(12) United States Patent
Shaffer et al.

(10) Patent No.: US 9,483,121 B2
(45) Date of Patent: *Nov. 1, 2016

(54) EVENT RECOGNITION

(71) Applicant: Apple Inc., Cupertino, CA (US)

(72) Inventors: Joshua H. Shaffer, San Jose, CA (US); Kenneth L. Kocienda, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/043,774

(22) Filed: Oct. 1, 2013

(65) Prior Publication Data

US 2014/0033131 A1    Jan. 30, 2014

Related U.S. Application Data

(63) Continuation of application No. 13/077,927, filed on Mar. 31, 2011, now Pat. No. 8,566,045, which is a a (Continued)

(51) Int. Cl.
*G01R 15/00*    (2006.01)
*G06F 3/01*    (2006.01)
(Continued)

(52) U.S. Cl.
CPC .......... *G06F 3/017* (2013.01); *G06F 3/04883* (2013.01); *G06F 9/4443* (2013.01); *G06F 9/542* (2013.01); *G06F 2203/04808* (2013.01)

(58) Field of Classification Search
CPC .. G06F 3/04883; G06F 9/4443; G06F 9/542; G06F 2209/545; G06F 3/017; G06F 2203/04808

USPC ........... 702/57, 182–185; 345/173; 715/200, 715/700, 733, 830

See application file for complete search history.

(56) References Cited

U.S. PATENT DOCUMENTS 4,455,452 A    6/1984    Schuyler .................... 178/18
5,046,434 A    9/1991    Breezer et al.
(Continued)

FOREIGN PATENT DOCUMENTS

AU    2007283771 A1    4/2008
CA    2755443 A1    9/2010
(Continued)

OTHER PUBLICATIONS

Ballard, Paul, "Microsoft Makes Research Technologies Available for Licensing", available at <http://www.theserveside.com/discussions/thread.tss?thread_id=33761>, May 5, 2005, 8 pages.
(Continued)

*Primary Examiner* — John H Le
(74) *Attorney, Agent, or Firm* — Morgan, Lewis & Bockius LLP

(57) ABSTRACT

While displaying one or more views of a first software application, an electronic device detects a sequence of touch inputs. The electronic device, in accordance with a determination that no gesture recognizer of the first software application recognizes a portion of the sequence of touch inputs, delivers the sequence of touch inputs to the second software application, and in accordance with a determination that at least one gesture recognizer in the second software application recognizes the sequence of touch inputs, processes the sequence of touch inputs with the at least one gesture recognizer in the second software application that recognizes the sequence of touch inputs.

33 Claims, 46 Drawing Sheets

Related U.S. Application Data continuation-in-part of application No. 12/566,660, filed on Sep. 24, 2009, now Pat. No. 8,285,499, and continuation-in-part of application No. 12/789,695, filed on May 28, 2010.

(60) Provisional application No. 61/425,222, filed on Dec. 20, 2010, provisional application No. 61/210,332, filed on Mar. 16, 2009, provisional application No. 61/298,531, filed on Jan. 26, 2010.

(51) Int. Cl.
*G06F 3/0488* (2013.01)
*G06F 9/44* (2006.01)
*G06F 9/54* (2006.01)

(56) References Cited

U.S. PATENT DOCUMENTS

| | | |
|---|---|---|
| 5,233,547 A | 8/1993 | Kapp et al. |
| 5,252,951 A | 10/1993 | Tannenbaum et al. |
| 5,454,960 A | 10/1995 | Newsom |
| 5,463,725 A | 10/1995 | Henckel et al. |
| 5,488,204 A | 1/1996 | Mead et al. ............. 178/18 |
| 5,495,566 A | 2/1996 | Kwatinetz |
| 5,513,309 A | 4/1996 | Meier et al. ............. 395/155 |
| 5,534,893 A | 7/1996 | Hansen, Jr. et al. ......... 345/179 |
| 5,564,112 A | 10/1996 | Hayes et al. |
| 5,566,337 A | 10/1996 | Szymanski et al. ......... 395/733 |
| 5,570,113 A | 10/1996 | Zetts |
| 5,583,543 A | 12/1996 | Takahashi et al. |
| 5,589,856 A | 12/1996 | Stein et al. |
| 5,627,567 A | 5/1997 | Davidson |
| 5,627,959 A | 5/1997 | Brown et al. ............. 395/356 |
| 5,676,064 A | 10/1997 | Shuert |
| 5,686,940 A | 11/1997 | Kuga ............. 345/156 |
| 5,698,822 A | 12/1997 | Haneda et al. |
| 5,708,460 A | 1/1998 | Young et al. ............. 345/173 |
| 5,745,116 A | 4/1998 | Pisutha-Arnond ............ 345/358 |
| 5,798,752 A | 8/1998 | Buxton et al. |
| 5,818,455 A | 10/1998 | Stone et al. |
| 5,844,547 A | 12/1998 | Minakuchi et al. |
| 5,864,636 A | 1/1999 | Chisaka |
| 5,867,158 A | 2/1999 | Murasaki et al. |
| 5,880,411 A | 3/1999 | Gillespie et al. ............. 178/18.01 |
| 5,903,902 A | 5/1999 | Orr et al. ............. 707/517 |
| 5,917,477 A | 6/1999 | Lee ............. 345/173 |
| 6,028,602 A | 2/2000 | Weidenfeller et al. ........ 345/340 |
| 6,034,688 A | 3/2000 | Greenwood et al. |
| 6,035,343 A | 3/2000 | Tsushima et al. |
| 6,061,063 A | 5/2000 | Wagner et al. |
| 6,089,371 A | 7/2000 | Lin |
| 6,141,018 A | 10/2000 | Beri et al. |
| 6,188,391 B1 | 2/2001 | Seely et al. ............. 345/173 |
| 6,259,436 B1 | 7/2001 | Moon et al. ............. 345/173 |
| 6,323,846 B1 | 11/2001 | Westerman et al. ............ 345/173 |
| 6,369,821 B2 | 4/2002 | Merrill et al. ............. 345/473 |
| 6,446,083 B1 | 9/2002 | Leight et al. |
| 6,486,896 B1 | 11/2002 | Ubillos ............. 345/784 |
| 6,489,951 B1 | 12/2002 | Wong et al. |
| 6,498,590 B1 | 12/2002 | Dietz et al. |
| 6,559,869 B1 | 5/2003 | Lui et al. |
| 6,567,102 B2 | 5/2003 | Kung |
| 6,570,557 B1 | 5/2003 | Westerman et al. ............ 345/173 |
| 6,570,594 B1 | 5/2003 | Wagner ............. 345/786 |
| 6,590,595 B1 | 7/2003 | Wagner et al. ............. 345/784 |
| 6,628,835 B1 | 9/2003 | Brill et al. |
| 6,636,242 B2 | 10/2003 | Bowman-Amuah |
| 6,639,584 B1 | 10/2003 | Li ............. 345/173 |
| 6,661,409 B2 | 12/2003 | Demartines et al. |
| 6,664,989 B1 | 12/2003 | Snyder et al. ............. 345/856 |
| 6,677,932 B1 | 1/2004 | Westerman ............. 345/173 |
| 6,677,965 B1 | 1/2004 | Ullmann et al. ............. 345/786 |
| 6,690,387 B2 | 2/2004 | Zimmerman et al. |
| 6,707,449 B2 | 3/2004 | Hinckley et al. |
| 6,714,936 B1 | 3/2004 | Nevin, III |
| 6,735,583 B1 | 5/2004 | Bjarnestam et al. |
| 6,741,996 B1 | 5/2004 | Brechner et al. ............. 707/102 |
| 6,757,673 B2 | 6/2004 | Makus et al. |
| 6,765,557 B1 | 7/2004 | Segal et al. ............. 345/173 |
| 6,778,992 B1 | 8/2004 | Searle et al. |
| 6,809,724 B1 | 10/2004 | Shiraishi et al. |
| 6,820,237 B1 | 11/2004 | Abu-Hakima et al. |
| 6,831,631 B2 | 12/2004 | Chuang |
| 6,839,721 B2 | 1/2005 | Schwols ............. 707/200 |
| 6,856,326 B1 | 2/2005 | Zhai |
| 6,868,383 B1 | 3/2005 | Bangalore et al. |
| 6,903,927 B2 | 6/2005 | Anlauff ............. 361/681 |
| 6,907,575 B2 | 6/2005 | Duarte |
| 6,912,462 B2 | 6/2005 | Ogaki |
| 6,957,392 B2 | 10/2005 | Simister et al. ............. 715/746 |
| 6,958,749 B1 | 10/2005 | Matsushita et al. ............ 345/175 |
| 6,963,937 B1 | 11/2005 | Kamper et al. ............. 710/73 |
| 6,972,776 B2 | 12/2005 | Davis et al. |
| 6,975,306 B2 | 12/2005 | Hinckley et al. |
| 6,985,137 B2 | 1/2006 | Kaikuranta ............. 345/175 |
| 6,985,178 B1 | 1/2006 | Morita et al. ............. 348/211 |
| 7,009,599 B2 | 3/2006 | Pihlaja |
| 7,009,626 B2 | 3/2006 | Anwar ............. 345/660 |
| 7,013,435 B2 | 3/2006 | Gallo et al. ............. 715/850 |
| 7,023,427 B2 | 4/2006 | Kraus et al. ............. 345/173 |
| 7,046,230 B2 | 5/2006 | Zadesky et al. |
| 7,062,090 B2 | 6/2006 | Simmons et al. |
| 7,075,512 B1 | 7/2006 | Fabre et al. |
| 7,084,859 B1 | 8/2006 | Pryor |
| 7,088,374 B2 | 8/2006 | David et al. ............. 345/619 |
| 7,102,626 B2 | 9/2006 | Denny, III |
| 7,117,453 B2 | 10/2006 | Drucker et al. ............. 715/833 |
| 7,152,210 B1 | 12/2006 | Van Den Hoven et al. .. 715/723 |
| 7,154,534 B2 | 12/2006 | Seki et al. |
| 7,155,048 B2 | 12/2006 | Ohara |
| 7,173,623 B2 | 2/2007 | Calkins et al. ............. 345/473 |
| 7,181,373 B2 | 2/2007 | Le Cocq et al. |
| 7,184,796 B2 | 2/2007 | Karidis et al. |
| 7,240,291 B2 | 7/2007 | Card et al. |
| 7,337,412 B2 | 2/2008 | Guido et al. ............. 715/853 |
| 7,346,850 B2 | 3/2008 | Swartz et al. ............. 715/763 |
| 7,358,965 B2 | 4/2008 | Barabe et al. |
| 7,385,592 B2 | 6/2008 | Collins |
| 7,469,381 B2 | 12/2008 | Ording |
| 7,487,447 B1 | 2/2009 | Jerger |
| 7,499,027 B2 | 3/2009 | Brigham, II et al. |
| 7,561,159 B2 | 7/2009 | Abel et al. ............. 345/473 |
| 7,564,448 B2 | 7/2009 | Yi |
| 7,576,732 B2 | 8/2009 | Lii ............. 345/173 |
| 7,614,008 B2 | 11/2009 | Ording |
| 7,653,883 B2 | 1/2010 | Hotelling et al. ............. 715/863 |
| 7,663,607 B2 | 2/2010 | Hotelling et al. |
| 7,673,255 B2 | 3/2010 | Schechter et al. |
| 7,724,242 B2 | 5/2010 | Hillis et al. |
| 7,750,893 B2 | 7/2010 | Hashimoto et al. ............ 345/173 |
| 7,786,975 B2 | 8/2010 | Ording et al. |
| 7,812,826 B2 | 10/2010 | Ording et al. |
| 7,843,427 B2 | 11/2010 | Ording et al. |
| 7,844,915 B2 | 11/2010 | Platzer et al. |
| 7,864,037 B2 | 1/2011 | Miller |
| 7,872,652 B2 | 1/2011 | Platzer et al. |
| 7,900,156 B2 | 3/2011 | Andre et al. ............. 715/773 |
| 7,903,115 B2 | 3/2011 | Platzer et al. |
| 7,917,584 B2 | 3/2011 | Arthursson |
| 7,925,996 B2 | 4/2011 | Hofmeister et al. |
| 7,941,760 B2 | 5/2011 | Kocienda et al. |
| 7,962,862 B2 | 6/2011 | Kulp et al. |
| 7,966,578 B2 | 6/2011 | Tolmasky et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | No et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |

(56) References Cited

U.S. PATENT DOCUMENTS

| | | |
|---|---|---|
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,400,416 B2 | 3/2013 | Ho et al. |
| 8,416,196 B2 | 4/2013 | Williamson et al. |
| 8,428,893 B2 | 4/2013 | Moore et al. |
| 8,434,003 B2 | 4/2013 | Zalewski et al. |
| 8,436,815 B2 | 5/2013 | Mazeev et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 | 10/2013 | Rekimoto |
| 8,645,827 B2 | 2/2014 | Beaver et al. |
| 8,682,602 B2 | 3/2014 | Moore et al. |
| 2001/0009033 A1 | 7/2001 | Morisaki et al. |
| 2001/0011998 A1 | 8/2001 | Agata et al. ............... 345/168 |
| 2001/0012001 A1 | 8/2001 | Rekimoto et al. |
| 2001/0028369 A1 | 10/2001 | Gallo et al. |
| 2001/0045949 A1 | 11/2001 | Chithambaram et al. .... 345/418 |
| 2002/0015024 A1 | 2/2002 | Westerman et al. |
| 2002/0015064 A1 | 2/2002 | Robotham et al. |
| 2002/0036618 A1 | 3/2002 | Wakai et al. |
| 2002/0101418 A1 | 8/2002 | Vernier et al. |
| 2002/0191029 A1 | 12/2002 | Gillespie et al. |
| 2002/0194589 A1 | 12/2002 | Cristofalo et al. ............ 725/32 |
| 2003/0071850 A1 | 4/2003 | Geidl ........................... 345/781 |
| 2003/0071858 A1 | 4/2003 | Morohoshi ................... 345/856 |
| 2003/0080946 A1 | 5/2003 | Chuang |
| 2003/0095096 A1 | 5/2003 | Robbin et al. ................ 345/156 |
| 2003/0095135 A1 | 5/2003 | Kaasila et al. |
| 2003/0095697 A1 | 5/2003 | Wood et al. |
| 2003/0122787 A1 | 7/2003 | Zimmerman et al. ........ 345/173 |
| 2003/0132959 A1 | 7/2003 | Simister et al. .............. 345/746 |
| 2003/0146941 A1 | 8/2003 | Bailey et al. |
| 2003/0160832 A1 | 8/2003 | Ridgley et al. ............... 345/854 |
| 2003/0174149 A1 | 9/2003 | Fujisaki et al. ............... 345/684 |
| 2003/0184525 A1 | 10/2003 | Tsai |
| 2003/0197689 A1 | 10/2003 | May ............................. 345/173 |
| 2003/0197744 A1 | 10/2003 | Irvine |
| 2003/0210258 A1 | 11/2003 | Williams |
| 2003/0214531 A1 | 11/2003 | Chambers et al. |
| 2003/0222917 A1 | 12/2003 | Trantow |
| 2004/0001627 A1 | 1/2004 | Simmons et al. |
| 2004/0021676 A1 | 2/2004 | Chen et al. ................... 345/684 |
| 2004/0021698 A1 | 2/2004 | Baldwin et al. .............. 345/853 |
| 2004/0025115 A1 | 2/2004 | Sienel et al. |
| 2004/0027398 A1 | 2/2004 | Jaeger .......................... 345/863 |
| 2004/0039474 A1 | 2/2004 | Kontani |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. ............... 345/700 |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt ......................... 345/173 |
| 2004/0189721 A1 | 9/2004 | Pettiross et al. |
| 2004/0210847 A1 | 10/2004 | Berson et al. |
| 2004/0215643 A1 | 10/2004 | Brechner et al. ............. 707/100 |
| 2004/0222992 A1 | 11/2004 | Calkins et al. ............... 345/473 |
| 2004/0224638 A1 | 11/2004 | Fadell et al. ................. 455/66.1 |
| 2004/0263486 A1 | 12/2004 | Seni |
| 2005/0005241 A1 | 1/2005 | Hunleth et al. ............... 715/720 |
| 2005/0008343 A1 | 1/2005 | Frohlich et al. |
| 2005/0012723 A1 | 1/2005 | Pallakoff |
| 2005/0017957 A1 | 1/2005 | Yi |
| 2005/0024341 A1 | 2/2005 | Gillespie et al. |
| 2005/0027666 A1 | 2/2005 | Beck, Jr. et al. |
| 2005/0057524 A1 | 3/2005 | Hill et al. ..................... 345/173 |
| 2005/0088443 A1 | 4/2005 | Blanco et al. ................ 345/473 |
| 2005/0122806 A1 | 6/2005 | Arakawa et al. |
| 2005/0145807 A1 | 7/2005 | Lapstun et al. |
| 2005/0162402 A1 | 7/2005 | Watanachote ................ 345/173 |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0193015 A1 | 9/2005 | Logston et al. ........... 707/104.1 |
| 2005/0195154 A1 | 9/2005 | Robbins et al. |
| 2005/0198588 A1 | 9/2005 | Lin et al. |
| 2005/0210419 A1 | 9/2005 | Kela et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0010400 A1 | 1/2006 | Dehlin et al. ................. 715/856 |
| 2006/0025218 A1 | 2/2006 | Hotta |
| 2006/0026521 A1 | 2/2006 | Hotelling et al. ............ 715/702 |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028455 A1 | 2/2006 | Hinckley et al. ............. 345/173 |
| 2006/0031786 A1 | 2/2006 | Hillis et al. |
| 2006/0036955 A1 | 2/2006 | Baudisch et al. ............. 715/747 |
| 2006/0038796 A1 | 2/2006 | Hinckley et al. ............. 345/173 |
| 2006/0048073 A1 | 3/2006 | Jarrett et al. |
| 2006/0055662 A1 | 3/2006 | Rimas-Ribikauskas et al. |
| 2006/0055669 A1 | 3/2006 | Das |
| 2006/0061551 A1 | 3/2006 | Fateh |
| 2006/0066588 A1 | 3/2006 | Lyon et al. |
| 2006/0077183 A1 | 4/2006 | Studt |
| 2006/0077544 A1 | 4/2006 | Stark |
| 2006/0082549 A1 | 4/2006 | Hoshino et al. |
| 2006/0094502 A1 | 5/2006 | Katayama et al. |
| 2006/0097991 A1 | 5/2006 | Hotelling et al. ............ 345/173 |
| 2006/0112335 A1 | 5/2006 | Hofmeister et al. |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. ............ 715/863 |
| 2006/0181510 A1 | 8/2006 | Faith |
| 2006/0187215 A1 | 8/2006 | Rosenberg et al. |
| 2006/0190833 A1 | 8/2006 | SanGiovanni et al. ....... 715/767 |
| 2006/0197753 A1 | 9/2006 | Hotelling ..................... 345/173 |
| 2006/0236263 A1 | 10/2006 | Bathiche et al. ............. 715/786 |
| 2006/0238495 A1 | 10/2006 | Davis |
| 2006/0242602 A1 | 10/2006 | Schechter et al. |
| 2006/0242607 A1 | 10/2006 | Hudson ........................ 715/863 |
| 2006/0262104 A1 | 11/2006 | Sullivan et al. |
| 2006/0279548 A1 | 12/2006 | Geaghan |
| 2006/0284792 A1 | 12/2006 | Foxlin |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0036346 A1 | 2/2007 | Kwon |
| 2007/0046643 A1 | 3/2007 | Hillis et al. |
| 2007/0050469 A1 | 3/2007 | Gupta et al. |
| 2007/0055967 A1 | 3/2007 | Poff et al. .................... 717/162 |
| 2007/0061126 A1 | 3/2007 | Russo et al. |
| 2007/0064004 A1 | 3/2007 | Bonner et al. |
| 2007/0067745 A1 | 3/2007 | Choi et al. |
| 2007/0075965 A1 | 4/2007 | Huppi et al. .................. 345/156 |
| 2007/0081726 A1 | 4/2007 | Westerman et al. .......... 382/185 |
| 2007/0089069 A1 | 4/2007 | Hsieh et al. |
| 2007/0109275 A1 | 5/2007 | Chuang |
| 2007/0120835 A1 | 5/2007 | Sato |
| 2007/0132789 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | Van Os et al. |

(56) References Cited

U.S. PATENT DOCUMENTS

| | | |
|---|---|---|
| 2007/0174257 A1 | 7/2007 | Howard .......................... 707/3 |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. ................. 707/10 |
| 2007/0198926 A1 | 8/2007 | Joguet et al. |
| 2007/0214436 A1 | 9/2007 | Myers, Jr. |
| 2007/0214462 A1 | 9/2007 | Boillot |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. ................... 345/173 |
| 2007/0252821 A1 | 11/2007 | Hollemans et al. ........... 345/173 |
| 2007/0262964 A1 | 11/2007 | Zotov et al. |
| 2007/0277124 A1 | 11/2007 | Shin et al. |
| 2007/0288856 A1 | 12/2007 | Butlin et al. .................. 715/762 |
| 2007/0291009 A1 | 12/2007 | Wright et al. ................. 345/173 |
| 2008/0001923 A1 | 1/2008 | Hall et al. |
| 2008/0005703 A1 | 1/2008 | Radivojevic et al. ......... 715/863 |
| 2008/0012835 A1 | 1/2008 | Rimon et al. .................. 345/173 |
| 2008/0016096 A1 | 1/2008 | Wilding et al. ............... 707/101 |
| 2008/0028327 A1 | 1/2008 | Hirota et al. |
| 2008/0034029 A1 | 2/2008 | Fang et al. .................... 709/203 |
| 2008/0036743 A1 | 2/2008 | Westerman et al. |
| 2008/0043020 A1 | 2/2008 | Snow et al. |
| 2008/0048978 A1 | 2/2008 | Trent, Jr. et al. ............. 345/157 |
| 2008/0094356 A1 | 4/2008 | Ording et al. |
| 2008/0094368 A1 | 4/2008 | Ording et al. ................ 345/173 |
| 2008/0104544 A1 | 5/2008 | Collins et al. |
| 2008/0114614 A1 | 5/2008 | Mahesh et al. ................ 705/2 |
| 2008/0120576 A1 | 5/2008 | Kariathungal et al. |
| 2008/0122806 A1 | 5/2008 | Ahn |
| 2008/0158191 A1 | 7/2008 | Yang et al. |
| 2008/0162751 A1 | 7/2008 | Wilson |
| 2008/0165132 A1 | 7/2008 | Weiss et al. .................. 345/173 |
| 2008/0165136 A1 | 7/2008 | Christie et al. |
| 2008/0165140 A1 | 7/2008 | Christie et al. |
| 2008/0165141 A1 | 7/2008 | Christie et al. |
| 2008/0165160 A1 | 7/2008 | Kocienda et al. |
| 2008/0166049 A1 | 7/2008 | Wang et al. |
| 2008/0168384 A1 | 7/2008 | Platzer et al. |
| 2008/0168388 A1 | 7/2008 | Decker |
| 2008/0168395 A1 | 7/2008 | Ording et al. ................. 715/833 |
| 2008/0168402 A1 | 7/2008 | Blumenberg |
| 2008/0168405 A1 | 7/2008 | Tolmasky et al. |
| 2008/0168478 A1 | 7/2008 | Platzer et al. |
| 2008/0172633 A1 | 7/2008 | Jeon et al. |
| 2008/0207130 A1 | 8/2008 | Kunii |
| 2008/0218489 A1 | 9/2008 | Park et al. .................... 345/173 |
| 2008/0231610 A1 | 9/2008 | Hotelling et al. ............. 345/173 |
| 2008/0316183 A1 | 12/2008 | Westerman et al. |
| 2009/0049388 A1 | 2/2009 | Taib et al. ..................... 715/738 |
| 2009/0051671 A1 | 2/2009 | Konstas |
| 2009/0058830 A1 | 3/2009 | Herz et al. |
| 2009/0064047 A1 | 3/2009 | Shim et al. |
| 2009/0207140 A1 | 8/2009 | Hansson ....................... 345/173 |
| 2009/0211891 A1 | 8/2009 | Lai et al. ...................... 200/512 |
| 2009/0225037 A1 | 9/2009 | Williamson et al. .......... 345/173 |
| 2009/0225038 A1 | 9/2009 | Bolsinga et al. .............. 345/173 |
| 2009/0225039 A1 | 9/2009 | Williamson et al. .......... 345/173 |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0244020 A1 | 10/2009 | Sjolin |
| 2009/0251434 A1 | 10/2009 | Rimon et al. |
| 2009/0259969 A1 | 10/2009 | Pallakoff ...................... 715/808 |
| 2009/0262087 A1 | 10/2009 | Kim |
| 2009/0273571 A1 | 11/2009 | Bowens |
| 2009/0282332 A1 | 11/2009 | Porat |
| 2009/0284479 A1 | 11/2009 | Dennis et al. |
| 2009/0300530 A1 | 12/2009 | Falchuk |
| 2009/0304281 A1 | 12/2009 | Yipu |
| 2009/0309847 A1 | 12/2009 | Russell et al. |
| 2009/0322687 A1 | 12/2009 | Duncan et al. |
| 2009/0322699 A1 | 12/2009 | Hansson ....................... 345/174 |
| 2009/0322700 A1 | 12/2009 | D'Souza et al. .............. 345/174 |
| 2010/0013676 A1 | 1/2010 | Do et al. |
| 2010/0020025 A1 | 1/2010 | Lemort et al. |
| 2010/0020221 A1 | 1/2010 | Tupman et al. ......... 348/333.01 |
| 2010/0030612 A1 | 2/2010 | Kim et al. |
| 2010/0046850 A1 | 2/2010 | Ho et al. |
| 2010/0085323 A1 | 4/2010 | Bogue |
| 2010/0107116 A1 | 4/2010 | Rieman et al. ............... 715/784 |
| 2010/0146458 A1 | 6/2010 | Wadekar ...................... 715/863 |
| 2010/0149122 A1 | 6/2010 | Lin ............... 345/173 |
| 2010/0156804 A1 | 6/2010 | Young |
| 2010/0169841 A1 | 7/2010 | Singh |
| 2010/0177053 A2 | 7/2010 | Yasutake |
| 2010/0182248 A1 | 7/2010 | Chun |
| 2010/0235118 A1 | 9/2010 | Moore et al. |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299590 A1 | 11/2010 | Zalewski et al. |
| 2010/0325575 A1 | 12/2010 | Platzer et al. |
| 2011/0037714 A1 | 2/2011 | Seo et al. ..................... 345/173 |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0102464 A1 | 5/2011 | Godavari |
| 2011/0115745 A1 | 5/2011 | Cabrera Cordon et al. |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0242032 A1 | 10/2011 | Seo et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0291951 A1 | 12/2011 | Tong |
| 2011/0295596 A1 | 12/2011 | Hung et al. |
| 2011/0304560 A1 | 12/2011 | Dale et al. |
| 2011/0307833 A1 | 12/2011 | Dale et al. |
| 2011/0310046 A1 | 12/2011 | Beaver et al. |
| 2011/0310047 A1 | 12/2011 | Moore et al. |
| 2011/0314429 A1 | 12/2011 | Blumenberg |
| 2011/0314430 A1 | 12/2011 | Blumenberg |
| 2011/0321125 A1 | 12/2011 | Kyohgoku et al. |
| 2012/0023443 A1 | 1/2012 | Blumenberg |
| 2012/0023460 A1 | 1/2012 | Blumenberg |
| 2012/0023461 A1 | 1/2012 | Blumenberg |
| 2012/0023509 A1 | 1/2012 | Blumenberg |
| 2012/0026104 A1 | 2/2012 | Ho et al. |
| 2012/0133579 A1 | 5/2012 | Prieur et al. |
| 2012/0221929 A1 | 8/2012 | Bolsinga et al. |
| 2012/0242584 A1 | 9/2012 | Tuli |
| 2012/0256849 A1 | 10/2012 | Crumly |
| 2012/0278725 A1 | 11/2012 | Gordon et al. |
| 2013/0009986 A1 | 1/2013 | Shah et al. |
| 2013/0016039 A1 | 1/2013 | Moore et al. |
| 2013/0069899 A1 | 3/2013 | Beaver et al. |
| 2013/0120280 A1 | 5/2013 | Kukulski |
| 2013/0239046 A1 | 9/2013 | Platzer et al. |
| 2013/0244574 A1 | 9/2013 | Okuno et al. |
| 2013/0246861 A1 | 9/2013 | Colley et al. |
| 2013/0275888 A1 | 10/2013 | Williamson et al. |
| 2014/0145995 A1 | 5/2014 | Beaver et al. |
| 2014/0160052 A1 | 6/2014 | Moore et al. |
| 2014/0173419 A1 | 6/2014 | Williamson et al. |
| 2014/0181731 A1 | 6/2014 | Platzer et al. |
| 2014/0361982 A1 | 12/2014 | Shaffer |

FOREIGN PATENT DOCUMENTS

| | | |
|---|---|---|
| CN | 1326564 A | 12/2001 |
| CN | 1331815 A | 1/2002 |
| CN | 1422481 A | 6/2003 |
| CN | 1695105 A | 11/2005 |
| CN | 1704886 A | 12/2005 |
| CN | 1797308 A | 7/2006 |
| CN | 1845046 A | 10/2006 |

(56) References Cited

FOREIGN PATENT DOCUMENTS

| | | | |
|---|---|---|---|
| CN | 2841284 A | 10/2006 | G06F 3/033 |
| CN | 1860429 A | 11/2006 | |
| CN | 1967458 A | 5/2007 | |
| CN | 101410781 A | 4/2009 | |
| CN | 101526880 A | 9/2009 | |
| CN | 101529368 A | 9/2009 | |
| CN | 101727240 A | 6/2010 | |
| DE | 202007013923 U1 | 12/2007 | |
| DE | 202005021427 U1 | 2/2008 | |
| EA | 2 141 576 A2 | 1/2010 | G06F 3/048 |
| EP | 0538705 A1 | 4/1993 | |
| EP | 0626635 A2 | 11/1994 | |
| EP | 0635779 A1 | 1/1995 | |
| EP | 0701220 A1 | 3/1996 | |
| EP | 0712825 A1 | 5/1996 | |
| EP | 0880091 A2 | 11/1998 | |
| EP | 1 517 228 A2 | 3/2005 | G06F 3/033 |
| EP | 1860539 A1 | 11/2007 | |
| EP | 2031837 A2 | 3/2009 | |
| EP | 1964022 B1 | 3/2010 | |
| EP | 2 184 673 A1 | 5/2010 | G06F 3/048 |
| EP | 2 354 930 A1 | 8/2011 | |
| EP | 2 390 766 A1 | 11/2011 | G06F 3/041 |
| GB | 1517521 A | 7/1978 | |
| GB | 2 319 591 A | 5/1998 | G06F 3/033 |
| GB | 2 351 639 A | 1/2001 | G06F 3/033 |
| GB | 2373778 A | 10/2002 | |
| GB | 2 404 547 A | 7/2003 | G06F 3/033 |
| JP | 2-140822 A1 | 5/1990 | |
| JP | 3-271976 A | 12/1991 | |
| JP | H05-019969 | 1/1993 | |
| JP | 05 298002 | 11/1993 | |
| JP | 06-149467 | 5/1994 | |
| JP | 08-16314 | 1/1996 | |
| JP | 10-500509 A | 1/1998 | |
| JP | H11-085354 A | 3/1999 | |
| JP | 2000-163031 A | 6/2000 | |
| JP | 2000-163443 A | 6/2000 | |
| JP | 2000 222130 | 8/2000 | |
| JP | 2000-322199 A | 11/2000 | |
| JP | 2001-027924 | 1/2001 | |
| JP | 2001 290585 | 10/2001 | |
| JP | 2003-296024 A | 10/2003 | |
| JP | 2003-330605 | 11/2003 | |
| JP | 2005 056286 | 3/2005 | |
| JP | 2005 082086 | 3/2005 | |
| JP | 2005-165532 | 6/2005 | |
| JP | 2005 242669 | 9/2005 | G06F 17/21 |
| JP | 2005 322088 | 11/2005 | |
| JP | 2006-085356 A | 3/2006 | |
| JP | 2006-085703 | 3/2006 | |
| JP | 2006 102275 | 4/2006 | |
| JP | 2006-314167 | 11/2006 | |
| JP | 2006-350490 | 12/2006 | |
| JP | 2008-508601 A | 3/2008 | |
| JP | 2008 146165 | 6/2008 | |
| JP | 2008-203973 | 9/2008 | |
| JP | 2008 312153 | 12/2008 | |
| JP | 2009-169825 | 7/2009 | |
| JP | 2009-525538 | 7/2009 | |
| JP | 2010-503124 A | 1/2010 | |
| JP | 2010-503125 A | 1/2010 | |
| JP | 2012 014299 | 1/2012 | |
| KR | 10-2009-0057304 A | 6/2009 | |
| KR | 10-2009-0057421 A | 6/2009 | |
| WO | WO 00/38042 A1 | 6/2000 | |
| WO | 01/29702 A2 | 4/2001 | |
| WO | 01/77792 A2 | 4/2001 | |
| WO | 02/01338 A1 | 1/2002 | |
| WO | WO 02/08881 A2 | 1/2002 | G06F 3/00 |
| WO | WO 02/13176 A2 | 2/2002 | |
| WO | 02/21338 A2 | 3/2002 | |
| WO | 03/060622 A2 | 7/2003 | |
| WO | 03/081458 A1 | 10/2003 | |
| WO | 2004/001560 A1 | 12/2003 | |
| WO | WO 2005/029460 A1 | 3/2005 | |
| WO | 2005/052773 A2 | 6/2005 | |
| WO | 2006/003590 A2 | 1/2006 | |
| WO | 2006/003591 A2 | 1/2006 | |
| WO | WO 2006/020304 A2 | 2/2006 | |
| WO | WO 2006/020305 A2 | 2/2006 | |
| WO | WO 2006/026183 A2 | 3/2006 | |
| WO | 2006/045530 A2 | 5/2006 | |
| WO | WO 2006/067711 A2 | 6/2006 | |
| WO | WO 2006/094308 A2 | 9/2006 | |
| WO | WO 2006/128248 A2 | 12/2006 | G06F 3/00 |
| WO | WO 2007/037806 A1 | 4/2007 | G06F 3/038 |
| WO | WO 2007/067858 | 6/2007 | |
| WO | WO 2007/079425 A2 | 7/2007 | |
| WO | WO 2007/089766 A2 | 8/2007 | G06F 3/048 |
| WO | WO 2008/020446 A1 | 2/2008 | |
| WO | WO 2008/030779 A2 | 3/2008 | |
| WO | WO 2008/030879 A2 | 3/2008 | |
| WO | WO 2008/030880 A1 | 3/2008 | |
| WO | WO 2008/085846 A2 | 7/2008 | |
| WO | WO 2008/085848 A1 | 7/2008 | G06F 3/048 |
| WO | WO 2008/085855 A1 | 7/2008 | G06F 3/048 |
| WO | WO 2008/085871 A1 | 7/2008 | G06F 3/048 |
| WO | WO 2008/085877 A1 | 7/2008 | G06F 9/44 |
| WO | WO 2008/148021 A1 | 12/2008 | |
| WO | WO 2009/018314 A2 | 2/2009 | G06F 3/048 |
| WO | WO 2009/111189 A1 | 9/2009 | G06F 3/048 |
| WO | WO 2009/111458 A1 | 9/2009 | G06F 17/30 |
| WO | WO 2009/111460 A1 | 9/2009 | G06F 17/30 |
| WO | WO 2009/111469 A1 | 9/2009 | G06F 3/041 |

OTHER PUBLICATIONS

Bederson et al., "PhotoMesa 3.1.2 Screen Shots", 2004-2006, 5 pages.
Benko et al., "Precise Selection Techniques for Multi-Touch Screens", CHI 2006, Apr. 22-27, 2006, 10 pages.
Davis, Joshua, "Flash to the Core—An Interactive Sketchbook", available at <http://flashtothecore.praystation.com/menu.html>, 2002, 3 pages.
Dewid, R D., "Scroll Control Box", IBM Technical Disclosure Bulletin, vol. 38, No. 4, Apr. 1993, pp. 399-403.
Dodge et al., "Microsoft Office Excel 2003 Office Manual", Microsoft Press, vol. 1, Unable to Locate English Translation, Jul. 12, 2004, 5 pages.
Forlines et al., "DTLens: Multi-user Tabletop Spatial Data Exploration", UIST'05, Oct. 23-27, 2005, 6 pages.
Forlines et al., "Glimpse: A Novel Input Model for Multi-Level Devices", CHI'2005, Apr. 2-7, 2005, 6 pages.
Karlson et al., "AppLens and LaunchTile: Two Designs for One-Handed Thumb Use on Small Devices", CHI 2005 (Powerpoint), 2005, 17 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Mertz et al., "The Influence of Design Techniques on User Interfaces: The DigiStrips Experiment for Air Traffic Control", Proceeding of HCI-Aero 2000 International Conference on Human-Computer Interaction in Aeronautics, 2000, 6 pages.
Miller, Dana, "PersonalJava Application Enviornment", available at <http://java.sun.com/products/personaljava/touchable/>, Jun. 8, 1999, 12 pages.
Millhollon et al., "Microsoft Office Word 2003 Inside Out", 2004, 7 pages.
Plaisant et al., "Touchscreen Toggle Design", CHI'92, May 3-7, 1992, pp. 667-668.
Rubine, Dean H., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Salmoni, "The Zooming User Interface", Advogato, available at <http://www.advogato.org/article/788.html>, Aug. 16, 2004, 14 pages.
Tidwell, Jenifer, "Magnetism", Designing Interfaces, Section 85, 2006, pp. 261-262.

(56) References Cited

OTHER PUBLICATIONS

Westerman, Wayne, "Hand Tracking, Finger Identification, and Chordic Manipulation on a Multi-Touch Surface", Doctoral Dissertation, 1999, 363 Pages.
"*Apple Inc.* vs. *Samsung Electronics Co. Ltd.* et al., Judgment", Aug. 24, 2011, 65 pages.
"*Apple Inc.* vs. *Samsung Electronics Co. Ltd.*, et al., Samsung's Motion to Supplement Invalidity Contentions filed Jan. 27, 2012 together with Exhibit 6", 47 pages.
"*Apple Inc.* vs. *Samsung Electronics Co. Ltd.*, et al., Samsung's Patent Local Rule 3-3 and 3-4 Disclosures dated Oct. 7, 2011, together with Exhibits G-1 through G-7 and Exhibit H", Oct. 7, 2011, 287 pages.
"HTC Europe Co. Ltd and Apple Inc. Invalidity Claim dated Apr. 5, 2012, together with annexes", 12 pages.
"HTC Europe Co. Ltd and Apple Inc. invalidity Claim dated Jul. 29, 2011, together with amended Particulars of Claim and amended Grounds of Invalidity", 22 pages.
"Microsoft Word 2003 Screenshots", 1983-2003, 2 pages.
"Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA", 53 pages.
"Notice of Appeal in Expedited Appeal in Summary Proceedings dated Sep. 14, 2011", 51 pages.
"Pleading notes Mr. B.J. Berghuis van Woortman", Aug.-Nov. 2010, 16 pages.
"Pleading notes Mr. Kleemans, Mr. Blomme and Mr. Van Oorschot", Aug. 10, 2011, 35 pages.
"Samsung Electronics GmbH/Apple Inc. Opposition", Jan. 30, 2012, 27 pages.
"Samsung Statement of Defense (Smartphones) Also Counterclaim", Jul. 20, 2011, 48 pages.
"Samsung Statement of Defense (Tablets) Also Counterclaim", Jul. 20, 2011, 44 pages.
International Preliminary Report on Patentability received for PCT Patent Application No. PCT/US2005/000089, issued on Jun. 18, 2005, 5 pages.
Office Action received for European Patent Application No. 09154313.2, mailed on Feb. 12, 2010, 1 page.
Office Action received for European Patent Application No. 09700007.9, Aug. 28, 2014, 8 pages.
Office Action received for European Patent Application No. 09700007.9, Mar. 9, 2012, 7 pages.
Extended European Search Report (includes Partial European Search Report and European Search Opinion) received for European Patent Application No. 11150788.5, mailed on Mar. 1, 2011, 6 pages.
Office Action received for European Patent Application No. 11150788.5, mailed on May 9, 2014, 6 pages.
Office Action received for European Patent Application No. 11184167.2, mailed on May 14, 2014, 6 pages.
Office Action received for European Patent Application No. 11184169.8, mailed on May 14, 2014, 6 pages.
Office Action received for European Patent Application No. 11184170.6, mailed on May 16, 2014, 6 pages.
Office Action received for European Patent Application No. 11184172.2, mailed on May 16, 2014, 5 pages.
Extended European Search Report (includes Partial European Search Report and European Search Opinion) received for European Patent Application No. 11184222.5, mailed on Jan. 13, 2012, 7 pages.
Extended European Search Report (includes Partial European Search Report and European Search Opinion) received for European Patent Application No. 11184223.3, mailed on Jan. 13, 2012, 7 pages.
Office Action received for European Patent Application No. 11184409.8, mailed on May 16, 2014, 6 pages.
Non-Final Office Action received for U.S. Appl. No. 12/042,237, mailed on Dec. 30, 2010, 9 pages.
Extended European Search Report (includes Partial European Search Report and European Search Opinion) received for European Patent Application No. 12156394.4, mailed on Jun. 5, 2012, 6 pages.
Extended European Search Report (includes Partial European Search Report and European Search Opinion) received for European Patent Application No. 121563951, mailed on Jun. 6, 2012, 6 pages.
Office Action received for European Patent Application No. 12188748.3, mailed on Oct. 30, 2013, 5 pages.
Non-Final Office Action received for U.S. Appl. No. 13/221,827, mailed on Jun. 23, 2014, 19 pages.
Kim et al., "HCI(Human Computer Interaction) Using Multi-touch Tabletop Display", IEEE Pacific Rim Conference on Communications, Computers and Signal Processing, Aug. 22-24, 2007, pp. 391-394.
Flanagan, D., "JavaScript," 5th Edition, O'Reilly Japan, Jan. 31, 2008, pp. 405-437, (No English translation provided).
International Preliminary Report on Patentability dated Jul. 4, 2013, received in International Patent Application No. PCT/US2011/065859, which corresponds to U.S. Appl. No. 13/077,925, 18 pages (Shaffer).
Office Action dated Oct. 31, 2013, received in Chinese Patent Application No. 201080020598.0, which corresponds to U.S. Appl. No. 12/566,660, 2 pages (Moore).
Office Action dated Jun. 19, 2013, received in European Patent Application No. 10 712 825.8, which corresponds to U.S. Appl. No. 12/666,660, 5 pages (Moore).
Office Action dated Oct. 24, 2013, received in U.S. Appl. No. 12/789,695, 24 pages (Shaffer).
Office Action dated Jun. 28, 2013, received in Australian Patent Application No. 2011209720, which corresponds to U.S. Appl. No. 12/789,605, 4 pages (Shaffer).
Office Action dated Aug. 26, 2013, received in Chinese Patent Application No. 201110063183.8 which corresponds to U.S. Appl. No. 12/789,695, (Shaffer).
Office Action dated Jul. 26, 2013, received in European Patent Application No. 11 152 015.1, which corresponds to U.S. Appl. No. 12/789,695, 6 pages (Shaffer).
Office Action dated Aug. 14, 2013, received in Australian Patent Application No. 2011268047, which corresponds to U.S. Appl. No. 12/892,848, 2 pages (Dale).
Office Action dated Aug. 22, 2013, received in European Patent Application No. 11 727 371.4, which corresponds to U.S. Appl. No. 12/892,848, 6 pages (Dale).
Office Action dated Nov. 18, 2013, received in Japanese Patent Application No. 2013 515382, which corresponds to U.S. Appl. No. 12/892,848, 37 pages (Dale).
Office Action dated Dec. 5, 2013, received in Korean Patent Application No. 2012 7029818, which corresponds to U.S. Appl. No. 12/892,848, 4 pages (Dale).
Final Office Action dated Jul. 19, 2013, received in U.S. Appl. No. 12/892,851, 21 pages (Dale).
Notice of Grant dated Jul. 26, 2013, received in Chinese Patent Application No. 201120580018.5, which corresponds to U.S. Appl. No. 13/077,925, 7 pages (Shaffer).
Notice of Allowance dated Dec. 16, 2013, received in U.S. Appl. No. 12/042,318, 51 pages (Beaver).
Notice of Acceptance dated Jul. 3, 2013. received in Australian Patent Application No. 2011205170, which corresponds to U.S. Appl. No. 12/042,318, 2 pages (Beaver).
Office Action dated Aug. 6, 2013, received in Chinese Patent Application No. 201110148738.9, which corresponds to U.S. Appl. No. 12/042,318 6 pages (Beaver).
Decision to Grant dated Nov. 1, 2013, received in Japanese Patent Application No. 2012 186775, which corresponds to U.S. Appl. No. 12/042,318, 3 pages (Beaver).
Notice of Allowance dated Sep. 27, 2013, received in U.S. Appl. No. 12/042,067, 16 pages (Williamson).
Notice of Allowance dated Dec. 6, 2013, received in U.S. Appl. No. 12/042,067, 12 pages (Williamson).

(56) References Cited

OTHER PUBLICATIONS

Office Action dated Jul. 3, 2013, received in Chinese Patent Application No. 200980000013.6, which corresponds to U.S. Appl. No. 12/042,299, 6 pages (Williamson).
Notification of Grant dated Nov. 6, 2013, received in Chinese Patent Application No. 200980000013.6, which corresponds to U.S. Appl. No. 12/042,299, 2 pages (Williamson).
Summons to attend oral proceedings dated Oct. 30, 2013, received in European Patent Application No. 09700007.9, which corresponds to U.S. Appl. No. 12/042,299, 5 pages (Williamson).
Summons to attend oral proceedings dated Oct. 30, 2013, received in European Patent Application No. 11184226 6, which corresponds to U.S. Appl. No. 12/042,299, 5 pages (Williamson).
Summons to attend oral proceedings dated Oct. 30, 2013, received in European Patent Application No. 11184224.1, which corresponds to U.S. Appl. No. 12/042,299, 5 pages (Williamson).
Summons to attend oral proceedings dated Oct. 30, 2813, received in European Patent Application No. 11184223.3, which corresponds to U.S. Appl. No. 12/042,299, 5 pages (Williamson).
Summons to attend oral proceedings dated Oct. 30, 2013, received in European Patent Application No. 11184222.5, which corresponds to U.S. Appl. No. 12/042,299, 5 pages (Williamson).
Office Action dated Sep. 6, 2013, received in Japanese Patent Application No. 2012 088747, which corresponds to U.S. Appl. No. 12/042,299, 4 pages (Williamson).
Final Office Action dated Sep. 9, 2013, received in U.S. Appl. No. 13/077,931, 30 pages (Shaffer).
Office Action dated Oct. 24, 2013, received in U.S. Appl. No. 13/163,624, 16 pages (Williamson).
Office Action dated Oct. 24, 2013, received in U.S. Appl. No. 13/163,626, 16 pages (Williamson).
Office Action dated Sep. 2, 2013, received in Japanese Patent Application No. 2010 502357, which corresponds to U.S. Appl. No. 12/042,237, 11 pages (Bolsinga).
Office Action dated Sep. 24, 2013, received in Japanese Patent Application No. 2012 218235, which corresponds to U.S. Appl. No. 12/042,237, 6 pages (Bolsinga).
Office Action dated Jul. 2, 2013, received in Chinese Patent Application No. 200880001327.7 which corresponds to U.S. Appl. No. 11/620,717, 7 pages (Platzer).
Office Action dated Nov. 26, 2012, received in European Patent Application No. 08 712 964.9, which corresponds to U.S. Appl. No. 11/620,717, 6 pages (Platzer).
Office Action dated Oct. 30, 2013, received in U.S. Appl. No. 13/221,836, 31 pages (Blumenberg).
Final Office Action dated Sep. 23, 2013, received in U.S. Appl. No. 13/251,121, 28 pages (Blumenberg).
Final Office Action dated Oct. 2, 2013, received in U.S. Appl. No. 13/251,146, 24 pages (Blumenberg).
Final Office Action dated Dec. 11, 2013, received in U.S. Appl. No. 13/251,150, 47 pages (Blumenberg).
Final Office Action dated Oct. 18, 2013, received in U.S. Appl. No. 13/251,152, 38 pages (Blumenberg).
Office Action dated Oct. 9, 2012, received in U.S. Appl. No. 13/084,472, 15 pages (Crumly).
Final Office Action dated Jun. 20, 2013, received in U.S. Appl. No. 13/084,472, 20 pages (Crumly).
Office Action dated Dec. 6, 2013, received in U.S. Appl. No. 13/054,472, 42 pages (Crumly).
Ex parte reexamination communication transmittal form, dated Jul. 26, 2013, received in U.S. Appl. No. 90/012,332, 61 pages.
Notice of Allowance dated Jan. 15, 2014, received in U.S. Appl. No. 13/620,390, 28 pages (Moore).
Notice of Allowance dated Jul. 24, 2013, received in U.S. Appl. No. 13/670,378, 20 days (Beaver).
Notice of Allowance dated Oct. 22, 2013, received in U.S. Appl. No. 13/867,950, 12 pages (Platzer).
Dietz, DiamondTouch: A Multi-User Touch Technology, UIST'01, Orlando, FL, 2001, 17 pages.
Esenther, Fluid DTMouse: Better Mouse Support for Touch-Based Interactions, May 2006, 6 pages.
Hildon User Interface Style Guide Summary, Version 1.1, 2005, 15 pages.
Maemo Coding Style and Programming Guidelines (Maemo 3.x), 2007, 5 pages.
Merriam-Webster definition of "Contemporaneous", Jan. 21, 2014, 2 pages.
Olsen, Building Interactive Systems, Chapter 3, Jan. 2009, 6 pages.
Olsen, Developing User Interfaces, Morgan Kaufmann Publishers, 1998, chapter 4, 5 pages.
Plaisant, Touchscreen Toggle Design, video recorded Jan. 1991, uploaded to YouTube Nov. 30, 2011, 6:39 minutes, www.youtube.com/watch?v=wFWbdxievK0, 2 pages.
Ramachandran, An Architecture for Ink Annotations on Web Documents, Proceedings of the 7th International Conference on Document Analysis and Recognition, Aug. 2003, pp. 256-260.
Rappin, wxPython in Action, 2006, 40 pages.
Sells, Windows Forms Programming in C#, 2004, 9 pages.
Shen, Informing the Design of Direct-Touch Tabletops, 2006, 11 pages.
Office Action, AU Application 2009200493, Dec. 13, 2011, 3 pages.
Office Action, AU Application 2009200493, Mar. 17, 2010 2 pages.
Office Action, AU Application 2011349513, Dec. 10, 2014, 3 pages.
Office Action, CA Application 2,653,363, Sep. 3, 2013, 3 pages.
Office Action, CA Application 2,653,363, Jan. 18, 2012, 2 pages.
Office Action, CA Application 2,817,890, Oct. 9, 2013, 3 pages.
Office Action, CN 200880001811.6, Jan. 6, 2012, 10 pages.
Office Action, CN 200880001811.6, Aug. 10 2011, 7 pages.
Office Action, CN 200880001811.6, Oct. 21, 2010, 5 pages.
Office Action, CN 201210128932.5, Oct. 30, 2014, 3 pages.
Office Action, CN Application 200880001855.9, Jul. 21, 2011, 19 pages.
Office Action, CN Application 200910118596.4, Aug. 6, 2010, 6 pages.
Office Action, CN Application 200980000015.5, Jan. 15, 2015, 1 pg.
Office Action, CN Application 200980000015.5, May 29, 2014, 1 pg.
Office Action, CN Application 201110148738.9, Jun. 5, 2014, 3 pages.
Office Action, CN Application 201110148738.9, Feb. 8, 2014, 3 pages.
Office Action, CN Application 201180022994.1, Dec. 3, 2014, 4 pages.
Office Action, CN Application 201210128911.3, Nov. 15, 2014, 3 pages.
Office Action, CN Application 201210128915.1, Dec. 24, 2014, 3 pages.
Office Action, dated Apr. 28, 2015, received in U.S. Appl. No. 13/791,621, 6 pages.
Office Action, dated May 20, 2015, received in U.S. Appl. No. 13/221,827, 26 pages.
Office Action, DE Application 102009011687.7, May 17, 2010, 5 pages.
Office Action, DE Application 112009000002.9, Oct. 19, 2010, 4 pages.
Office Action, EP Application 08705471.4, Jan. 29, 2015, 6 pages.
Office Action, EP Application 08712946.6, Oct. 20, 2014, 6 pages.
Office Action, EP Application 08712964.9, Jan. 20, 2015, 8 pages.
Office Action, EP Application 09700008.7, Jul. 12, 2010, 4 pages.
Office Action, EP Application 12156394.4, Oct. 22, 2014, 6 pages.
Office Action, EP Application 12156395.1, Oct. 22, 2014, 6 pages.
Office Action, JP Application 2010-502357, Mar. 4, 2013, 2 pages.
Office Action, JP Application 2012-088747, Aug. 11, 2014, 3 pages.
Office Action, JP Application 2012-224838, Jan. 6, 2014, 2 pages.
Office Action, JP Application 2013-546284, Jul. 11, 2014, 3 pages. (JP only).
Office Action, U.S. Appl. No. 12/892,851, Oct. 9, 2012, 11 pages.
Office Action, U.S. Appl. No. 13/084,472, Dec. 6, 2013, 23 pages.
Office Action, U.S. Appl. No. 13/084,472, Dec. 10, 2010, 24 pages.
Office Action, U.S. Appl. No. 14/189,922, Sep. 24, 2014, 6 pages.

(56) References Cited

OTHER PUBLICATIONS

Decision revoking the European Patent, EP Patent 2098948, Apr. 2, 2014, 28 pages.
Decision to Grant, JP Application 2010-502357, Mar. 28, 2014, 1 pg.
Decision to Grant, JP Application 2012-088747, Feb. 16, 2015, 3 pages.
Decision to Grant, JP Application 2012-218235, Sep. 22, 2014, 3 pages.
Decision to Refuse EP Application, EP Application 09700006.1, Jul. 15, 2013, 15 pages.
Decision to Refuse EP Application EP Application 09700008.7, Oct. 8, 2013, 18 pages.
Decision to refuse EP application, EP Application 11184222.5, Feb. 11, 2015, 10 pages.
Decision to refuse EP application, EP Application 11184223.3, Feb. 11, 2015, 10 pages.
Decision to Refuse EP Application, EP Application 11184224.1, Feb. 11, 2015, 10 pages.
Decision to refuse EP application, EP Application 12188748.3, Dec. 12, 2014, 14 pages.
Examiner's Answer, U.S. Appl. No. 11/620,715, Feb. 13, 2014, 22 pages.
Examiner's Answer, U.S. Appl. No. 11/620,727, Feb. 13, 2014, 23 pages.
Examiner's Answer, U.S. Appl. No. 13/221,837, Feb. 11, 2014, 19 pages.
Final Office Action, U.S. Appl. No. 12/042,237, Jun. 2, 2011, 9 pages.
HTC Corporation, Intervention of the Assumed Infringer According to Art. 105 EPC, EP Patent 2098948, Dec. 12, 2011, 24 pages.
HTC Europe Co. Ltd and Apple Inc. Invalidity Claim together with annexes, Apr. 5, 2012, 84 pages.
Notice of Allowance, CA Application 2653363, Apr. 29, 2014, 1 pg.
Notice of Allowance, dated May 28, 2015, received in U.S. Appl. No. 14/180,267, 11 pages.
Notice of Allowance, KR Application 2012-7022239, Mar. 30, 2015, 2 pages. (KR version only).
Notice of Allowance, U.S. Appl. No. 12/869,182, Feb. 23, 2012, 5 pages.
Notice of Allowance, U.S. Appl. No. 13/077,931, Dec. 31, 2014, 8 pages.
Notice of Opposition, EP Patent 2098948, Nov. 8, 2011, 22 pages.
Quinn Emanuel, Response to Patent Proprietor's Grounds of Appeal, Dec. 8, 2014, 34 pages.
Quinn Emanuel, Statement re Notice of the Opposition Division dated May 15, 2013, Dec. 3, 2013, 13 pages.
Quinn Emanuel, Statement, Jan. 21, 2014, 9 pages.
Summons to oral proceedints, EP Application 09154313.2, Jul. 18, 2013, 3 pages.
Summons to oral proceedings, EP Application 09700006.1, Mar. 10, 2015, 9 pages.
Summons to oral proceedings, EP Application 09700008.7, Mar. 10, 2015, 12 pages.
Summons to oral proceedings, EP Application 12188748.3, Apr. 22, 2014, 3 pages.
Wagner & Geyer, Remarks for Consideration w/Annexes A11-A14, Aug. 10, 2012, 73 pages.
Withers Rogers, Comments on Sections 3.1 and 3.4 of the Withdrawn Appeal, Oct. 14, 2014, 3 pages.
Withers Rogers, Grounds for Appeal, Aug. 4, 2014, 104 pages.
Withers Rogers, Preliminary Response to Opponent O1's Written Submission, Dec. 3, 2013, 11 pages.
Withers Rogers, Response to Preliminary Opinion of the Opposition Division, Dec. 3, 2013, 45 pages.
Withers Rogers, Revised Second Auxiliary Request, Jan. 30, 2014, 14 pages.
Zimmermann & Partner, Response to Patentee letter of Dec. 3, 2013, Jan. 3, 2014, 10 pages.
Zimmermann & Partner, Response to Summons to Attend Oral Proceeding, Nov. 7, 2013, 33 pages.
*Apple Inc.* v. *HTC Corporation*, Brief Details of Claim, in the High Court of Justice, Chancery Division, Patents Court, Sep. 12, 2011, 2 pages.
*Apple Inc.* v. *HTC Corporation*, Particulars of Infringement, In the High Court of Justice, Chancery Division, Patents Court, Sep. 12, 2011, 5 pages.
Apple Inc., Proprietor's Response to Addendum from Samsug Electronics GmbH, Jun. 21, 2012, 3 pages.
Apple Inc., Proprietor's Response to Communication under Rule 79(1) EPC, Mar. 8, 2012, 8 pages.
Apple Inc., Proprietor's Response to Notice of Intervention from Motorola Mobility Germany GmbH, Jun. 21, 2012, 3 pages.
Lin, A Embedded GUI Based on Linux OS and Ameliorate of Framework, May 13, 2004, 3 pages.
Office Action, dated Jul. 1, 2015, received in European Patent Application No. 10 712 825.8, which corresponds with U.S. Appl. No. 12/566,660, 6 pages.
Touch Technology Handbook, Carroll Touch, 1998, 37 pages.
International Preliminary Report on Patentability received for PCT Patent Application No. PCT/US2011/022516, mailed on Aug. 9, 2012, 11 pages.
International Preliminary Report on Patentability received for PCT Patent Application No. PCT/US2009/035858, mailed on Sep. 16, 2010, 7 pages.
International Search Report and Written Opinion received for PCT Patent Application No. PCT/US2009/035858, mailed on Jul. 3, 2009, 10 pages.
International Search Report and Written Opinion received for PCT Patent Application No. PCT/US2008/050292, mailed on Sep. 19, 2008, 25 pages.
Invitation to Pay Additional Fees received for PCT Patent Application No. PCT/US2008/050292, mailed on Jul. 18, 2008, 4 pages.
Extended European Search Report (includes European Search Report and European Search Opinion) received for European Patent Application No. 11152015.1, mailed on May 20, 2011, 9 pages.
Extended European Search Report (includes Partial European Search Report and European Search Opinion) received for European Patent Application No. 11182954.5, mailed on Nov. 29, 2011, 6 pages.
Extended European Search Report (includes Partial European Search Report and European Search Opinion) received for European Patent Application No. 11182959.4, mailed on Nov. 30, 2011, 7 pages.
Extended European Search Report (includes Partial European Search Report and European Search Opinion) received for European Patent Application No. 11182962.8, mailed on Dec. 1, 2011, 8 pages.
Extended European Search Report (includes Partial European Search Report and European Search Opinion) received for European Patent Application No. 11182963.6, mailed on Dec. 1, 2011, 7 pages.
Office Action received for European Patent Application No. 08705471.4, mailed on Dec. 19, 2011, 6 pages.
Summons to Attend Oral Proceedings received for European Patent Application No. 08705751.9, mailed on Oct. 28, 2011, 9 pages.
Decision to Grant received for European Patent Application No. 08713567.9, mailed on Oct. 7, 2011, 1 page.
Office Action received for European Application No. 08713567.9, mailed on Dec. 29, 2009, 5 pages.
Office Action received for Taiwan Patent Application No. 100147539, mailed on Apr. 8, 2014, 12 pages. (5 pages of English Translation and 7 pages of Official copy).
Certificate of Grant received for Hong Kong Patent Application No. 10103983.1, mailed on Feb. 3, 2012, 5 pages.
Office Action received for Korean Patent Application No. 10-2009-7003574, mailed on Aug. 27, 2009, 1 page.
Office Action received for Korean Patent Application No. 10-2012-7022239, mailed on Apr. 30, 2014, 5 pages (2 pages of English Translation and 3 pages of official copy).

(56) References Cited

OTHER PUBLICATIONS

Office Action received for Korean Patent Application No. 10-2013-7019463, mailed on Jun. 26, 2014, 6 pages (2 pages of English Translation and 4 pages of Official copy).
Office Action received for European Patent Application No. 11184186.2, mailed on Mar. 20, 2014, 5 pages.
Office Action received for German Patent Application No. 112008000144.8, mailed on Oct. 29, 2010, 8 pages (4 pages of English translation and 4 pages of Official Copy).
Office Action received for European Patent Application No. 11808779.0, mailed on Jul. 1, 2014, 5 pages.
Office Action received for Canadian Patent Application No. 2,759,090, mailed on Nov. 4, 2013, 3 pages.
Office Action received for Canadian Patent Application No. 2,759,091, mailed on Nov. 7, 2013, 4 pages.
Notice of Allowance received for Canadian Patent Application No. 2,817,648, mailed on Apr. 10, 2014, 1 page.
Office Action received for Canadian Patent Application No. 2,817,890, mailed on Apr. 22, 2014, 3 pages.
Office Action received for Australian Patent Application No. 2008100283, mailed on Jul. 1, 2008, 2 pages.
Office Action received for Australian Patent Application No. 2008201540, mailed on Feb. 19, 2009, 2 pages.
Office Action received for Australian Patent Application No. 2008201540, mailed on Jul. 15, 2009, 2 pages.
Office Action received for Chinese Patent Application No. 200880000019.9, mailed on Feb. 18, 2013, 12 pages.
Office Action received for Chinese Patent Application No. 200880000019.9, mailed on Jan. 5, 2012, 14 pages.
Office Action received for Chinese Patent Application No. 200880000019.9, mailed on Jul. 23, 2013, 7 pages (4 pages of English translation and 3 pages of Official copy).
Office Action received for Chinese Patent Application No. 200880000019.9, mailed on Nov. 23, 2010, 13 pages.
Office Action received for Chinese Patent Application No. 200880000019.9, mailed on Sep. 20, 2012, 22 pages (13 pages of English Translation and 9 pages of Official copy).
Office Action received for Chinese Patent Application No. 200880001822.7, mailed on Jan. 29, 2012, 5 pages.
International Search Report and Written Opinion received for PCT Patent Application No. PCT/US2005/000089, mailed on May 31, 2005, 7 pages.
Office Action received for Australian Patent Application No. 2009200366, mailed on Feb. 11, 2009, 2 pages.
Notice of Acceptance received for Australian Patent Application No. 2009208099, mailed on Nov. 24, 2011, 3 pages.
Notice of Acceptance received for Australian Patent Application No. 2009208103, mailed on Apr. 14, 2011, 3 pages.
Office Action received for Australian Patent Application No. 2009208103, mailed on Apr. 8, 2010, 2 pages.
Decision to Grant received for Japanese Patent Application No. 2009-544996, mailed on May 20, 2011, 1 page.
Office Action received for Japanese Patent Application No. 2009-544996, mailed on Feb. 12, 2010, 1 page.
Office Action received for Japanese Patent Application No. 2009-544996, mailed on Nov. 8, 2010, 6 pages.
Decision to Grant received for Japanese Patent No. 2010-157302, mailed on Oct. 26, 2012, 4 pages.
Decision to Grant received for Japanese Patent No. 2010-157303, mailed on Apr. 15, 2013, 4 pages.
Office Action received for Japanese Patent Application No. 2010-157303, mailed on Oct. 15, 2012, 4 pages (2 pages of English Translation and 2 pages of Official copy).
Decision to Grant received for Chinese Patent Application No. 201080020598.0, mailed on Apr. 24, 2014, 1 page.
International Preliminary Report on Patentability received for PCT Patent Application No. PCT/US2009/034772, mailed on Sep. 16, 2010, 8 pages.

Office Action received for Chinese Patent Application No. 201110463262.8, mailed on Apr. 30, 2014, 14 pages (3 pages of English Translation and 11 pages of Official copy).
Notice of Acceptance received for Australian Patent Application No. 2011201639, mailed on Nov. 9, 2011, 3 pages.
Notice of Acceptance Received for Australian Patent Application No. 2011209720, mailed on May 1, 2014, 3 pages.
Certification of Australian Patent Application No. 2012100050, mailed on Mar. 2, 2012, 3 pages.
Office Action received for Chinese Patent Application No. 201210128911.3, mailed on Jan. 17, 2014, 6 pages (Official copy only).
Office Action received for Chinese Patent Application No. 201210128915.1, mailed on Mar. 18, 2014, 8 pages (Official copy only).
Office Action received for Chinese Patent Application No. 201210128932.5, mailed on Feb. 21, 2014, 12 pages (Official copy only).
Office Action received for Australian Patent Application No. 2012200689, mailed on Sep. 9, 2013, 3 pages.
Office Action received for Japanese Patent Application No. 2012-500844, mailed on Feb. 24, 2014, 8 pages (6 pages of English Translation and 2 pages of Official Copy).
Certificate of Grant received for Turkish part of European Patent Application No. 2126678, mailed on Jun. 21, 2012, 3 pages.
Notice of Allowance received for Canadian Patent Application No. 2658177, mailed on Jan. 30, 2012, 1 page.
Office Action received for Canadian Patent Application No. 2658177, mailed on Dec. 1, 2009, 2 pages.
Office Action received for Canadian Patent Application No. 2658177, mailed on Jun. 22, 2011, 2 pages.
Non-Final Office Action Received for U.S. Appl. No. 11/620,710, mailed on Jul. 21, 2010, 28 pages.
Final Office Action received for U.S. Appl. No. 11/620,720, mailed on Jun. 23, 2009, 17 pages.
Non-Final Office Action received for U.S. Appl. No. 11/620,720, mailed on Dec. 23, 2008, 18 pages.
Non-Final Office Action received for U.S. Appl. No. 11/620,720, mailed on Nov. 18, 2009, 17 pages.
Non-Final Office Action received for U.S. Appl. No. 11/620,727, mailed on Nov. 4, 2011, 15 pages.
Examiner's Amendment received for U.S. Appl. No. 11/956,969, mailed on Oct. 29, 2008, 13 pages.
Notice of Allowance received for U.S. Appl. No. 11/956,969, mailed on Oct. 29, 2008, 6 pages.
Non-Final Office Action received for U.S. Appl. No. 12/207,429, mailed on Mar. 30, 2012, 9 pages.
Non-Final Office Action received for U.S. Appl. No. 12/270,805, mailed on Oct. 11, 2011, 27 pages.
Notice of Allowance received for U.S. Appl. No. 12/270,805, mailed on May 17, 2012, 14 pages.
Non-Final Office Action received for U.S. Appl. No. 12/270,807, mailed on Oct. 11, 2011, 26 pages.
Notice of Allowance received for U.S. Appl. No. 12/270,807, mailed on May 11, 2012, 12 pages.
Non-Final Office Action received for U.S. Appl. No. 12/270,810, mailed on Oct. 12, 2011, 12 pages.
Notice of Allowance received for U.S. Appl. No. 12/270,810, mailed on Jul. 11, 2012, 21 pages.
Non-Final Office Action received for U.S. Appl. No. 12/270,812, mailed on May 17, 2012, 14 pages.
Non-Final Office Action received for U.S. Appl. No. 12/270,812, mailed on Oct. 13, 2011, 12 pages.
Notice of Allowance received for U.S. Appl. No. 12/270,812, mailed on Sep. 19, 2012, 22 pages.
Final Office Action received for U.S. Appl. No. 12/270,815, mailed on Feb. 14, 2013, 12 pages.
Non-Final Office Action received for U.S. Appl. No. 12/270,815, mailed on May 17, 2012, 13 pages.
Non-Final Office Action received for U.S. Appl. No. 12/270,815, mailed on Oct. 11, 2011, 12 pages.
Final Office Action received for U.S. Appl. No. 12/789,695, mailed on May 7, 2014, 17 pages.

(56) References Cited

OTHER PUBLICATIONS

Non-Final Office Action received for U.S. Appl. No. 12/869,182, mailed on Oct. 24, 2011, 7 pages.
Non-Final Office Action received for U.S. Appl. No. 12/892,851, mailed on May 22, 2014, 11 pages.
Non-Final Office Action received for U.S. Appl. No. 13/077,931, mailed on Jul. 17, 2014, 21 pages.
Final Office Action received for U.S. Appl. No. 13/084,472, mailed on Jun. 17, 2014, 31 pages.
Notice of Allowance received for U.S. Appl. No. 13/163,624, mailed on May 12, 2014, 5 pages.
Notice of Allowance received for U.S. Appl. No. 13/163,626, mailed on Mar. 31, 2014, 5 pages.
Final Office Action received for U.S. Appl. No. 13/221,836, mailed on May 20, 2014, 36 pages.
Examiner's Answer to Appeal Brief received for U.S. Appl. No. 13/251,121, mailed on Apr. 29, 2014, 41 pages.
Non-Final Office Action Received for U.S. Appl. No. 13/251,121, mailed on Jan. 10, 2012, 16 pages.
Non-Final Office Action Received for U.S. Appl. No. 13/251,121, mailed on May 1, 2013, 17 pages.
Examiner's Answer to Appeal Brief received for U.S. Appl. No. 13/251,146, mailed on May 7, 2014, 43 pages.
Non-Final Office Action received for U.S. Appl. No. 13/251,146, mailed on Jan. 31, 2012, 16 pages.
Examiner's Answer to Appeal Brief received for U.S. Appl. No. 13/251,150, mailed on Jun. 17, 2014, 48 pages.
Non-Final Office Action received for U.S. Appl. No. 13/251,150, mailed on Feb. 10, 2012, 23 pages.
Examiner's Answer to Appeal Brief received for U.S. Appl. No. 13/251,152, mailed on May 21, 2014, 45 pages.
Non-Final Office Action received for U.S. Appl. No. 13/251,152, mailed on Jan. 20, 2012, 20 pages.
Supplemental Notice of Allowance received for U.S. Appl. No. 13/620,390, mailed on Jan. 27, 2014, 2 pages.
Notice of Allowance received for U.S. Appl. No. 13/867,950, mailed on Nov. 15, 2013, 7 pages.
Rowan, Nairn, "Breakthrough Internet Device", Eureka Man, available online at <http://eurekaman.com/towards-multi-touch-in-the-browser>, Jan. 31, 2007, 2 pages.
Office Action received for Chinese Patent Application No. 200880001855.9, mailed on Jul. 29, 2014, 14 pages.
Notice of Allowance received for Chinese Patent Application No. 201110063183.8, mailed on Feb. 24, 2014, 4 pages.
Notice of Allowance received for Japanese Patent Application No. 2012-500844, mailed on Aug. 1, 2014, 3 pages.
Notice of Allowance received for Japanese Patent Application No. 2013-515382, mailed on Aug. 22, 2014, 3 pages.
Allen, J., "Override the GNU C library—painlessly" ibm.com, Apr. 2002, 4 pages.
Anonymous, "Firegestures: Firefox Extension," Internet Article, Oct. 27, 2009, 2 pages, http://xuldev.org/firegestures/.
Anonymous, "Firegestures: Changelog," Internet Article, Oct. 28, 2009, 8 pages, http://xuldev.org/firegestures/changelog.php.
Anonymous, "Firegestures Version History," Internet Article, Oct. 28, 2009, 6 pages, http://addons.mozilla.org/en-US/firefox/addons/version/6366.
Apple, "Safari Web Content Guide for iPhone," Apple Inc., Feb. 5, 2005, 96 pages.
Brown et al., "Distributed active objects," Computer Networks and ISDN Systems, North Holland Publishing Amsterdam, NL, vol. 28, No. 11, May 1996, pp. 1037-1052.
Buxton, W. et al., "Multi-Touch Systems that I Have Known and Loved," Jan. 12, 2007, 14 pages, http://www.billbuxton.com/multitouchOverview.html.
Chartier, D., "Apple releases iOS 4.3 beta for developers," Macworld.com, Jan. 12, 2011, http://www.macworld.com/article/1157114/ios_4_3.html, 7 pages.
Chen, T., "The Web is Everywhere," IEEE Communications Magazine, Feb. 5, 2008, 1 page.
Han, J., "Jeff Han demos his breakthrough touchscreen," TED ideas worth spreading, Feb. 25, 2006, http://www.ted.com/talks/jeff_han_demos_his_breakthrough_touchscreen.html.
Holzner, "Built-in JavaScript Objects," JavaScript Complete, 1998, McGraw/Hill, New York, pp. 71-79.
Jazzmutant, "Lemur v1.3 Documentation Addendum," Mar. 22, 2005, http://www.juzzmutant.com/support_download.php, 3 pages.
Jazzmutant, "Lemur v1.3 Examples package: CursorModes.xml," Jan. 31, 2006, http://www.juzzmutant.com/support_download.php, 4 pages.
Jazzmutant, "Lemur v1.3 Examples package: LightStepSeq.xml," Jan. 31, 2006, http://www.juzzmutant.com/support_download.php, 5 pages.
Jazzmutant Sas et al., "The Lemur Owner's Manual," Oct. 31, 2005, http://www.juzzmutant.com/support_download.php, 108 pages.
Jazzmutant, "Support," Apr. 21, 2006, http://web.archive.org/web/20060421144624/http://www.jazzmutant.com/support_download.php, 2 pages.
Justice Floyd, "UK Royal Court of Justice: [2012] EWHC 1789 (Pat)—Extracts," Jul. 4, 2013, http://www.judiciary.gov.uk/Resources/JCO/Documents/Judgments/htc-v-apple-judgment.pdf, 26 pages.
KennyTM, "UIGestureRecognizer," from iPhone Development Wiki, Oct. 31, 2009, 3 pages, http://iphonedevwiki.net/index.php?title=UIGestureRecognizer&oldid=319http://iphonedevwiki.net/index.php?title=UIGestureRecognizer&action=history.
Matsui et al., "Elastic Graphical Interfaces for Precise Data Manipulation," ACM Conference on Human Factors in Computing Systems (CHI '95), Apr. 1995, Conference Companion, ACM press, pp. 143-144.
Microsoft, "Microsoft Windows Software Development Kit-Update for Windows Vista" Mar. 22, 2007, http://www.microsoft.com/en-us/download/details.aspx?displaylang=en&id=23719, 26 pages.
Microsoft, "Window Styles—Microsoft Windows SDK-Screenshot," Mar. 22, 2007, 2 pages.
Petzold, C., "Programming Microsoft Windows with C#," Jan. 18, 2002, 5 pages.
Pixley, "Document Object Model (DOM) Level 2 Events Specifications Version 1.0," W3C Recommendation, pp. 1-47, Nov. 13, 2000.
Pogue, D., "Windows Vista for Starter: The Missing Manual," Safari Books Online, Jan. 25, 2007, 18 pages.
Räihä, L., "Delegation: Dynamic Specialization," Proceeding of the Conference on TRI-Ada '94, pp. 172-179.
Rogers, M., "Its for You! An iPhone Development Primer for the Busy College Professor," Journal of Computing Sciences in Colleges, vol. 25, No. 1, Oct. 1, 2009, pp. 94-101.
W3C, "Document Object Model (DOM) Level 2 Events Specification, Version 1," W3C Recommendation, Nov. 13, 2000, 48 pages.
Wikibooks, "Java Programming/Applets/Event Listeners," May 1, 2007, http://en.wikibooks.org/w/index.php?title=Java_Programming/Applets/Event_Listeners&oldid=849558, 6 pages.
YouTube, "A Lemurized Formula," 4:07 minute video uploaded to YouTube by Sph9000 on Dec. 12, 2007, http://youtube.com/watch?v=sHAMyOak-LM, 1 page.
Invitation to Pay Additional Fees dated Jul. 13, 2010, received in International Application No. PCT/US2010/027118, which corresponds to U.S. Appl. No. 12/566,660.
International Search Report and Written Opinion dated Oct. 5, 2010, received in International Application No. PCT/US2010/027118, which corresponds to U.S. Appl. No. 12/566,660, 19 pages (Moore).
International Preliminary Report on Patentability dated Sep. 20, 2011, received in International Application No. PCT/US2010/027118, which corresponds to U.S. Appl. No. 12/566,660, 10 pages (Moore).
European Search Report dated Dec. 7, 2011, received in European Patent Application No. 11184186.2, which corresponds to U.S. Appl. No. 12/566,660, 6 pages (Moore).

(56) References Cited

OTHER PUBLICATIONS

International Search Report and Written Opinion dated May 20, 2011, received in International Application No. PCT/US2011/022516, which corresponds to U.S. Appl. No. 12/789,695, 6 pages (Moore).
International Search Report and Written Opinion dated Dec. 13, 2011, received in International Patent Application No. PCT/US2011/039583, which corresponds to U.S. Appl. No. 12/892,848, 12 pages (Dale).
International Preliminary Report on Patentability dated Dec. 27, 2012, received in International Patent Application No. PCT/US2011/039583, which corresponds to U.S. Appl. No. 12/892,848, 10 pages (Dale).
Search Report dated Jun. 2012, received in Dutch Patent Application No. 2007993, which corresponds to U.S. Appl. No. 13/077,925, 6 pages (Shaffer).
Invitation to Pay Additional Fees dated Mar. 12, 2012, received in International Application No. PCT/US2011/065859, which corresponds to U.S. Appl. No. 13/077,925, 10 pages (Shaffer).
International Search Report and Written Opinion dated Jun. 1, 2012, received in International No. PCT/US2011/065859, which corresponds to U.S. Appl. No. 13/077,925, 22 pages (Shaffer).
International Search Report dated Apr. 16, 2009, received in International Application No. PCT/US2009/034772, which corresponds to U.S. Appl. No. 12/042,318, 3 pages (Platzer).
European Search Report dated Apr. 21, 2009, received in European Application No. 09154313.2, which corresponds to U.S. Appl. No. 12/042,318, 6 pages (Platzer).
European Search Report dated Nov. 23, 2011, received in European Patent Application No. 11184167.2, which corresponds to U.S. Appl. No. 12/042,318, 6 pages (Beaver).
European Search Report dated Nov. 24, 2011, received in European Patent Application No. 11184169.8, which corresponds to U.S. Appl. No. 12/042,318, 6 pages (Beaver).
European Search Report dated Nov. 18, 2011, received in European Patent Application No. 11184170.6, which corresponds to U.S. Appl. No. 12/042,318, 6 pages (Beaver).
European Search Report dated Nov. 18, 2011, received in European Patent Application No. 11184172.2, which corresponds to U.S. Appl. No. 12/042,318, 6 pages (Beaver).
European Search Report dated Nov. 30, 2011, received in European Patent Application No. 11184409.8, which corresponds to U.S. Appl. No. 12/042,318, 6 pages (Beaver).
European Search Report dated Jul. 9, 2012, received in European Patent Application No. 12156395.1, which corresponds to U.S. Appl. No. 12/042,318, 8 pages (Beaver).
International Search Report and Written Opinion dated Jul. 3, 2009, received in International Application No. PCT/US2009/035856, which corresponds to U.S. Appl. No. 12/042,067, 15 pages (Williamson).
International Preliminary Report on Patentablity dated Sep. 16, 2010, received in International Application No. PCT/US2009/035856, which corresponds to U.S. Appl. No. 12/042,067, 8 pages (Williamson).
European Search Report dated Feb. 28, 2013, received in European Patent Application No. 12188748.3, which corresponds to U.S. Appl. No. 12/042,067, 8 pages (Williamson).
International Search Report and Written Opinion dated Nov. 11, 2009, received in International Application No. PCT/US2009/035874, which corresponds to U.S. Appl. No. 12/042,299, 7 pages (Williamson).
International Preliminary Report on Patentability dated Sep. 16, 2010, received in International Application No. PCT/US2009/035874, which corresponds to U.S. Appl. No. 12/042,299, 8 pages (Williamson).
European Search Report dated Jan. 13, 2012, received in European Patent Application No. 11184226.6, which corresponds to U.S. Appl. No. 12/042,299, 7 pages (Williamson).
European Search Report dated Jan. 13, 2012, received in European Patent Application No. 11184224.1, which corresponds to U.S. Appl. No. 12/042,299, 7 pages (Williamson).
International Search Report and Written Opinion dated Jul. 31, 2008, received in International Application No. PCT/US2008/000058.
International Preliminary Report on Patentability dated Jul. 7, 2009, received in International Application No. PCT/US2008/000058.
International Search Report and Written Opinion dated Apr. 22, 2008 received in International Application No. PCT/US2008/000060.
International Preliminary Report on Patentability dated Jul. 7, 2009, received in International Application No. PCT/US2008/000060.
International Search Report and Written Opinion dated May 2, 2008, received in International Application No. PCT/US2008/000069.
International Preliminary Report on Patentability dated Jul. 7, 2009, received in International Application No. PCT/US2008/000069.
International Search Report and Written Opinion dated Jun. 4, 2008, received in International Application No. PCT/US2008/000089.
International Preliminary Report on Patentability dated Jul. 7, 2009, received in International Application No. PCT/US2008/000089.
International Search Report and Written Opinion dated Jun. 3, 2008, received in International Application No. PCT/US2008/000103.
International Preliminary Report on Patentability dated Jul. 7, 2009, received in International Application No. PCT/US2008/000103.
Office Action dated Dec. 9, 2011, received in U.S. Appl. No. 12/566,660, 14 pages (Moore).
Notice of Allowance dated May 24, 2012 received in U.S. Appl. No. 12/566,660, 10 pages (Moore).
Notice of Allowance dated Jul. 26, 2012, received in U.S. Appl. No. 12/566,660, 9 pages (Moore).
Patent Examination Report No. 1 dated Oct. 17, 2012, received in Australian Patent Application No. 2010226120, which corresponds to U.S. Appl. No. 12/566,660, 3 pages (Moore).
Notice of Allowance dated Nov. 2, 2012, received in Canadian Patent Application No. 2755443, which corresponds to U.S. Appl. No. 12/566,660, 1 page (Moore).
Office Action dated Jun. 3, 2013, received in Japanese Patent Application No. 2012500844, which corresponds to U.S. Appl. No. 12/566,660, 5 pages (Moore).
Notice of Allowance dated May 29, 2013, received in Korean Patent Application No. 10-2011-7024288, which corresponds to U.S. Appl. No. 12/566,660, 2 pages (Moore).
Office Action dated Mar. 4, 2013, received in U.S. Appl. No. 12/789,695, 29 pages (Shaffer).
Office Action dated Oct. 22, 2012, received in Chinese Patent Application No. 201110063183.8, which corresponds to U.S. Appl. No. 12/789,695, 8 pages (Shaffer).
Notice of Allowance dated May 15, 2013, received in U.S. Appl. No. 12/892,848, 37 pages (Dale).
Office Action dated Oct. 9, 2012, received in U.S. Appl. No. 12/892,851, 22 pages (Dale).
Notice of Allowance dated Jun. 27, 2013, received in U.S. Appl. No. 13/077,925, 29 pages (Shaffer).
Office Action dated Oct. 19, 2012, received in Chinese Patent Application No. 201120580018.5, which corresponds to U.S. Appl. No. 13/077,925, 4 pages (Shaffer).
Office Action dated Apr. 22, 2013, received in Chinese Patent Application No. 201120580018.5, which corresponds to U.S. Appl. No. 13/077,925, 4 pages (Shaffer).
Office Action dated Feb. 16, 2011, received in U.S. Appl. No. 12/042,318, 26 pages.
Final Office Action dated Sep. 15, 2011, received in U.S. Appl. No. 12/042,318, 46 pages (Beaver).
Office Action dated Feb. 25, 2011, received in Australian Patent Application No. 2009200493, which corresponds to U.S. Appl. No. 12/042,318, 3 pages (Beaver).
Office Action dated Aug. 9, 2011, received in Australian Patent Application No. 2009200493, which corresponds to U.S. Appl. No. 12/042,318, 2 pages (Beaver).

(56) References Cited

OTHER PUBLICATIONS

Office Action dated Feb. 22, 2012, received in Australian Patent Application No. 2011205170, which corresponds to U.S. Appl. No. 12/042,318, 3 pages (Beaver).
Office Action dated Dec. 13, 2011, received in Australian Patent Application No. 2011101154, which corresponds to U.S. Appl. No. 12/042,318, 4 pages, (Beaver).
Certificate of Examination dated May 7, 2012, received in Australian Patent No. 2011101154, which corresponds to U.S. Appl. No. 12/042,318, 1 page (Beaver).
Office Action dated Dec. 13, 2011, received in Australian Patent Application No. 2011101157, which corresponds to U.S. Appl. No. 12/042,318, 4 pages (Beaver).
Certificate of Examination dated May 8, 2012, received in Australian Patent No. 2011101157, which corresponds to U.S. Appl. No. 12/042,318, 1 page (Beaver).
Office Action dated Dec. 13, 2011, received in Australian Patent Application No. 2011101156, which corresponds to U.S. Appl. No. 12/042,318, 3 pages (Beaver).
Certificate of Examination dated May 8, 2012, received in Australian Patent No. 2011101156, which corresponds to U.S. Appl. No. 12/042,318, 1 page (Beaver).
Certificate of Examination dated May 8, 2012, received in Australian Patent No. 2011101155, which corresponds to U.S. Appl. No. 12/042,318, 1 page (Beaver).
Office Action dated Sep. 3, 2012, received in Australian Patent Application No. 2011265335, which corresponds U.S. Appl. No. 12/042,318, 2 pages (Beaver).
Notice of Acceptance dated Nov. 8, 2012, received in Australian Patent Application No. 2011265335, which corresponds to U.S. Appl. No. 12/042,318, 3 pages (Beaver).
Grant for Invention Patent dated Mar. 22, 2011, received in Chinese Patent Application No. ZL200910118596.4, which corresponds to U.S. Appl. No. 12/042,318, 3 pages (Beaver).
Office Action dated Jan. 21, 2013, received in Chinese Patent Application No. 201110148738.9, which corresponds to U.S. Appl. No. 12/042,318, 17 pages (Beaver).
Summons to oral proceedings dated May 15, 2013, received in European Patent Application No. 09154313.2, which corresponds to U.S. Appl. No. 12/042,318, 30 pages (Beaver).
Office Action dated Mar. 2, 2011, received in European Patent Application No. 11150786.9, which corresponds to U.S. Appl. No. 12/042,318, 5 pages (Beaver).
Decision to Grant dated Jul. 26, 2012, received in European Patent Application No. 11150786.9. which corresponds to U.S. Appl. No. 12/042,318, 1 pages (Beaver).
Certificate of Grant dated Nov. 30, 2012, received in Hong Kong Patent Application No. 11110416.2, which corresponds to U.S. Appl. No. 12/042,318, 1 page (Beaver).
Office Action dated Aug. 26, 2011, received in Japanese Patent Application No. 2009-080377, which corresponds to U.S. Appl. No. 12/042,318, 2 pages (Beaver).
Decision to Grant dated Jul. 27, 2012, received in Japanese Patent Application No. 2009080377, which corresponds to US. Appl. No. 12/042,318, 4 pages (Beaver).
Office Action dated Jan. 18, 2011, received in U.S. Appl. No. 12/042,067, 14 pages (Williamson).
Final Office Action dated Jul. 28, 2011, received in U.S. Appl. No. 12/042,067, 18 pages (Williamson).
Office Action dated Mar. 14, 2013, received in U.S. Appl. No. 12/042,067, 27 pages (Williamson).
Office Action dated Oct. 19, 2011, received in Chinese Patent Application No. 200980000014.0, which corresponds to U.S. Appl. No. 12/042,067, 15 pages (Williamson).
Office Action dated Jun. 13, 2012, received in Chinese Patent Application No. 200980000014.0, which corresponds to U.S. Appl. No. 12/042,067, 6 pages (Williamson).
Decision to Grant dated Nov. 27, 2012, received in Chinese Patent Application No. 200980000014.0, which corresponds to U.S. Appl. No. 12/042,067, 6 pages (Williamson).
Office Action dated Oct. 19, 2010, received in German Patent Application No. 11 2009 000 001.0, which corresponds to U.S. Appl. No. 12/042,067, 5 pages (Williamson).
Office Action dated Sep. 26, 2012, received in German Patent Application No. 11 2009 000 001.0, whith corresponds to U.S. Appl. No. 12/042,067, 5 pages (Williamson).
Office Action dated Oct. 15, 2010, received in European Patent Application No. 09 700 006.1, which corresponds to U.S. Appl. No. 12/042,067, 4 pages (Williamson).
Summons to oral proceedings dated Mar. 7, 2013, received in European Patent Application No. 09700006.1, which corresponds to U.S. Appl. No. 12/042,067, 5 pages (Williamson).
Office Action dated Oct. 24, 2011, received in Japanese Patent Application No. 2010-502356, which corresponds U.S. Appl. No. 12/042,067, 2 pages (Williamson).
Office Action dated Jan. 4, 2011, received in U.S. Appl. No. 12/042,299, 9 pages (Williamson).
Final Office Action dated Jul. 8, 2011, received in U.S. Appl. No. 12/042,299, 13 pages (Williamson).
Office Action dated May 3, 2012, received in U.S. Appl. No. 12/042,299, 14 pages (Williamson).
Notice of Allowance dated Dec. 12, 2012, received in U.S. Appl. No. 12/042,299, 12 pages (Williamson).
Office Action dated Oct. 26, 2011, received in Chinese Patent Application No. 200980000013.8, which corresponds to U.S. Appl. No. 12/042,299, 11 pages (Williamson).
Office Action dated Jun. 6, 2012, received in Chinese Patent Application No. 200980000013.6, which corresponds to U.S. Appl. No. 12/042,299,7 pages (Williamson).
Office Action dated Dec. 5, 2012, received in Chinese Patent Application No. 200980000013.6, which corresponds to U.S. Appl. No. 12/042,299, 7 pages (Williamson).
Office Action dated Aug. 10, 2010, received in German Patent Application No. 11 2009 000 003.7, which corresponds to U.S. Appl. No. 12/042,299, 3 pages (Williamson).
Office Action dated Sep. 26, 2012, received in German Patent Applicaton No. 11 2009 000 003.7, which corresponds to U.S. Appl. No. 12/042,299, 5 pages (Williamson).
Office Action dated Nov. 26, 2010, received in European Patent Application No. 09 700 007.9, which corresponds to U.S. Appl. No. 12/402,299, 5 pages (Williamson).
Office Action dated Sep. 12, 2012, received in European Patent Applicaton No. 11184226.6, which corresponds to U.S. Appl. No. 12/402,299 5 pages (Williamson).
Office Action dated Sep. 12, 2012, received in European Patent Application No. 11184224.1, which corresponds to U.S. Appl. No. 12/402,299, 4 pages (Williamson).
Office Action dated Sep. 12, 2012, received in European Patent Application No. 11184223,3, which corresponds to U.S. Appl. No. 12/402,299 4 pages (Williamson).
Office Action dated Sep. 12, 2012, received in European Patent Application No. 11184222.5, which corresponds to U.S. Appl. No. 12/402,299, 4 pages (Williamson).
Office Action dated Aug. 15, 2011, received in Japanese Patent Appiication No. 2010 502358, which corresponds to U.S. Appl. No. 12/042,299, 2 pages (Williamson).
Decision to Grant dated Mar. 23, 2012, received in Japanese Patent Application No. 2010 502358, which corresponds to U.S. Appl. No. 12/042,299, 5 pages (Williamson).
Notice of Allowance dated Jun. 13, 2013, received in U.S. Appl. No. 13/077,927, 29 pages (Shaffer).
Office Action dated Jan. 3, 2013, received in U.S. Appl. No. 13/077,931, 24 pages (Shaffer).
Office Action dated Nov. 21, 2012, received in U.S. Appl. No. 13/163,624, 29 pages (Williamson).
Office Action dated Mar. 22, 2013, received in U.S. Appl. No. 13/163,624, 11 pages (Williamson).
Office Action dated Nov. 26, 2012, received in U.S. Appl. No. 13/163,626, 29 pages (Williamson).
Office Action dated Mar. 20, 2013, received in U.S. Appl. No. 13/163,626, 10 pages (Williamson).
Office Action dated Sep. 14, 2011, received in U.S. Appl. No. 12/042,237, 8 pages (Bolsinga).

(56) References Cited

OTHER PUBLICATIONS

Notice of Allowance dated Mar. 6, 2012, received in U.S. Appl. No. 12/042,237, 16 pages (Bolsinga).
Office Action dated Jul. 14, 2011, received in Chinese Patent Application No. 200980000015.5, which corresponds to U.S. Appl. No. 12/042,237 8 pages (Bolsinga).
Office Action dated Feb. 22, 2012, received in Chinese Patent Application No. 200980000015.5, which corresponds to U.S. Appl. No. 12/042,237 9 pages (Bolsinga).
Office Action dated Sep. 11, 2012, received in Chinese Patent Application No. 200980000015.5, which corresponds to U.S. Appl. No. 12/042,237, 9 pages (Bolsinga).
Office Action dated Sep. 26, 2012, received in German Patent Application No. 11 2009 000 002.9, which corresponds to U.S. Appl. No. 12/042,237, 5 pages (Bolsinga).
Summons to oral proceedings dated Mar. 27, 2013, received in European Patent Application No. 09700008.7, which corresponds to U.S. Appl. No. 12/042,237, 4 pages (Bolsinga).
Office Action dated Jan. 16, 2012, received in Japanese Patent Application No. 2010-502357, which corresponds to U.S. Appl. No. 12/042,237, 2 pages (Bolsinga).
Notice of Allowance dated May 23, 2012, received in U.S. Appl. No. 13/221,830, 8 pages (Moore).
Notice of Allowance dated Dec. 3, 2012, received in U.S. Appl. No. 13/221,830, 17 pages (Moore).
Office Action dated Nov. 11, 2010, received in Chinese Patent Application No. 200880001827.7, which corresponds to U.S. Appl. No. 11/620,717, 6 pages (Platzer).
Office Action dated Jan. 29, 2012, received in Chinese Patent Application No. 200880001827.7, which corresponds to U.S. Appl. No. 11/620,717, 5 pages (Platzer).
Office Action dated Jun. 20, 2012, received in U.S. Appl. No. 12/869,182, 18 pages (Platzer).
Notice of Allowance dated Dec. 12, 2012, received in U.S. Appl. No. 12/869,182, 8 pages (Platzer).
Final Office Action dated Mar. 12, 2012, received in U.S. Appl. No. 11/620,727, 21 pages (Blumenberg).
Office Action dated Aug. 15, 2012, received in U.S. Appl. No. 11/620,727, 19 pages (Blumenberg).
Final Office Action dated Mar. 7, 2013, received in U.S. Appl. No. 11/620,727, 23 pages (Blumenberg).
Office Action dated Nov. 5, 2012, received in U.S. Appl. No. 13/221,836, 31 pages (Blumenberg).
Final Office Action dated May 16, 2013, received in U.S. Appl. No. 13/221,836, 27 pages (Blumenberg).
Office Action dated Jul. 24, 2012, received in U.S. Appl. No. 13/221,837, 25 pages (Blumenberg).
Final Office Action dated Feb. 14, 2013, received in U.S. Appl. No. 13/221,837, 17 (Blumenberg).
Final Office Action dated Jul. 9, 2012, received in U.S. Appl. No. 13/251,121, 30 pages (Blumenberg).
Final Office Action dated Jun. 20, 2012, received in U.S. Appl. No. 13/251,146, 28 pages (Blumenberg).
Office Action dated Apr. 11, 2013, received in U.S. Appl. No. 13/251,146, 35 pages (Blumenberg).
Final Office Action dated Jul. 5, 2012, received in U.S. Appl. No. 13/251,150: 36 pages (Blumenberg).
Office Action dated Jun. 7, 2013, received in U.S. Appl. No. 13/215,150, 43 pages (Blumenberg).
Final Office Action dated Jun. 20, 2012, received in U.S. Appl. No. 13/251,152, 24 pages (Blumenberg).
Office Action dated Apr. 23, 2013, received in U.S. Appl. No. 13/251,152, 29 pages (Blumenberg).
Office Action dated Aug. 29, 2012, received in U.S. Appl. No. 11/620,715, 20 pages (Platzer).
Final Office Acton dated Mar. 1, 2013, received in U.S. Appl. No. 11/620,715, 25 pages (Platzer).
Office Action dated Jun. 6, 2012, received in Chinese Patent Application No. 200880001855.9, which corresponds to U.S. Appl. No. 11/620,715 (Platzer).
Office Action dated Nov. 5, 2012, received in Chinese Patent Application No. 200880001855.9, which corresponds to U.S. Appl. No. 11/620,715, 22 pages (Platzer).
Office Action dated Mar. 7, 2013, received in Chinese Patent Application No. 200880001855.9, which corresponds to U.S. Appl. No. 11/620,715, 21 pages (Platzer).
Office Action dated Oct. 30, 2012, received in European Patent Application No. 08 712 946.6, which corresponds to U.S. Appl. No. 11/620,715, 20 pages (Platzer).
Office Action dated Jun. 18, 2012, received in U.S. Appl. No. 13/464,800, 10 pages (Bolsinga).
Notice of Allowance dated Nov. 13, 2012, received in U.S. Appl. No. 13/464,800, 20 pages (Bolsinga).
Notice of Allowance dated Dec. 19, 2012, received in U.S. Appl. No. 13/464,800, 11 pages (Bolsinga).
Office Action dated Mar. 5, 2013, received in U.S. Appl. No. 13/670,378, 40 pages (Beaver).
Office Action dated Jun. 26, 2013, received in U.S. Appl. No. 13/867,950, 21 pages (Platzer).
Office Action dated Apr. 1, 2009, received in U.S. Appl. No. 11/620,709 (Platzer).
Final Office Action dated Nov. 13, 2009, received in U.S. Appl. No. 11/620,709 (Platzer).
Office Action dated Jun. 9, 2010, received in U.S. Appl. No. 11/620,709, 8 pages (Platzer).
Office Action dated Jul. 8, 2009, received in U.S. Appl. No. 11/620,717 (Platzer).
Office Action dated Dec. 29, 2009, received in U.S. Appl. No. 11/620,717 (Platzer).
Notice of Allowance dated Jul. 20, 2010, received in U.S. Appl. No. 11/620,717, 31 pages (Platzer).
Office Action dated Apr. 1, 2009, received in U.S. Appl. No. 11/620,723 (Platzer).
Final Office Action dated Nov. 17, 2009, received in U.S. Appl. No. 11/620,723 (Platzer).
Office Action dated Jun. 8, 2010, received in U.S. Appl. No. 11/620,723, 8 pages (Platzer).
*Apple Inc.* v. *HTC Corporation*, Particulars of Claim, In the High Court of Justice, Chancery Division, Patents Court, Sep. 12, 2011, 4 pages.
*Apple Inc.* v. *HTC Corporation* Intervention of the Assumed Infringer according to Art. 105 EPC, Dec. 12, 2011, 24 pages.
Feng et al., "Wireless Java Programming with Java 2 Micro Edition," ASCII Corporation, Kenichi Suzuki, Japan, May 11, 2002, 90 pages.
International Search Report and Written Opinion, dated May 31, 2005, received in International Patent Application No. PCT/US2005/000089, 7 pages.
International Preliminary Report on Patentability, dated Jun. 18, 2005, received in International Patent Application No. PCT/US2005/000089, 5 pages.
JazzMutant, "Lemur v1.3 Examples Package: CursorModes.xml," http://www.jazzmutant.com/support_download.php>, Jan. 31, 2006, 4 pages.
Matsuda et al., "Phosphorylcholine-endcapped oligomer and block co-oligomer and surface biological reactivity," Biomaterials, Jun. 24, 2003, 11 pages.
Nathan, "Silverlight 1.0 Unleashed," Sam's Publishing, XP055236068, ISBN: 978-0-672-33007-0, Oct. 16, 2007, 271 pages.
Office Action, dated Apr. 1, 2009, received in U.S. Appl. No. 11/620,709, 8 pages.
Office Action, dated Jun. 9, 2010, received in U.S. Appl. No. 11/620,709, 8 pages.
Office Action, dated Jul. 21, 2010, received in U.S. Appl. No. 11/620,710, 28 pages.
Office Action, dated Nov. 18, 2009, received in U.S. Appl. No. 11/620,720, 17 pages.
Office Action, dated Dec. 23, 2008, received in U.S. Appl. No. 11/620,720, 18 pages.
Office Action, dated Apr. 1, 2009, received in U.S. Appl. No. 11/620,723, 8 pages.

(56) References Cited

OTHER PUBLICATIONS

Office Action, dated Jun. 8, 2010, received in U.S. Appl. No. 11/620,723, 8 pages.
Office Action, dated Feb. 19, 2009, received in Australian Patent Application No. 2008201540, which corresponds with U.S. Appl. No. 11/956,969, 2 pages.
Office Action, dated Jul. 15, 2009, received in Australian Patent Application No. 2008201540, which corresponds with U.S. Appl. No. 11/956,969, 2 pages.
Office Action, dated Jul. 1, 2008, received in Australian Patent Application No. 2008100283, which corresponds with U.S. Appl. No. 11/956,969, 2 pages.
Office Action, dated Feb. 11, 2009, received in Australian Patent Application No. 2009200366, which corresponds with U.S. Appl. No. 11/956,969, 2 pages.
Office Action, dated Apr. 8, 2010, received in Australian Patent Application No. 2009208103, which corresponds with U.S. Appl. No. 11/956,969, 2 pages.
Office Action, Notice of Acceptance, dated Nov. 9, 2011, received in Australian Patent Application No. 2011201639, which corresponds with U.S. Appl. No. 11/956,969, 3 pages.
Office Action, Letters Patent, dated Mar. 2, 2012, received in Australian Patent Application No. 2012100050, which corresponds with U.S. Appl. No. 11/956,969, 3 pages.
Office Action, dated Sep. 9, 2013, received in Australian Patent Application No. 2012200689, which corresponds with U.S. Appl. No. 11/956,969, 3 pages.
Office Action, dated Dec. 1, 2009, received in Canadian Patent Application No. 2,658,177, which corresponds with U.S. Appl. No. 11/956,969, 2 pages.
Office Action, dated Jun. 22, 2011, received in Canadian Patent Application No. 2,658,177, which corresponds with U.S. Appl. No. 11/956,969, 2 pages.
Office Action, dated Nov. 4, 2013, received in Canadian Patent Application No. 2,759,090, which corresponds with U.S. Appl. No. 11/959,969, 3 pages.
Office Action, Notice of Allowance, dated Jan. 30, 2012, received in Canadian Patent Application No. 2,658,177, which corresponds with U.S. Appl. No. 11/956,969, 1 page.
Office Action, dated Nov. 7, 2013, received in Canadian Patent Application No. 2,759,091, which corresponds with U.S. Appl. No. 11/956,969, 4 pages.
Office Action, dated Nov. 23, 2010, received in Chinese Patent Application No. 200880000019.9, which corresponds with U.S. Appl. No. 11/956,969, 13 pages.
Office Action, dated Jan. 5, 2012, received in Chinese Patent Application No. 200880000019.9, which corresponds with U.S. Appl. No. 11/956,969, 14 pages.
Office Action, dated Sep. 20, 2012, received in Chinese Patent Application No. 200880000019.9, which corresponds with U.S. Appl. No. 11/956,969, 22 pages.
Office Action, dated Feb. 18, 2013, received in Chinese Patent Application No. 200880000019.9, which corresponds with U.S. Appl. No. 11/956,969, 12 pages.
Office Action, dated Jul. 23, 2013, received in Chinese Patent Application No. 200880000019.9, which corresponds with U.S. Appl. No. 11/956,969, 4 pages.
Office Action, dated Oct. 29, 2010, received in German Patent Application No. 112008000144.8, which corresponds with U.S. Appl. No. 11/956,969, 4 pages.
Office Action, dated Dec. 29, 2009, received in European Patent Application No. 08713567.9, which corresponds with U.S. Appl. No. 11/956,969, 5 pages.
Office Action, Decision to Grant, dated Oct. 7, 2011, received in European Patent Application No. 08713567.9, which corresponds with U.S. Appl. No. 11/956,969, 1 page.
Office Action, Patent Certificate, dated Jun. 21, 2012, received in European Patent Application No. 2126678 (08713567.9), which corresponds with U.S. Appl. No. 11/956,969, 2 pages.
Office Action, Certificate of Grant, dated Feb. 3, 2012, received in Hong Kong Patent Application No. 10103983.1, which corresponds with U.S. Appl. No. 11/956,969, 2 pages.
Office Action, dated Nov. 19, 2010, received in Japanese Patent Application No. 2009-544996, which corresponds with U.S. Appl. No. 11/956,969, 6 pages.
Office Action, Letters Patent, dated Jun. 1, 2011, received in Japanese Application No. 2009-544996, which corresponds with U.S. Appl. No. 11/956,969, 1 page.
Office Action, dated Feb. 12, 2010, received in Japanese Application No. 2009-544996, which corresponds with U.S. Appl. No. 11/956,969, 1 page.
Grant of Patent, dated Oct. 26, 2012, received in Japanese Patent Application No. 2010-157302, which corresponds with U.S. Appl. No. 11/956,969, 3 pages.
Office Action, dated Oct. 15, 2012, received in Japanese Patent Application No. 2010-157303, which corresponds with U.S. Appl. No. 11/956,969, 2 pages.
Office Action, Notice of Allowance, dated Apr. 15, 2013, received in Japanese Patent Application No. 2010-157303, which corresponds with U.S. Appl. No. 11/956,969, 3 pages.
Office Action, dated Aug. 27, 2009, received in Korean Patent Application No. 10-2009-7003574, which corresponds with U.S. Appl. No. 11/956,969, 1 page.
Office Action, dated Jun. 25, 2013, received in Korean Patent Application No. 2013-7000337, which corresponds with U.S. Appl. No. 11/956,969, 3 pages.
Office Action, dated Oct. 11, 2011, received in U.S. Appl. No. 12/270,805, 27 pages.
Office Action, dated Oct. 11, 2011, received in U.S. Appl. No. 12/270,807, 26 pages.
Office Action, dated Oct. 12, 2011, received in U.S. Appl. No. 12/270,810, 12 pages.
Office Action, dated Oct. 13, 2011, received in U.S. Appl. No. 12/270,812, 12 pages.
Office Action, dated May 17, 2012, received in U.S. Appl. No. 12/270,812, 12 pages.
Office Action, dated Oct. 11, 2011, received in U.S. Appl. No. 12/270,815, 12 pages.
Office Action, dated May 17, 2012, received in U.S. Appl. No. 12/270,815, 13 pages.
Office Action, dated Jul. 8, 2009, received in U.S. Appl. No. 11/620,717, 6 pages.
Office Action, dated Dec. 29, 2009, received in U.S. Appl. No. 11/620,717, 8 pages.
Office Action, dated Nov. 11, 2010, received in Chinese Patent Application No. 200880001827.7, which corresponds with U.S. Appl. No. 11/620,717, 6 pages.
Office Action, dated Jan. 29, 2012, received in Chinese Patent Application No. 200880001827.7, which corresponds with U.S. Appl. No. 11/620,717, 5 pages.
Office Action, dated Jul. 2, 2013, received in Chinese Patent Application No. 200880001827.7, which corresponds with U.S. Appl. No. 11/620,717, 7 pages.
Office Action, dated Nov. 26, 2012, received in European Patent Application No. 08712964.9, which corresponds with U.S. Appl. No. 11/620,717, 6 pages.
Office Action, dated Jan. 20, 2015, received in European Patent Application No. 08712964.9, which corresponds with U.S. Appl. No. 11/620,717, 8 pages.
Office Action, dated Oct. 24, 2011, received in U.S. Appl. No. 12/869,182, 7 pages.
Office Action, dated Jun. 20, 2012, received in U.S. Appl. No. 12/869,182, 6 pages.
Office Action, dated Mar. 18, 2014, received in Chinese Patent Application No. 201210128915.1, 6 pages.
Office Action, dated Jan. 17, 2014, received in Chinese Patent Application No. 201210128911.3, 6 pages.
Office Action, dated Mar. 30, 2012, received in U.S. Appl. No. 12/207,429, 9 pages.
Office Action, dated Jun. 26, 2013, received in U.S. Appl. No. 13/867,950, 5 pages.

(56) References Cited

OTHER PUBLICATIONS

Office Action, dated Sep. 24, 2014, received in U.S. Appl. No. 14/189,922, 6 pages.
Plaisant et al., "Touchscreen Toggle Design," Human-Computer Interaction Laboratory, University of Maryland, College Park, MD, May 3-7, 1992, 2 pages.
*Apple* vs *HTC*, Reference to Complaint, Letter from Powell Gilbert, Apr. 5, 2012, 12 pages.
Samsung, Statement of Defense also Counterclaim (Tablets), Judge in Interlocutory Proceedings of the Court in the Hague, Jul. 20, 2011, 48 pages.
*Withers & Rogers LLP, Apple* vs. *Samsung*, Proprietor's Response to Communication under Rule 79(1) EPC, dated Mar. 8, 2012, 8 pages.
Letters Patent, dated Dec. 29, 2015, received in Canadian Patent Application No. 2,817,890, which corresponds with U.S. Appl. No. 12/566,660, 2 pages.
Office Action, dated Jul. 1, 2015, received in U.S. Appl. No. 12/789,695, 15 pages.
Final Office Action, dated Feb. 22, 2016, received in U.S. Appl. No. 12/789,695, 31 pages.
Office Action, dated Dec. 3, 2015, received in Chinese Patent Application No. 201310557439.X, which corresponds with U.S. Appl. No. 12/789,695, 2 pages.
Office Action, dated Apr. 30, 2014, received in Korean Patent Application No. 2012-7022239, which corresponds with U.S. Appl. No. 12/789,695, 2 pages.
Office Action, dated Nov. 24, 2015, received in Chinese Patent Application No. 201180022994.1, which corresponds with U.S. Appl. No. 12/892,848, 2 pages.
Office Action, dated Aug. 26, 2015, received in European Patent Application No. 11727371.4, which corresponds with U.S. Appl. No. 12/892,848, 9 pages.
Notice of Allowance, dated Aug. 22, 2014, received in Japanese Patent Application No. 2013-515382, which corresponds with U.S. Appl. No. 12/892,848, 3 pages.
Office Action, dated Nov. 13, 2015, received in Japanese Patent Application No. 2014-191701, which corresponds with U.S. Appl. No. 12/892,848, 3 pages.
Office Action, dated May 22, 2014, received in U.S. Appl. No. 12/892,851, 11 pages.
Office Action, dated Jul. 1, 2014, received in European Patent Application No. 11808779.0, which corresponds with U.S. Appl. No. 13/077,925, 5 pages.
Office Action, dated Jun. 26, 2014, received in Korean Patent Application No. 2013-7019463, which corresponds with U.S. Appl. No. 13/077,925, 5 pages.
Office Action, dated Oct. 20, 2015, received in Korean Patent Application No. 2014-7036632, which corresponds with U.S. Appl. No. 13/077,925, 2 pages.
Office Action, dated Aug. 9, 2011, received in Australian Patent Application No. 2009200493, which corresponds with U.S. Appl. No. 12/042,318, 2 pages.
Office Action, dated Sep. 3, 2013, received in Canadian Patent Application No. 2,653,363, which corresponds with U.S. Appl. No. 12/042,318, 3 pages.
Office Action, dated Jan. 7, 2016, received in Canadian Patent Application No. 2653363, which corresponds with U.S. Appl. No. 12/042,318, 4 pages.
Office Action, dated Aug. 5, 2013, received in Chinese Patent Application No. 201110148738.9, which corresponds with U.S. Appl. No. 12/042,318, 6 pages.
Decision to Grant, dated Sep. 17, 2015, received in European Application No. 11150788.5, which corresponds with U.S. Appl. No. 12/042,318, 1 page.
Granted Patent (2302494), dated Oct. 14, 2015, received in European Patent Application No. 11150788.5, which corresponds with U.S. Appl. No. 12/042,318, 1 page.

Office Action, dated Apr. 15, 2015, received in European Patent Application No. 11184167.2, which corresponds with U.S. Appl. No. 12/042,318, 3 pages.
Office Action, dated Nov. 25, 2015, received in European Patent Application No. 11184167.2, which corresponds with U.S. Appl. No. 12/042,318, 7 pages.
Office Action, dated Nov. 25, 2015, received in European Patent Application No. 11184169.8, which corresponds with U.S. Appl. No. 12/042,318, 8 pages.
Office Action, dated Apr. 16, 2015, received in European Patent Application No. 11184170.6, which corresponds with U.S. Appl. No. 12/042,318, 2 pages.
Office Action, dated Nov. 30, 2015, received in European Patent Application No. 11184170.6, which corresponds with U.S. Appl. No. 12/042,318, 4 pages.
Office Action, dated Apr. 17, 2015, received in European Patent Application No. 11184172.2, which corresponds with U.S. Appl. No. 12/042,318, 6 pages.
Office Action, dated Nov. 30, 2015, received in European Patent Application No. 11184172.2, which corresponds with U.S. Appl. No. 12/042,318, 4 pages.
Office Action, dated Apr. 22, 2015, received in European Patent Application No. 11184409.8, which corresponds with U.S. Appl. No. 12/042,318, 6 pages.
Office Action, dated Nov. 30, 2015, received in European Patent Application No. 11184409.8, which corresponds with U.S. Appl. No. 12/042,318, 4 pages.
Office Action, dated Nov. 25, 2015, received in European Patent Application No. 12156394.4, which corresponds with U.S. Appl. No. 12/042,318, 8 pages.
European Search Report, dated Jul. 9, 2012, received in European Patent Application No. 12156395.1, which corresponds with U.S. Appl. No. 12/042,318, 8 pages.
Office Action, dated Nov. 25, 2015, received in European Application No. 12156395.1, which corresponds with U.S. Appl. No. 12/042,318, 9 pages.
Certificate of Grant, dated Jul. 17, 2015, received in Hong Kong Patent Application No. 12105027.2, which corresponds with U.S. Appl. No. 12/042,318, 2 pages.
Office Action, dated Jul. 20, 2015, received in Israel Patent Application No. 197386, which corresponds with U.S. Appl. No. 12/042,318, 3 pages.
Notice of Allowance, dated Nov. 23, 2015, received in Israel Patent Application No. 197386, which corresponds with U.S. Appl. No. 12/042,318, 2 pages.
Summons to Oral Proceedings, dated Mar. 10, 2015, received in European Patent Application No. 09700006.1, which corresponds with U.S. Appl. No. 12/042,067, 9 pages.
Decision to Grant, dated Apr. 12, 2015, received in European Patent Application No. 09700006.1, which corresponds with U.S. Appl. No. 12/042,067, 5 pages.
Summons to Attend Oral Proceedings, dated Apr. 22, 2014, received in European Patent Application No. 12188748.3, which corresponds with U.S. Appl. No. 12/042,067, 3 pages.
Office Action, dated Nov. 30, 2015, received in Japanese Patent Application No. 2014-250268, which corresponds with U.S. Appl. No. 12/042,299, 4 pages.
Office Action, dated Aug. 20, 2015, received in U.S. Appl. No. 13/077,931, 22 pages.
Notice of Allowance, dated Jan. 14, 2016, received in U.S. Appl. No. 13/077,931, 8 pages.
Decision to Grant, dated Dec. 2, 2015, received in European Patent Application No. 09700008.7, which corresponds with U.S. Appl. No. 12/042,237, 5 pages.
Letters Patent, dated Oct. 31, 2014, received in Japanese Patent Application No. 2012-218235, which corresponds with U.S. Appl. No. 12/042,237, 2 pages.
Office Action, dated Nov. 19, 2015, received in Chinese Patent Application No. 201210128932.5, which corresponds with U.S. Appl. No. 11/620,727, 6 pages.
Notice of Allowance, dated Feb. 5, 2016, received in Chinese Patent Application No. 201210128915.1, which corresponds with U.S. Appl. No. 11/620,727, 2 pages.

(56) References Cited

OTHER PUBLICATIONS

Office Action, dated Jan. 10, 2012, received in U.S. Appl. No. 13/251,121, 16 pages.
Office Action, dated May 1, 2013, received in U.S. Appl. No. 13/251,121, 17 pages.
Office Action, dated Apr. 11, 2013, received in U.S. Appl. No. 13/251,146, 15 pages.
Office Action, dated Jul. 29, 2014, received in Chinese Patent Application No. 200880001855.9, which corresponds with U.S. Appl. No. 11/620,715, 14 pages.
Notice of Allowance, dated Jul. 7, 2015, received in U.S. Appl. No. 13/084,472, 8 pages.
Notice of Allowance, dated Oct. 26, 2015, received in U.S. Appl. No. 13/084,472, 8 pages.
Supplemental Notice of Allowance, dated Jan. 27, 2014, received in U.S. Appl. No. 13/620,390, 2 pages.
Notice of Allowance, dated Nov. 5, 2015, received in U.S. Appl. No. 13/791,621, 5 pages.
Office Action, dated Jan. 4, 2016, received in U.S. Appl. No. 14/171,680, 7 pages.
Notice of Allowance, dated Sep. 15, 2015, received in U.S. Appl. No. 14/180,267, 5 pages.
Notice of Allowance, dated Dec. 31, 2015, received in U.S. Appl. No. 14/180,267, 5 pages.
Notice of Allowance, dated Feb. 11, 2016, received in U.S. Appl. No. 14/180,267, 2 pages.
Search Report, dated Jun. 2012, received in Dutch Patent Application No. 2007993, which corresponds with U.S. Appl. No. 13/077,925, 6 pages.
Extended European Search Report, dated Dec. 22, 2015, received in European Patent Application No. 15175530.3, which corresponds with U.S. Appl. No. 12/042,067, 9 pages.
International Search Report and Written Opinion, dated Dec. 4, 2014, received in International Patent Application No. PCT/US2014/040406, which corresponds with U.S. Appl. No. 14/290,931, 9 pages.
International Preliminary Report on Patentability, dated Dec. 15, 2015, received in International Patent Application No. PCT/US2014/040406, which corresponds with U.S. Appl. No. 14/290,931, 6 pages.
Certificate of Patent, dated Feb. 5, 2016, received in Japanese Patent Application No. 2014-129689, which corresponds with U.S. Appl. No. 12/566,660, 1 page.
Notice of Allowance, dated Apr. 14, 2016, received in Australian Patent Application No. 2014213525, which corresponds with U.S. Appl. No. 12/789,695, 1 page.
Notice of Allowance, dated Apr. 15, 2016, received in Japanese Patent Application No. 2014-044208, which corresponds with U.S. Appl. No. 12/789,695, 3 pages.
Notice of Allowance, dated Mar. 18, 2016, received in Australian Patent Application No. 2014200702, which corresponds with U.S. Appl. No. 12/892,848, 2 pages.
Notice of Allowance, dated Apr. 6, 2016, received in Chinese Patent Application No. 201180022994.1, which corresponds with U.S. Appl. No. 12/892,848, 2 pages.
Office Action, dated Mar. 15, 2016, received in Australian Patent Application No. 2015203638, which corresponds with U.S. Appl. No. 13/077,925, 3 pages.
NOA/Grant, dated Apr. 1, 2016, received in Chinese Patent Application No. 20110463262.8, which corresponds with U.S. Appl. No. 13/077,925, 2 pages.
Letters Patent, dated May 4, 2016, received in Chinese Patent Application No. 20110463262.8, which corresponds with U.S. Appl. No. 13/077,925, 3 pages.
Certificate of Grant, dated Feb. 1, 2016, received in Taiwanese Patent Application No. 103144867, which corresponds with U.S. Appl. No. 13/077,925, 2 pages.
Notice of Allowance, dated Apr. 29, 2016, received in Korean Patent Application No. 2014-7036632, which corresponds with U.S. Appl. No. 13/077,925, 3 pages.
Office Action, dated Feb. 16, 2016, received in European Patent Application No. 11184167.2, which corresponds with U.S. Appl. No. 12/042,318, 6 pages.
Office Action, dated Feb. 16, 2016, received in European Patent Application No. 11184169.8, which corresponds with U.S. Appl. No. 12/042,318, 6 pages.
Office Action, dated Apr. 4, 2016, received in Japanese Patent Application No. 2015-085361, which corresponds with U.S. Appl. No. 12/042,318, 3 pages.
Office Action, dated Mar. 21, 2016, received in Chinese Patent Application No. 2016031601558630, which corresponds with U.S. Appl. No. 12/042,067, 2 pages.
Decision to Grant, dated Apr. 14, 2016, received in European Patent Application No. 09700006.1, which corresponds with U.S. Appl. No. 12/042,067, 1 page.
Decision to Grant, dated Apr. 14, 2016, received in European Patent Application No. 09700008.7, which corresponds with U.S. Appl. No. 12/042,237, 1 page.
Pixley, "Document Object Model (DOM) Level 2 Events Specification, Version 1," Netscape Communications Corp., W3C, Nov. 13, 2000, 47 pages.
Patent Certificate, dated May 20, received in Japanese Patent Application No. 2014-044208, which corresponds with U.S. Appl. No. 12/789,695, 2 pages.
Notice of Allowance, dated May 23, 2016, received in Korean Patent Application No. 10-2014-7030745, which corresponds with U.S. Appl. No. 12/789,695, 3 pages.
Patent Certificate, dated May 18, 2016, received in Chinese Patent Application No. 201180022994.1, which corresponds with U.S. Appl. No. 12/892,848, 6 page.
Patent, dated May 30, 2016, received in Israel Patent Application No. 197386, which corresponds with U.S. Appl. No. 12/042,318, 2 pages.
Office Action, dated Apr. 28, 2016, received in Chinese Patent Application No. 2016042501712900, which corresponds with U.S. Appl. No. 12/042,299, 2 pages.
Notice of Allowance, dated Jun. 6, 2016, received in Japanese Patent Application No. 2014-250268, which corresponds with U.S. Appl. No. 12/042,299, 4 pages.
Office Action, dated Apr. 27, 2016, received in U.S. Appl. No. 14/290,931; 12 pages.
Notice of Allowance, dated Apr. 18, 2016, received in U.S. Appl. No. 14/171,680, 5 pages.
Office Action, dated Apr. 27, 2016, received in U.S. Appl. No. 14/290,931, 12 pages.

Sub-Event Sequence 465
- Detect finger down 465-1
- Measure delay 465-2
- Detect finger vertical swipe of at least N pixels 465-3
- Detect finger lift off 465-4
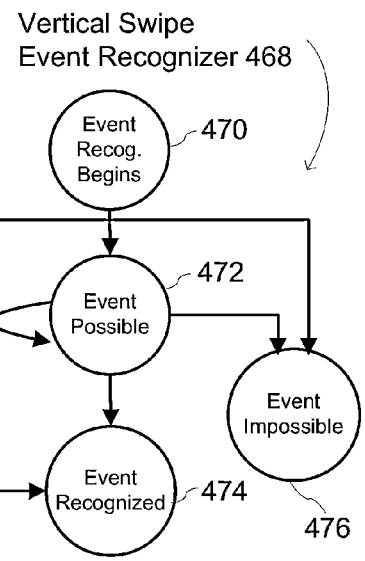
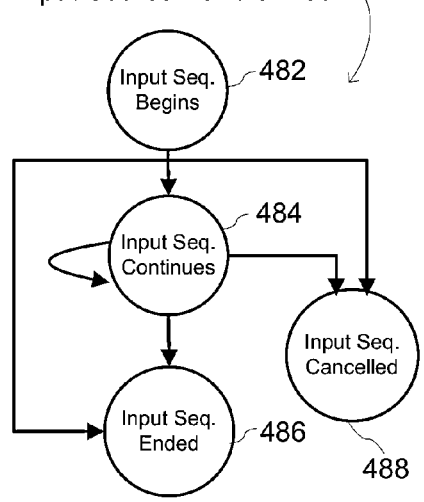
Figure 4C Sub-Event Sequence 520
- Detect finger down 521-1
- Measure delay 521-2
- Detect finger liftoff 521-3
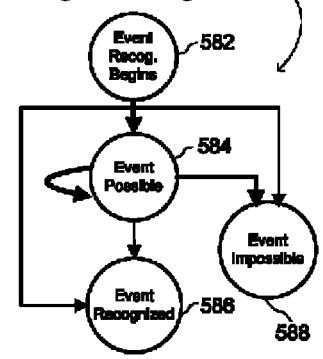
Scrolling Event Recognizer 580
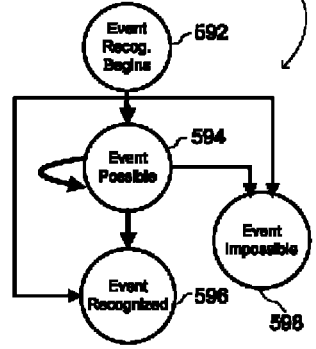
Tap Event Recognizer 590
Figure 5A Sub-Event Sequence 530
- Detect finger down 531-1
- Measure delay 531-2
- Detect finger movement 531-3
- Detect finger lift off 531-4
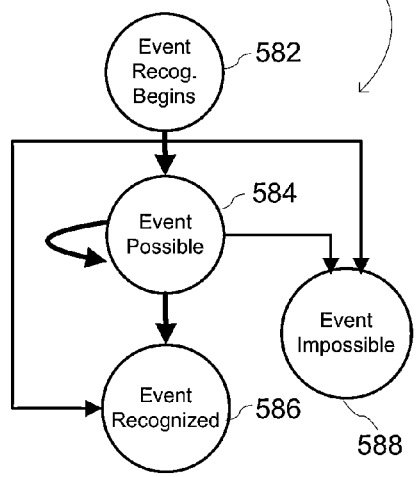
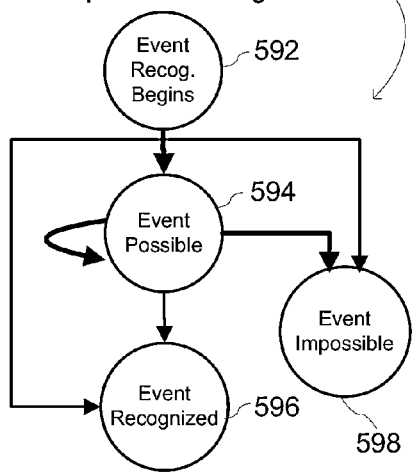
Figure 5B Sub-Event Sequence 540
- Detect finger down 541-1
- Measure delay 541-2
- Detect finger liftoff 541-3
- Measure delay 541-4
- Detect finger down 541-5
- Measure delay 541-6
- Detect finger liftoff 541-7
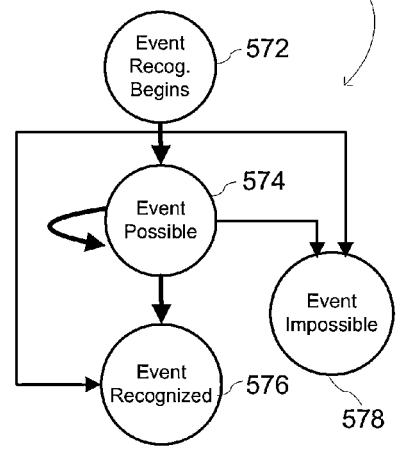
Double Tap Event Recognizer 570
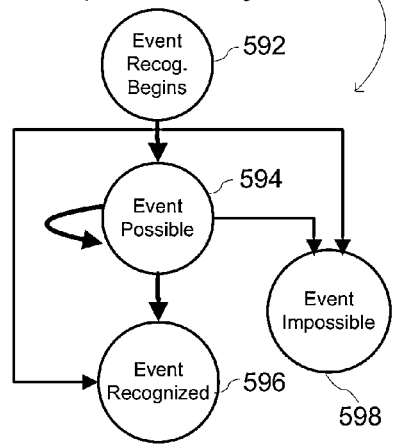
Tap Event Recognizer 590
Figure 5C

600

| | |
|---|---|
| Display one or more views of the view hierarchy. | ─ 608 |

▼

Execute one or more software elements, each software element being associated ─ 610
with a particular view, wherein each particular view includes one or more event
recognizers, each event recognizer having an event definition based on one or more sub-
events, and an event handler, wherein the event handler specifies an action for a target, and
is configured to send the action to the target in response to the event recognizer detecting
an event corresponding to the event definition.

> At least one of the plurality of event recognizers is a gesture recognizer having a ─ 612
> gesture definition and a gesture handler.

> The event definition defines a user gesture. ─ 614

> Each event recognizer has a set of event recognition states including at least an event ─ 616
> possible state, an event impossible state, and an event recognized state.

>> The event handler initiates preparation of its corresponding action for delivery to ─ 618
>> the target if the event recognizer enters the event possible state.

>>> The event handler terminates preparation of its corresponding action if the ─ 620
>>> event recognizer enters the event impossible state.

>>> The event handler completes preparation of its corresponding action for ─ 622
>>> delivery to the target if the the event recognizer enters the event recognized
>>> state.

>>> The event handler delivers its corresponding action to the target. ─ 624

> The plurality of event recognizers independently process the sequence of one or more ─ 626
> sub-events in parallel.

> One or more of the plurality of event recognizers, comprising exclusive event ─ 628
> recognizers, are configured to perform exclusive event recognition, and the event
> delivery system prevents any non-exclusive event recognizers for actively involved
> views in the view hierarchy from recognizing respective events after any of the
> exclusive event recognizers recognizes an event.

>> One or more exclusive event recognizers include an event exception list. ─ 630

>>> The event exception list includes events whose corresponding event definitions ─ 632
>>> have repetitive sub-events.

> The event definition defines a user input operation. ─ 634

▼

802 An electronic device with a touch-sensitive display is configured to execute at least a first software application and a second software application. The first software application includes a first set of one or more gesture recognizers, and the second software application includes one or more views and a second set of one or more gesture recognizers. Respective gesture recognizers have corresponding gesture handlers.

| 804 The first software application is an application launcher | 806 The first software application is an operating system application |

808 Display at least a subset of the one or more views of the second software application

| 810 The displaying includes displaying at least a subset of the one or more views of the second software application without displaying any view of the first software application | 812 The displaying includes displaying at least a subset of the one or more views of the second software application without displaying a view of any other application |

While displaying at least the subset of the one or more views of the second application:

814 Detect a sequence of touch inputs on the touch-sensitive display. The sequence of touch inputs includes a first portion of one or more touch inputs and a second portion of one or more touch inputs subsequent to the first portion 816 The detecting occurs while touch inputs in the first portion of one or more touch inputs at least partially overlap at least one of the displayed views of the second software application 818 During a first phase of detecting the sequence of touch inputs:

820 Deliver the first portion of one or more touch inputs to the first software application and the second software application 822 Identify from gesture recognizers in the first set, one or more matching gesture recognizers that recognize the first portion of one or more touch inputs 824 Process the first portion of one or more touch inputs with one or more gesture handlers corresponding to the one or more matching gesture recognizers (A)

Figure 8A

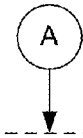

---

826 During a second phase of detecting the sequence of touch inputs, subsequent to the first phase:
deliver the second portion of one or more touch inputs to the first software application without delivering the second portion of one or more touch inputs to the second software application;
identify from the one or more matching gesture recognizers a second matching gesture recognizer that recognizes the sequence of touch inputs; and
process the sequence of touch inputs with a gesture handler corresponding to the respective matching gesture recognizer.

---

828 Processing the sequence of touch inputs with the gesture handler corresponding to the respective matching gesture recognizer includes displaying one or more views of the first software application

---

830 Processing the sequence of touch inputs with the gesture handler corresponding to the respective matching gesture recognizer includes replacing the display of the one or more views of the second software application with display of one or more views of the first software application

---

832 The electronic device concurrently executes the first software application, the second software application, and a third software application. Processing the sequence of touch inputs with the gesture handler corresponding to the respective matching gesture recognizer includes replacing the one or more displayed views of the second software application with one or more views of the third software application.

---

834 Processing the sequence of touch inputs with the gesture handler corresponding to the respective matching gesture recognizer includes:
displaying in a first predefined area of the touch-sensitive display a group of open application icons that correspond to at least some of a plurality of concurrently open applications; and
concurrently displaying at least a subset of the one or more views of the second software application.

902 An electronic device with a touch-sensitive display is configured to execute at least a first software application and a second software application. The first software application includes a first set of one or more gesture recognizers. The second software application includes one or more views and a second set of one or more gesture recognizers. Respective gesture recognizers have corresponding gesture handlers.

904 The first software application is an application launcher

906 The first software application is an operating system application

908 Display a first set of one or more views. The first set of one or more views includes at least a subset of the one or more views of the second software application.

910 Displaying the first set of one or more views includes displaying the first set of one or more views without displaying any view of the first software application

912 Displaying the first set of one or more views includes displaying the first set of one or more views without displaying a view of any other software application While displaying the first set of the one or more views:

914 Detect a sequence of touch inputs on the touch-sensitive display. The sequence of touch inputs includes a first portion of one or more touch inputs and a second portion of one or more touch inputs subsequent to the first portion.

916 The sequence of touch inputs at least partially overlaps at least one of the one or more displayed views of the second software application

918 Prior to a determination that at least one gesture recognizer in the first set of one or more gesture recognizers recognizes the first portion of one or more touch inputs, concurrently deliver the first portion of one or more touch inputs to the first software application and the second software application

920 Determine whether at least one gesture recognizer in the first set of one or more gesture recognizers recognizes the first portion of one or more touch inputs (B)

Figure 9A

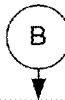

922 In accordance with a determination that at least one gesture recognizer in the first set of one or more gesture recognizers recognizes the first portion of one or more touch inputs:

924 Deliver the sequence of touch inputs to the first software application without delivering the sequence of touch inputs to the second software application 926 Determine whether at least one gesture recognizer in the first set of one or more gesture recognizers recognizes the sequence of touch inputs 928 In accordance with a determination that at least one gesture recognizer in the first set of one or more gesture recognizers recognizes the sequence of touch inputs, process the sequence of touch inputs with the at least one gesture recognizer in the first set of one or more gesture recognizers that recognizes the sequence of touch inputs 930 Processing the sequence of touch inputs with the at least one gesture recognizer in the first set of one or more gesture recognizers includes displaying one or more views of the first software application 932 Processing the sequence of touch inputs with the at least one gesture recognizer in the first set of one or more gesture recognizers includes replacing the display of the first set of one or more views with display of one or more views of the first software application.

934 The electronic device concurrently executes the first software application, the second software application, and a third software application. Processing the sequence of touch inputs with the at least one gesture recognizer in the first set of one or more gesture recognizers includes replacing the first set of one or more views with one or more views of the third software application.

936 Processing the sequence of touch inputs with the at least one gesture recognizer in the first set of one or more gesture recognizers includes: displaying in a first predefined area of the touch-sensitive display a group of open application icons that correspond to at least some of a plurality of concurrently open applications; and concurrently displaying at least a subset of the first set of one or more views

1002 An electronic device with an internal state is configured to execute software that includes a view hierarchy with a plurality of views:

1016 The internal state includes one or more settings for an accessibility operating mode 1018 The software is an application launcher 1020 The software is an operating system application 1004 Display one or more views of the view hierarchy 1006 Execute one or more software elements. Each software element is associated with a particular view, and each particular view includes one or more event recognizers. Each event recognizer has one or more event definitions based on one or more sub-events, and an event handler. The event handler specifies an action for a target, and is configured to send the action to the target in response to the event recognizer detecting an event corresponding to a particular event definition of the one or more event definitions.

1008 Detect a sequence of one or more sub-events

1010 Identify one of the views of the view hierarchy as a hit view. The hit view establishes which views in the view hierarchy are actively involved views.

1012 Deliver a respective sub-event to event recognizers for each actively involved view within the view hierarchy 1014 At least one event recognizer for actively involved views in the view hierarchy has a plurality of event definitions. One of the event definitions is selected in accordance with the internal state of the electronic device. The at least one event recognizer processes the respective sub-event prior to processing a next sub-event in the sequence of sub-events in accordance with the selected event definition.

Figure 10A

1014 At least one event recognizer for actively involved views in the view hierarchy has a plurality of event definitions. One of the event definitions is selected in accordance with the internal state of the electronic device. The at least one event recognizer processes the respective sub-event prior to processing a next sub-event in the sequence of sub-events in accordance with the selected event definition.

1020 The plurality of event definitions includes a first event definition corresponding to a first swipe gesture with a first number of fingers and a second event definition corresponding to a second swipe gesture with a second number of fingers distinct from the first number of fingers.

1022 A respective definition of the plurality of event definitions is selected for a respective event recognizer in accordance with the internal state of the electronic device and a determination that the respective event definition does not correspond to an event definition of any event recognizer for the actively involved views other than the respective event recognizer.

1024 Two or more event recognizers for actively involved views in the view hierarchy each have a respective plurality of event definitions, and a respective event definition of the respective plurality of event definitions is selected for a respective event recognizer in accordance with the internal state of the electronic device and a determination that the respective event definition does not correspond to any event definition selected for any event recognizer with the plurality of event definitions other than the respective event recognizer 1026 Processing the respective sub-event in accordance with the selected event definition includes displaying one or more views of a first software application distinct from the software that includes the view hierarchy 1028 The at least one event recognizer processes the respective sub-event by replacing the display of the one or more views of the view hierarchy with display of one or more views of a first software application distinct from the software that includes the view hierarchy 1030 The at least one event recognizer processes the respective sub-event by: displaying in a first predefined area of a touch-sensitive display in the electronic device a group of open application icons that correspond to at least some of a plurality of concurrently open applications; and concurrently displaying at least a subset of the one or more views of the view hierarchy

Figure 10B

EVENT RECOGNITION

RELATED APPLICATIONS

This application is a continuation application of U.S. patent application Ser. No. 13/077,927, filed Mar. 31, 2011, entitled "Event Recognition," which claims priority to U.S. Provisional Application Ser. No. 61/425,222, filed on Dec. 20, 2010, entitled "Event Recognition", which was a continuation-in-part of: (A) U.S. patent application Ser. No. 12/566,660, filed Sep. 24, 2009, entitled "Event Recognition," which claims priority to U.S. Provisional Application Ser. No. 61/210,332, filed on Mar. 16, 2009, entitled "Event Recognition"; and (B) U.S. patent application Ser. No. 12/789,695, filed May 28, 2010, entitled "Gesture Recognizers with Delegates for Controlling and Modifying Gesture Recognition," which claims priority to U.S. Provisional Application Ser. No. 61/298,531, filed Jan. 26, 2010, entitled "Gesture Recognizers with Delegates for Controlling and Modifying Gesture Recognition." All of these applications are incorporated by reference herein in their entirety.

This application relates to U.S. patent application Ser. No. 13/077,524, filed Mar. 31, 2011, entitled "Device, Method, and Graphical User Interface for Navigation of Concurrently Open Software Applications". This application is incorporated by reference herein in its entirety.

This application relates to U.S. patent application Ser. No. 13/077,925, filed Mar. 31, 2011, entitled "Event Recognition"; and U.S. patent application Ser. No. 13/077,931, filed Mar. 31, 2011, entitled "Event Recognition". Both of these applications are incorporated by reference herein in their entirety.

TECHNICAL FIELD

This relates generally to user interface processing, including but not limited to, apparatuses and methods for recognizing touch inputs.

BACKGROUND

An electronic device typically includes a user interface that is used to interact with the computing device. The user interface may include a display and/or input devices such as a keyboard, mice, and touch-sensitive surfaces for interacting with various aspects of the user interface. In some devices with a touch-sensitive surface as an input device, a first set of touch-based gestures (e.g., two or more of: tap, double tap, horizontal swipe, vertical swipe, pinch, depinch, two finger swipe) are recognized as proper inputs in a particular context (e.g., in a particular mode of a first application), and other, different sets of touch-based gestures are recognized as proper inputs in other contexts (e.g., different applications and/or different modes or contexts within the first application). As a result, the software and logic required for recognizing and responding to touch-based gestures can become complex, and can require revision each time an application is updated or a new application is added to the computing device. These and similar issues may arise in user interfaces that utilize input sources other than touch-based gestures.

Thus, it would be desirable to have a comprehensive framework or mechanism for recognizing touch-based gestures and events, as well as gestures and events from other input sources, that is easily adaptable to virtually all contexts or modes of all application programs on a computing device, and that requires little or no revision when an application is updated or a new application is added to the computing device.

SUMMARY

To address the aforementioned drawbacks, some embodiments provide a method performed at an electronic device with a touch-sensitive display. The electronic device is configured to execute at least a first software application and a second software application. The first software application includes a first set of one or more gesture recognizers, and the second software application includes one or more views and a second set of one or more gesture recognizers. Respective gesture recognizers have corresponding gesture handlers. The method includes displaying at least a subset of the one or more views of the second software application, and while displaying at least the subset of the one or more views of the second software application, detecting a sequence of touch inputs on the touch-sensitive display. The sequence of touch inputs includes a first portion of one or more touch inputs and a second portion of one or more touch inputs subsequent to the first portion. The method also includes, during a first phase of detecting the sequence of touch inputs, delivering the first portion of one or more touch inputs to the first software application and the second software application, identifying from gesture recognizers in the first set one or more matching gesture recognizers that recognize the first portion of one or more touch inputs, and processing the first portion of one or more touch inputs with one or more gesture handlers corresponding to the one or more matching gesture recognizers.

In accordance with some embodiments, a method is performed at an electronic device with a touch-sensitive display. The electronic device is configured to execute at least a first software application and a second software application. The first software application includes a first set of one or more gesture recognizers, and the second software application includes one or more views and a second set of one or more gesture recognizers. Respective gesture recognizers have corresponding gesture handlers. The method includes displaying a first set of one or more views. The first set of one or more views includes at least a subset of the one or more views of the second software application. The method also includes, while displaying the first set of the one or more views, detecting a sequence of touch inputs on the touch-sensitive display. The sequence of touch inputs includes a first portion of one or more touch inputs and a second portion of one or more touch inputs subsequent to the first portion. The method includes determining whether at least one gesture recognizer in the first set of one or more gesture recognizers recognizes the first portion of one or more touch inputs. The method also includes, in accordance with a determination that at least one gesture recognizer in the first set of one or more gesture recognizers recognizes the first portion of one or more touch inputs, delivering the sequence of touch inputs to the first software application without delivering the sequence of touch inputs to the second software application, and determining whether at least one gesture recognizer in the first set of one or more gesture recognizers recognizes the sequence of touch inputs. The method furthermore includes, in accordance with a determination that at least one gesture recognizer in the first set of one or more gesture recognizers recognizes the sequence of touch inputs, processing the sequence of touch inputs with the at least one gesture recognizer in the first set of one or more gesture recognizers that recognizes the sequence of touch inputs. The method also includes, in accordance with a determination that no gesture recognizer in the first set of one or more gesture recognizers recognizes the first portion of one or more touch inputs, delivering the sequence of touch inputs to the second software application, and determining whether at least one gesture recognizer in the second set of one or more gesture recognizers recognizes the sequence of touch inputs. The method furthermore includes, in accordance with a determination that at least one gesture recognizer in the second set of one or more gesture recognizers recognizes the sequence of touch inputs, processing the sequence of touch inputs with the at least one gesture recognizer in the second set of one or more gesture recognizers that recognizes the sequence of touch inputs.

In accordance with some embodiments, a method is performed at an electronic device with an internal state. The electronic device is configured to execute software that includes a view hierarchy with a plurality of views. The method includes displaying one or more views of the view hierarchy, and executing one or more software elements. Each software element is associated with a particular view, and each particular view includes one or more event recognizers. Each event recognizer has one or more event definitions based on one or more sub-events, and an event handler, which specifies an action for a target, and is configured to send the action to the target in response to the event recognizer detecting an event corresponding to a particular event definition of the one or more event definitions. The method also includes detecting a sequence of one or more sub-events, and identifying one of the views of the view hierarchy as a hit view. The hit view establishes which views in the view hierarchy are actively involved views. The method furthermore includes delivering a respective sub-event to event recognizers for each actively involved view within the view hierarchy. At least one event recognizer for actively involved views in the view hierarchy has a plurality of event definitions, and one in the plurality of event definitions is selected in accordance with the internal state of the electronic device. The at least one event recognizer processes the respective sub-event prior to processing a next sub-event in the sequence of sub-events in accordance with the selected event definition.

In accordance with some embodiments, a non-transitory computer readable storage medium stores one or more programs for execution by one of more processors of an electronic device. The one or more programs include one or more instructions, which when executed by the electronic device, cause the device to perform any of the methods described above.

In accordance with some embodiments, an electronic device with a touch-sensitive display includes one or more processors, and memory storing one or more programs for execution by the one or more processors. The one or more programs include instructions for implementing any of the methods described above.

In accordance with some embodiments, an electronic device with a touch-sensitive display includes means for implementing any of the methods described above.

In accordance with some embodiments, an information processing apparatus in a multifunction device with a touch-sensitive display includes means for implementing any of the methods described above.

In accordance with some embodiments, an electronic device includes a touch-sensitive display unit configured to receive touch inputs, and a processing unit coupled to the touch-sensitive display unit. The processing unit is configured to execute at least a first software application and a second software application. The first software application includes a first set of one or more gesture recognizers, and the second software application includes one or more views and a second set of one or more gesture recognizers. Respective gesture recognizers have corresponding gesture handlers. The processing unit is configured to: enable display of at least a subset of the one or more views of the second software application; and while displaying at least the subset of the one or more views of the second software application, detect a sequence of touch inputs on the touch-sensitive display unit. The sequence of touch inputs includes a first portion of one or more touch inputs and a second portion of one or more touch inputs subsequent to the first portion. The processing unit is configured to, during a first phase of detecting the sequence of touch inputs: deliver the first portion of one or more touch inputs to the first software application and the second software application; identify from gesture recognizers in the first set one or more matching gesture recognizers that recognize the first portion of one or more touch inputs; and process the first portion of one or more touch inputs with one or more gesture handlers corresponding to the one or more matching gesture recognizers.

In accordance with some embodiments, an electronic device includes a touch-sensitive display unit configured to receive touch inputs, and a processing unit coupled to the touch-sensitive display unit. The processing unit is configured to execute at least a first software application and a second software application. The first software application includes a first set of one or more gesture recognizers, and the second software application includes one or more views and a second set of one or more gesture recognizers. Respective gesture recognizers have corresponding gesture handlers. The processing unit is configured to enable display of a first set of one or more views. The first set of one or more views includes at least a subset of the one or more views of the second software application. The processing unit is configured to, while displaying the first set of the one or more views: detect a sequence of touch inputs on the touch-sensitive display unit (the sequence of touch inputs includes a first portion of one or more touch inputs and a second portion of one or more touch inputs subsequent to the first portion); and determine whether at least one gesture recognizer in the first set of one or more gesture recognizers recognizes the first portion of one or more touch inputs. The processing unit is configured to, in accordance with a determination that at least one gesture recognizer in the first set of one or more gesture recognizers recognizes the first portion of one or more touch inputs: deliver the sequence of touch inputs to the first software application without delivering the sequence of touch inputs to the second software application; and determine whether at least one gesture recognizer in the first set of one or more gesture recognizers recognizes the sequence of touch inputs. The processing unit is configured to, in accordance with a determination that at least one gesture recognizer in the first set of one or more gesture recognizers recognizes the sequence of touch inputs, process the sequence of touch inputs with the at least one gesture recognizer in the first set of one or more gesture recognizers that recognizes the sequence of touch inputs. The processing unit is configured to, in accordance with a determination that no gesture recognizer in the first set of one or more gesture recognizers recognizes the first portion of one or more touch inputs: deliver the sequence of touch inputs to the second software application; determine whether at least one gesture recognizer in the second set of one or more gesture recognizers recognizes the sequence of touch inputs; and in accordance with a determination that at least one gesture recognizer in the second set of one or more gesture recognizers recognizes the sequence of touch inputs, process the sequence of touch inputs with the at least one gesture recognizer in the second set of one or more gesture recognizers that recognizes the sequence of touch inputs.

In accordance with some embodiments, an electronic device includes: a display unit configured to display one or more views; a memory unit configured to store an internal state; and a processing unit coupled to the display unit and the memory unit. The processing unit is configured to: execute software that includes a view hierarchy with a plurality of views; enable display of one or more views of the view hierarchy; and execute one or more software elements. Each software element is associated with a particular view, and each particular view includes one or more event recognizers. Each event recognizer has: one or more event definitions based on one or more sub-events, and an event handler. The event handler specifies an action for a target, and is configured to send the action to the target in response to the event recognizer detecting an event corresponding to a particular event definition of the one or more event definitions. The processing unit is configured to: detect a sequence of one or more sub-events; and identify one of the views of the view hierarchy as a hit view. The hit view establishes which views in the view hierarchy are actively involved views. The processing unit is configured to deliver a respective sub-event to event recognizers for each actively involved view within the view hierarchy. At least one event recognizer for actively involved views in the view hierarchy has a plurality of event definitions, one of which is selected in accordance with the internal state of the electronic device, and the at least one event recognizer processes the respective sub-event prior to processing a next sub-event in the sequence of sub-events in accordance with the selected event definition.

BRIEF DESCRIPTION OF THE DRAWINGS

FIG. 4C illustrates the exemplary state machines of FIGS. 4A and 4B to an exemplary set of sub-events in accordance with some embodiments.

FIGS. 5A-5C illustrate exemplary sub-event sequences with exemplary event recognizer state machines in accordance with some embodiments.

FIGS. 6A and 6B are event recognition method flow diagrams in accordance with some embodiments.

FIGS. 8A and 8B are flow diagrams illustrating an event recognition method in accordance with some embodiments.

FIGS. 9A-9C are flow diagrams illustrating an event recognition method in accordance with some embodiments.

FIGS. 10A-10B are flow diagrams illustrating an event recognition method in accordance with some embodiments.

Like reference numerals refer to corresponding parts throughout the drawings.

DESCRIPTION OF EMBODIMENTS

Electronic devices with small screens (e.g., smart phones and tablets) typically display a single application at a time, even though multiple applications may be running on the device. Many of these devices have touch-sensitive displays configured to receive gesture as touch inputs. With such devices, a user may want to perform operations that are provided by a hidden application (e.g., an application that is running in the background and is not currently displayed on the display of the electronic device, such as an application launcher software application running in the background). Existing methods for performing operations provided by a hidden application typically require first displaying the hidden application and then providing touch inputs to the now displayed application. Therefore, the existing methods require additional steps. Furthermore, the user may not want to see the hidden application, but yet still want to perform an operation provided by the hidden application. In the embodiments described below, improved methods for interacting with a hidden application is achieved by delivering touch inputs to the hidden application, and processing the touch inputs with the hidden application without displaying the hidden application. Thus, these methods streamline the interaction with a hidden application, thereby eliminating the need for extra, separate steps to display the hidden application, while providing the ability to control and interact with the hidden application based on a gesture input.

In addition, in some embodiments, such electronic devices have at least one gesture recognizer with a plurality of gesture definitions. This helps the gesture recognizer work in different distinct operating modes. For example, a device may have a normal operating mode and an accessibility operating mode (e.g., for people with limited vision). In the normal operating mode, a next application gesture is used to move between applications, and the next application gesture is defined as a three-finger left-swipe gesture. In the accessibility operating mode, the three-finger left-swipe gesture is used to perform a different function. Thus, a gesture different from the three-finger left-swipe is needed in the accessibility operating mode to correspond to the next application gesture (e.g., a four-finger left-swipe gesture in the accessibility operating mode). By having multiple gesture definitions associated with the next application gesture, the device can select one of the gesture definitions for the next application gesture, depending on the current operating mode. This provides flexibility in using the gesture recognizer in different operating modes. In some embodiments, a plurality of gesture recognizers with multiple gesture definitions is adjusted depending on the operating mode (e.g., gestures performed with three fingers in the normal operating mode are performed with four fingers in the accessibility operating mode).

Figure 6B:
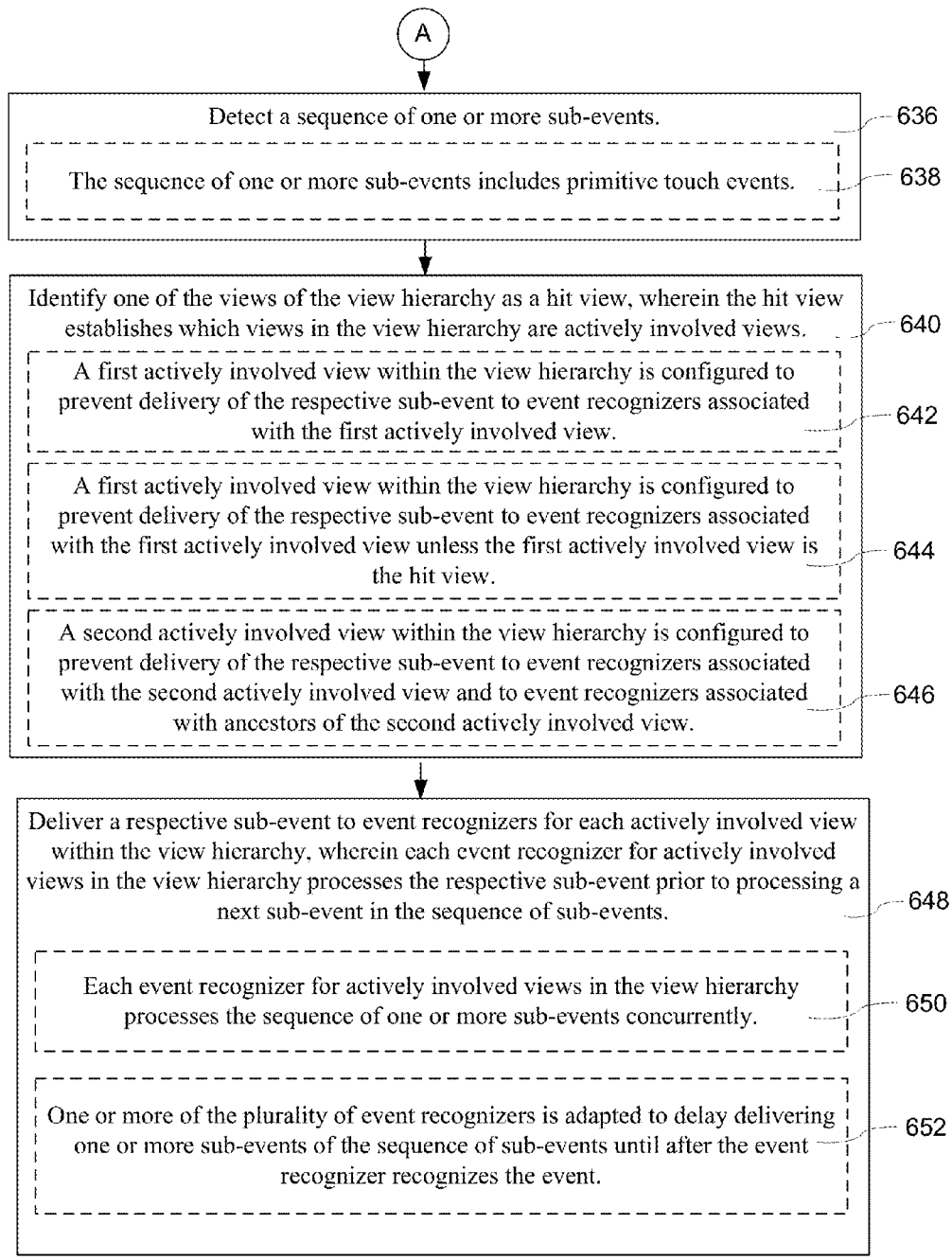
Figure 7A:
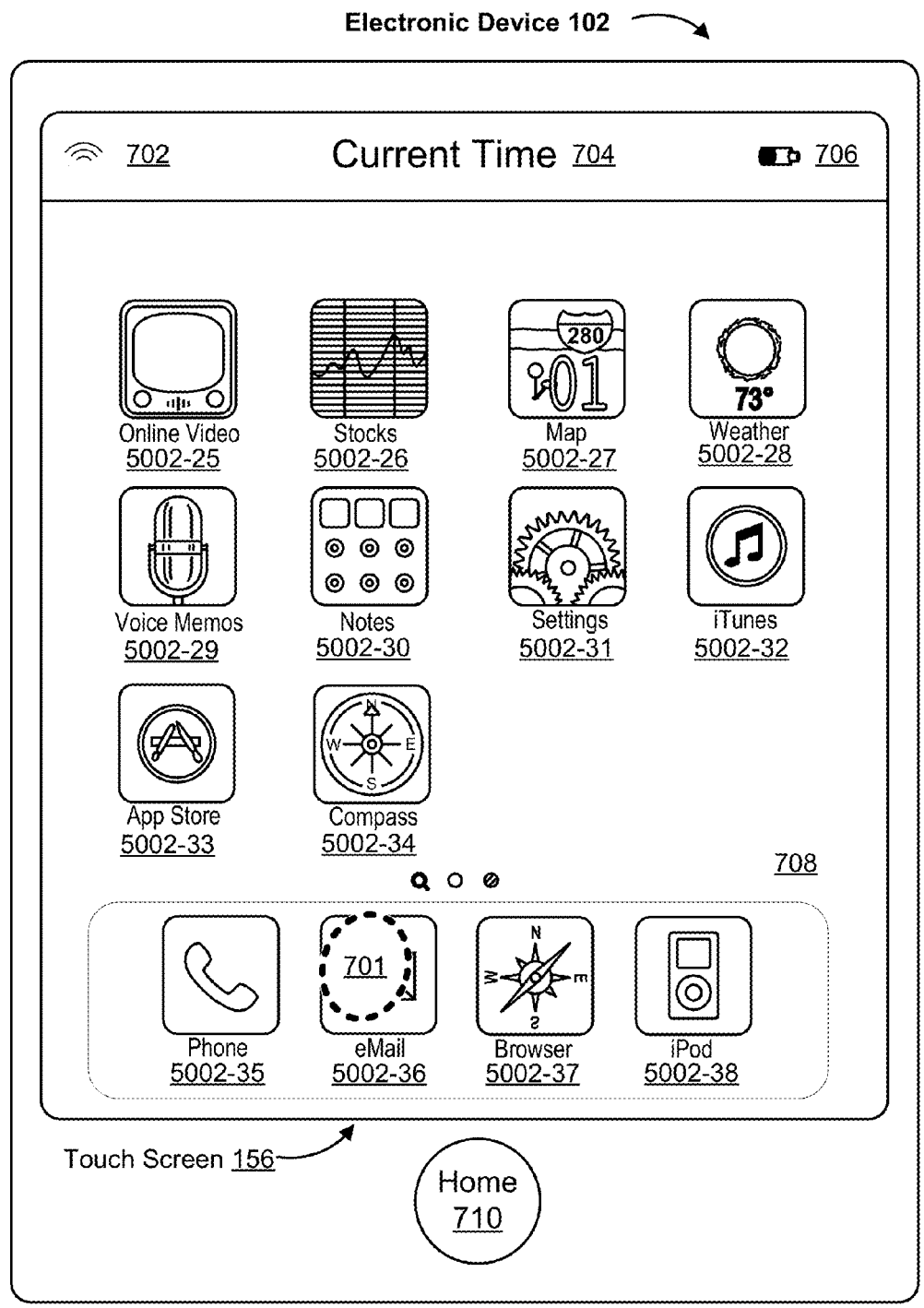
FIGS. 7A-7S illustrate exemplary user interfaces and user inputs recognized by event recognizers for navigating through concurrently open applications in accordance with some embodiments.
Figure 9C:
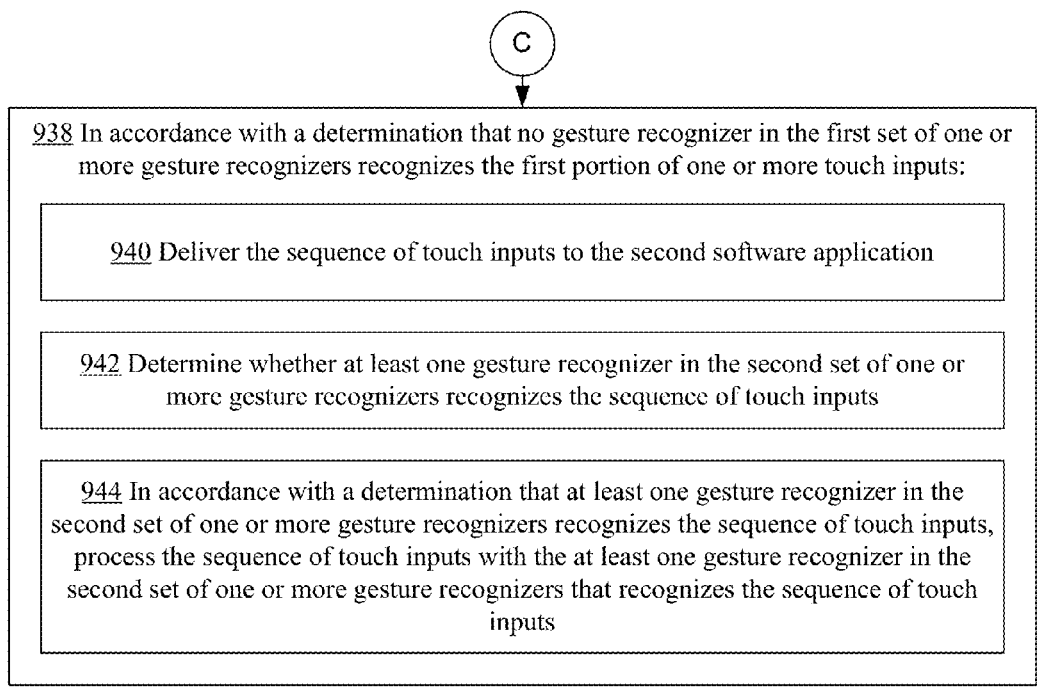

Below, FIGS. 1A-1C and 2 provide a description of exemplary devices. FIGS. 3A-3F describe components for event handling and the operation (e.g., flow of event information) of such components. FIGS. 4A-4C and 5A-5C describe operations of event recognizers in more detail. FIGS. 6A-6B are flow diagrams illustrating event recognition methods. FIGS. 7A-7S are exemplary user interfaces illustrating operations using event recognition methods in FIGS. 8A-8B, 9A-9C, and 10. FIGS. 8A-8B are flow diagrams illustrating an event recognition method of processing the event information with a gesture handler of a hidden open application. FIGS. 9A-9C are flow diagrams illustrating an event recognition method of conditionally processing the event information with a gesture recognizer of a hidden open application or a displayed application. FIG. 10 is a flow diagram illustrating an event recognition method of selecting an event definition of a plurality of event definitions for a single event recognizer.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "event" refers to an input detected by one or more sensors of the device. In particular, the term "event" includes a touch on a touch-sensitive surface. An event comprises one or more sub-events. Sub-events typically refer to changes to an event (e.g., a touch-down, touch-move, and lift-off of the touch can be sub-events). Sub-events in the sequence of one or more sub-events can include many forms, including without limitation, key presses, key press holds, key press releases, button presses, button press holds, button press releases, joystick movements, mouse movements, mouse button presses, mouse button releases, pen stylus touches, pen stylus movements, pen stylus releases, oral instructions, detected eye movements, biometric inputs, and detected physiological changes in a user, among others. Since an event may comprise a single sub-event (e.g., a short lateral motion of the device), the term "sub-event" as used herein also refers to an event.

As used herein, the terms "event recognizer" and "gesture recognizer" are used interchangeably to refer to a recognizer that can recognize a gesture or other events (e.g., motion of the device). As used herein, the terms "event handler" and "gesture handler" are used interchangeably to refer to a handler that performs a predefined set of operations (e.g., updating data, updating object(s), and/or updating display) in response to recognition of an event/sub-event or a gesture.

As noted above, in some devices with a touch-sensitive surface as an input device, a first set of touch-based gestures (e.g., two or more of: tap, double tap, horizontal swipe, vertical swipe) are recognized as proper inputs in a particular context (e.g., in a particular mode of a first application), and other, different sets of touch-based gestures are recognized as proper inputs in other contexts (e.g., different applications and/or different modes or contexts within the first application). As a result, the software and logic required for recognizing and responding to touch-based gestures can become complex, and can require revision each time an application is updated or a new application is added to the computing device. Embodiments described herein address these problems by providing a comprehensive framework for handling events and/or gesture inputs.

In the embodiments described below, touch-based gestures are events. Upon recognition of a predefined event, e.g., an event that corresponds to a proper input in the current context of an application, information concerning the event is delivered to the application. Furthermore, each respective event is defined as a sequence of sub-events. In devices that have a multi-touch display device (often herein called "screens") or other multi-touch sensitive surface, and that accept multi-touch-based gestures, the sub-events that define a multi-touched based event may include multi-touch sub-events (requiring two or more fingers to be simultaneously in contact with the device's touch-sensitive surface). For example, in a device having a multi-touch sensitive display, a respective multi-touch sequence of sub-events may begin when a user's finger first touches the screen. Additional sub-events may occur when one or more additional fingers subsequently or concurrently touch the screen, and yet other sub-events may occur when all of the fingers touching the screen move across the screen. The sequence ends when the last of the user's fingers is lifted from the screen.

When using touch-based gestures to control an application running in a device having a touch-sensitive surface, touches have both temporal and spatial aspects. The temporal aspect, called a phase, indicates when a touch has just begun, whether it is moving or stationary, and when it ends—that is, when the finger is lifted from the screen. A spatial aspect of a touch is the set of views or user interface windows in which the touch occurs. The views or windows in which a touch is detected may correspond to programmatic levels within a programmatic or view hierarchy. For example, the lowest level view in which a touch is detected may be called the hit view, and the set of events that are recognized as proper inputs may be determined based, at least in part, on the hit view of the initial touch that begins a touch-based gesture. Alternatively, or additionally, events are recognized as proper inputs based, at least in part, on one or more software programs (i.e., software applications) in the programmatic hierarchy. For example, a five-finger pinch gesture is recognized as a proper input in an application launcher that has a five-finger pinch gesture recognizer, but not in a web browser application that does not have the five-finger pinch gesture recognizer.

Figure 1A:
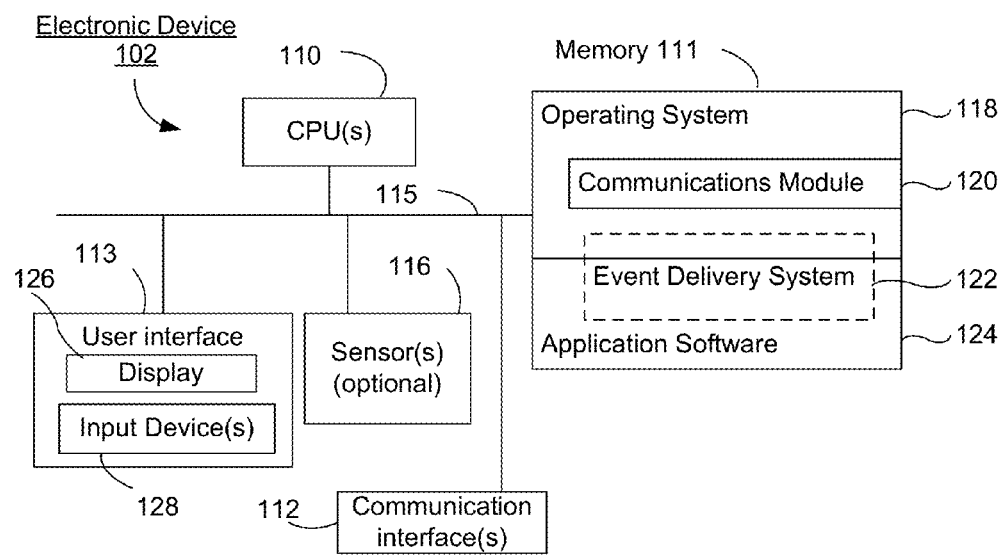
FIGS. 1A-1C are block diagrams illustrating electronic devices in accordance with some embodiments.
Figure 1B:
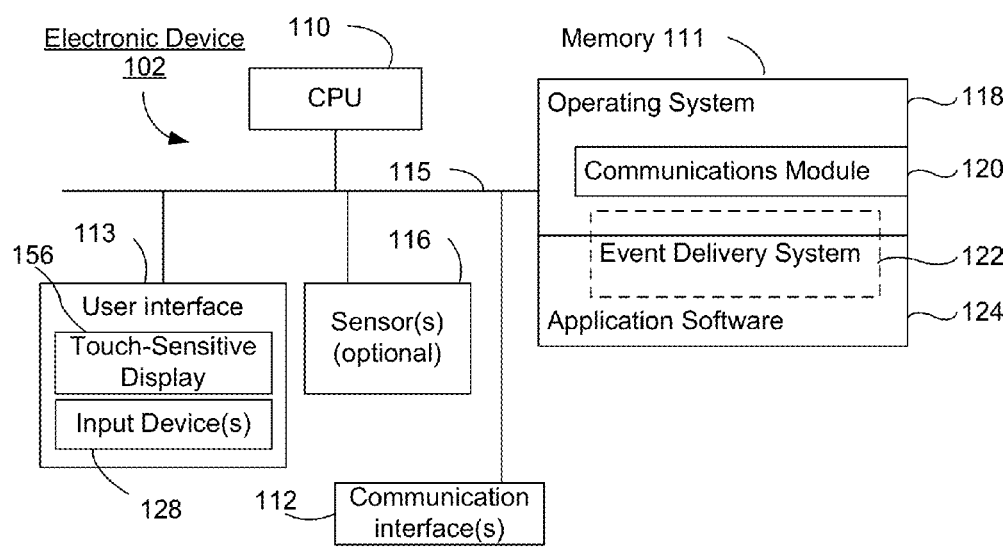
Figure 1C:
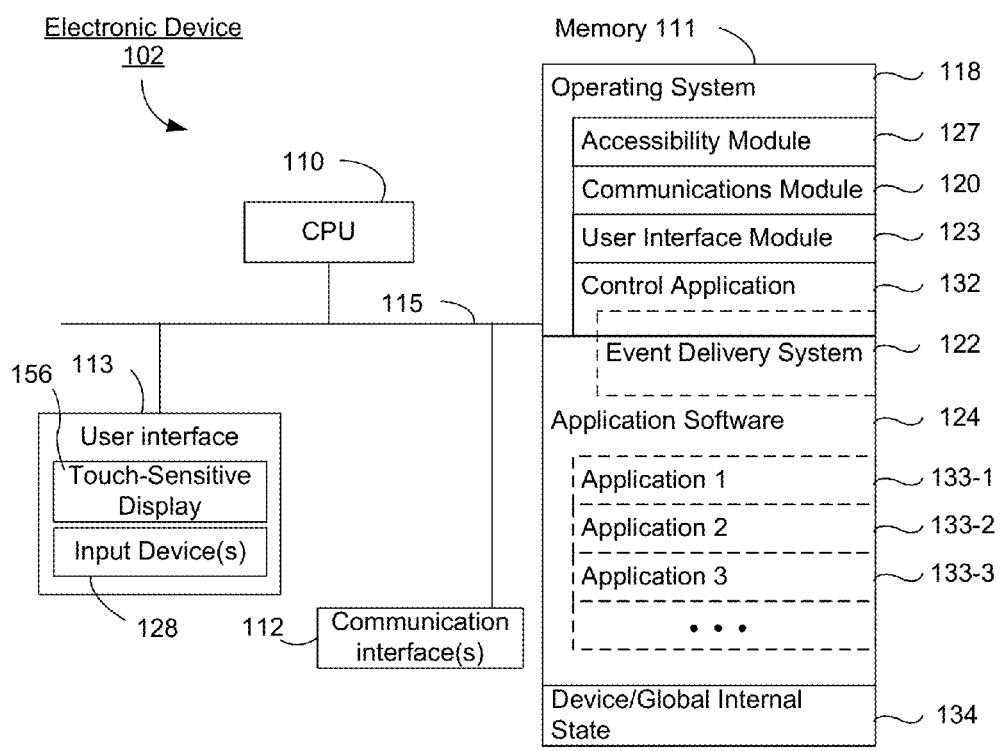

FIGS. 1A-1C are block diagrams illustrating different embodiments of electronic device 102, in accordance with some embodiments. Electronic device 102 may be any electronic device including, but not limited to, a desktop computer system, a laptop computer system, a mobile phone, a smart phone, a personal digital assistant, or a navigation system. Electronic device 102 may also be a portable electronic device with a touch screen display (e.g., touch-sensitive display 156, FIG. 1B) configured to present a user interface, a computer with a touch screen display configured to present a user interface, a computer with a touch sensitive surface and a display configured to present a user interface, or any other form of computing device, including without limitation, consumer electronic devices, mobile telephones, video game systems, electronic music players, tablet PCs, electronic book reading systems, e-books, PDAs, electronic organizers, email devices, laptops or other computers, kiosk computers, vending machines, smart appliances, etc. Electronic device 102 includes user interface 113.

In some embodiments, electronic device 102 includes a touch-sensitive display 156 (FIG. 1B). In these embodiments, user interface 113 may include an on-screen keyboard (not depicted) that is used by a user to interact with electronic device 102. In some embodiments, electronic device 102 also includes one or more input devices 128 (e.g., keyboard, mouse, trackball, microphone, physical button(s), touchpad, etc.). In some embodiments, touch-sensitive display 156 has the ability to detect two or more distinct, concurrent (or partially concurrent) touches, and in these embodiments, display 156 is sometimes herein called a multitouch display or multitouch-sensitive display. In some embodiments, a keyboard of the one or more input devices 128 may be separate and distinct from electronic device 102. For example, a keyboard may be a wired or wireless keyboard coupled to electronic device 102.

In some embodiments, electronic device 102 includes display 126 and one or more input devices 128 (e.g., keyboard, mouse, trackball, microphone, physical button(s), touchpad, trackpad, etc.) that are coupled to electronic device 102. In these embodiments, one or more of input devices 128 may optionally be separate and distinct from electronic device 102. For example, the one or more input devices may include one or more of: a keyboard, a mouse, a trackpad, a trackball, and an electronic pen, any of which may optionally be separate from the electronic device. Optionally, device 102 may include one or more sensors 116, such as one or more accelerometers, gyroscopes, GPS systems, speakers, infrared (IR) sensors, biometric sensors, cameras, etc. It is noted that the description above of various exemplary devices as input devices 128 or as sensors 116 is of no significance to the operation of the embodiments described herein, and that any input or sensor device described herein as an input device may equally well be described as a sensor, and vice versa. In some embodiments, signals produced by one or more sensors 116 are used as input sources for detecting events.

In some embodiments, electronic device 102 includes touch-sensitive display 156 (i.e., a display having a touch-sensitive surface) and one or more input devices 128 that are coupled to electronic device 102 (FIG. 1B). In some embodiments, touch-sensitive display 156 has the ability to detect two or more distinct, concurrent (or partially concurrent) touches, and in these embodiments, display 156 is sometimes herein called a multitouch display or multitouch-sensitive display.

In some embodiments of electronic device 102 discussed herein, input devices 128 are disposed in electronic device 102. In other embodiments, one or more of input devices 128 is separate and distinct from electronic device 102. For example, one or more of input devices 128 may be coupled to electronic device 102 by a cable (e.g., USB cable) or wireless connection (e.g., Bluetooth connection).

When using input devices 128, or when performing a touch-based gesture on touch-sensitive display 156 of electronic device 102, the user generates a sequence of sub-events that are processed by one or more CPUs 110 of electronic device 102. In some embodiments, one or more CPUs 110 of the electronic device 102 process the sequence of sub-events to recognize events.

Electronic device 102 typically includes one or more single- or multi-core processing units ("CPU" or "CPUs") 110 as well as one or more network or other communications interfaces 112. Electronic device 102 includes memory 111 and one or more communication buses 115 for interconnecting these components. Communication buses 115 may include circuitry (sometimes called a chipset) that interconnects and controls communications between system components (not depicted herein). As discussed above, electronic device 102 includes user interfaces 113 including a display (e.g., display 126 or touch-sensitive display 156). Further, electronic device 102 typically includes input devices 128 (e.g., keyboard, mouse, touch sensitive surfaces, keypads, etc.). In some embodiments, the input devices 128 include an on-screen input device (e.g., a touch-sensitive surface of a display device). Memory 111 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 111 may optionally include one or more storage devices remotely located from the CPU(s) 110. Memory 111, or alternately the non-volatile memory device(s) within memory 111, comprise a computer readable storage medium. In some embodiments, memory 111, or the non-volatile memory device(s) within memory 111, comprises a non-transitory computer readable storage medium. In some embodiments, memory 111 (of electronic device 102) or the computer readable storage medium of memory 111 stores the following programs, modules and data structures, or a subset thereof:

- operating system 118, which includes procedures for handling various basic system services and for performing hardware dependent tasks;
- accessibility module 127 (FIG. 1C), which is used for modifying behavior of one or more software applications in application software 124 or modifying data from touch-sensitive display 156 or input device(s) 128 to improve accessibility of the one or more software applications in application software 124 or accessibility to content (e.g., a web page) displayed therein (e.g., for people with impaired vision or limited motion capabilities);

communication module 120, which is used for connecting electronic device 102 to other devices via one or more respective communication interfaces 112 (wired or wireless) and one or more communication networks, such as the Internet, other wide area networks, local area networks, metropolitan area networks, and so on;

user interface module 123 (FIG. 1C), which is used for displaying user interfaces including user interface objects on display 126 or touch-sensitive display 156;

control application 132 (FIG. 1C), which is used for controlling processes (e.g., hit view determination, thread management, and/or event monitoring, etc.); in some embodiments, control application 132 includes a run-time application; in other embodiments, the run-time application includes control application 132;

event delivery system 122, which may be implemented in various alternate embodiments within operating system 118 or in application software 124; in some embodiments, however, some aspects of event delivery system 122 may be implemented in operating system 118 while other aspects are implemented in application software 124;

application software 124, which includes one or more software applications (e.g., applications 133-1, 133-2, and 133-3 in FIG. 1C, each of which can be one of: an email application, a web browser application, a notes application, a text messaging application, etc.); a respective software application typically has, at least during execution, an application state, indicating the state of the respective software application and its components (e.g., gesture recognizers); see application internal state 321 (FIG. 3D) described below; and device/global internal state 134 (FIG. 1C), which includes one or more of: application state, indicating the state of software applications and their components (e.g., gesture recognizers and delegates); display state, indicating what applications, views or other information occupy various regions of touch-sensitive display 156 or display 126; sensor state, including information obtained from the device's various sensors 116, input devices 128, and/or touch-sensitive display 156; location information concerning the device's location and/or attitude; and other states.

As used in the specification and claims, the term "open application" refers to a software application with retained state information (e.g., as part of device/global internal state 134 and/or application internal state 321 (FIG. 3D)). An open application is any one of the following types of applications:

an active application, which is currently displayed on display 126 or touch-sensitive display 156 (or a corresponding application view is currently displayed on the display);

a background application (or background process), which is not currently displayed on display 126 or touch-sensitive display 156, but one or more application processes (e.g., instructions) for the corresponding application are being processed by one or more processors 110 (i.e., running);

a suspended application, which is not currently running, and the application is stored in a volatile memory (e.g., DRAM, SRAM, DDR RAM, or other volatile random access solid state memory device of memory 111); and a hibernated application, which is not running, and the application is stored in a non-volatile memory (e.g., one or more magnetic disk storage devices, optical disk storage devices, flash memory devices, or other non-volatile solid state storage devices of memory 111).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

Each of the above identified elements may be stored in one or more of the previously mentioned memory devices. Each of the above identified module, application or system elements corresponds to a set of instructions for performing functions described herein. The set of instructions can be executed by one or more processors (e.g., one or more CPUs 110). The above identified modules or programs (i.e., sets of instructions) need not be implemented as separate software programs, procedures or modules, and thus various subsets of these modules may be combined or otherwise rearranged in various embodiments. In some embodiments, memory 111 may store a subset of the modules and data structures identified above. Furthermore, memory 111 may store additional modules and data structures not described above.

Figure 2:
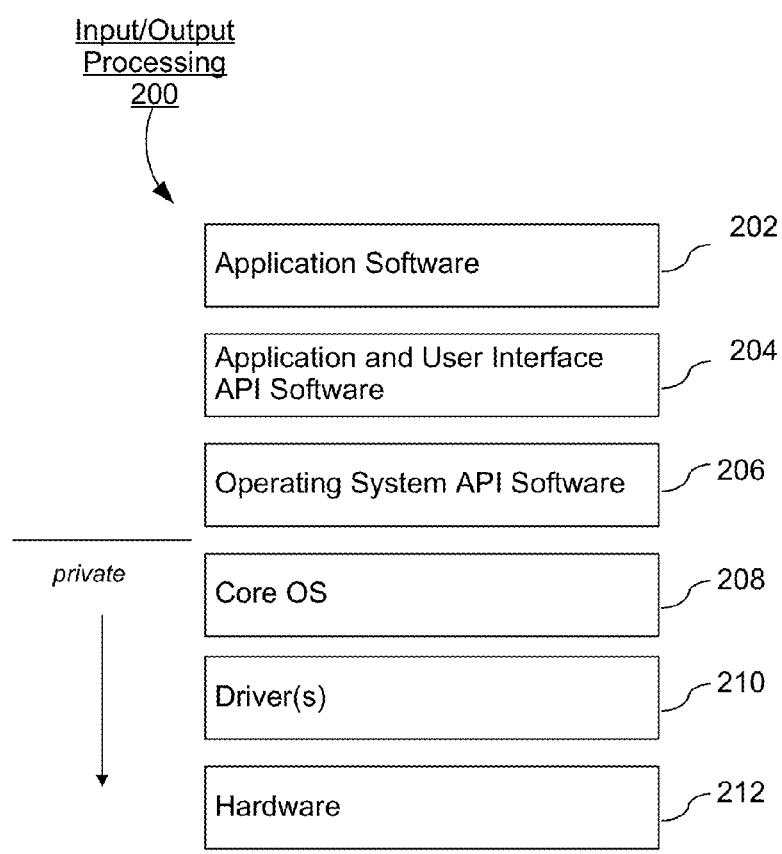
FIG. 2 is a diagram of an input/output processing stack of an exemplary electronic device in accordance with some embodiments.

FIG. 2 is a diagram of input/output processing stack 200 of an exemplary electronic device or apparatus (e.g., device 102) according to some embodiments of the invention. Hardware (e.g., electronic circuitry) 212 of the device is at the base level of the input/output processing stack 200. Hardware 212 can include various hardware interface components, such as the components depicted in FIGS. 1A and/or 1B. Hardware 212 can also include one or more of above mentioned sensors 116. At least some of the other elements (202-210) of input/output processing stack 200 are software procedures, or portions of software procedures, that process inputs received from hardware 212 and generate various outputs that are presented through a hardware user interface (e.g., one or more of a display, speakers, device vibration actuator, etc.).

A driver or a set of drivers 210 communicates with hardware 212. Drivers 210 can receive and process input data received from hardware 212. Core Operating System ("OS") 208 can communicate with driver(s) 210. Core OS 208 can process raw input data received from driver(s) 210. In some embodiments, drivers 210 can be considered to be a part of core OS 208.

A set of OS application programming interfaces ("OS APIs") 206, are software procedures that communicate with core OS 208. In some embodiments, APIs 206 are included in the device's operating system, but at a level above core OS 208. APIs 206 are designed for use by applications running on the electronic devices or apparatuses discussed herein. User interface (UI) APIs 204 can utilize OS APIs

206. Application software ("applications") 202 running on the device can utilize UI APIs 204 in order to communicate with the user. UI APIs 204 can, in turn, communicate with lower level elements, ultimately communicating with various user interface hardware, e.g., multitouch display 156. In some embodiments, application software 202 includes applications in application software 124 (FIG. 1A).

While each layer input/output processing stack 200 can utilize the layer underneath it, that is not always required. For example, in some embodiments, applications 202 may directly communicate with OS APIs 206. In general, layers at or above OS API layer 206 may not directly access Core OS 208, driver(s) 210, or hardware 212, as these layers are considered private. Applications in layer 202 and UI API 204 usually direct calls to the OS API 206, which in turn, accesses the layers Core OS 208, driver(s) 210, and hardware 212.

Stated in another way, one or more hardware elements 212 of electronic device 102, and software running on the device detect input events (which may correspond to sub-events in a gesture) at one or more of the input device(s) 128 and/or a touch-sensitive display 156 and generate or update various data structures (stored in memory 111 of device 102) used by a set of currently active event recognizers to determine whether and when the input events correspond to an event to be delivered to application 124. Embodiments of event recognition methodologies, apparatus and computer program products are described in more detail below.

Figure 3A:
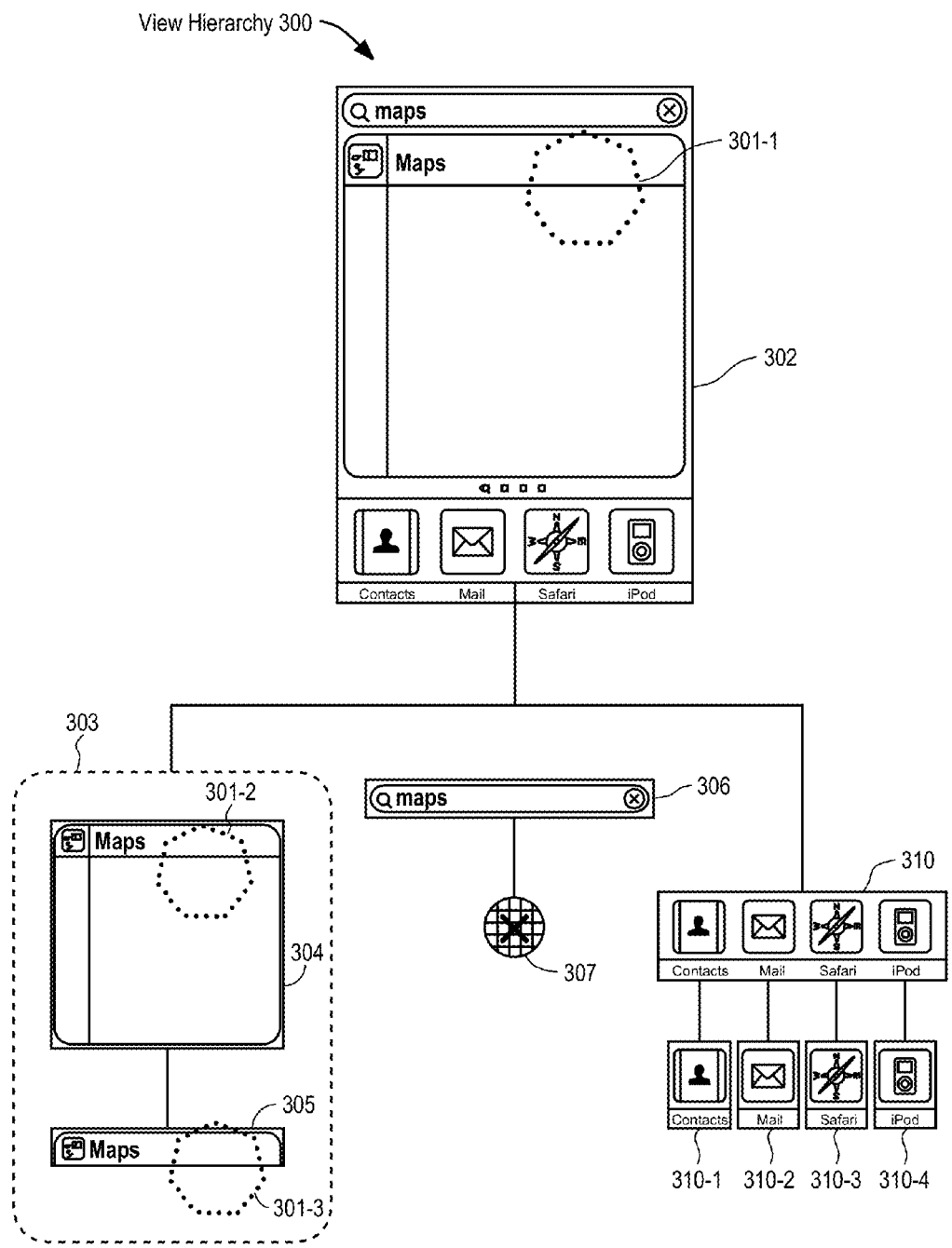
FIG. 3A illustrates an exemplary view hierarchy in accordance with some embodiments.

FIG. 3A depicts an exemplary view hierarchy 300, which in this example is a search program displayed in outermost view 302. Outermost view 302 generally encompasses the entire user interface a user may directly interact with, and includes subordinate views, e.g., search results panel 304, which groups search results and can be scrolled vertically;
search field 306, which accepts text inputs; and
a home row 310, which groups applications for quick access.

In this example, each subordinate view includes lower-level subordinate views. In other examples, the number of view levels in the hierarchy 300 may differ in different branches of the hierarchy, with one or more subordinate views having lower-level subordinate views, and one or more other subordinate views not have any such lower-level subordinate views. Continuing with the example shown in FIG. 3A, search results panel 304 contains separate subordinate views 305 (subordinate to panel 304) for each search result. Here, this example shows one search result in a subordinate view called the maps view 305. Search field 306 includes a subordinate view herein called clear contents icon view 307, which clears the contents of the search field when a user performs a particular action (e.g., a single touch or tap gesture) on the clear contents icon in view 307. Home row 310 includes subordinate views 310-1, 310-2, 310-3, and 310-4, which respectively correspond to a contacts application, an email application, a web browser, and an iPod music interface.

A touch sub-event 301-1 is represented in outermost view 302. Given the location of touch sub-event 301-1 over both the search results panel 304, and maps view 305, the touch sub-event is also represented over those views as 301-2 and 301-3, respectively. Actively involved views of the touch sub-event include the views search results panel 304, maps view 305 and outermost view 302. Additional information regarding sub-event delivery and actively involved views is provided below with reference to FIGS. 3B and 3C.

Views (and corresponding programmatic levels) can be nested. In other words, a view can include other views. Consequently, the software element(s) (e.g., event recognizers) associated with a first view can include or be linked to one or more software elements associated with views within the first view. While some views can be associated with applications, others can be associated with high level OS elements, such as graphical user interfaces, window managers, etc. In some embodiments, some views are associated with other OS elements. In some embodiments, the view hierarchy includes views from a plurality of software applications. For example, the view hierarchy may include a view from an application launcher (e.g., a home screen) and a view from a web browser application (e.g., a view including content of a web page).

A programmatic hierarchy includes one or more software elements or software applications in a hierarchy. To simplify subsequent discussion, reference will generally be made only to views and the view hierarchy, but it must be understood that in some embodiments, the method may operate with a programmatic hierarchy with a plurality of programmatic layers, and/or a view hierarchy.

Figure 3B:
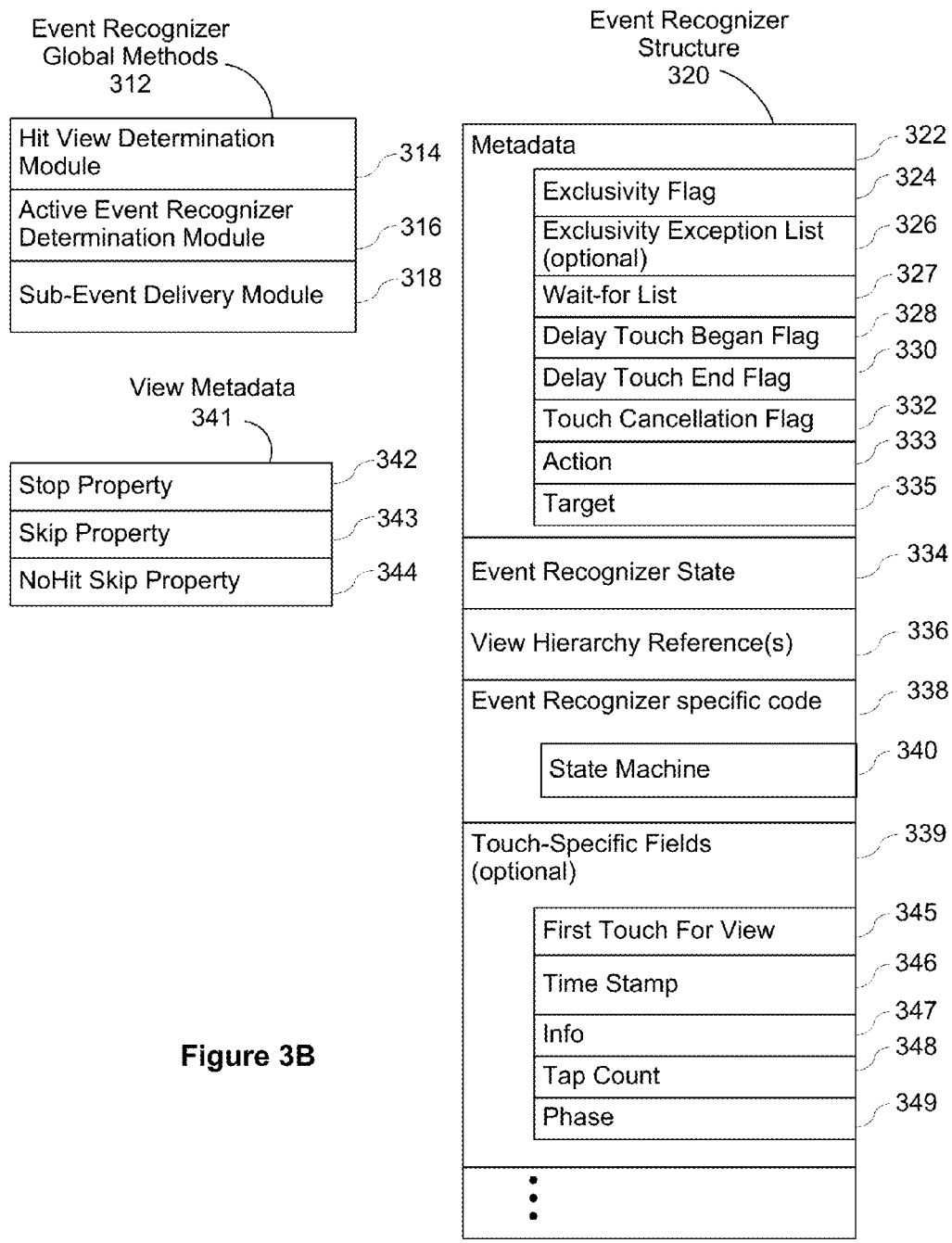
FIGS. 3B and 3C are block diagrams illustrating exemplary event recognizer methods and data structures in accordance with some embodiments.
Figure 3C:
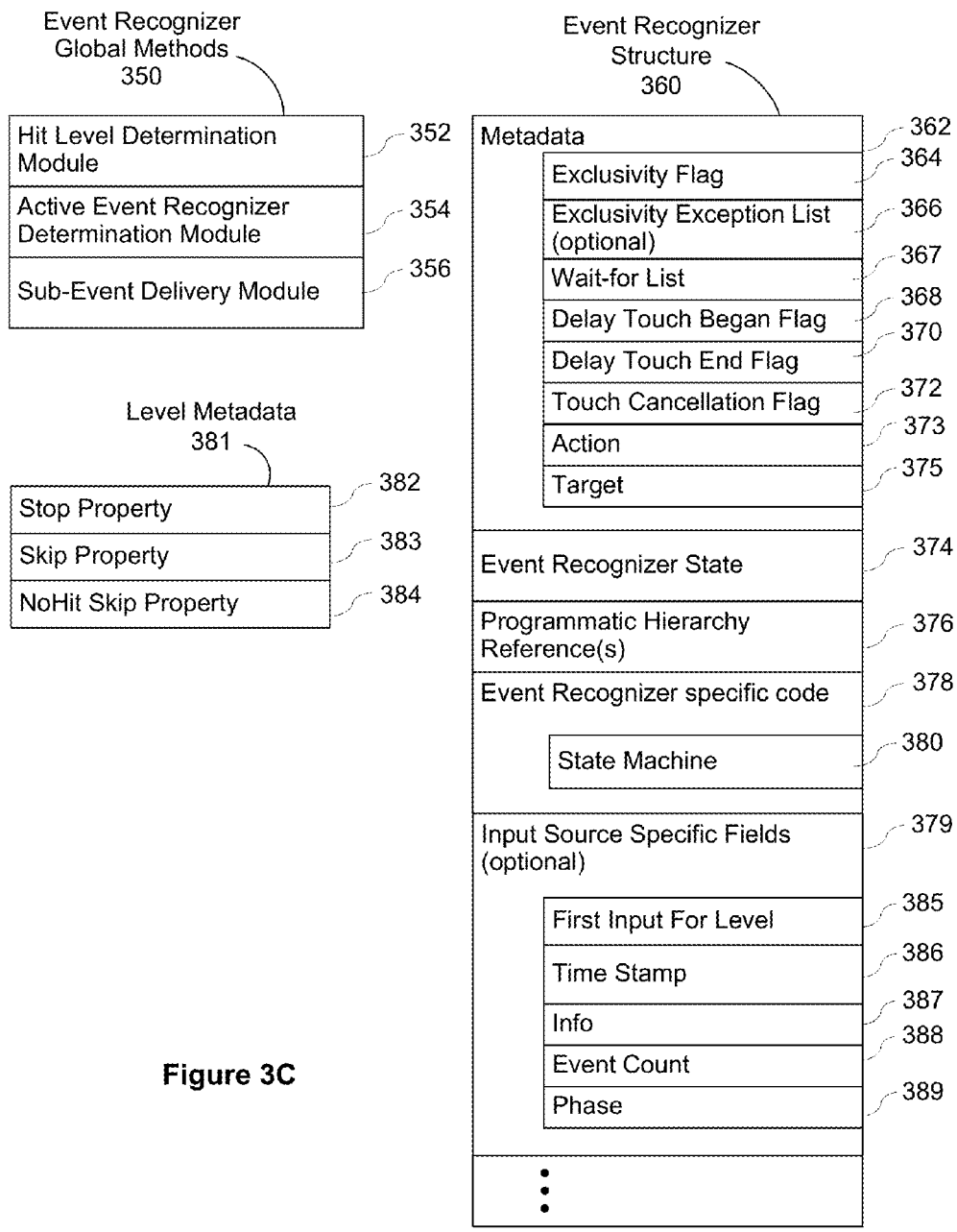

FIGS. 3B and 3C depict exemplary methods and structures related to event recognizers. FIG. 3B depicts methods and data structures for event handling when event handlers are associated with particular views within a hierarchy of views. FIG. 3C depicts methods and data structures for event handling when event handlers are associated with particular levels within a hierarchy of programmatic levels. Event recognizer global methods 312 and 350 include hit view and hit level determination modules 314 and 352, respectively, active event recognizer determination modules 316 and 354, and sub-event delivery modules 318 and 356.

In some embodiments, electronic device 102 includes one or more of: event recognizer global methods 312 and 350. In some embodiments, electronic device 102 includes one or more of: hit view determination module 314 and hit level determination module 352. In some embodiments, electronic device 102 includes one or more of: active event recognizer determination modules 316 and 354. In some embodiments, electronic device 102 includes one or more of: sub-event delivery modules 318 and 356. In some embodiments, one or more of these methods and modules are included in fewer or more methods and modules. For example, in some embodiments, electronic device 102 includes a hit view/level determination module which includes the functionality of hit view determination module 314 and hit level determination module 352. In some embodiments, electronic device 102 includes an active event recognizer determination module which includes the functionality of active event recognizer determination modules 316 and 354.

Hit view and hit level determination modules, 314 and 352, respectively, provide software procedures for determining where a sub-event has taken place within one or more views (e.g., the exemplary view hierarchy 300 depicted in FIG. 3A, which has three main branches) and/or one or more software elements in the programmatic hierarchy that correspond to the sub-event (e.g., one or more of applications 133 in FIG. 1C).

The hit view determination module 314 of FIG. 3B, receives information related to a sub-event, e.g., a user touch represented as 301-1 on the outermost view 302, on a search result (maps view 305) and the search results panel view 304. The hit view determination module 314 identifies a hit-view as the lowest view in the hierarchy which should handle the sub-event. In most circumstances, the hit view is the lowest level view in which an initiating sub-event (i.e., the first sub-event in the sequence of sub-events that form an event or potential event) occurs. In some embodiments, once the hit-view is identified, it will receive all sub-events related to the same touch or input source for which the hit view was identified. In some embodiments, one or more other views (e.g., a default or predefined view) receive at least some of the sub-events that the hit view receives.

In some embodiments, the hit level determination module 352 of FIG. 3C may utilize an analogous process. For example, in some embodiments, the hit level determination module 352 identifies a hit level as the lowest level in the programmatic hierarchy (or a software application in the lowest programmatic level in the programmatic hierarchy) which should handle the sub-event. In some embodiments, once the hit level is identified, it or a software application in the hit level will receive all sub-events related to the same touch or input source for which the hit level was identified. In some embodiments, one or more other levels or software applications (e.g., a default or predefined software application) receive at least some of the sub-events that the hit view receives.

Active event recognizer determination modules 316 and 354 of event recognizer global methods 312 and 350, respectively, determine which view or views within a view hierarchy and/or a programmatic hierarchy should receive a particular sequence of sub-events. FIG. 3A depicts an exemplary set of active views, 302, 304 and 305, that receive the sub-event 301. In the example of FIG. 3A, the active event recognizer determination module 316 would determine that the outermost view 302, search results panel 304 and maps view 305 are actively involved views because these views include the physical location of the touch represented by sub-event 301. It is noted that even if touch sub-event 301 were entirely confined to the area associated with maps view 305, search results panel 304 and outermost view 302 would still remain in the actively involved views since the search results panel 304 and outermost view 302 are ancestors of maps view 305.

In some embodiments, active event recognizer determination modules 316 and 354 utilize analogous processes. In the example of FIG. 3A, the active event recognizer determination module 350 would determine that the map application is actively involved because the views of the map application are displayed and/or the views of the map application include the physical location of the touch represented by sub-event 301. It is noted that even if touch sub-event 301 were entirely confined to the area associated with the map application, other applications in the programmatic hierarchy may still remain as actively involved applications (or applications in the actively involved programmatic levels).

Sub-event delivery module 318 delivers sub-events to event recognizers for actively involved views. Using the example of FIG. 3A, a user's touch is represented in different views of the hierarchy by touch marks 301-1, 301-2, and 301-3. In some embodiments, sub-event data representing this user's touch is delivered by the sub-event delivery module 318 to event recognizers at the actively involved views, i.e., top level view 302, search results panel 304 and maps view 305. Further, the event recognizers of a view can receive subsequent sub-events of an event that starts within the view (e.g., when an initial sub-event occurs within the view). Stated in another way, a view can receive sub-events associated with user interactions beginning in the view, even if it continues outside of the view.

In some embodiments, sub-event delivery module 356 delivers sub-events to event recognizers for actively involved programmatic levels in a process analogous to that used by sub-event delivery module 318. For example, sub-event delivery module 356 delivers sub-events to event recognizers for actively involved applications. Using the example of FIG. 3A, a user's touch 301 is delivered by sub-event delivery module 356 to event recognizers at the actively involved views (e.g., the map application and any other actively involved applications in the programmatic hierarchy). In some embodiments, a default or predefined software application is included in the programmatic hierarchy by default.

In some embodiments, a separate event recognizer structure 320 or 360 is generated and stored in memory of the device for each actively involved event recognizer. Event recognizer structures 320 and 360 typically include an event recognizer state 334, 374, respectively (discussed in greater detail below when referring to FIGS. 4A and 4B), and event recognizer specific code 338, 378, respectively, having state machines 340, 380, respectively. Event recognizer structure 320 also includes a view hierarchy reference 336, while event recognizer structure 360 includes a programmatic hierarchy reference 376. Each instance of a particular event recognizer references exactly one view or programmatic level. View hierarchy reference 336 or programmatic hierarchy reference 376 (for a particular event recognizer) is used to establish which view or programmatic level is logically coupled to the respective event recognizer.

View metadata 341 and level metadata 381 may include data regarding a view or level, respectively. View or level metadata may include at least the following properties that may influence sub-event delivery to event recognizers:

A stop property 342, 382, which, when set for a view or programmatic level prevents sub-event delivery to event recognizers associated with the view or programmatic level as well as its ancestors in the view or programmatic hierarchy.

A skip property 343, 383, which, when set for a view or programmatic level prevents sub-event delivery to event recognizers associated with that view or programmatic level, but permits sub-event delivery to its ancestors in the view or programmatic hierarchy.

A NoHit skip property 344, 384, which, when set for a view, prevents delivery of sub-events to event recognizers associated with the view unless the view is the hit view. As discussed above, the hit view determination module 314 identifies a hit-view (or hit level in the case of hit level determination module 352) as the lowest view in the hierarchy which should handle the sub-event.

Event recognizer structures 320 and 360 may include metadata 322, 362, respectively. In some embodiments, the metadata 322, 362 includes configurable properties, flags, and lists that indicate how the event delivery system should perform sub-event delivery to actively involved event recognizers. In some embodiments, metadata 322, 362 may include configurable properties, flags, and lists that indicate how event recognizers may interact with one another. In some embodiments, metadata 322, 362 may include configurable properties, flags, and lists that indicate whether sub-events are delivered to varying levels in the view or programmatic hierarchy. In some embodiments, the combination of event recognizer metadata 322, 362 and view or level metadata (341, 381, respectively) are both be used to configure the event delivery system to: a) perform sub-event delivery to actively involved event recognizers, b) indicate how event recognizers may interact with one another, and c) indicate whether and when sub-events are delivered to various levels in the view or programmatic hierarchy.

It is noted that, in some embodiments, a respective event recognizer sends an event recognition action 333, 373 to its respective target 335, 375, as specified by fields of the event recognizer's structure 320, 360. Sending an action to a target is distinct from sending (and deferred sending) sub-events to a respective hit view or level.

The metadata properties stored in a respective event recognizer structure 320, 360 of a corresponding event recognizer includes one or more of:

An exclusivity flag 324, 364, which, when set for an event recognizer, indicates that upon recognition of an event by the event recognizer, the event delivery system should stop delivering sub-events to any other event recognizers of the actively involved views or programmatic levels (with the exception of any other event recognizers listed in an exception list 326, 366). When receipt of a sub-event causes a particular event recognizer to enter the exclusive state, as indicated by its corresponding exclusivity flag 324 or 364, then subsequent sub-events are delivered only to the event recognizer in the exclusive state (as well as any other event recognizers listed in an exception list 326, 366).

Some event recognizer structures 320, 360, may include an exclusivity exception list 326, 366. When included in the event recognizer structure 320, 360 for a respective event recognizer, this list 326, 366 indicates the set of event recognizers, if any, that are to continue receiving sub-events even after the respective event recognizer has entered the exclusive state. For example, if the event recognizer for a single tap event enters the exclusive state, and the currently involved views include an event recognizer for a double tap event, then the list 320, 360 would list the double tap event recognizer so that a double tap event can be recognized even after a single tap event has been detected. Accordingly, the exclusivity exception list 326, 366 permits event recognizers to recognize different events that share common sequences of sub-events, e.g., a single tap event recognition does not preclude subsequent recognition of a double or triple tap event by other event recognizers.

Some event recognizer structures 320, 360, may include a wait-for list 327, 367.

When included in the event recognizer structure 320, 360 for a respective event recognizer, this list 327, 367 indicates the set of event recognizers, if any, that must enter the event impossible or event canceled state before the respective event recognizer can recognize a respective event. In effect, the listed event recognizers have higher priority for recognizing an event than the event recognizer with the wait-for list 327, 367.

A delay touch began flag 328, 368, which, when set for an event recognizer, causes the event recognizer to delay sending sub-events (including a touch begin or finger down sub-event, and subsequent events) to the event recognizer's respective hit view or level until after it has been determined that the sequence of sub-events does not correspond to this event recognizer's event type. This flag can be used to prevent the hit view or level from ever seeing any of the sub-events in the case where the gesture is recognized. When the event recognizer fails to recognize an event, the touch began sub-event (and sub-sequent touch end sub-event) can be delivered to the hit view or level. In one example, delivering such sub-events to the hit view or level causes the user interface to briefly highlight an object, without invoking the action associated with that object.

A delay touch end flag 330, 370, which, when set for an event recognizer, causes the event recognizer to delay sending a sub-event (e.g., a touch end sub-event) to the event recognizer's respective hit view or level until it has been determined that the sequence of sub-events does not correspond to this event recognizer's event type. This can be used to prevent the hit view or level from acting upon a touch end sub-event, in case the gesture is later recognized. As long as the touch end sub-event is not sent, a touch canceled can be sent to the hit view or level. If an event is recognized, the corresponding action by an application is preformed, and the touch end sub-event is delivered to the hit view or level.

A touch cancellation flag 332, 372, which, when set for an event recognizer, causes the event recognizer to send touch or input cancellation to the event recognizer's respective hit view or hit level when it has been determined that the sequence of sub-events does not correspond to this event recognizer's event type. The touch or input cancellation sent to the hit view or level indicates that a prior sub-event (e.g., a touch began sub-event) has been cancelled. The touch or input cancellation may cause the input source handler's state (see FIG. 4B) to enter the input sequence cancelled state 460 (discussed below).

In some embodiments, the exception list 326, 366 can also be used by non-exclusive event recognizers. In particular, when a non-exclusive event recognizer recognizes an event, subsequent sub-events are not delivered to the exclusive event recognizers associated with the currently active views, except for those exclusive event recognizers listed in the exception list 326, 366 of the event recognizer that recognized the event.

In some embodiments, event recognizers may be configured to utilize the touch cancellation flag in conjunction with the delay touch end flag to prevent unwanted sub-events from being delivered to the hit view. For example, the definition of a single tap gesture and the first half of a double tap gesture are identical. Once a single tap event recognizer successfully recognizes a single tap, an undesired action could take place. If the delay touch end flag is set, the single tap event recognizer is prevented from sending sub-events to the hit view until a single tap event is recognized. In addition, the wait-for list of the single tap event recognizer may identify the double-tap event recognizer, thereby preventing the single tap event recognizer from recognizing a single tap until the double-tap event recognizer has entered the event impossible state. The use of the wait-for list avoids the execution of actions associated with a single tap when a double tap gesture is performed. Instead, only actions associated with a double tap will be executed, in response to recognition of the double tap event.

Turning in particular to forms of user touches on touch-sensitive surfaces, as noted above, touches and user gestures may include an act that need not be instantaneous, e.g., a touch can include an act of moving or holding a finger against a display for a period of time. A touch data structure, however, defines the state of a touch (or, more generally, the state of any input source) at a particular time. Therefore, the values stored in a touch data structure may change over the course of a single touch, enabling the state of the single touch at different points in time to be conveyed to an application.

Each touch data structure can comprise various fields. In some embodiments, touch data structures may include data corresponding to at least the touch-specific fields 339 in FIG. 3B or input source specific fields 379 in FIG. 3C.

For example, a "first touch for view" field 345 in FIG. 3B (385 for "first touch for level" in FIG. 3C) can indicate whether the touch data structure defines the first touch for the particular view (since the software element implementing the view was instantiated). A "time stamp" field 346, 386 can indicate the particular time to which the touch data structure relates.

Optionally, an "info" field 347, 387 can be used to indicate if a touch is a rudimentary gesture. For example, the "info" field 347, 387 can indicate whether the touch is a swipe and, if so, in which direction the swipe is oriented. A swipe is a quick drag of one or more fingers in a straight direction. API implementations (discussed below) can determine if a touch is a swipe and pass that information to the application through the "info" field 347, 387, thus alleviating the application of some data processing that would have been necessary if the touch were a swipe.

Optionally, a "tap count" field 348 in FIG. 3B ("event count" field 388 in FIG. 3C) can indicate how many taps have been sequentially performed at the position of the initial touch. A tap can be defined as a quick pressing and lifting of a finger against a touch-sensitive panel at a particular position. Multiple sequential taps can occur if the finger is again pressed and released in quick succession at the same position of the panel. An event delivery system 122 can count taps and relay this information to an application through the "tap count" field 348. Multiple taps at the same location are sometimes considered to be a useful and easy to remember command for touch enabled interfaces. Thus, by counting taps, the event delivery system 122 can again alleviate some data processing from the application.

A "phase" field 349, 389 can indicate a particular phase the touch-based gesture is currently in. The phase field 349, 389 can have various values, such as "touch phase began" which can indicate that the touch data structure defines a new touch that has not been referenced by previous touch data structures. A "touch phase moved" value can indicate that the touch being defined has moved from a prior position. A "touch phase stationary" value can indicate that the touch has stayed in the same position. A "touch phase ended" value can indicate that the touch has ended (e.g., the user has lifted his/her finger from the surface of a multi touch display). A "touch phase cancelled" value can indicate that the touch has been cancelled by the device. A cancelled touch can be a touch that is not necessarily ended by a user, but which the device has determined to ignore. For example, the device can determine that the touch is being generated inadvertently (i.e., as a result of placing a portable multi touch enabled device in one's pocket) and ignore the touch for that reason. Each value of the "phase field" 349, 389 can be an integer number.

Thus, each touch data structure can define what is happening with a respective touch (or other input source) at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening in the view.

Figure 3D:
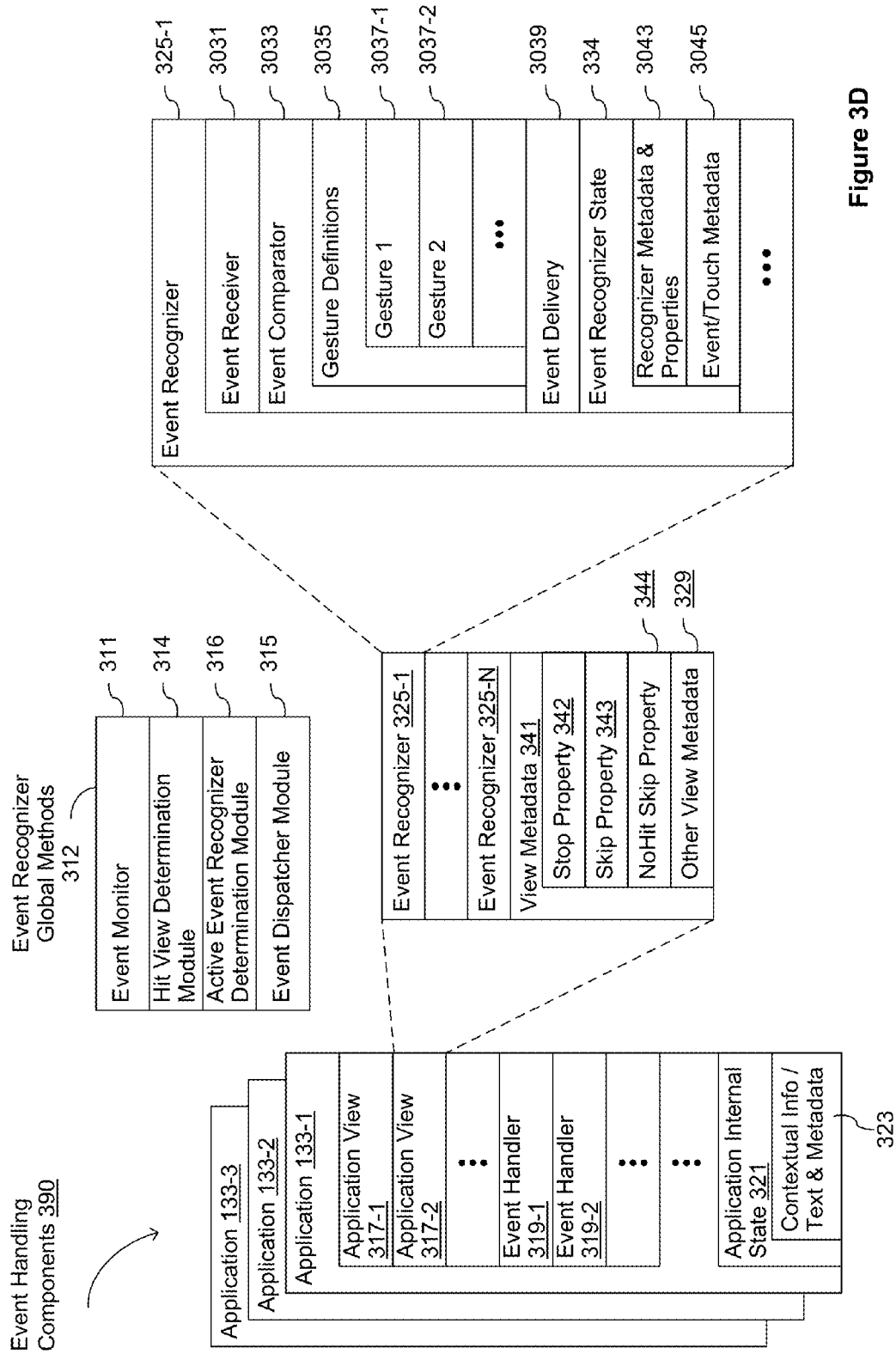
FIG. 3D is a block diagram illustrating exemplary components for event handling in accordance with some embodiments.

FIG. 3D is a block diagram illustrating exemplary components for event handling (e.g., event handling components 390) in accordance with some embodiments. In some embodiments, memory 111 (FIG. 1A) includes event recognizer global methods 312 and one or more applications (e.g., 133-1 through 133-3).

In some embodiments, event recognizer global methods 312 include event monitor 311, hit view determination module 314, active event recognizer determination module 316, and event dispatcher module 315. In some embodiments, event recognizer global methods 312 are located within event delivery system 122 (FIG. 1A). In some embodiments, event recognizer global methods 312 are implemented in operating system 118 (FIG. 1A). Alternatively, event recognizer global methods 312 are implemented in a respective application 133-1. In yet other embodiments, event recognizer global methods 312 are implemented as a stand-alone module, or a part of another module stored in memory 111 (e.g., a contact/motion module (not depicted)).

Event monitor 311 receives event information from one or more sensors 116, touch-sensitive display 156, and/or one or more input devices 128. Event information includes information about an event (e.g., a user touch on touch-sensitive display 156, as part of a multi-touch gesture or a motion of device 102) and/or a sub-event (e.g., a movement of a touch across touch-sensitive display 156). For example, event information for a touch event includes one or more of: a location and time stamp of a touch. Similarly, event information for a swipe event includes two or more of: a location, time stamp, direction, and speed of a swipe. Sensors 116, touch-sensitive display 156, and input devices 128 transmit information event and sub-event information to event monitor 311 either directly or through a peripherals interface, which retrieves and stores event information. Sensors 116 include one or more of: proximity sensor, accelerometer(s), gyroscopes, microphone, and video camera. In some embodiments, sensors 116 also include input devices 128 and/or touch-sensitive display 156.

In some embodiments, event monitor 311 sends requests to sensors 116 and/or the peripherals interface at predetermined intervals. In response, sensors 116 and/or the peripherals interface transmit event information. In other embodiments, sensors 116 and the peripheral interface transmit event information only when there is a significant event (e.g., receiving an input beyond a predetermined noise threshold and/or for more than a predetermined duration).

Event monitor 311 receives event information and relays the event information to event dispatcher module 315. In some embodiments, event monitor 311 determines one or more respective applications (e.g., 133-1) to which to deliver the event information. In some embodiments, event monitor 311 also determines one or more respective application views 317 of the one or more respective applications to which to deliver the event information.

In some embodiments, event recognizer global methods 312 also include a hit view determination module 314 and/or an active event recognizer determination module 316.

Hit view determination module 314, if present, provides software procedures for determining where an event or a sub-event has taken place within one or more views, when touch-sensitive display 156 displays more than one view. Views are made up of controls and other elements that a user can see on the display.

Another aspect of the user interface associated with a respective application (e.g., 133-1) is a set of views 317, sometimes herein called application views or user interface windows, in which information is displayed and touch-based gestures occur. The application views (of a respective application) in which a touch is detected may correspond to a particular view within a view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 314 receives information related to events and/or sub-events. When an application has multiple views organized in a hierarchy, hit view determination module 314 identifies a hit view as the lowest view in the hierarchy which should handle the event or sub-event. In most circumstances, the hit view is the lowest level view in which an initiating event or sub-event occurs (i.e., the first event or sub-event in the sequence of events and/or sub-events that form a gesture). Once the hit view is identified by the hit view determination module, the hit view typically receives all events and/or sub-events related to the same touch or input source for which it was identified as the hit view. However, the hit view is not always a sole view that receives all events and/or sub-events related to the same touch or input source for which it was identified as the hit view. Stated differently, in some embodiments, another application (e.g., 133-2) or another view of the same application also receives at least a subset of the events and/or sub-events related to the same touch or input source regardless of whether a hit view has been determined for the touch or input source.

Active event recognizer determination module 316 determines which view or views within a view hierarchy should receive a particular sequence of events and/or sub-events. In some application contexts, active event recognizer determination module 316 determines that only the hit view should receive a particular sequence of events and/or sub-events. In other application contexts, active event recognizer determination module 316 determines that all views that include the physical location of an event or sub-event are actively involved views, and therefore determines that all actively involved views should receive a particular sequence of events and/or sub-events. In other application contexts, even if touch events and/or sub-events are entirely confined to the area associated with one particular view, views higher in the hierarchy still remain as actively involved views and thus the views higher in the hierarchy should receive a particular sequence of events and/or sub-events. Additionally, or alternatively, active event recognizer determination module 316 determines which application(s) in a programmatic hierarchy should receive a particular sequence of events and/or sub-events. Thus, in some embodiments, active event recognizer determination module 316 determines that only a respective application in the programmatic hierarchy should receive a particular sequence of events and/or sub-events. In some embodiments, active event recognizer determination module 316 determines that a plurality of applications in the programmatic hierarchy should receive a particular sequence of events and/or sub-events.

Event dispatcher module 315 dispatches the event information to an event recognizer (also called herein "gesture recognizer") (e.g., event recognizer 325-1). In embodiments including active event recognizer determination module 316, event dispatcher module 315 delivers the event information to an event recognizer determined by active event recognizer determination module 316. In some embodiments, event dispatcher module 315 stores in an event queue the event information, which is retrieved by a respective event recognizer 325 (or event receiver 3031 in a respective event recognizer 325).

In some embodiments, a respective application (e.g., 133-1) includes application internal state 321, which indicates the current application view(s) displayed on touch-sensitive display 156 when the application is active or executing. In some embodiments, device/global internal state 134 (FIG. 1C) is used by event recognizer global methods 312 to determine which application(s) is(are) currently active, and application internal state 321 is used by event recognizer global methods 312 to determine application views 317 to which to deliver event information.

In some embodiments, application internal state 321 includes additional information, such as one or more of: resume information to be used when application 133-1 resumes execution, user interface state information that indicates information being displayed or that is ready for display by application 133-1, a state queue for enabling the user to go back to a prior state or view of application 133-1, and a redo/undo queue of previous actions taken by the user. In some embodiments, application internal state 321 further includes contextual information/text and metadata 323.

In some embodiments, application 133-1 includes one or more application views 317, each of which has corresponding instructions for handling touch events that occur within a respective view of the application's user interface (e.g., a corresponding event handler 319). At least one application view 317 of the application 133-1 includes one or more event recognizers 325. Typically, a respective application view 317 includes a plurality of event recognizers 325. In other embodiments, one or more of event recognizers 325 are part of a separate module, such as a user interface kit (not shown) or a higher level object from which application 133-1 inherits methods and other properties. In some embodiments, a respective application view 317 also includes one or more of: data updater, object updater, GUI updater, and/or event data received.

A respective application (e.g., 133-1) also includes one or more event handlers 319. Typically, a respective application (e.g., 133-1) includes a plurality of event handlers 319.

A respective event recognizer 325-1 receives event information from event dispatcher module 315 (directly or indirectly through application 133-1), and identifies an event from the event information. Event recognizer 325-1 includes event receiver 3031 and event comparator 3033.

The event information includes information about an event (e.g., a touch) or a sub-event (e.g., a touch movement). Depending on the event or sub-event, the event information also includes additional information, such as location of the event or sub-event. When the event or sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 3033 compares the event information to one or more predefined gesture definitions (also called herein "event definitions") and, based on the comparison, determines an event or sub-event, or determines or updates the state of an event or sub-event. In some embodiments, event comparator 3033 includes one or more gesture definitions 3035 (as described above, also called herein "event definitions"). Gesture definitions 3035 contain definitions of gestures (e.g., predefined sequences of events and/or sub-events), for example, gesture 1 (3037-1), gesture 2 (3037-2), and others. In some embodiments, sub-events in gesture definitions 3035 include, for example, touch begin, touch end, touch movement, touch cancellation, and multiple touching. In one example, the definition for gesture 1 (3037-1) is a double tap on a displayed object. The double tap, for example, comprises a first touch (touch begin) on the displayed object for a predetermined phase of the gesture, a first lift-off (touch end) for a next predetermined phase of the gesture, a second touch (touch begin) on the displayed object for a subsequent predetermined phase of the gesture, and a second lift-off (touch end) for a final predetermined phase of the gesture. In another example, the definition for gesture 2 (3037-2) includes a dragging on a displayed object. The dragging, for example, comprises a touch (or contact) on the displayed object, a movement of the touch across touch-sensitive display 156, and lift-off of the touch (touch end).

In some embodiments, event recognizer 325-1 also includes information for event delivery 3039. Information for event delivery 3039 includes references to corresponding event handlers 319. Optionally, information for event delivery 3039 includes action-target pair(s). In some embodiments, in response to recognizing a gesture (or a part of a gesture), event information (e.g., action message(s)) is sent to one or more targets identified by the action-target pair(s). In other embodiments, in response to recognizing a gesture (or a part of a gesture), the action-target pair(s) are activated.

In some embodiments, gesture definitions 3035 include a definition of a gesture for a respective user-interface object. In some embodiments, event comparator 3033 performs a hit test to determine which user-interface object is associated with a sub-event. For example, in an application view in which three user-interface objects are displayed on touch-sensitive display 156, when a touch is detected on touch-sensitive display 156, event comparator 3033 performs a hit test to determine which of the three user-interface objects, if any, is associated with the touch (event). If each displayed object is associated with a respective event handler 319, event comparator 3033 uses the result of the hit test to determine which event handler 319 should be activated. For example, event comparator 3033 selects an event handler 319 associated with the event and the object triggering the hit test.

In some embodiments, a respective gesture definition 3037 for a respective gesture also includes delayed actions that delay delivery of the event information until after it has been determined whether the sequence of events and/or sub-events does or does not correspond to the event recognizer's event type.

When a respective event recognizer 325-1 determines that the series of events and/or sub-events do not match any of the events in gesture definitions 3035, the respective event recognizer 325-1 enters an event failed state, after which the respective event recognizer 325-1 disregards subsequent events and/or sub-events of the touch-based gesture. In this situation, other event recognizers, if any, that remain active for the hit view continue to track and process events and/or sub-events of an ongoing touch-based gesture.

In some embodiments, when no event recognizer for the hit view remains, the event information is sent to one or more event recognizers in a higher view in the view hierarchy. Alternatively, when no event recognizer for the hit view remains, the event information is disregarded. In some embodiments, when no event recognizer for views in the view hierarchy remains, the event information is sent to one or more event recognizers in a higher programmatic level in the programmatic hierarchy. Alternatively, when no event recognizer for views in the view hierarchy remains, the event information is disregarded.

In some embodiments, a respective event recognizer 325-1 includes event recognizer state 334. Event recognizer state 334 includes a state of the respective event recognizer 325-1. Examples of event recognizer states are described in more detail below with reference to FIGS. 4A-4B and 5A-5C.

In some embodiments, event recognizer state 334 includes recognizer metadata and properties 3043. In some embodiments, recognizer metadata and properties 3043 include one or more of the following: A) configurable properties, flags, and/or lists that indicate how the event delivery system should perform event and/or sub-event delivery to actively involved event recognizers; B) configurable properties, flags, and/or lists that indicate how event recognizers interact with one another; C) configurable properties, flags, and/or lists that indicate how event recognizers receive event information; D) configurable properties, flags, and/or lists that indicate how event recognizers may recognize a gesture; E) configurable properties, flags, and/or lists that indicate whether events and/or sub-events are delivered to varying levels in the view hierarchy; and F) references to corresponding event handlers 319.

In some embodiments, event recognizer state 334 includes event/touch metadata 3045. Event/touch metadata 3045 includes event/touch information about a respective event/touch that has been detected and corresponds to a respective gesture definition 3037 of gesture definitions 3035. The event/touch information includes one or more of: a location, time stamp, speed, direction, distance, scale (or change in scale), and angle (or change in angle) of the respective event/touch.

In some embodiments, a respective event recognizer 325 activates event handler 319 associated with the respective event recognizer 325 when one or more particular events and/or sub-events of a gesture are recognized. In some embodiments, respective event recognizer 325 delivers event information associated with the event to event handler 319.

Event handler 319, when activated, performs one or more of: creating and/or updating data, creating and updating objects, and preparing display information and sending it for display on display 126 or touch-sensitive display 156.

In some embodiments, a respective application view 317-2 includes view metadata 341. As described above with respect to FIG. 3B, view metadata 341 includes data regarding a view. Optionally, view metadata 341 includes one or more of: stop property 342, skip property 343, NoHit skip property 344, and other view metadata 329.

In some embodiments, a first actively involved view within the view hierarchy may be configured to prevent delivery of a respective sub-event to event recognizers associated with that first actively involved view. This behavior can implement the skip property 343. When the skip property is set for an application view, delivery of the respective sub-event is still performed for event recognizers associated with other actively involved views in the view hierarchy.

Alternately, a first actively involved view within the view hierarchy may be configured to prevent delivery of a respective sub-event to event recognizers associated with that first actively involved view unless the first actively involved view is the hit view. This behavior can implement the conditional NoHit skip property 344.

In some embodiments, a second actively involved view within the view hierarchy is configured to prevent delivery of the respective sub-event to event recognizers associated with the second actively involved view and to event recognizers associated with ancestors of the second actively involved view. This behavior can implement the stop property 342.

Figure 3E:
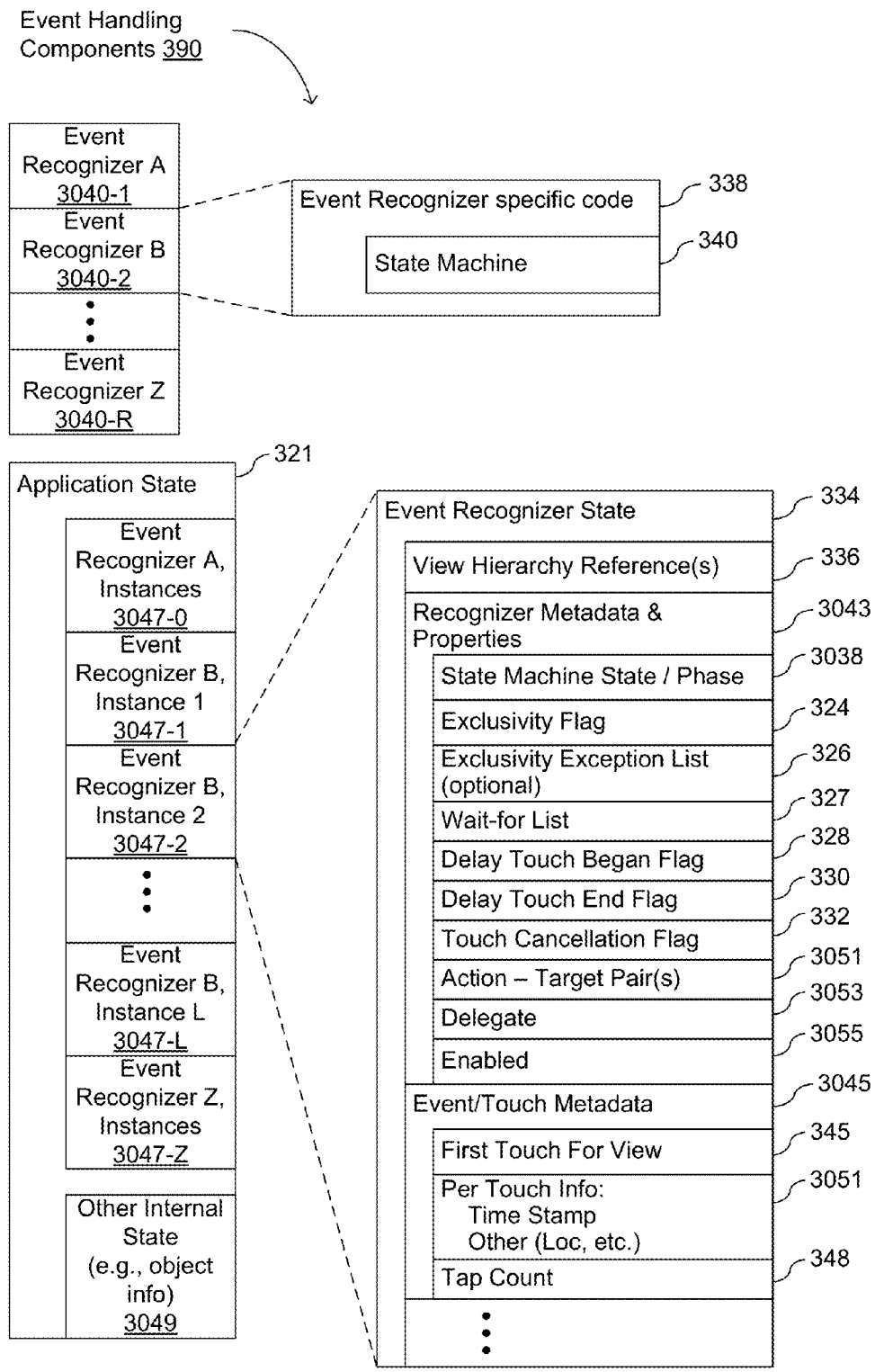
FIG. 3E is a block diagram illustrating exemplary classes and instances of gesture recognizers in accordance with some embodiments.

FIG. 3E is a block diagram illustrating exemplary classes and instances of gesture recognizers (e.g., event handling components 390) in accordance with some embodiments.

A software application (e.g., application 133-1) has one or more event recognizers 3040. In some embodiments, a respective event recognizer (e.g., 3040-2) is an event recognizer class. The respective event recognizer (e.g., 3040-2) includes event recognizer specific code 338 (e.g., a set of instructions defining the operation of event recognizers) and state machine 340.

In some embodiments, application state 321 of a software application (e.g., application 133-1) includes instances of event recognizers. Each instance of an event recognizer is an object having a state (e.g., event recognizer state 334). "Execution" of a respective event recognizer instance is implemented by executing corresponding event recognizer specific code (e.g., 338) and updating or maintaining the state 334 of the event recognizer instance 3047. The state 334 of event recognizer instance 3047 includes the state 3038 of the event recognizer instance's state machine 340.

In some embodiments, application state 321 includes a plurality of event recognizer instances 3047. A respective event recognizer instance 3047 typically corresponds to an event recognizer that has been bound (also called "attached") to a view of the application. In some embodiments, one or more event recognizer instances 3047 are bound to a respective application in a programmatic hierarchy without reference to any particular view of the respective application. In some embodiments, application state 321 includes a plurality of instances (e.g., 3047-1 to 3047-L) of a respective event recognizer (e.g., 3040-2). In some embodiments, application state 321 includes instances 3047 of a plurality of event recognizers (e.g., 3040-1 to 3040-R).

In some embodiments, a respective instance 3047-2 of a gesture recognizer 3040 includes event recognizer state 334. As discussed above, in some embodiments, event recognizer state 334 includes recognizer metadata and properties 3043 and event/touch metadata 3045. In some embodiments, event recognizer state 334 also includes view hierarchy reference(s) 336, indicating to which view the respective instance 3047-2 of the gesture recognizer 3040-2 is attached.

In some embodiments, recognizer metadata and properties 3043 include the following, or a subset or superset thereof:
  exclusivity flag 324;
  exclusivity exception list 326;
  wait-for list 327;
  delay touch began flag 328;
  delay touch end flag 330; and
  touch cancellation flag 332.

In some embodiments, one or more event recognizers may be adapted to delay delivering one or more sub-events of the sequence of sub-events until after the event recognizer recognizes the event. This behavior reflects a delayed event. For example, consider a single tap gesture in a view for which multiple tap gestures are possible. In that case, a tap event becomes a "tap+delay" recognizer. In essence, when an event recognizer implements this behavior, the event recognizer will delay event recognition until it is certain that the sequence of sub-events does in fact correspond to its event definition. This behavior may be appropriate when a recipient view is incapable of appropriately responding to cancelled events. In some embodiments, an event recognizer will delay updating its event recognition status to its respective actively involved view until the event recognizer is certain that the sequence of sub-events does not correspond to its event definition. Delay touch began flag 328, delay touch end flag 330, and touch cancellation flag 332 are provided to tailor sub-event delivery techniques, as well as event recognizer and view status information updates to specific needs.

In some embodiments, recognizer metadata and properties 3043 include the following, or a subset or superset thereof:
  state machine state/phase 3038, which indicates the state of a state machine (e.g., 340) for the respective event recognizer instance (e.g., 3047-2); state machine state/phase 3038 can have various state values, such as "event possible", "event recognized", "event failed", and others, as described below; alternatively or additionally, state machine state/phase 3038 can have various phase values, such as "touch phase began" which can indicate that the touch data structure defines a new touch that has not been referenced by previous touch data structures; a "touch phase moved" value can indicate that the touch being defined has moved from a prior position; a "touch phase stationary" value can indicate that the touch has stayed in the same position; a "touch phase ended" value can indicate that the touch has ended (e.g., the user has lifted his/her finger from the surface of a multi touch display); a "touch phase cancelled" value can indicate that the touch has been cancelled by the device; a cancelled touch can be a touch that is not necessarily ended by a user, but which the device has determined to ignore; for example, the device can determine that the touch is being generated inadvertently (i.e., as a result of placing a portable multi touch enabled device in one's pocket) and ignore the touch for that reason; each value of state machine state/phase 3038 can be an integer number (called herein "gesture recognizer state value");
  action-target pair(s) 3051, where each pair identifies a target to which the respective event recognizer instance sends the identified action message in response to recognizing an event or touch as a gesture or a part of a gesture;
  delegate 3053, which is a reference to a corresponding delegate when a delegate is assigned to the respective event recognizer instance; when a delegate is not assigned to the respective event recognizer instance, delegate 346 contains a null value; and
  enabled property 3055, indicating whether the respective event recognizer instance is enabled; in some embodiments, when the respective event recognizer instance is not enabled (e.g., disabled), the respective event recognizer instance does not process events or touches.

In some embodiments, exception list 326 can also be used by non-exclusive event recognizers. In particular, when a non-exclusive event recognizer recognizes an event or sub-event, subsequent events and/or sub-events are not delivered to the exclusive event recognizers associated with the currently active views, except for those exclusive event recognizers listed in exception list 326 of the event recognizer that recognized the event or sub-event.

In some embodiments, event recognizers may be configured to utilize the touch cancellation flag 332 in conjunction with the delay touch end flag 330 to prevent unwanted events and/or sub-events from being delivered to the hit view. For example, the definition of a single tap gesture and the first half of a double tap gesture are identical. Once a single tap event recognizer successfully recognizes a single tap, an undesired action could take place. If the delay touch end flag is set, the single tap event recognizer is prevented from sending sub-events to the hit view until a single tap event is recognized. In addition, the wait-for list of the single tap event recognizer may identify the double-tap event recognizer, thereby preventing the single tap event recognizer from recognizing a single tap until the double-tap event recognizer has entered the event impossible state. The use of the wait-for list avoids the execution of actions associated with a single tap when a double tap gesture is performed. Instead, only actions associated with a double tap will be executed, in response to recognition of the double tap event.

Turning in particular to forms of user touches on touch-sensitive surfaces, as noted above, touches and user gestures may include an act that need not be instantaneous, e.g., a touch can include an act of moving or holding a finger against a display for a period of time. A touch data structure, however, defines the state of a touch (or, more generally, the state of any input source) at a particular time. Therefore, the values stored in a touch data structure may change over the course of a single touch, enabling the state of the single touch at different points in time to be conveyed to an application.

Each touch data structure can comprise various entries. In some embodiments, touch data structures may include data corresponding to at least the touch-specific entries in event/touch metadata 3045 such as the following, or a subset or superset thereof:
- "first touch for view" entry 345;
- "per touch info" entry 3051, including "time stamp" information, which indicates the particular time to which the touch data structure relates (e.g., the time of touch); optionally, "per touch info" entry 3051 includes other information, such as a location of a corresponding touch; and
- optional "tap count" entry 348.

Thus, each touch data structure can define what is happening with a respective touch (or other input source) at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening in the view.

The ability to handle complex touch-based gestures, optionally including multi-touch gestures, can add complexity to the various software applications. In some cases, such additional complexity can be necessary to implement advanced and desirable interface features. For example, a game may require the ability to handle multiple simultaneous touches that occur in different views, as games often require the pressing of multiple buttons at the same time, or combining accelerometer data with touches on a touch-sensitive surface. However, some simpler applications and/or views need not require advanced interface features. For example, a simple soft button (i.e., a button that is displayed on a touch-sensitive display) may operate satisfactorily with single touches, rather than multi-touch functionality. In these cases, the underlying OS may send unnecessary or excessive touch data (e.g., multi-touch data) to a software component associated with a view that is intended to be operable by single touches only (e.g., a single touch or tap on a soft button). Because the software component may need to process this data, it may need to feature all the complexity of a software application that handles multiple touches, even though it is associated with a view for which only single touches are relevant. This can increase the cost of development of software for the device, because software components that have been traditionally easy to program in a mouse interface environment (i.e., various buttons, etc.) may be much more complex in a multi-touch environment.

In order to reduce the complexity in recognizing complex touch-based gestures, delegates can be used to control the behavior of event recognizers in accordance with some embodiments. As described below, delegates can determine, for example, whether a corresponding event recognizer (or gesture recognizer) can receive the event (e.g., touch) information; whether the corresponding event recognizer (or gesture recognizer) can transition from an initial state (e.g., event possible state) of state machine to another state; and/or whether the corresponding event recognizer (or gesture recognizer) can simultaneously recognize the event (e.g., touch) as a corresponding gesture without blocking other event recognizer(s) (or gesture recognizer(s)) from recognizing the event or getting blocked by other event recognizer(s) (or gesture recognizer(s)) recognizing the event.

It shall be understood, however, that the foregoing discussion regarding the complexity of evaluating and processing user touches on touch-sensitive surfaces also applies to all forms of user inputs to operate electronic device 102 with input devices 128, not all of which are initiated on touch screens, e.g., coordinating mouse movement and mouse button presses with or without single or multiple keyboard presses or holds, device rotations or other movements, user movements such as taps, drags, scrolls, etc., on touch-pads, pen stylus inputs, oral instructions, detected eye movements, biometric inputs, detected physiological change in a user, and/or any combination thereof, which may be utilized as inputs corresponding to events and/or sub-events which define an event to be recognized.

Figure 3F:
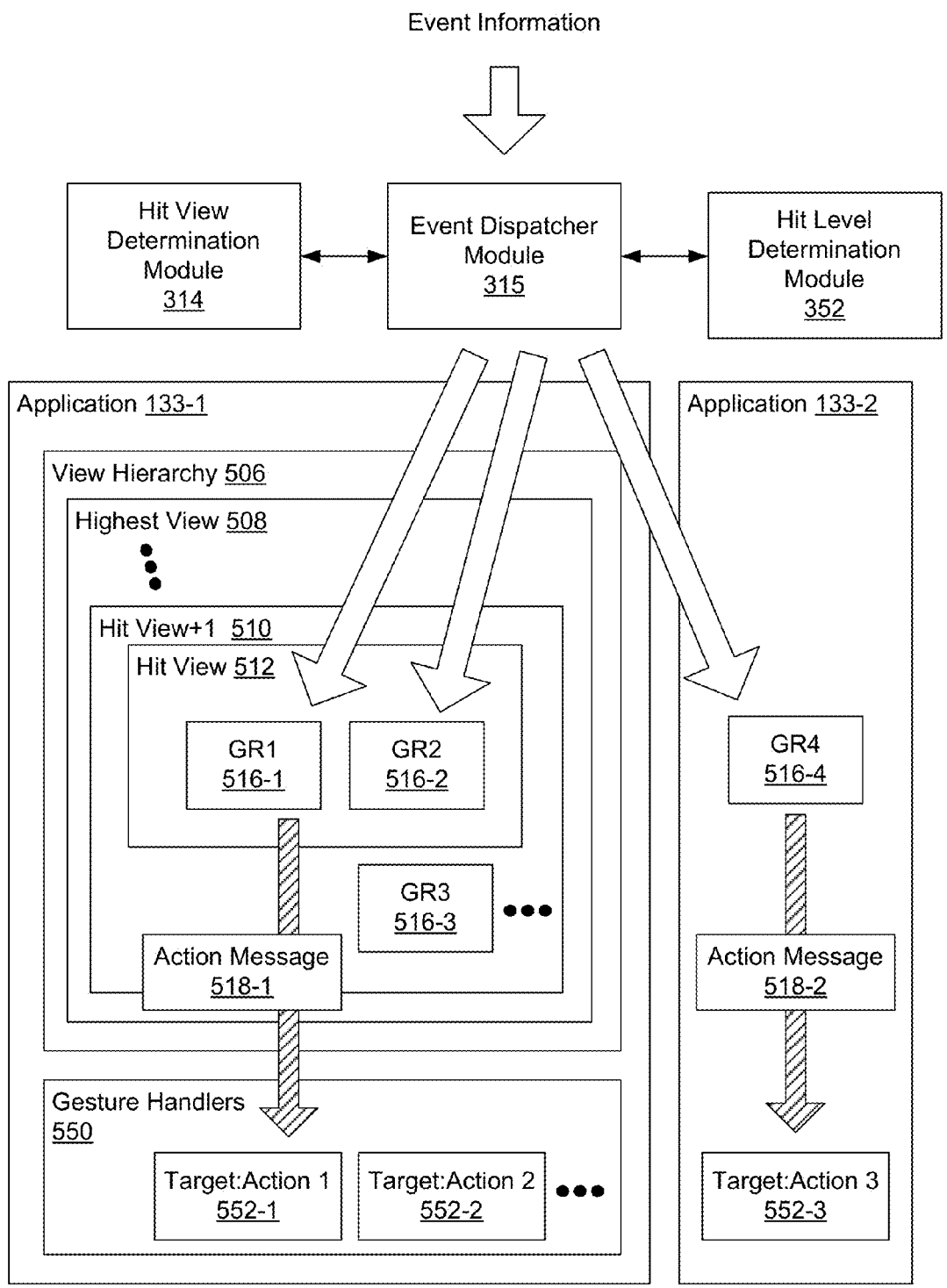
FIG. 3F is a block diagram illustrating the flow of event information in accordance with some embodiments.

Turning to the flow of event information, FIG. 3F is a block diagram illustrating the flow of event information in accordance with some embodiments. Event dispatcher module 315 (e.g., in operating system 118 or application software 124) receives event information, and sends the event information to one or more applications (e.g., 133-1 and 133-2). In some embodiments, application 133-1 includes a plurality of views (e.g., 508, 510, and 512 corresponding to views 317, FIG. 3D) in view hierarchy 506 and a plurality of gesture recognizers (516-1 through 516-3) in the plurality of views. Application 133-1 also includes one or more gesture handlers 550, which correspond to the target values in target-action pairs (e.g., 552-1 and 552-2). In some embodiments, event dispatcher module 315 receives hit view information from hit view determination module 314 and sends event information to the hit view (e.g., 512) or event recognizer(s) attached to the hit view (e.g., 516-1 and 516-2). Additionally or alternatively, event dispatcher module 315 receives hit level information from hit level determination module 352 and sends event information to applications in the hit level (e.g., 133-1 and 133-2) or one or more event recognizers (e.g., 516-4) in the hit level applications. In some embodiments, one of the applications receiving the event information is a default application (e.g., 133-2 may be a default application). In some embodiments, only a subset of gesture recognizers in each receiving application is allowed to (or configured to) receive the event information. For example, gesture recognizer 516-3 in application 133-1 does not receive the event information. The gesture recognizers that receive the event information are called herein receiving gesture recognizers. In FIG. 3F, receiving gesture recognizers 516-1, 516-2, and 516-4 receive the event information, and compare the received event information with a respective gesture definition 3037 (FIG. 3D) in the receiving gesture recognizers. In FIG. 3F, gesture recognizers 516-1 and 516-4 have respective gesture definitions that match the received event information, and send respective action messages (e.g., 518-1 and 518-2) to corresponding gesture handlers (e.g., 552-1 and 552-3).

Figure 4A:
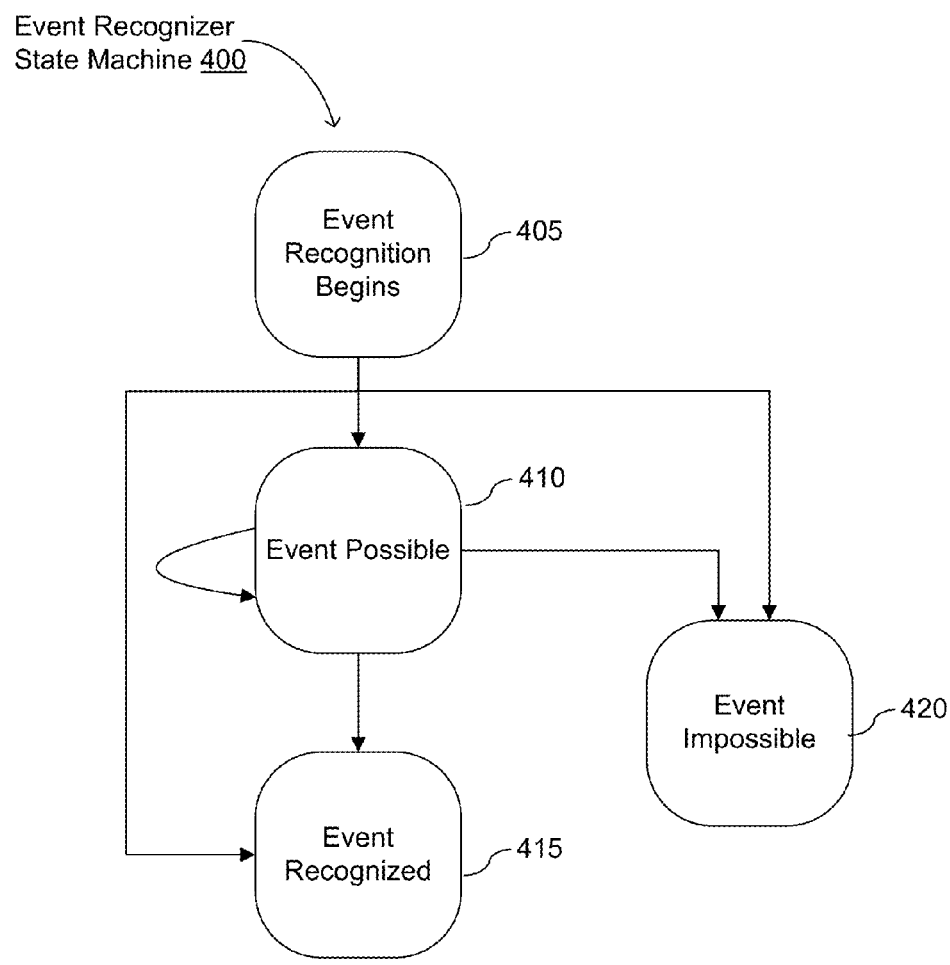
FIGS. 4A and 4B are flow charts illustrating exemplary state machines in accordance with some embodiments.

FIG. 4A depicts an event recognizer state machine 400 containing four states. By managing state transitions in event recognizer state machine 400 based on received sub-events, an event recognizer effectively expresses an event definition. For example, a tap gesture may be effectively defined by a sequence of two, or optionally, three sub-events. First, a touch should be detected, and this will be sub-event 1. For example, the touch sub-event may be a user's finger touching a touch-sensitive surface in a view that includes the event recognizer having state machine 400. Second, an optional measured delay where the touch does not substantially move in any given direction (e.g., any movement of the touch position is less than a predefined threshold, which may be measured as a distance (e.g., 5 mm) or as a number of pixels (e.g., 5 pixels) on the display), and the delay is sufficiently short, would serve as sub-event 2. Finally, termination of the touch (e.g., liftoff of the user's finger from the touch-sensitive surface) will serve as sub-event 3. By coding the event recognizer state machine 400 to transition between states based upon receiving these sub-events, the event recognizer state machine 400 effectively expresses a tap gesture event definition. However, it should be noted that the states depicted in FIG. 4A are exemplary states, and an event recognizer state machine 400 may contain more or fewer states and/or each state in the event recognizer state machine 400 may correspond to one of the depicted states or any other states.

In some embodiments, regardless of event type, the event recognizer state machine 400 begins in an event recognition begins state 405, and may progress to any of the remaining states depending on what sub-event is received. To facilitate discussion of the event recognizer state machine 400, the direct paths from the event recognition begins state 405 to the event recognized state 415, the event possible state 410, and event impossible state 420 will be discussed, followed by a description of the paths leading from the event possible state 410.

Starting from event recognition begins state 405, if a sub-event is received that, by itself comprises the event definition for an event, the event recognizer state machine 400 will transition to event recognized state 415.

Starting from state event recognition begins 405, if a sub-event is received that is not the first sub-event in an event definition, the event recognizer state machine 400 will transition to event impossible state 420.

Starting from event recognition begins state 405, if a sub-event is received that is the first and not final sub-event in a given event definition, the event recognizer state machine 400 will transition to event possible state 410. If the next sub-event received is a second sub-event, but not the final sub-event in the given event definition, the event recognizer state machine 400 will remain in state event possible 410. The event recognizer state machine 400 can remain in state event possible 410 for as long as the sequence of received sub-events continues to be part of the event definition. If, at any time the event recognizer state machine 400 is in event possible state 410, and the event recognizer state machine 400 receives a sub-event that is not part of the event definition, it will transition to state event impossible 420, thereby determining that the current event (if any) is not the type of event that corresponds to this event recognizer (i.e., the event recognizer corresponding to state 400). If, on the other hand, the event recognizer state machine 400 is in the event possible state 410, and the event recognizer state machine 400 receives the last sub-event in an event definition, it will transition to the event recognized state 415, thereby completing a successful event recognition.

Figure 4B:
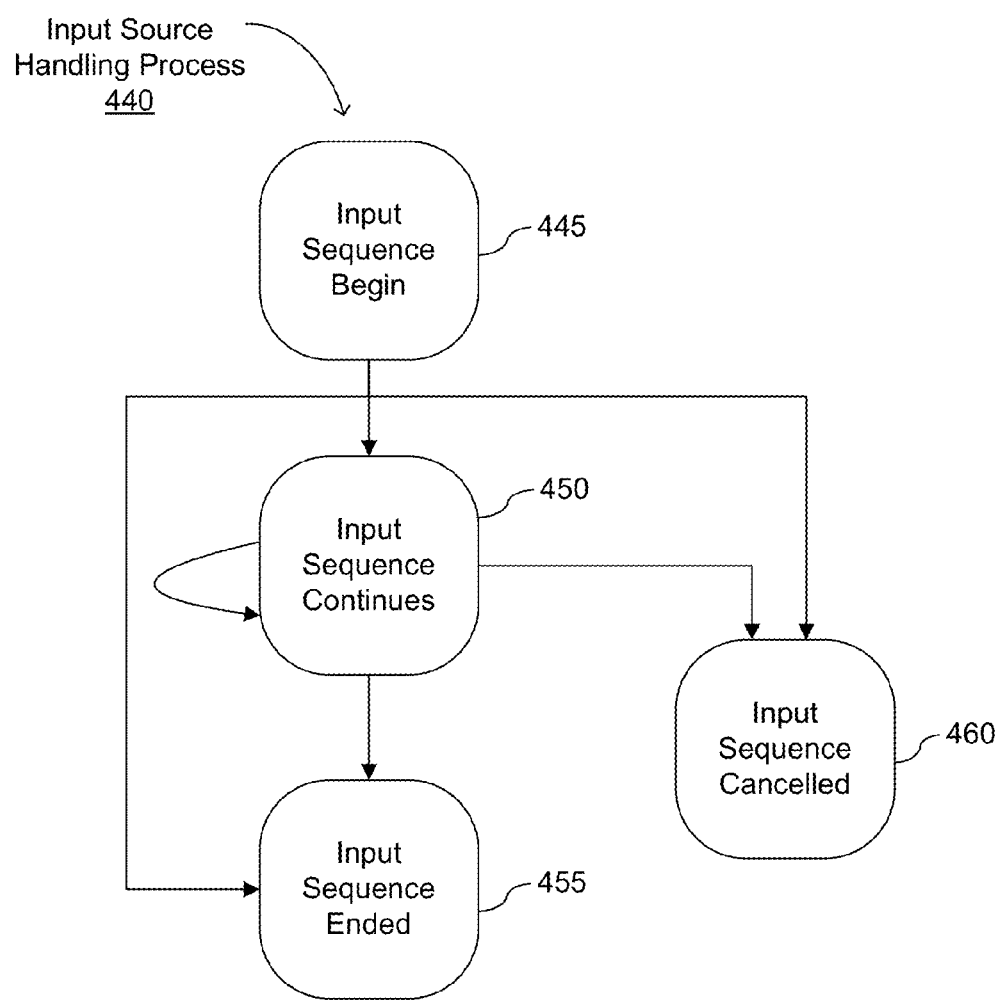

FIG. 4B depicts an embodiment of an input source handling process 440, having a finite state machine representing how views receive information about a respective input. It is noted that when there are multiple touches on the touch-sensitive surface of a device, each of the touches is a separate input source having its own finite state machine. In this embodiment, input source handling process 440 includes four states: input sequence begin 445, input sequence continues 450, input sequence ended 455, and input sequence cancelled 460. Input source handling process 440 may be used by a respective event recognizer, for example, when input is to be delivered to an application, but only after the completion of an input sequence is detected. Input source handling process 440 can be used with an application that is incapable of canceling or undoing changes made in response to an input sequence delivered to the application. It should be noted that the states depicted in FIG. 4B are exemplary states, and input source handling process 440 may contain more or fewer states and/or each state in input source handling process 440 may correspond to one of the depicted states or any other states.

Starting from input sequence begin 445, if an input is received that, by itself completes an input sequence, input source handling process 440 will transition to input sequence ended 455.

Starting from input sequence begin 445, if an input is received that indicates the input sequence terminated, input source handling process 440 will transition to input sequence cancelled 460.

Starting from input sequence begin 445, if an input is received that is the first and not final input in a input sequence, input source handling process 440 will transition to state input sequence continues 450. If the next input received is the second input in an input sequence, the input handling process 440 will remain in state input sequence continues 450. Input source handling process 440 can remain in state input sequence continues 450 for as long as the sequence of sub-events being delivered continue to be part of a given input sequence. If, at any time input source handling process 440 is in state input sequence continues 450, and input source handling process 440 receives an input that is not part of the input sequence, it will transition to state input sequence cancelled 460. If, on the other hand, input source handling process 440 is in input sequence continues 450, and the input handling process 440 receives the last input in a given input definition, it will transition to the input sequence ended 455, thereby successfully receiving a group of sub-events.

In some embodiments, input source handling process 440 may be implemented for particular views or programmatic levels. In that case, certain sequences of sub-events may result in transitioning to state input cancelled 460.

As an example, consider FIG. 4C, which supposes an actively involved view, represented only by actively involved view input source handler 480 (hereafter "view 480"). View 480 includes a vertical swipe event recognizer, represented only by vertical swipe event recognizer 468 (hereafter "recognizer 468") as one of its event recognizers. In this case, the recognizer 468 may require as part of its definition detecting: 1) a finger down 465-1; 2) an optional short delay 465-2; 3), vertical swiping of at least N pixels 465-3; and 4) a finger liftoff 465-4.

For this example, the recognizer 468 also has its delay touch began flag 328 and touch cancellation flag 332 set. Now consider delivery of the following sequence of sub-events to recognizer 468, as well as the view 480:

sub-event sequence 465-1: detect finger down, which corresponds to recognizer 468's event definition sub-event sequence 465-2: measure delay, which corresponds to recognizer 468's event definition sub-event sequence 465-3: finger performs a vertical swiping movement compatible with vertical scrolling, but is less than N pixels, and therefore does not correspond to recognizer 468's event definition sub-event sequence 465-4: detect finger liftoff, which corresponds to recognizer 468's event definition Here, recognizer 468 would successfully recognize sub-events 1 and 2 as part of its event definition, and accordingly, would be in state event possible 472 immediately prior to the delivery of sub-event 3. Since recognizer 468 has its delay touch began flag 328 set, the initial touch sub-event is not sent to the hit view. Correspondingly, the view 480's input source handling process 440 would still be in state input sequence begin immediately prior to the delivery of sub-event 3.

Once delivery of sub-event 3 to recognizer 468 is complete, recognizer 468's state transitions to event impossible 476, and importantly, the recognizer 468 has now determined that the sequence of sub-events does not correspond to its specific vertical swipe gesture event type (i.e., it has decided the event is not a vertical swipe. In other words, recognition 474 as a vertical swipe does not occur in this example.). The input source handling system 440 for view input source handler 480 will also update its state. In some embodiments, the state of the view input source handler 480 would proceed from the input sequence begins state 482 to the input sequence continues state 484 when the event recognizer sends status information indicating that it has begun recognizing an event. The view input source handler 480 proceeds to the input sequence cancelled state 488 when the touch or input ends without an event being recognized because the touch cancellation flag 322 of the event recognizer has been set. Alternately, if the touch cancellation flag 322 of the event recognizer had not been set, the view input source handler 480 proceeds to the input sequence ended state 486 when the touch of input ends.

Since event recognizer 468's touch cancellation flag 332 is set, when the event recognizer 468 transitions to the event impossible state 476, the recognizer will send a touch cancellation sub-event or message to the hit view corresponding to the event recognizer. As a result, the view input source handler 480 will transition to the state input sequence cancelled 488.

In some embodiments, delivery of sub-event 465-4 is not germane to any event recognition decisions made by recognizer 468, though view input source handler 480's other event recognizers, if any, may continue to analyze the sequence of sub-events.

The following table presents in summarized tabular format the processing of this exemplary sub-event sequence 465 as related to the state of event recognizer 468 described above, along with the state of view input source handler 480. In this example, the state of the view input source handler 480 proceeds from input sequence begin 445 to input sequence cancelled 488 because recognizer 468's touch cancellation flag 332 was set:

| Sub-Event Sequence 465 | State: Recognizer 468 | State: View 480 |
|---|---|---|
| before delivery starts | Event Recognition Begins 470 | |
| detect finger down 465-1 | Event Possible 472 | Input Sequence Begins 482 |
| measure delay 465-2 | Event Possible 472 | Input Sequence Continues 484 |
| detect finger vertical swipe 465-3 | Event Impossible 476 | Input Sequence Continues 484 |
| detect finger liftoff 465-4 | Event Impossible 476 | Input Sequence Cancelled 488 |

Turning to FIG. 5A, attention is directed to an example of a sub-event sequence 520, which is being received by a view that includes a plurality of event recognizers. For this example, two event recognizers are depicted in FIG. 5A, scrolling event recognizer 580 and tap event recognizer 590. For purposes of illustration, the view search results panel 304 in FIG. 3A will be related to the reception of the sub-event sequence 520, and the state transitions in scrolling event recognizer 580 and tap event recognizer 590. Note that in this example, the sequence of sub-events 520 defines a tap finger gesture on a touch-sensitive display or trackpad, but the same event recognition technique could be applied in a myriad of contexts, e.g., detecting a mouse button press, and/or in embodiments utilizing programmatic hierarchies of programmatic levels.

Before the first sub-event is delivered to view search results panel 304, event recognizers 580 and 590 are in the event recognition begins states 582 and 592, respectively. Following touch 301, which is delivered as sub-event detect finger down 521-1 to actively involved event recognizers for view search results panel 304 as touch sub-event 301-2 (as well as to actively involved event recognizers for map view 305 as touch sub-event 301-3), scrolling event recognizer 580 transitions to state event possible 584, and similarly, tap event recognizer 590 transitions to state event possible 594. This is because the event definition of a tap and a scroll both begin with a touch such as detecting a finger down on a touch-sensitive surface.

Some definitions of tap and scroll gestures may optionally include a delay between an initial touch and any next step in the event definition. In all examples discussed here, the exemplar event definitions for both tap and scroll gestures recognize a delay sub-event following the first touch sub-event (detect finger down).

Accordingly, as sub-event measure delay 521-2 is delivered to event recognizers 580 and 590, both remain in the event possible states 584 and 594, respectively.

Finally, sub-event detect finger liftoff 521-3 is delivered to event recognizers 580 and 590. In this case, the state transitions for event recognizers 580 and 590 are different, because the event definitions for tap and scroll are different. In the case of scrolling event recognizer 580, the next sub-event to remain in state event possible would be to detect movement. Since the sub-event delivered is detect finger liftoff 521-3, however, the scrolling event recognizer 580 transitions to state event impossible 588. A tap event definition concludes with a finger liftoff sub-event though. Accordingly, tap event recognizer 590 transitions to state event recognized 596 after sub-event detect finger liftoff 521-3 is delivered.

Note that in some embodiments, as discussed above with respect to FIGS. 4B and 4C, the input source handling process 440 discussed in FIG. 4B may be used for various purposes at the view level. The following table presents in summarized tabular format the delivery of sub-event sequence 520 as related to event recognizers 580, 590, and input source handling process 440:

states 582 and 592, respectively. Following delivery of sub-events corresponding to touch 301 (as discussed above), scrolling event recognizer 580 transitions to state event possible 584, and similarly, tap event recognizer 590 transitions to state event possible 594.

As sub-event measure delay 531-2 is delivered to event recognizers 580 and 590, both transition to the event possible states 584 and 594, respectively.

Next, sub-event detect finger movement 531-3 is delivered to event recognizers 580 and 590. In this case, the state transitions for event recognizers 580 and 590 are different because the event definitions for tap and scroll are different. In the case of scrolling event recognizer 580, the next sub-event to remain in state event possible is to detect movement, so the scrolling event recognizer 580 remains in the event possible state 584 when it receives sub-event detect finger movement 531-3. As discussed above, however, the definition for a tap concludes with a finger liftoff sub-event, so tap event recognizer 590 transitions to the state event impossible 598.

| Sub-Event Sequence 520 | State: Scrolling Event Recognizer 580 | State: Tap Event Recognizer 590 | State: Input Source Handling Process 440 |
|---|---|---|---|
| before delivery starts | Event Recognition Begins 582 | Event Recognition Begins 592 | |
| Detect Finger Down 521-1 | Event Possible 584 | Event Possible 594 | Input Sequence Begin 445 |
| Measure Delay 521-2 | Event Possible 584 | Event Possible 594 | Input Sequence Continues 450 |
| Detect Finger Liftoff 521-3 | Event impossible 588 | Event Recognized 596 | Input Sequence Ended 455 |

Turning to FIG. 5B, attention is directed to another example of a sub-event sequence 530, which is being received by a view that includes a plurality of event recognizers. For this example, two event recognizers are depicted in FIG. 5B, scrolling event recognizer 580 and tap event recognizer 590. For purposes of illustration, the view search results panel 304 in FIG. 3A will be related to the reception of the sub-event sequence 530, and the state transitions in scrolling event recognizer 580 and tap event recognizer 590. Note that in this example, the sequence of sub-events 530 defines a scroll finger gesture on a touch-sensitive display, but the same event recognition technique could be applied in myriad contexts, e.g., detecting a mouse button press, mouse movement, and mouse button release, and/or in embodiments utilizing programmatic hierarchies of programmatic levels.

Before the first sub-event is delivered to actively involved event recognizers for view search results panel 304, event recognizers 580 and 590 are in the event recognition begins Finally, sub-event detect finger liftoff 531-4 is delivered to event recognizers 580 and 590. Tap event recognizer is already in the event impossible state 598, and no state transition occurs. Scrolling event recognizer 580's event definition concludes with detecting a finger liftoff. Since the sub-event delivered is detect finger liftoff 531-4, the scrolling event recognizer 580 transitions to state event recognized 586. It is noted that a finger movement on a touch sensitive surface may generate multiple movement sub-events, and therefore a scroll may be recognized before liftoff and continue until liftoff.

The following table presents in summarized tabular format the delivery of sub-event sequence 530 as related to event recognizers 580, 590, and input source handling process 440:

| Sub-Event Sequence 530 | State: Scrolling Event Recognizer 580 | State: Tap Event Recognizer 590 | State: Input Source Handling Process 440 |
|---|---|---|---|
| before delivery starts | Event Recognition Begins 582 | Event Recognition Begins 592 | |
| detect finger down 531-1 | Event Possible 584 | Event Possible 594 | Input Sequence Begins 445 |
| measure delay 531-2 | Event Possible 584 | Event Possible 594 | Input sequence continues 450 |
| detect finger movement 531-3 | Event Possible 584 | Event Impossible 598 | Input sequence continues 450 |
| detect finger liftoff 531-4 | Event Recognized 586 | Event Impossible 598 | Input sequence ended 455 |

Turning to FIG. 5C, attention is directed to another example of a sub-event sequence 540, which is being received by a view that includes a plurality of event recognizers. For this example, two event recognizers are depicted in FIG. 5C, double tap event recognizer 570 and tap event recognizer 590. For purposes of illustration, the map view 305 in FIG. 3A will be related to the reception of the sub-event sequence 540, and the state transitions in double tap event recognizer 570 and tap event recognizer 590. Note that in this example, the sequence of sub-events 540 defines a double tap gesture on a touch-sensitive display, but the same event recognition technique could be applied in myriad contexts, e.g., detecting a mouse double click, and/or in embodiments utilizing programmatic hierarchies of programmatic levels.

Before the first sub-event is delivered to actively involved event recognizers for map view 305, event recognizers 570 and 590 are in the event recognition begins states 572 and 592, respectively. Following delivery of sub-events related to touch sub-event 301 to map view 304 (as described above), double tap event recognizer 570 and tap event recognizer 590 transition to states event possible 574 and 594, respectively. This is because the event definition of a tap and a double tap both begin with a touch such as detecting a finger down 541-1 on a touch-sensitive surface.

As sub-event measure delay 541-2 is delivered to event recognizers 570 and 590, both remain in states event possible 574 and 594, respectively.

While tap event recognizer 590 remains in state event recognized 596, sub-event sequence 540 continues to be delivered to double tap event recognizer 570, where sub-events measure delay 541-4, detect finger down 541-5, and measure delay 541-6, keep the double tap event recognizer 570 in the state event possible 574; delivery of the final sub-event of sequence 540, detect finger liftoff 541-7 transitions double tap event recognizer 570 to state event recognized 576.

At this point, the map view 305 takes the event double tap as recognized by event recognizer 570, rather than the single tap event recognized by tap event recognizer 590. The decision to take the double tap event is made in light of the combination of the tap event recognizer 590's exclusivity flag 324 being set, the tap event recognizer 590's exclusivity exception list 326 including a double tap event, and the fact that both the tap event recognizer 590 and the double tap event recognizer 570 both successfully recognized their respective event types.

The following table presents in summarized tabular format the delivery of sub-event sequence 540 as related to event recognizers 570 and 590, and sub-event handling process 440:

| Sub-Event Sequence 540 | State: Double Tap Event Recognizer 570 | State: Tap Event Recognizer 590 | State: Input Source Handling Process 440 |
| --- | --- | --- | --- |
| before delivery starts | Event Recognition Begins 572 | Event Recognition Begins 592 | |
| detect finger down 541-1 | Event Possible 574 | Event Possible 594 | Input Sequence Begins 445 |
| measure delay 541-2 | Event Possible 574 | Event Possible 594 | Input sequence continues 450 |
| detect finger liftoff 541-3 | Event Possible 574 | Event Recognized 596 | Input sequence continues 450 |
| measure delay 541-4 | Event Possible 574 | Event Recognized 596 | Input sequence continues 450 |
| detect finger down 541-5 | Event Possible 574 | Event Recognized 596 | Input sequence continues 450 |
| measure delay 541-6 | Event Possible 574 | Event Recognized 596 | Input sequence continues 450 |
| detect finger liftoff 541-7 | Event Recognized 576 | Event Recognized 596 | Input sequence ended 455 |

Next, sub-event detect finger liftoff 541-3 is delivered to event recognizers 570 and 590. In this case, the state transitions for event recognizers 580 and 590 are different because the exemplar event definitions for tap and double tap are different. In the case of tap event recognizer 590, the final sub-event in the event definition is to detect finger liftoff, so the tap event recognizer 590 transitions to the event recognized state 596.

Double tap recognizer 570 remains in state event possible 574, however, since a delay has begun, regardless of what the user may ultimately do. The complete event recognition definition for a double tap requires another delay, followed by a complete tap sub-event sequence though. This creates an ambiguous situation as between the tap event recognizer 590, which is already in state event recognized 576, and the double tap recognizer 570, which is still in state event possible 574.

Accordingly, in some embodiments, event recognizers may implement exclusivity flags and exclusivity exception lists as discussed above with respect to FIGS. 3B and 3C. Here, the exclusivity flag 324 for tap event recognizer 590 would be set, and additionally, exclusivity exception list 326 for tap event recognizer 590 would be configured to continue permitting delivery of sub-events to some event recognizers (such as double tap event recognizer 570) after tap event recognizer 590 enters the state event recognized 596.

In another embodiment, in the event scenario of FIG. 5C, the single tap gesture is not recognized, because the single tap event recognizer has a wait-for list that identifies the double tap event recognizer. As a result, a single tap gesture is not recognized until (if ever) the double tap event recognizer enters the event impossible state. In this example, in which a double tap gesture is recognized, the single tap event recognizer would remain in the event possible state until the double tap gesture is recognized, at which point the single tap event recognizer would transition to the event impossible state.

Attention is now directed to FIGS. 6A and 6B, which are flow diagrams illustrating an event recognition method in accordance with some embodiments. The method 600 is performed at an electronic device, which in some embodiments, may be an electronic device 102, as discussed above. In some embodiments, the electronic device may include a touch sensitive surface configured to detect multi-touch gestures. Alternatively, the electronic device may include a touch screen configured to detect multi-touch gestures.

The method 600 is configured to execute software that includes a view hierarchy with a plurality of views. The method 600 displays 608 one or more views of the view hierarchy, and executes 610 one or more software elements. Each software element is associated with a particular view, and each particular view includes one or more event recognizers, such as those described in FIGS. 3B and 3C as event recognizer structures 320 and 360, respectively.

Each event recognizer generally includes an event definition based on one or more sub-events, where the event definition may be implemented as a state machine, see e.g., FIG. 3B state machine 340. Event recognizers also generally include an event handler, which specifies an action for a target, and is configured to send the action to the target in response to the event recognizer detecting an event corresponding to the event definition.

In some embodiments, at least one of the plurality of event recognizers is a gesture recognizer having a gesture definition and a gesture handler as noted in step 612 of FIG. 6A.

In some embodiments, the event definition defines a user gesture as noted in step 614 of FIG. 6A.

Alternatively, event recognizers have a set of event recognition states 616. These event recognition states may include at least an event possible state, an event impossible state, and an event recognized state.

In some embodiments, the event handler initiates preparation 618 of its corresponding action for delivery to the target if the event recognizer enters the event possible state. As discussed above with respect to FIG. 4A and the examples in FIGS. 5A-5C, the state machines implemented for each event recognizer generally include an initial state, e.g., state event recognition begins 405. Receiving a sub-event that forms the initial part of an event definition triggers a state change to the event possible state 410. Accordingly, in some embodiments, as an event recognizer transitions from the state event recognition begins 405 to the state event possible 410, the event recognizer's event handler may begin preparing its particular action to deliver to the event recognizer's target after an event is successfully recognized.

On the other hand, in some embodiments, the event handler may terminate preparation 620 of its corresponding action if the event recognizer enters the state event impossible 420. In some embodiments, terminating the corresponding action includes canceling any preparation of the event handler's corresponding action.

The example of FIG. 5B is informative for this embodiment since tap event recognizer 590 may have initiated preparation 618 of its action, but then, once the sub-event detect finger movement 531-3 is delivered to the tap event recognizer 590, the recognizer 590 will transition to the event impossible state 598, 578. At that point, tap event recognizer 590 may terminate preparation 620 of the action for which it had initiated preparation 618.

In some embodiments, the event handler completes preparation 622 of its corresponding action for delivery to the target if the event recognizer enters the event recognized state. The example of FIG. 5C illustrates this embodiment since a double tap is recognized by actively involved event recognizers for the map view 305, which in some implementations, would be the event bound to selecting and/or executing the search result depicted by map view 305. Here, after the double tap event recognizer 570 successfully recognizes the double tap event comprised of the sub-event sequence 540, map view 305's event handler completes preparation 622 of its action, namely, indicating that it has received an activation command.

In some embodiments, the event handler delivers 624 its corresponding action to the target associated with the event recognizer. Continuing with the example of FIG. 5C, the action prepared, i.e. the activation command of the map view 305, would be delivered to the specific target associated with the map view 305, which may be any suitable programmatic method or object.

Alternatively, the plurality of event recognizers may independently process 626 the sequence of one or more sub-events in parallel.

In some embodiments, one or more event recognizers may be configured as exclusive event recognizers 628, as discussed above with respect to FIGS. 3B and 3C's exclusivity flags 324 and 364, respectively. When an event recognizer is configured as an exclusive event recognizer, the event delivery system prevents any other event recognizers for actively involved views (except those listed in the exception list 326, 366 of the event recognizer that recognizes the event) in the view hierarchy from receiving subsequent sub-events (of the same sequence of sub-events) after the exclusive event recognizer recognizes an event. Furthermore, when a non-exclusive event recognizer recognizes an event, the event delivery system prevents any exclusive event recognizers for actively involved views in the view hierarchy from receiving subsequent sub-events, except for those (if any) listed in the exception list 326, 366 of the event recognizer that recognizes the event.

In some embodiments, exclusive event recognizers may include 630 an event exception list, as discussed above with respect to FIGS. 3B and 3C's exclusivity exception lists 326 and 366, respectively. As noted in the discussion of FIG. 5C above, an event recognizer's exclusivity exception list can be used to permit event recognizers to continue with event recognition even when the sequence of sub-events making up their respective event definitions overlap. Accordingly, in some embodiments, the event exception list includes events whose corresponding event definitions have repetitive sub-events 632, such as the single tap/double tap event example of FIG. 5C.

Alternately, the event definition may define a user input operation 634.

In some embodiments, one or more event recognizers may be adapted to delay delivering every sub-event of the sequence of sub-events until after the event is recognized.

The method 600 detects 636 a sequence of one or more sub-events, and in some embodiments, the sequence of one or more sub-events may include primitive touch events 638. Primitive touch events may include, without limitation, basic components of a touch-based gesture on a touch-sensitive surface, such as data related to an initial finger or stylus touch down, data related to initiation of multi-finger or stylus movement across a touch-sensitive surface, dual finger movements in opposing directions, stylus lift off from a touch-sensitive surface, etc.

Sub-events in the sequence of one or more sub-events can include many forms, including without limitation, key presses, key press holds, key press releases, button presses, button press holds, button press releases, joystick movements, mouse movements, mouse button presses, mouse button releases, pen stylus touches, pen stylus movements, pen stylus releases, oral instructions, detected eye movements, biometric inputs, and detected physiological changes in a user, among others.

The method 600 identifies 640 one of the views of the view hierarchy as a hit view. The hit view establishes which views in the view hierarchy are actively involved views. An example is depicted in FIG. 3A, where the actively involved views 303 include search results panel 304, and maps view 305 because touch sub-event 301 contacted the area associated with the maps view 305.

In some embodiments, a first actively involved view within the view hierarchy may be configured 642 to prevent delivery of the respective sub-event to event recognizers associated with that first actively involved view. This behavior can implement the skip property discussed above with respect to FIGS. 3B and 3C (330 and 370, respectively). When the skip property is set for an event recognizer, delivery of the respective sub-event is still performed for event recognizers associated with other actively involved views in the view hierarchy.

Alternately, a first actively involved view within the view hierarchy may be configured 644 to prevent delivery of the respective sub-event to event recognizers associated with that first actively involved view unless the first actively involved view is the hit view. This behavior can implement the conditional skip property discussed above with respect to FIGS. 3B and 3C (332 and 372, respectively).

In some embodiments, a second actively involved view within the view hierarchy is configured 646 to prevent delivery of the respective sub-event to event recognizers associated with the second actively involved view and to event recognizers associated with ancestors of the second actively involved view. This behavior can implement the stop property discussed above with respect to FIGS. 3B and 3C (328 and 368, respectively).

The method 600 delivers 648 a respective sub-event to event recognizers for each actively involved view within the view hierarchy. In some embodiments, event recognizers for actively involved views in the view hierarchy process the respective sub-event prior to processing a next sub-event in the sequence of sub-events. Alternately, event recognizers for the actively involved views in the view hierarchy make their sub-event recognition decisions while processing the respective sub-event.

In some embodiments, event recognizers for actively involved views in the view hierarchy may process the sequence of one or more sub-events concurrently 650; alternatively, event recognizers for actively involved views in the view hierarchy may process the sequence of one or more sub-events in parallel.

In some embodiments, one or more event recognizers may be adapted to delay delivering 652 one or more sub-events of the sequence of sub-events until after the event recognizer recognizes the event. This behavior reflects a delayed event. For example, consider a single tap gesture in a view for which multiple tap gestures are possible. In that case, a tap event becomes a "tap+delay" recognizer. In essence, when an event recognizer implements this behavior, the event recognizer will delay event recognition until it is certain that the sequence of sub-events does in fact correspond to its event definition. This behavior may be appropriate when a recipient view is incapable of appropriately responding to cancelled events. In some embodiments, an event recognizer will delay updating its event recognition status to its respective actively involved view until the event recognizer is certain that the sequence of sub-events does not correspond to its event definition. As discussed above with respect to FIGS. 3B and 3C, delay touch began flag 328, 368, delay touch end flag 330, 370, and touch cancellation flag 332, 372 are provided to tailor sub-event delivery techniques, as well as event recognizer and view status information updates to specific needs.

FIGS. 7A-7S illustrate exemplary user interfaces and user inputs recognized by event recognizers for navigating through concurrently open applications in accordance with some embodiments. The user interfaces in these figures are used to illustrate the processes described below, including the processes in FIGS. 8A-8B, FIGS. 9A-9C, and FIGS. 10A-10B.

Although many of the examples which follow will be given with reference to inputs on touch screen display 156 (where the touch sensitive surface and the display are combined), in some embodiments, the device detects inputs on a touch-sensitive surface that is separate from the display (e.g., a touchpad or trackpad). In some embodiments the touch-sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the electronic device when the touch-sensitive surface is separate from the display. It should be understood that similar methods may be used for other user interfaces described herein.

FIG. 7A illustrates an exemplary user interface ("home screen" 708) on electronic device 102 in accordance with some embodiments. Similar user interfaces may be implemented on electronic devices 102. In some embodiments, home screen 708 is displayed by an application launcher software application, sometimes called a springboard. In some embodiments, the user interface on touch screen 156 includes the following elements, or a subset or superset thereof:

Signal strength indicator(s) 702 for wireless communication(s), such as cellular and Wi-Fi signals;
Time 704; and
Battery status indicator 706.

The exemplary user interface includes a plurality of application icons 5002 (e.g., 5002-25 through 5002-38). From the home screen 708, a finger gesture can be used to launch an application. For example, tap finger gesture 701 at a location that corresponds to application icon 5002-36 initiates launching an email application.

Figure 7B:
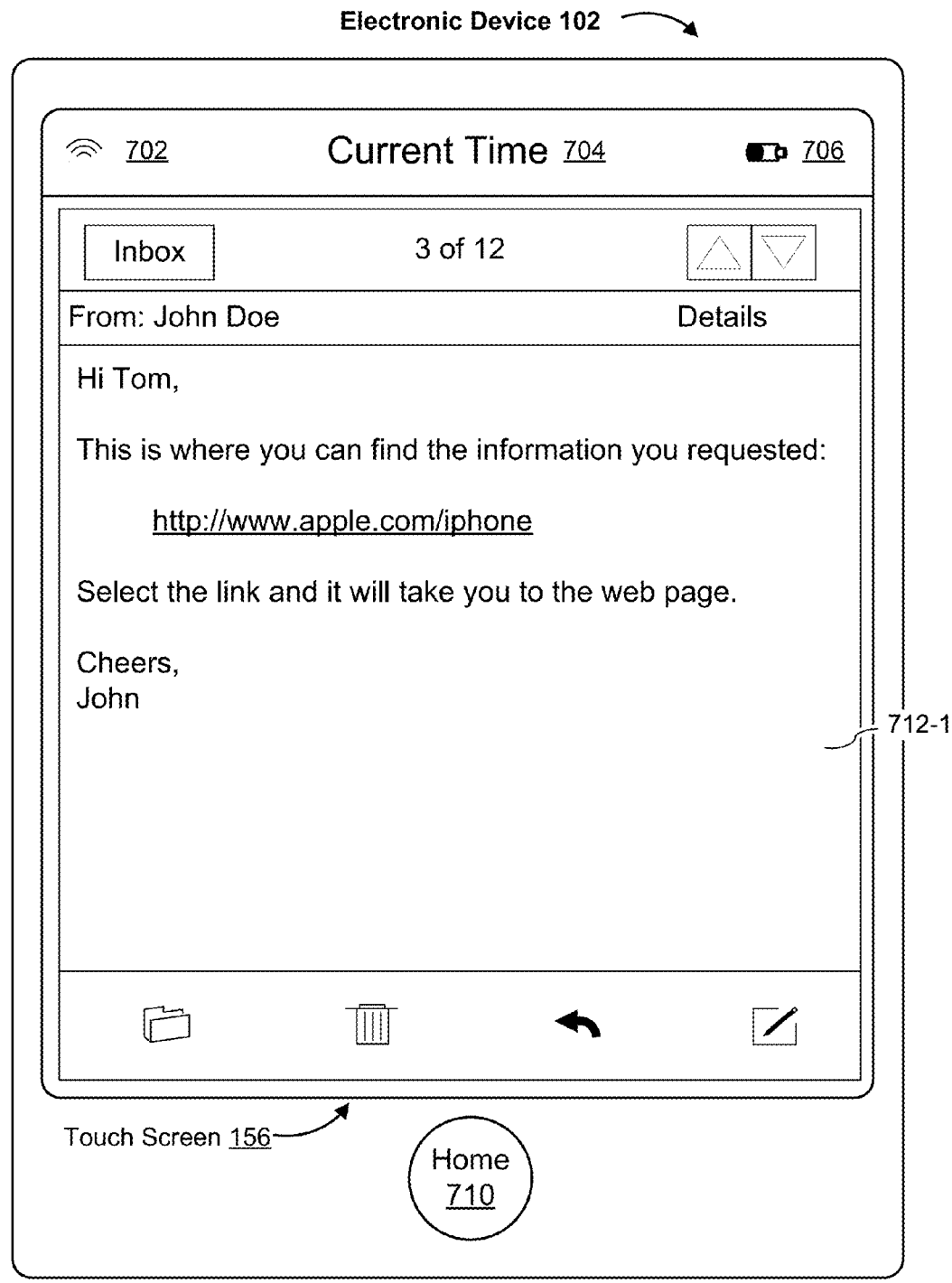

In FIG. 7B, in response to detecting the finger gesture 701 on application icon 5002-36, the email application is launched and email application view 712-1 is displayed on touch screen 156. A user may launch other applications in a similar manner. For example, a user may press home button 710 from any application view 712 to return to home screen 708 (FIG. 7A), and launch other applications with finger gestures on respective application icons 5002 on home screen 708.

Figure 7C:
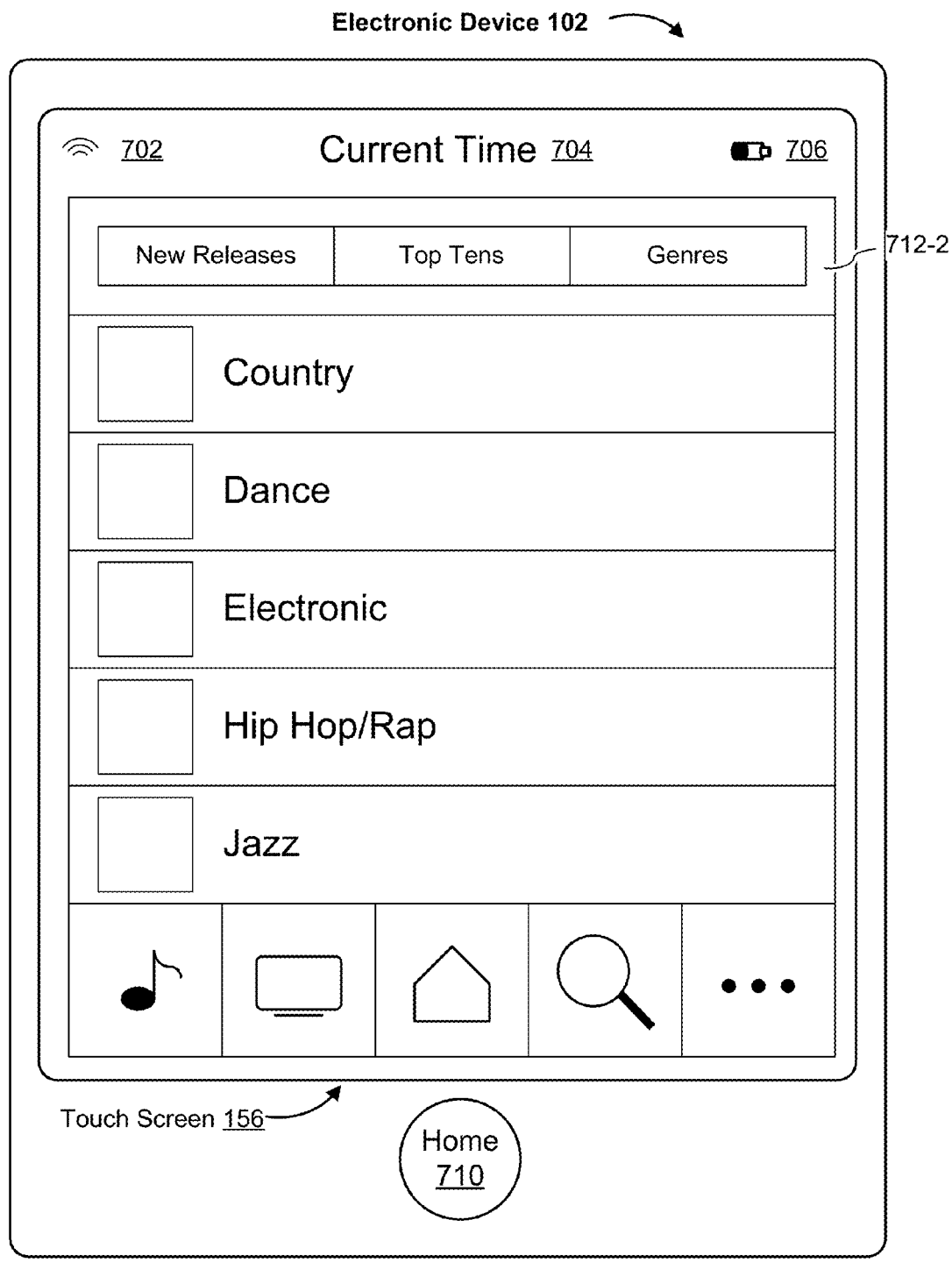
Figure 7D:
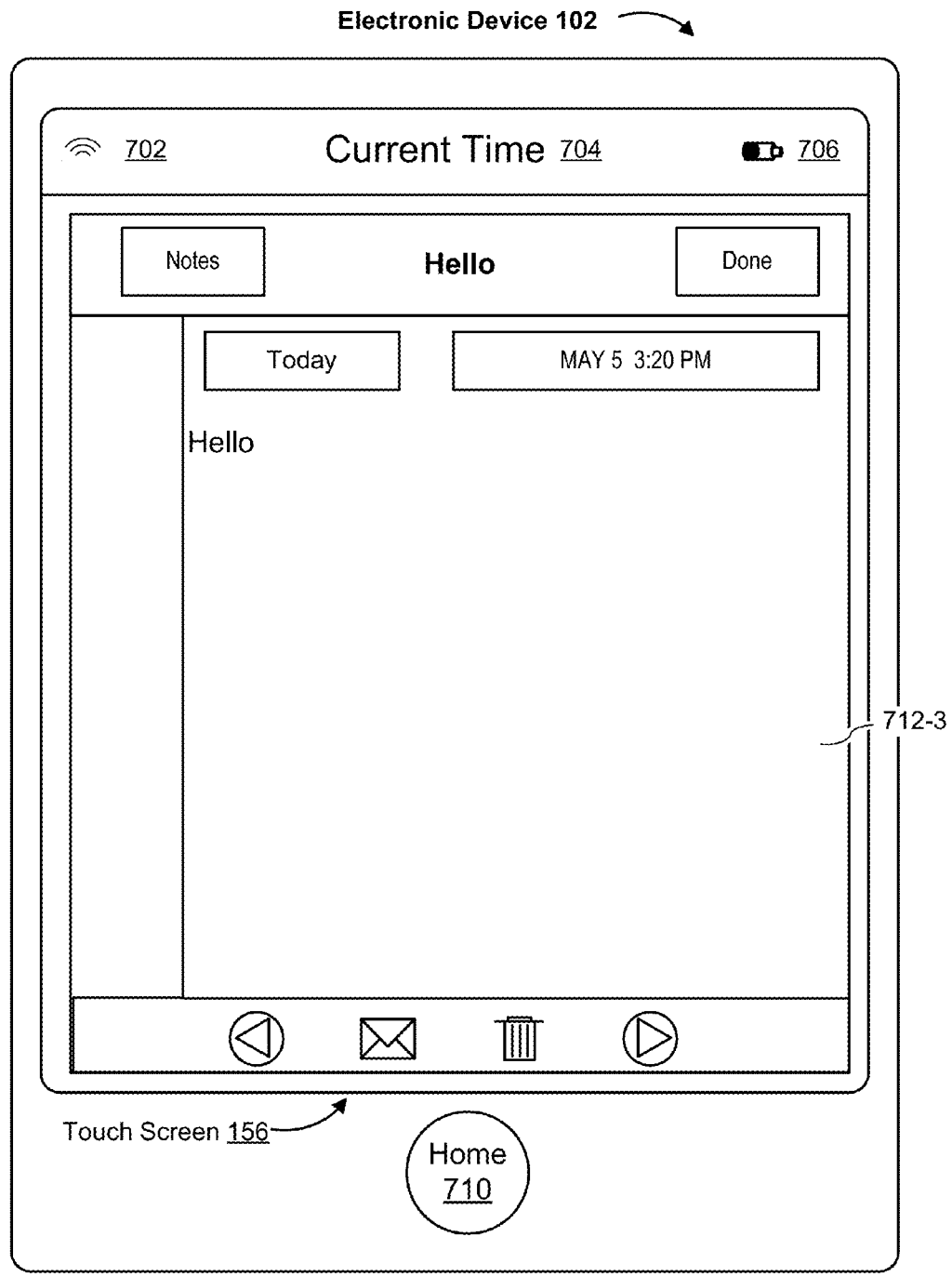
Figure 7E:
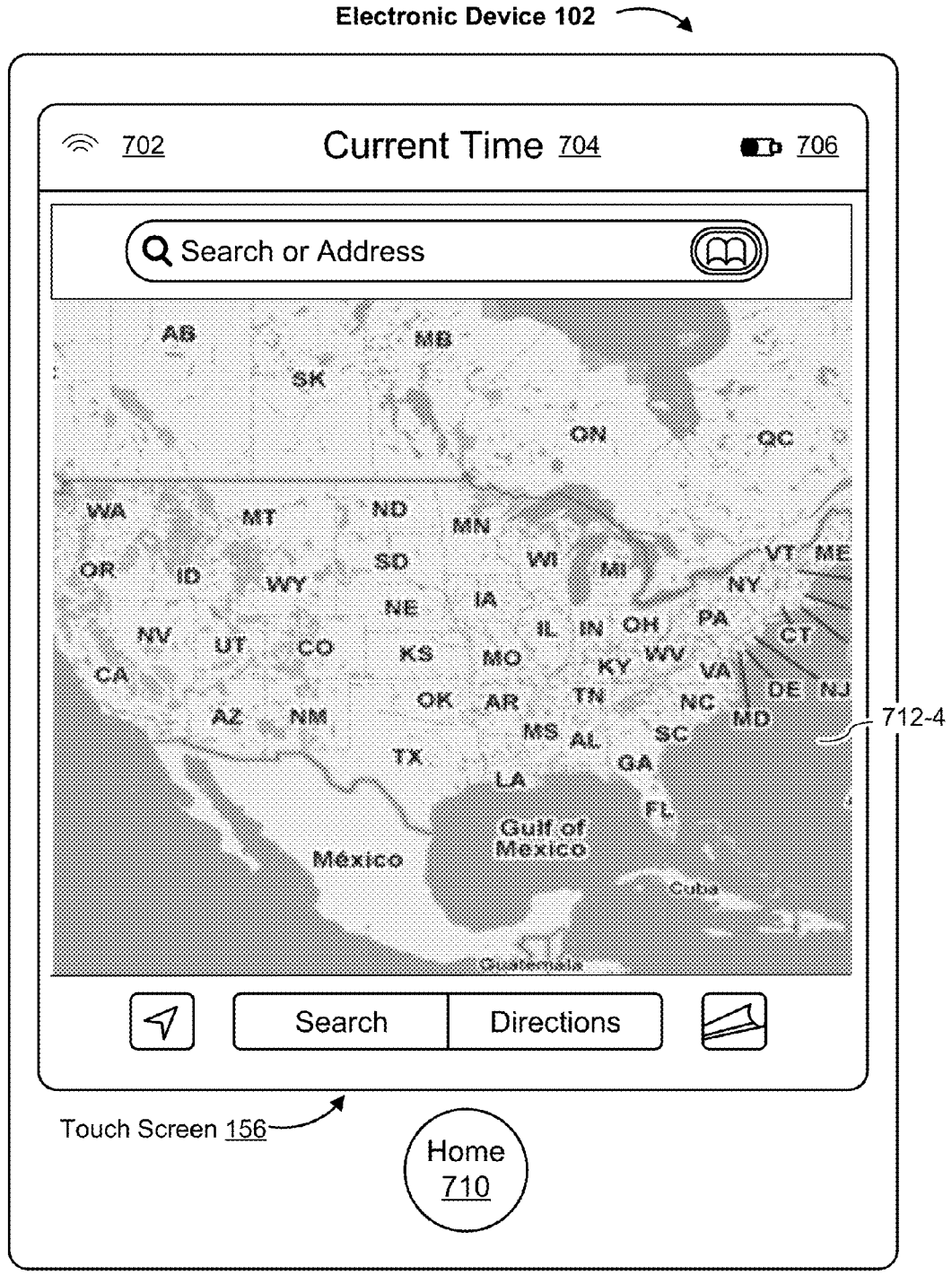
Figure 7F:
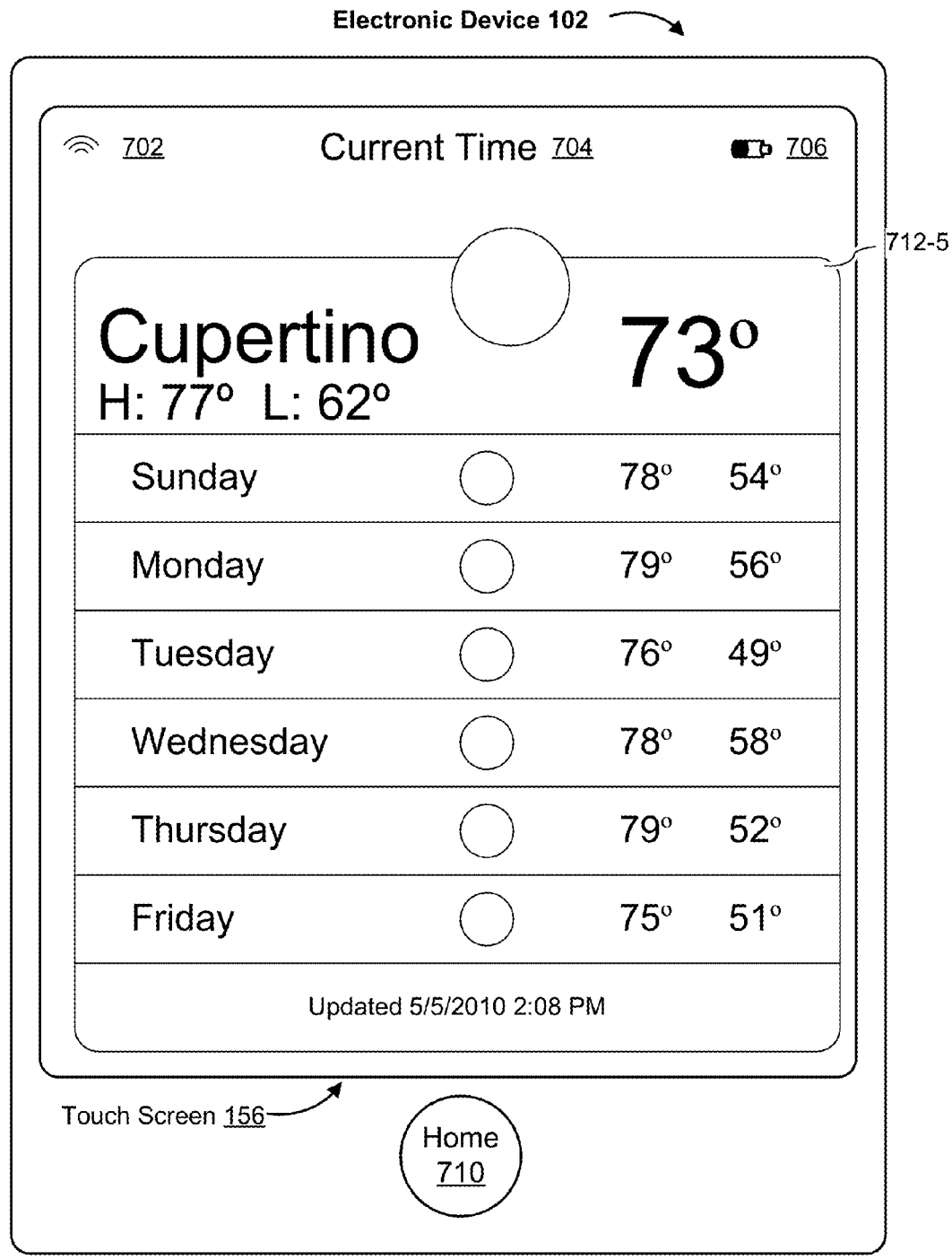
Figure 7G:
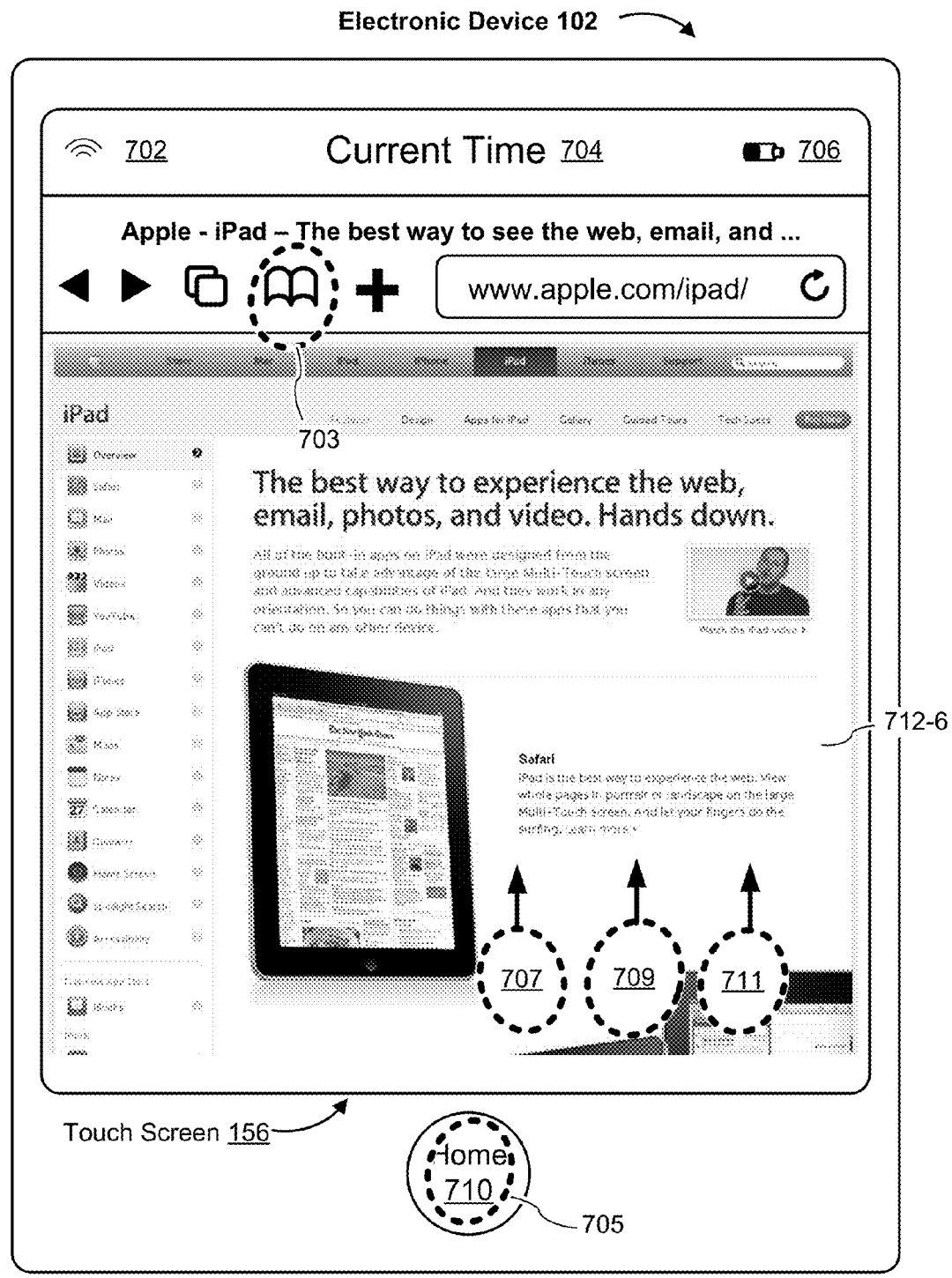

FIGS. 7C-7G illustrate that respective applications are sequentially launched in response to detecting respective finger gestures at locations corresponding to respective application icons 5002 on home screen 708, and that respective user interfaces (i.e., respective application views) are displayed in turn. In particular, FIG. 7C illustrates that media store application view 712-2 is displayed in response to a finger gesture on application icon 5002-32. In FIG. 7D, notes application view 712-3 is displayed in response to a finger gesture on application icon 5002-30. FIG. 7E illustrates that map application view 712-4 is displayed in response to a finger gesture on application icon 5002-27. In FIG. 7F, weather application view 712-5 is displayed in response to a finger gesture on application icon 5002-28. FIG. 7G illustrates that web browser application view 712-6 is displayed in response to a finger gesture on application icon 5002-37. In some embodiments, a sequence of open applications corresponds to the launching of an email application, a media store application, a notes application, a map application, a weather application, and a web browser application.

FIG. 7G also illustrates a finger gesture 703 (e.g., a tap gesture) on a user interface object (e.g., a bookmark icon). In some embodiments, in response to detecting the finger gesture 703 on the bookmark icon, the web browser application displays a list of bookmarks on touch screen 156. Similarly, a user may interact with a displayed application (e.g., the web browser application) with other gestures (e.g., a tap gesture on the address user interface object, which allows the user to type in a new address or modify the displayed address, typically with an on-screen keyboard; a tap gesture on any of links in the displayed web page, which initiates navigating to a web page corresponding to the selected link; etc.).

In FIG. 7G, a first predefined input (e.g., a double-click 705 on home button 710) is detected. Alternatively, a multi-finger swipe gesture (e.g., a three-finger swipe-up gesture as illustrated with movements of finger contacts 707, 709, and 711) is detected on touch screen 156.

Figure 7H:
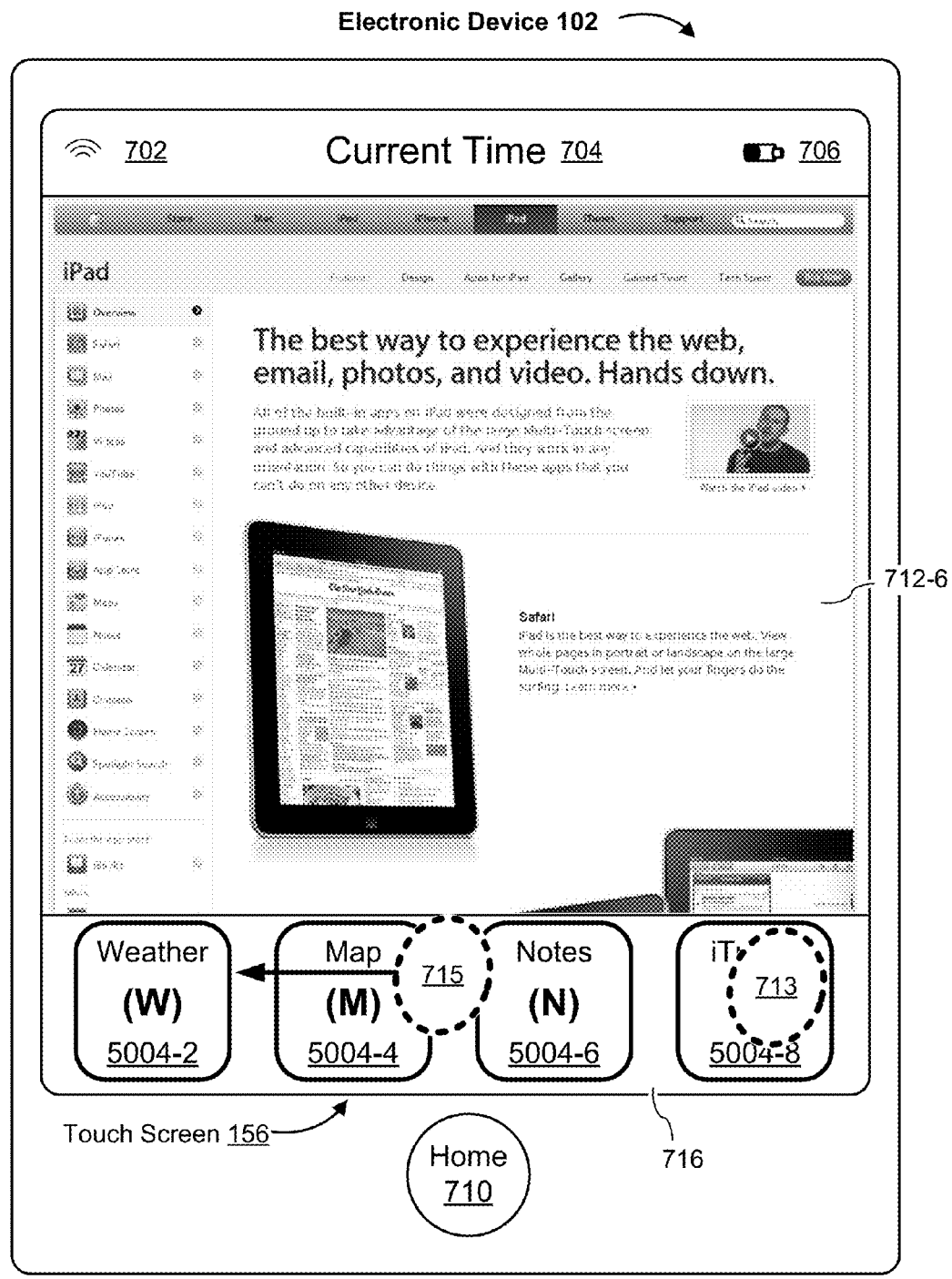

FIG. 7H illustrates that, in response to detecting the first predefined input (e.g., double-click 705 or the multi-finger swipe gesture including finger contacts 707, 709, and 711), a portion of web browser application view 712-6 and application icon area 716 are concurrently displayed. In some embodiments, in response to detecting the first predefined input, the device enters into an application view selection mode for selecting one of the concurrently open applications, and the portion of web browser application view 712-6 and application icon area 716 are concurrently displayed as part of the application view selection mode. Application icon area 716 includes a group of open application icons that correspond to at least some of the plurality of concurrently open applications. In this example, the portable electronic device has multiple applications that are concurrently open (e.g., the email application, the media store application, the notes application, the map application, the weather application, and the web browser application), although they are not all simultaneously displayed. As illustrated in FIG. 7H, application icon area 506 includes application icons (e.g., 5004-2, 5004-4, 5004-6, and 5004-8) for the weather application, the map application, the notes application, and the media store application (i.e., four applications that immediately follow the currently displayed application, the web browser application, in the sequence of open applications). In some embodiments, the sequence or order of open application icons displayed in application icon area 716 corresponds to the sequence of open applications in the predetermined sequence (e.g., weather, map, notes, and media store applications).

FIG. 7H also illustrates that gesture 713 (e.g., a tap gesture) is detected on open application icon 5004-8. In some embodiments, in response to detecting gesture 713, a corresponding application view (e.g., media store application view 712-2, FIG. 7C) is displayed.

Figure 7I:
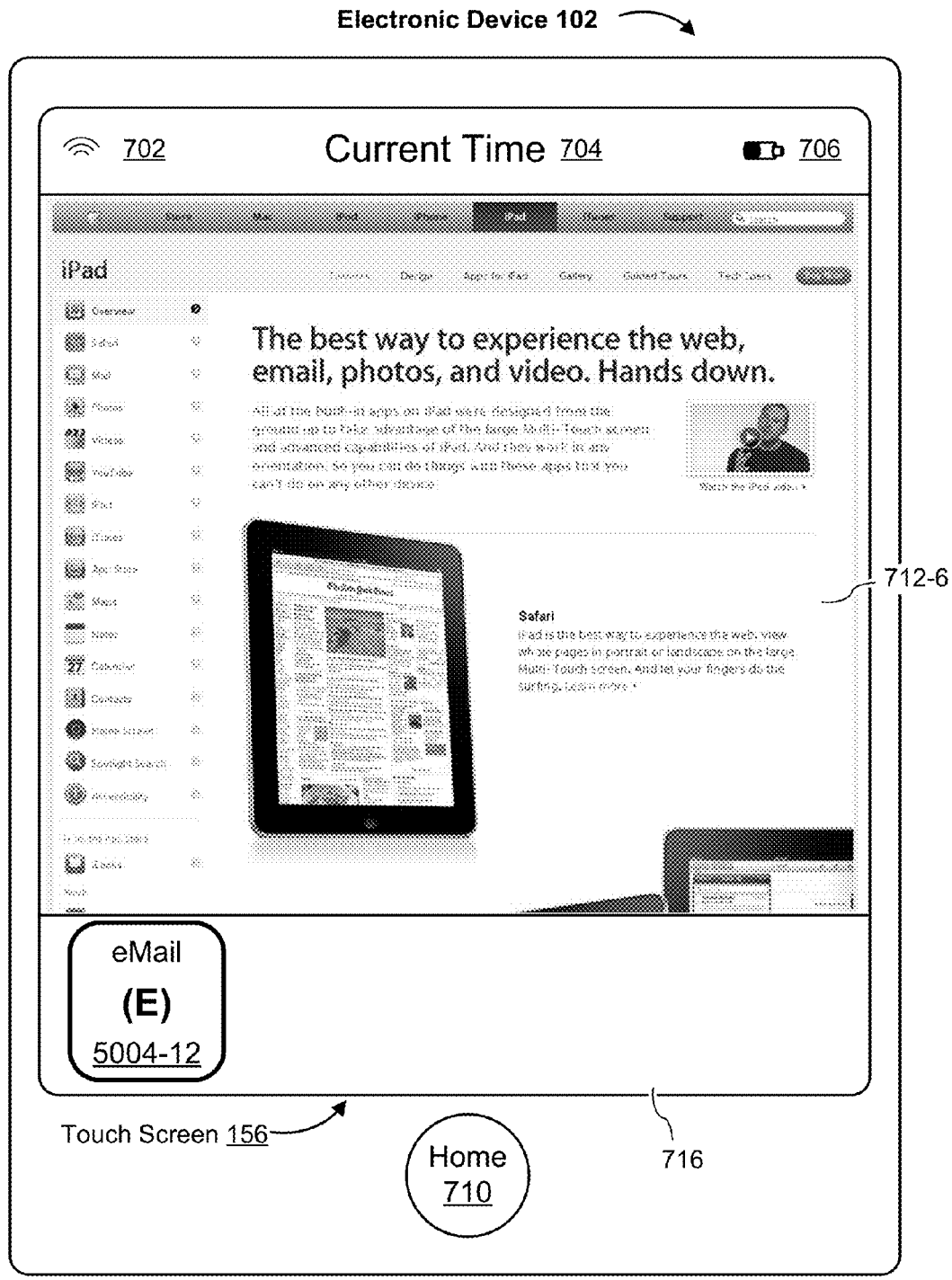

FIG. 7H illustrates that a left-swipe gesture 715 is detected at a location corresponding to application icon area 716. In FIG. 7I, in response to detecting left-swipe gesture 715, the application icons (e.g., 5004-2, 5004-4, 5004-6, and 5004-8) in application icon area 716 are scrolled. As a result of scrolling, application icon 5004-12 for the email application is displayed in application icon area 506 instead of previously displayed application icons (e.g., 5004-2, 5004-4, 5004-6, and 5004-8).

Figure 7J:
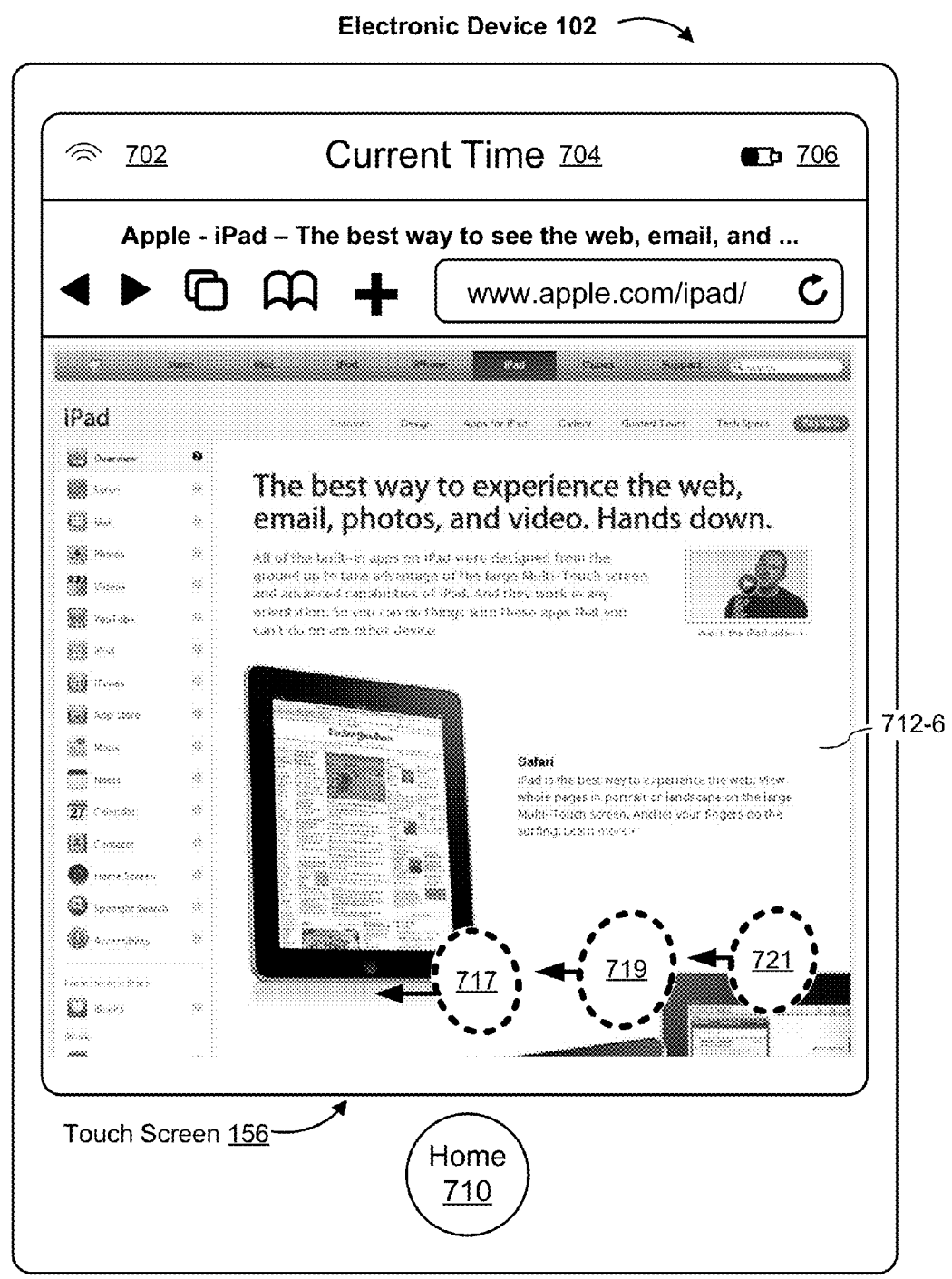
Figure 7K:
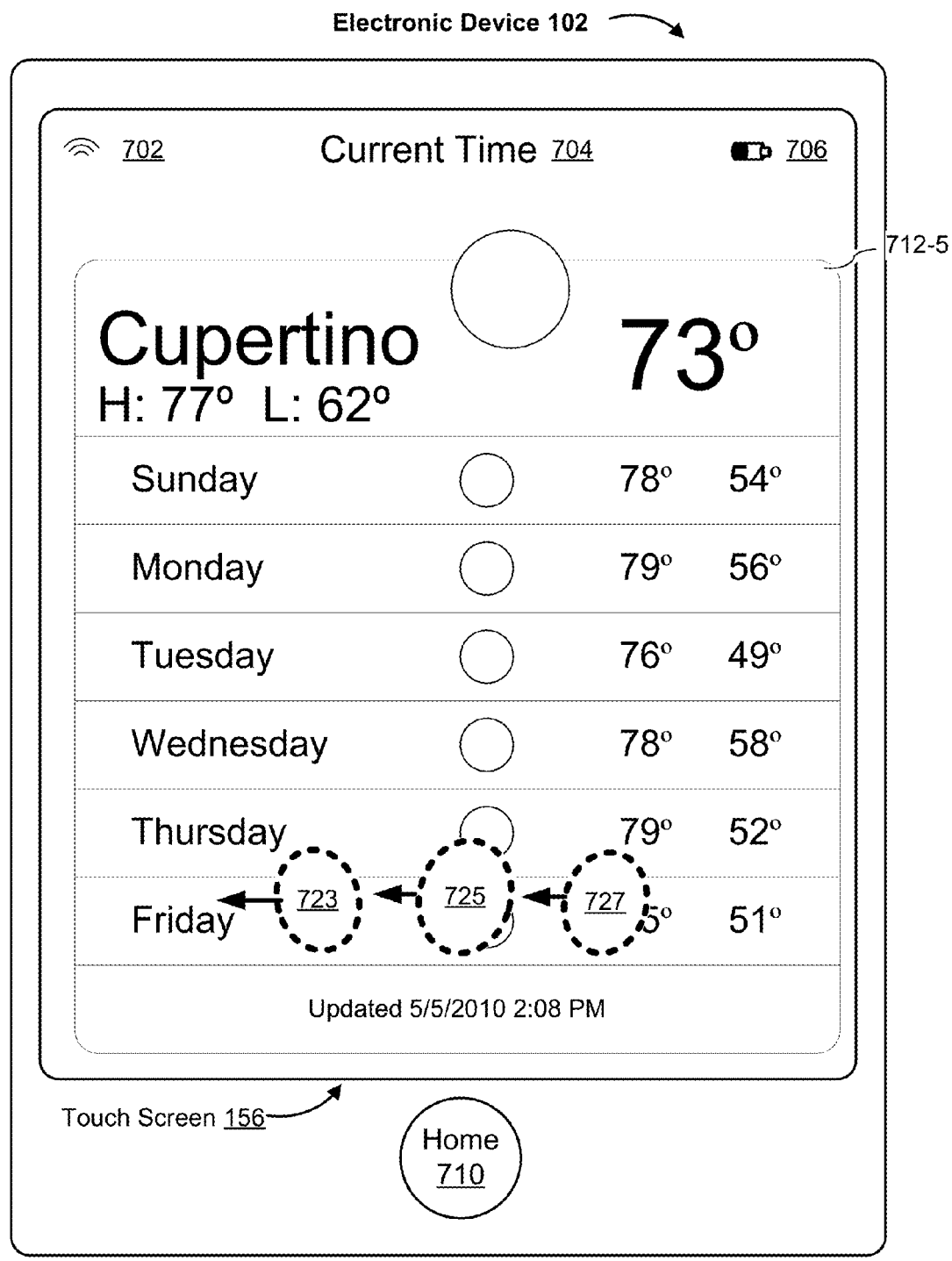

In FIG. 7J, a gesture of a first type (e.g., a multi-finger left-swipe gesture including movements of finger contacts 717, 719, and 721) is detected on web browser application view 712-6. FIG. 7K illustrates that, in response to detecting the gesture of the first type, weather application view 712-5 is displayed on touch screen 156. It should be noted that the weather application is next to the web browser application in the sequence of open applications.

Figure 7L:
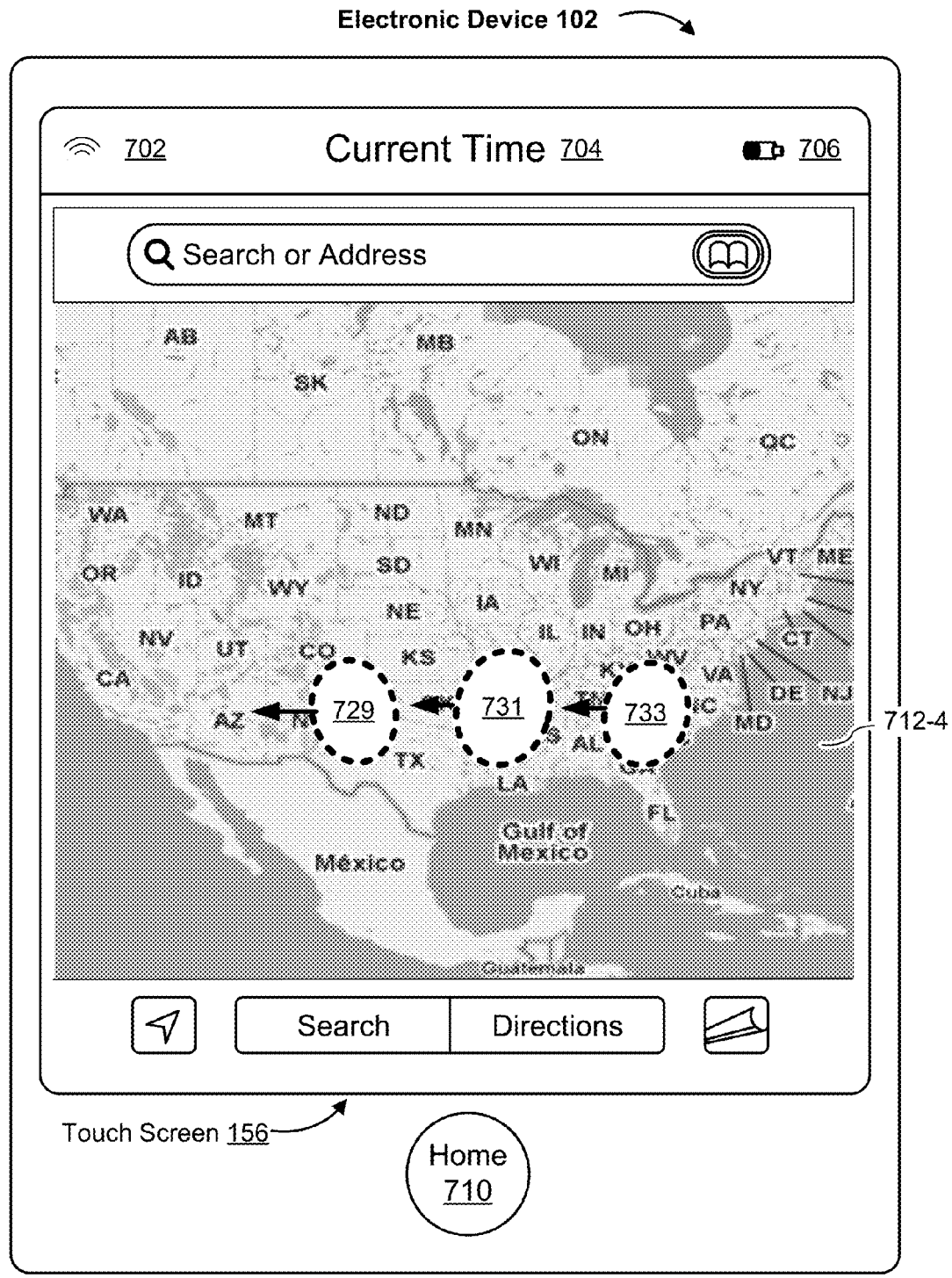

FIG. 7K also illustrates that a second gesture of the first type (e.g., a multi-finger left-swipe gesture including movements of finger contacts 723, 725, and 727) is detected on weather application view 712-5. FIG. 7L illustrates that, in response to detecting the second gesture of the first type, map application view 712-4 is displayed on touch screen 156. It should be noted that the map application is next to the weather application in the sequence of open applications.

Figure 7M:
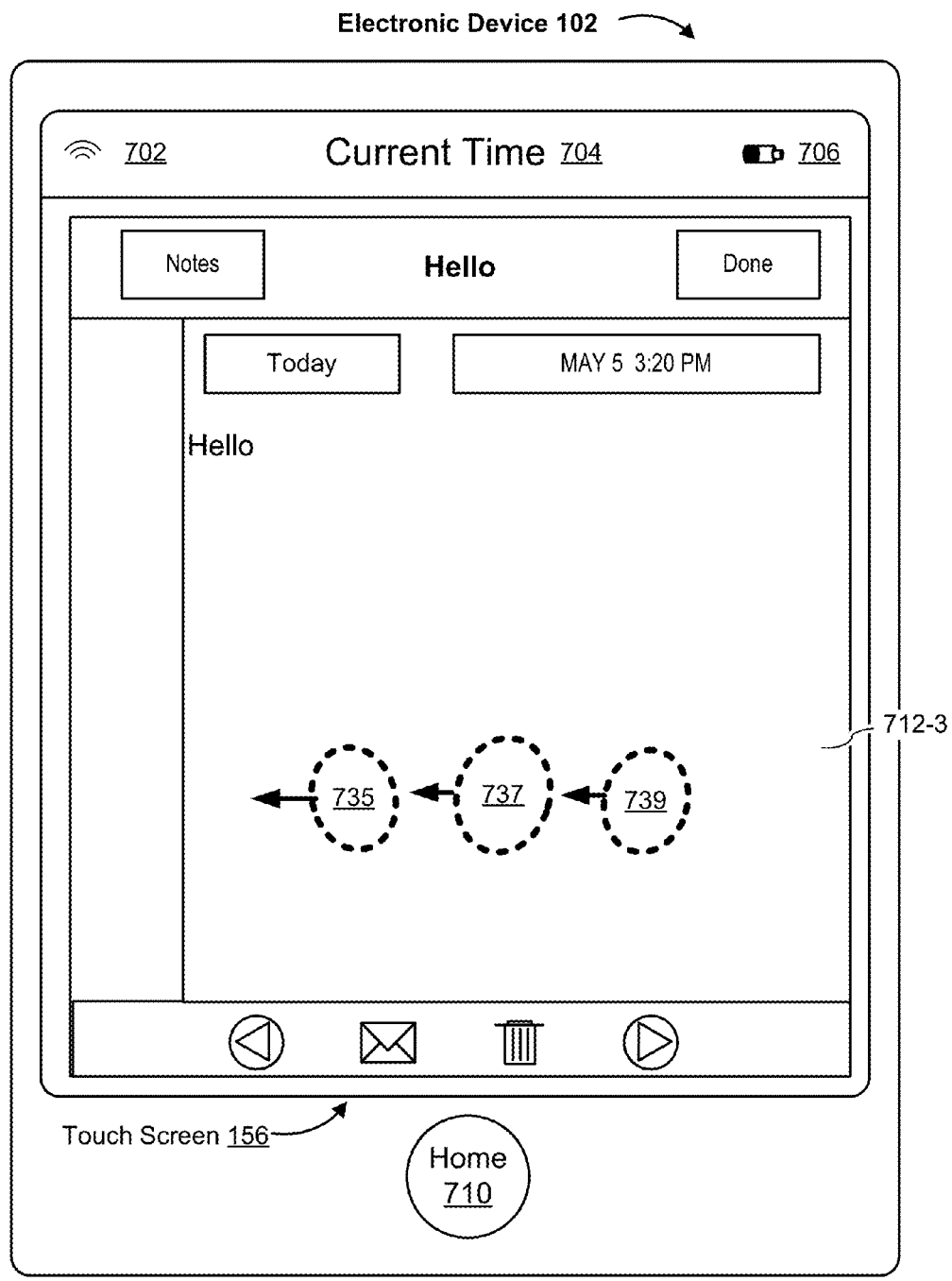

FIG. 7L also illustrates that a third gesture of the first type (e.g., a multi-finger left-swipe gesture including movements of finger contacts 729, 731, and 733) is detected on map application view 712-4. FIG. 7M illustrates that, in response to detecting the third gesture of the first type, notes application view 712-3 is displayed on touch screen 156. It should be noted that the notes application is next to the map application in the sequence of open applications.

Figure 7N:
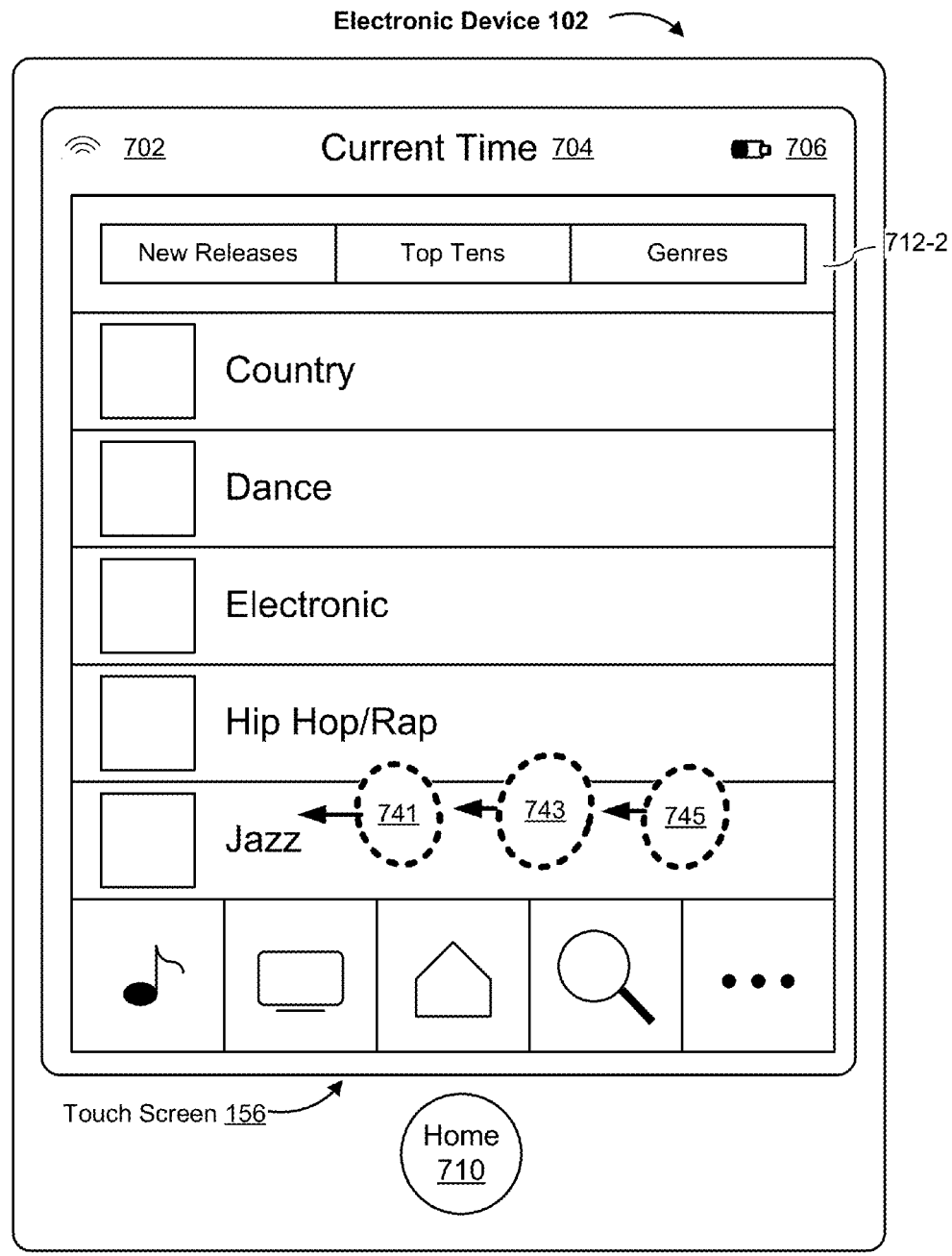

FIG. 7M also illustrates that a fourth gesture of the first type (e.g., a multi-finger left-swipe gesture including movements of finger contacts 735, 737, and 739) is detected on notes application view 712-3. FIG. 7N illustrates that, in response to detecting the fourth gesture of the first type, media store application view 712-2 is displayed on touch screen 156. It should be noted that the media store application is next to the notes application in the sequence of open applications.

Figure 7O:
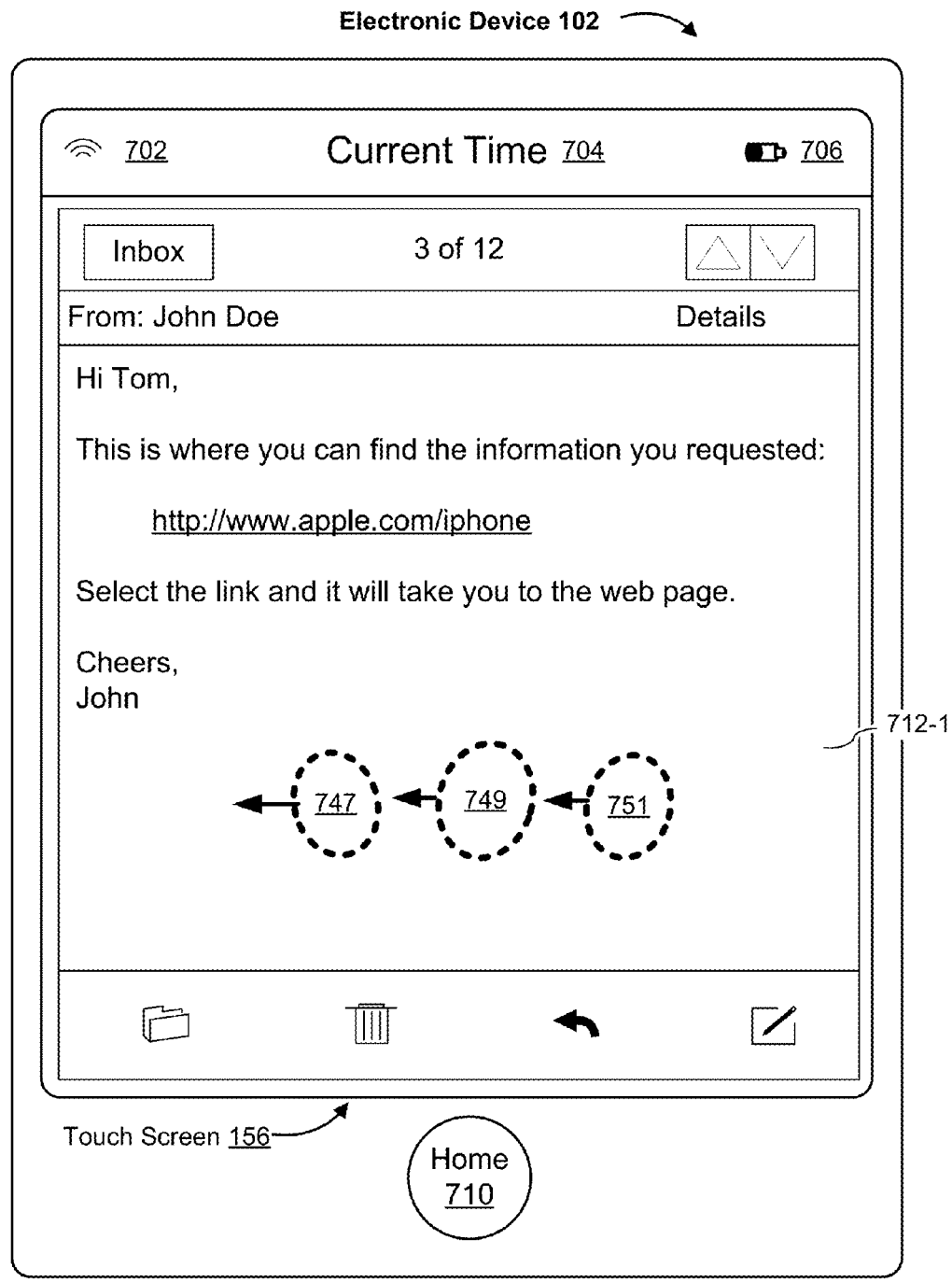

FIG. 7N also illustrates that a fifth gesture of the first type (e.g., a multi-finger left-swipe gesture including movements of finger contacts 741, 743, and 745) is detected on media store application view 712-2. FIG. 7O illustrates that, in response to detecting the fifth gesture of the first type, email application view 712-1 is displayed on touch screen 156. It should be noted that the email application is next to the media store application in the sequence of open applications.

Figure 7P:
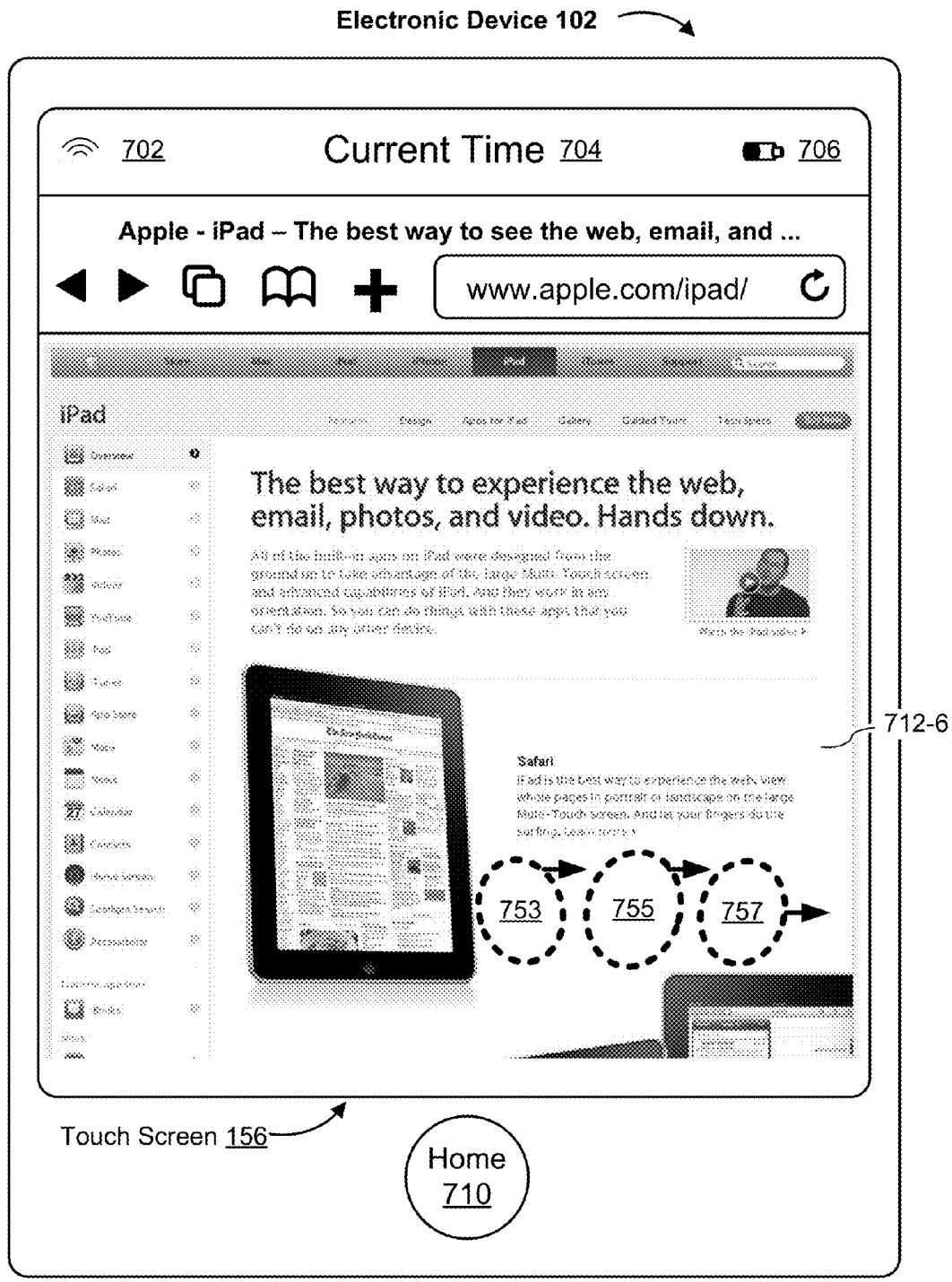

FIG. 7O also illustrates that a sixth gesture of the first type (e.g., a multi-finger left-swipe gesture including movements of finger contacts 747, 749, and 751) is detected on email application view 712-1. FIG. 7P illustrates that, in response to detecting the sixth gesture of the first type, web browser application view 712-6 is displayed on touch screen 156. It should be noted that the web browser application is on one end of the sequence of open applications, and the email application is on the opposite end of the sequence of open applications.

Figure 7Q:
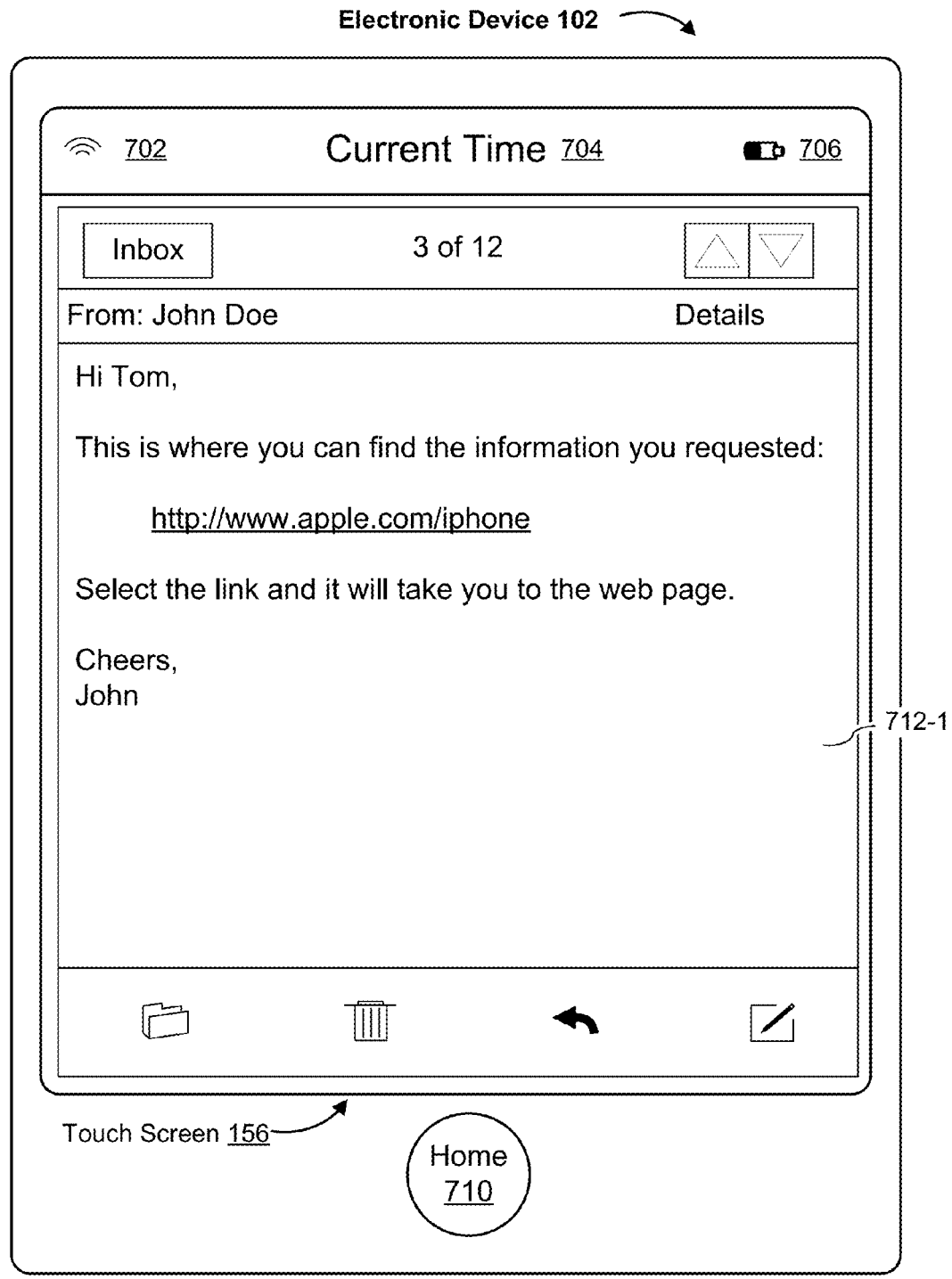

FIG. 7P also illustrates that a gesture of a second type (e.g., a multi-finger right-swipe gesture including movements of finger contacts 753, 755, and 757) is detected on web browser application view 712-6. FIG. 7Q illustrates that, in some embodiments, in response to detecting the gesture of the second type, email application view 712-1 is displayed on touch screen 156.

Figure 7R:
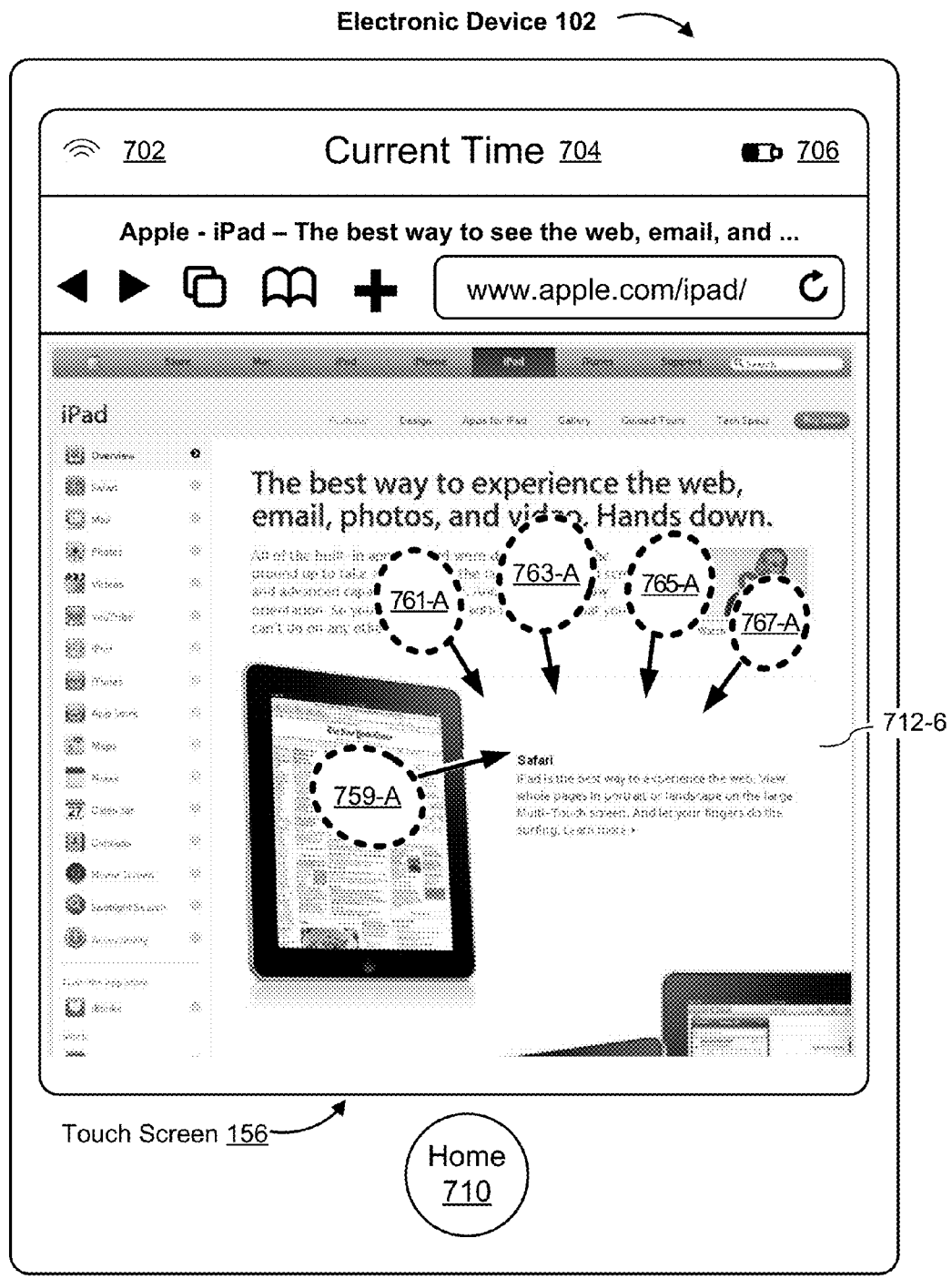
Figure 7S:
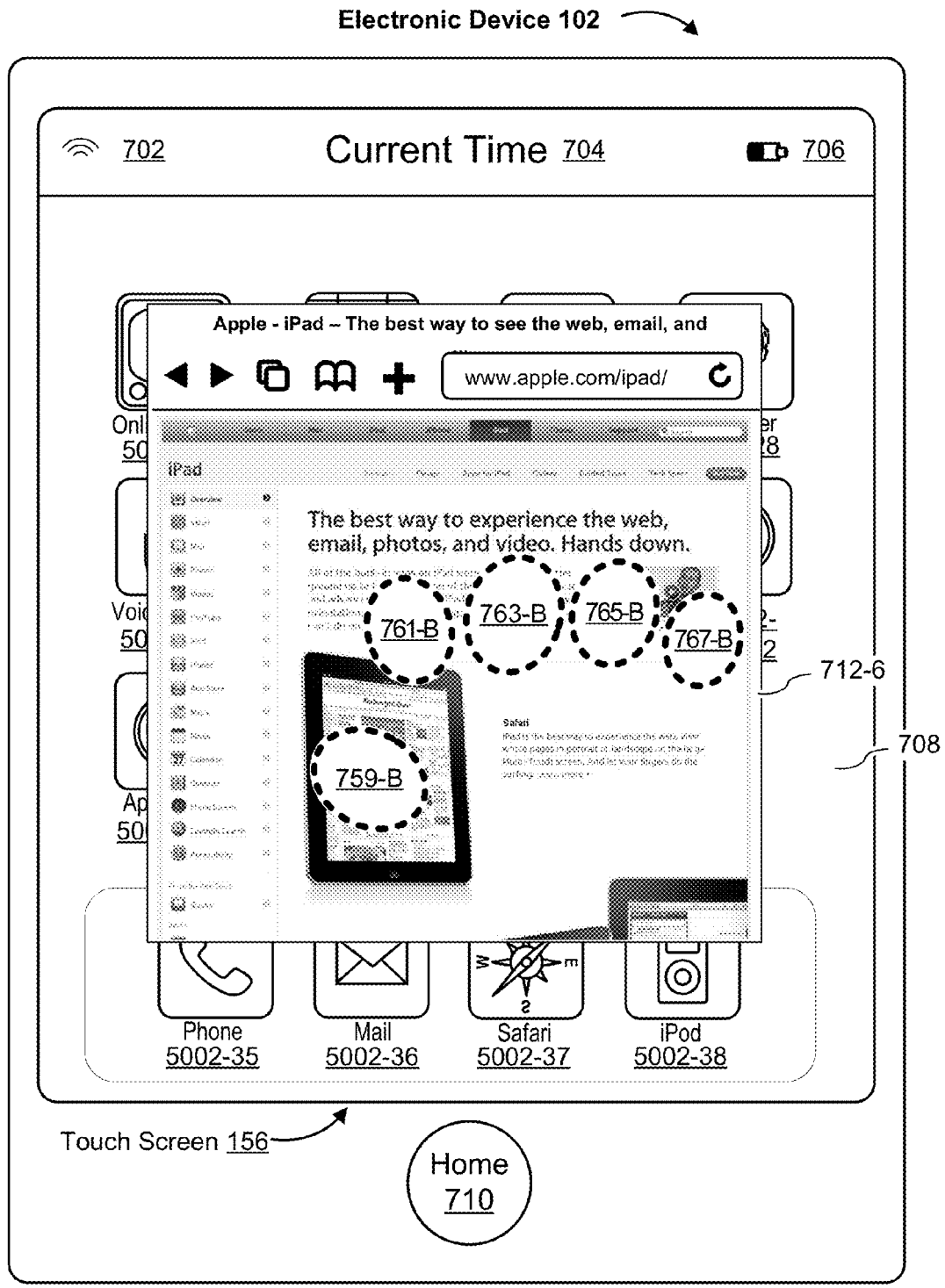

Referring to FIG. 7R, a multi-finger gesture (e.g., a five-finger pinch gesture including movements of finger contacts 759, 761, 763, 765, and 767) is detected on web browser application view 712-6. FIG. 7S illustrates that, while detecting the multi-finger gesture on touch screen 156, web browser application view 712-6 and at least a portion of home screen 708 are concurrently displayed. As illustrated, web browser application view 712-6 is displayed at a reduced scale. The reduced scale is adjusted in accordance with the multi-finger gesture while the multi-finger gesture is detected on the touch screen 156. For example, the reduced scale decreases with further pinching of finger contacts 759, 761, 763, 765, and 767 (i.e., web browser application view 712-6 is displayed at a smaller scale).

Alternatively, the reduced scale increases with depinching of finger contacts 759, 761, 763, 765, and 767 (i.e., web browser application view 712-6 is displayed at a larger scale than before).

In some embodiments, when the multi-finger gesture ceases to be detected, web browser application view 712-6 ceases to be displayed, and the entire home screen 708 is displayed. Alternatively, when the multi-finger gesture ceases to be detected, it is determined whether the entire home screen 708 is to be displayed or web browser application view 712-6 is to be displayed at a full-screen scale. In some embodiments, the determination is made based on the reduced scale when the multi-finger gesture ceases to be displayed (e.g., if the application view is displayed at a scale smaller than a predefined threshold when the multi-finger gesture ceases to be detected, the entire home screen 708 is displayed; if the application view is displayed at a scale larger than the predefined threshold when the multi-finger gesture ceases to be detected, the application view is displayed at a full-screen scale without a display of home screen 708). In some embodiments, the determination is made also based on the speed of the multi-finger gesture.

FIGS. 8A and 8B are flow diagrams illustrating event recognition method 800 in accordance with some embodiments. Method 800 is performed (802) at an electronic device with a touch-sensitive display (e.g., device 102, FIG. 1B). The electronic device is configured to execute at least a first software application and a second software application. The first software application includes a first set of one or more gesture recognizers, and the second software application includes one or more views and a second set of one or more gesture recognizers (e.g., application 133-2 has gesture recognizer 516-4, and application 133-1 has gesture recognizers 516-1 through 516-3 and views 508, 510, and 512, FIG. 3F). Respective gesture recognizers have corresponding gesture handlers (e.g., gesture handler 552-1 corresponds to gesture recognizer 516-1 and gesture handler 552-3 corresponds to gesture recognizer 516-4). The first set of one or more gesture recognizers is typically different from the second set of one or more gesture recognizers.

Method 800 allows a user to control with a gesture a hidden open application that is not currently displayed on a display of the electronic device (e.g., the first software application), such as a background application, a suspended application, or a hibernated application. Thus, the user can perform operations that are not provided by the application currently displayed on the display of the electronic device (e.g., the second software application) but are provided by one of the currently open applications (e.g., displaying a home screen or switching to a next software application using gestures for a hidden application launcher software application).

In some embodiments, the first software application is (804) an application launcher (e.g., a springboard). For example, as shown in FIG. 7A, the application launcher displays a plurality of application icons 5002 that correspond to a plurality of applications. The application launcher receives a user-selection of an application icon 5002 (e.g., based on a finger gesture on touch screen 156), and in response to receiving the user-selection, launches an application corresponding to the selected application icon 5002.

The second software application is typically a software application launched by the application launcher. As illustrated in FIGS. 7A and 7B, the application launcher receives information about tap gesture 701 on email application icon 5002-36, and launches an email application. In response, the email application displays email application view 712-1 on touch screen 156. The second application may be any application that corresponds to application icons 5002 (FIG. 7A) or any other application that can be launched by the application launcher (e.g., media store application, FIG. 7C; notes application, FIG. 7D; map application, FIG. 7E; weather application, 7F; web browser application, FIG. 7G; etc.). In the following description of method 800, an application launcher is used as an exemplary first software application and a web browser application is used as an exemplary second software application.

In some embodiments, the electronic device has only two software applications in the programmatic hierarchy: an application launcher and one other software application (typically a software application corresponding to one or more views displayed on touch screen 156 of electronic device 102).

In some embodiments, the first software application is (806) an operating system application. As used herein, an operating system application refers to an application that is integrated with an operating system 118 (FIGS. 1A-1C). An operating system application typically resides in core OS level 208 or operating system API software 206 in FIG. 2. An operating system application is typically not removable by a user, whereas other applications typically may be installed or removed by the user. In some embodiments, the operating system application includes the application launcher. In some embodiments, the operating system application includes a settings application (e.g., an application for displaying/modifying system settings or one or more values in device/global internal state 134, FIG. 1C). In some embodiments, the operating system application includes accessibility module 127. In some embodiments, the electronic device has only three software applications in the programmatic hierarchy: an application launcher, a settings application, and one other application (typically a software application corresponding to one or more views displayed on touch screen 156 of electronic device 102).

The electronic device displays (808) at least a subset of the one or more views of the second software application (e.g., web browser application view 712-6, FIG. 7G).

In some embodiments, the displaying includes (810) displaying at least a subset of the one or more views of the second software application without displaying any view of the first software application. For example, in FIG. 7G, no view of the application launcher (e.g., home screen 708) is displayed.

In some embodiments, the displaying includes (812) displaying at least a subset of the one or more views of the second software application without displaying a view of any other application. For example, in FIG. 7G, only one or more views of the web browser application are displayed.

While displaying at least the subset of the one or more views of the second software application, the electronic device detects (814) a sequence of touch inputs on the touch-sensitive display (e.g., gesture 703, which includes a touch-down event and a touch-up event; or another gesture, which includes touch-down of finger contacts 707, 709, and 711, movements of finger contacts 707, 709, and 711 across touch screen 156, and lift-off of finger contacts 707, 709, and 711). The sequence of touch inputs includes a first portion of one or more touch inputs and a second portion of one or more touch inputs subsequent to the first portion. As used herein, the term "sequence" refers to the order in which one or more touch events happens. For example, in the sequence of touch inputs including finger contacts 707, 709, and 711, the first portion may include the touch-down of finger contacts 707, 709, and 711, and the second portion may include the movements of finger contacts 707, 709, and 711, and lift-off of finger contacts 707, 709, and 711.

In some embodiments, the detecting occurs (816) while touch inputs in the first portion of one or more touch inputs at least partially overlap at least one of the displayed views of the second software application. In some embodiments, even though the touch inputs at least partially overlap at least one of the displayed views of the second software application, the first software application receives the first portion of one or more touch inputs. For example, the application launcher receives the first portion of touch inputs on the displayed views of the web browser (FIG. 7G), even though the application launcher is not displayed.

During a first phase of detecting the sequence of touch inputs (818), the electronic device delivers (820) the first portion of one or more touch inputs to the first software application and the second software application (e.g., using event dispatcher module 315, FIG. 3D), identifies (822) from gesture recognizers in the first set, one or more matching gesture recognizers that recognize the first portion of one or more touch inputs (e.g., using event comparator 3033 in each gesture recognizer (typically, each receiving gesture recognizer) in the first set, FIG. 3D), and processes (824) the first portion of one or more touch inputs with one or more gesture handlers corresponding to the one or more matching gesture recognizers (e.g., activating corresponding event handler(s) 319, FIG. 3D).

In some embodiments, the first phase of detecting the sequence of touch inputs is a phase of detecting the first portion of one or more touch inputs.

Regarding the delivering operation (820), in some embodiments, the first software application, after receiving the first portion of one or more inputs, delivers the first portion of one or more touch inputs to at least a subset of gesture recognizers in the first set, and the second software application, after receiving the first portion of one or more inputs, delivers the first portion of one or more touch inputs to at least a subset of gesture recognizers in the second set. In some embodiments, the electronic device or an event dispatcher module (e.g., 315, FIG. 3D) in the electronic device delivers the first portion of one or more touch inputs to at least a subset of gesture recognizers in the first set and the second set (e.g., event dispatcher module 315 delivers the first portion of one or more touch inputs to gesture recognizers 516-1, 516-2, and 516-4, FIG. 3F).

For example, when the finger gesture including finger contacts 707, 709, and 711 is detected on touch screen 156 (FIG. 7G), the touch-down event is delivered to one or more gesture recognizers of the application launcher and one or more gesture recognizers of the web browser application. In another example, a touch-down event of tap gesture 703 (FIG. 7G) is delivered to one or more gesture recognizers of the application launcher and one or more gesture recognizers of the web browser application.

In some embodiments, when no gesture recognizer in the first set recognizes the first portion of one or more touch inputs (e.g., a mismatch between detected events and the gesture definition or the gesture is not completed), processing the first portion of one or more touch inputs includes performing a null operation (e.g., the device does not update the displayed user interface).

In some embodiments, the electronic device identifies from gesture recognizers in the second set, one or more matching gesture recognizers that recognize the first portion of one or more touch inputs. The electronic device processes the first portion of one or more touch inputs with one or more gesture handlers corresponding to the one or more matching gesture recognizers. For example, in response to tap gesture 703 (FIG. 7G) delivered to one or more gesture recognizers of the web browser application, a matching gesture recognizer in the web browser application (e.g., a gesture recognizer that recognizes a tap gesture on the bookmark icon, FIG. 7G) processes tap gesture 703 by displaying a list of bookmarks on touch screen 156.

In some embodiments, during a second phase of detecting the sequence of touch inputs, subsequent to the first phase, the electronic device delivers (826, FIG. 8B) the second portion of one or more touch inputs to the first software application without delivering the second portion of one or more touch inputs to the second software application (e.g., using event dispatcher module 315, FIG. 3D), identifies from the one or more matching gesture recognizers a second matching gesture recognizer that recognizes the sequence of touch inputs (e.g., using event comparator 3033 in each matching gesture recognizer, FIG. 3D), and processes the sequence of touch inputs with a gesture handler corresponding to the respective matching gesture recognizer. In some embodiments, the second phase of detecting the sequence of touch inputs is a phase of detecting the second portion of one or more touch inputs.

For example, when the finger gesture including finger contacts 707, 709, and 711 is detected on touch screen 156 (FIG. 7G), the touch movement and lift-off events are delivered to one or more gesture recognizers of the application launcher without delivering the touch events to the web browser application. The electronic device identifies a matching gesture recognizer (e.g., a three-finger swipe-up gesture recognizer) of the application launcher, and processes the sequence of touch inputs with a gesture handler corresponding to the three-finger swipe-up gesture recognizer.

The second software application does not receive the second portion of one or more touch inputs during the second phase, typically because the first software application has a priority over the second software application (e.g., in the programmatic hierarchy). Thus, in some embodiments, when a gesture recognizer in the first software application recognizes the first portion of one or more touch inputs, the one or more gesture recognizers in the first software application exclusively receive the second subsequent portion of one or more touch inputs. In addition, the second software application may not receive the second portion of one or more touch inputs during the second phase, because no gesture recognizer in the second software application matches the first portion of one or more touch inputs.

In some embodiments, processing the sequence of touch inputs with the gesture handler corresponding to the respective matching gesture recognizer includes (834) displaying in a first predefined area of the touch-sensitive display a group of open application icons that correspond to at least some of a plurality of concurrently open applications, and concurrently displaying at least a subset of the one or more views of the second software application. For example, in FIG. 7H, application icons 5004 in predefined area 716 corresponds to concurrently open applications of the electronic device. In some embodiments, application icons 5004 in predefined area 716 are displayed in accordance with a sequence of open applications. In FIG. 7H, the electronic device concurrently displays predefined area 716 and a subset of web browser application view 712-6.

In some embodiments, processing the sequence of touch inputs with the gesture handler corresponding to the respective matching gesture recognizer includes (828) displaying one or more views of the first software application. For example, in response to a multi-finger pinch gesture (FIG. 7R), the electronic device displays home screen 708 (FIG. 7A). In some embodiments, displaying the one or more views of the first software application includes displaying the one or more views of the first software application without concurrently displaying a view corresponding to any other software application (e.g., FIG. 7A).

In some embodiments, processing the sequence of touch inputs with the gesture handler corresponding to the respective matching gesture recognizer includes (830) replacing the display of the one or more views of the second software application with display of one or more views of the first software application (e.g., displaying home screen 708, FIG. 7A). Thus, the one or more views of the second software application ceases to be displayed after the one or more views of the first software application are displayed. In some embodiments, replacing the display of the one or more views of the second software application with display of one or more views of the first software application includes displaying the one or more views of the first software application without concurrently displaying a view corresponding to any other software application (FIG. 7A).

In some embodiments, the electronic device concurrently executes (832) the first software application, the second software application, and a third software application. In some embodiments, processing the sequence of touch inputs with the gesture handler corresponding to the respective matching gesture recognizer includes replacing the one or more displayed views of the second software application with one or more views of the third software application. For example, in response to a multi-finger swipe gesture, the electronic device replaces the display of web browser application view 712-6 with a display of weather application view 712-5 (FIGS. 7J-7K). In some embodiments, replacing the one or more displayed views of the second software application with one or more views of the third software application includes displaying the one or more views of the third software application without concurrently displaying a view corresponding to any other software application. In some embodiments, the third software application is next to the second software application in the sequence of open applications.

In some embodiments, processing the sequence of touch inputs with the gesture handler corresponding to the respective matching gesture recognizer includes launching a settings application. For example, in response to a ten-finger tap gesture, the electronic device launches the settings application.

Note that details of the processes described above with respect to method 800 are also applicable in an analogous manner to method 900 described below. For brevity, these details are not repeated below.

FIGS. 9A-9C are flow diagrams illustrating event recognition method 900 in accordance with some embodiments. Method 900 is performed (902) at an electronic device with a touch-sensitive display. The electronic device is configured to execute at least a first software application and a second software application. The first software application includes a first set of one or more gesture recognizers, and the second software application includes one or more views and a second set of one or more gesture recognizers. Respective gesture recognizers have corresponding gesture handlers. In some embodiments, the first set of one or more gesture recognizers is different from the second set of one or more gesture recognizers.

Method 900 allows a user to control with a gesture a hidden open application that is not currently displayed on a display of the electronic device (e.g., the first software application), such as a background application, a suspended application, or a hibernated application Thus, the user can perform operations that are not provided by the application currently displayed on the display of the electronic device (e.g., the second software application) but are provided by one of the currently open applications (e.g., displaying a home screen or switching to a next software application using gestures for a hidden application launcher software application).

In some embodiments, the first software application is (904) an application launcher (e.g., a springboard). In some embodiments, the first software application is (906) an operating system application. In the following description of method 900, an application launcher is used as an exemplary first software application and a web browser application is used as an exemplary second software application.

The electronic device displays (908) a first set of one or more views (e.g., web browser application view 712-6, FIG. 7G). The first set of one or more views includes at least a subset of the one or more views of the second software application. For example, the second software application may have a plurality of application views (e.g., application views 317 of application 133-1, FIG. 3D), and the electronic device displays at least one view of the plurality of application views. In some embodiments, the subset includes the entire one or more views of the second software application.

In some embodiments, displaying the first set of one or more views includes (910) displaying the first set of one or more views without displaying any view of the first software application (e.g., web browser application view 712-6, FIG. 7G).

In some embodiments, displaying the first set of one or more views includes (912) displaying the first set of one or more views without displaying a view of any other software application. For example, in FIG. 7G, only one or more views of the web browser application are displayed.

While displaying the first set of the one or more views, the electronic device detects (914) a sequence of touch inputs on the touch-sensitive display, and determines (920) whether at least one gesture recognizer in the first set of one or more gesture recognizers recognizes the first portion of one or more touch inputs. For example, while displaying web browser application view 712-6 (FIG. 7G), the device determines whether gesture recognizers for the application launcher recognizes the first portion of the touch inputs. The sequence of touch inputs includes a first portion of one or more touch inputs and a second portion of one or more touch inputs subsequent to the first portion (i.e., the second portion is after the first portion).

In some embodiments, the sequence of touch inputs at least partially overlaps (916) at least one of the one or more displayed views of the second software application. For example, the application launcher receives the first portion of touch inputs on web browser application view 712-6 (FIG. 7G), even though the application launcher is not displayed.

In some embodiments, prior to a determination that at least one gesture recognizer in the first set of one or more gesture recognizers recognizes the first portion of one or more touch inputs, the electronic device concurrently delivers (918) the first portion of one or more touch inputs to the first software application and the second software application. For example, both the application launcher and the web browser application receive the touch-down event of finger contacts 707, 709, and 711 (FIG. 7G) prior to a determination that at least one gesture recognizer in the application launcher recognizes the touch-down event.

In accordance with a determination that at least one gesture recognizer in the first set of one or more gesture recognizers recognizes the first portion of one or more touch inputs (922, FIG. 9B), the electronic device delivers (924) the sequence of touch inputs to the first software application without delivering the sequence of touch inputs to the second software application, determines (926) whether at least one gesture recognizer in the first set of one or more gesture recognizers recognizes the sequence of touch inputs, and in accordance with a determination that at least one gesture recognizer in the first set of one or more gesture recognizers recognizes the sequence of touch inputs, processes (928) the sequence of touch inputs with the at least one gesture recognizer in the first set of one or more gesture recognizers that recognizes the sequence of touch inputs.

For example, when the touch-down and touch-movement of three finger contacts 707, 709, and 711 are detected on touch screen 156 (FIG. 7G), the electronic device identifies that at least a three-finger swipe-up gesture recognizer of the application launcher recognizes the touch inputs. Thereafter, the electronic device delivers subsequent touch events (e.g., lift-off of finger contact 707, 709, and 711) to the application launcher without delivering the subsequent touch events to the web browser application. The electronic device further identifies that the three-finger swipe-up gesture recognizer recognizes the sequence of touch inputs, and processes the sequence of touch inputs with a gesture handler corresponding to the three-finger swipe-up gesture recognizer.

In some embodiments, processing the sequence of touch inputs with the at least one gesture recognizer in the first set of one or more gesture recognizers includes (930) displaying one or more views of the first software application. For example, in response to detecting a multi-finger pinch gesture (FIG. 7R), the electronic device displays home screen 708 (FIG. 7A).

In some embodiments, processing the sequence of touch inputs with the at least one gesture recognizer in the first set of one or more gesture recognizers includes (932) replacing the display of the first set of one or more views with display of one or more views of the first software application (e.g., displaying home screen 708, FIG. 7A, which is part of the application launcher software application).

In some embodiments, the electronic device concurrently executes the first software application, the second software application, and a third software application; and processing the sequence of touch inputs with the at least one gesture recognizer in the first set of one or more gesture recognizers includes (934) replacing the first set of one or more views with one or more views of the third software application. In some embodiments, replacing the first set of one or more views with one or more views of the third software application includes displaying the one or more views of the third software application without concurrently displaying a view corresponding to any other software application. For example, in response to a multi-finger swipe gesture, the electronic device replaces the display of web browser application view 712-6 with a display of weather application view 712-5 (FIGS. 7J-7K).

In some embodiments, processing the sequence of touch inputs with the at least one gesture recognizer in the first set of one or more gesture recognizers includes (936) displaying in a first predefined area of the touch-sensitive display a group of open application icons that correspond to at least some of a plurality of concurrently open applications, and concurrently displaying at least a subset of the first set of one or more views. For example, in FIG. 7H, application icons 5004 in predefined area 716 corresponds to concurrently open applications of the electronic device. In some embodiments, application icons 5004 in predefined area 716 are displayed in accordance with a sequence of open applications. In FIG. 7H, the electronic device concurrently displays predefined area 716 and a subset of web browser application view 712-6.

In accordance with a determination that no gesture recognizer in the first set of one or more gesture recognizers recognizes the first portion of one or more touch inputs (938, FIG. 9C), the electronic device delivers (940) the sequence of touch inputs to the second software application, determines (942) whether at least one gesture recognizer in the second set of one or more gesture recognizers recognizes the sequence of touch inputs, and in accordance with a determination that at least one gesture recognizer in the second set of one or more gesture recognizers recognizes the sequence of touch inputs, processes (944) the sequence of touch inputs with the at least one gesture recognizer in the second set of one or more gesture recognizers that recognizes the sequence of touch inputs.

For example, when the first portion of one or more touch inputs is tap gesture (e.g., 703, FIG. 7G), and no gesture recognizer in the application launcher recognizes the tap gesture, the electronic device delivers the tap gesture to the web browser application, and determines whether at least one gesture recognizer of the web browser application recognizes the tap gesture. When the web browser application (or a gesture recognizer of the web browser application) recognizes tap gesture 703 on the bookmark icon, the electronic device processes tap gesture 703 with a corresponding gesture handler.

FIGS. 10A-10B are flow diagrams illustrating an event recognition method in accordance with some embodiments. Note that details of the processes described above with respect to methods 600, 800, and 900 are also applicable in an analogous manner to method 1000 described below. For brevity, these details are not repeated below.

Method 1000 is performed (1002) at an electronic device with an internal state (e.g., device/global internal state 134, FIG. 1C). The electronic device is configured to execute software that includes a view hierarchy with a plurality of views.

In method 1000, at least one gesture recognizer has a plurality of gesture definitions. This helps the gesture recognizer work in different distinct operating modes. For example, a device may have a normal operating mode and an accessibility operating mode. In the normal operating mode, a next application gesture is used to move between applications, and the next application gesture is defined as a three-finger left-swipe gesture. In the accessibility operating mode, the three-finger left-swipe gesture is used to perform a different function. Thus, a gesture different from the three-finger left-swipe is needed in the accessibility operating mode to correspond to the next application gesture (e.g., a four-finger left-swipe gesture in the accessibility operating mode). By having multiple gesture definitions associated with the next application gesture, the device can select one of the gesture definitions for the next application gesture, depending on the current operating mode. This provides flexibility in using the gesture recognizer in different operating modes. In some embodiments, a plurality of gesture recognizers with multiple gesture definitions is adjusted depending on the operating mode (e.g., gestures performed with three fingers in the normal operating mode are performed with four fingers in the accessibility operating mode).

In some embodiments, the internal state includes (1016) one or more settings for an accessibility operating mode (e.g., the internal state indicates whether the device is operating in the accessibility operating mode).

In some embodiments, the software is (1018) or includes an application launcher (e.g., a springboard).

In some embodiments, the software is (1020) or includes an operating system application (e.g., an application integrated with an operating system of the device).

The electronic device displays (1004) one or more views of the view hierarchy.

The electronic device executes (1006) one or more software elements. Each software element is associated with a particular view (e.g., application 133-1 has one or more application views 317, FIG. 3D), and each particular view includes one or more event recognizers (e.g., event recognizers 325, FIG. 3D). Each event recognizer has one or more event definitions based on one or more sub-events, and an event handler (e.g., gesture definitions 3035 and a reference to a corresponding event handler in event delivery information 3039, FIG. 3D). The event handler specifies an action for a target, and is configured to send the action to the target in response to the event recognizer detecting an event corresponding to a particular event definition of the one or more event definitions (e.g., an event definition selected from the one or more event definitions when the event recognizer has multiple event definitions, or a sole event definition when the event recognizer has only one event definition).

The electronic device detects (1008) a sequence of one or more sub-events.

The electronic device identifies (1010) one of the views of the view hierarchy as a hit view. The hit view establishes which views in the view hierarchy are actively involved views.

The electronic device delivers (1012) a respective sub-event to event recognizers for each actively involved view within the view hierarchy. In some embodiments, the one or more actively involved views in the view hierarchy include the hit view. In some embodiments, the one or more actively involved views in the view hierarchy include a default view (e.g., home screen 708 of the application launcher).

At least one event recognizer for actively involved views in the view hierarchy has (1014) a plurality of event definitions, one of which is selected in accordance with the internal state of the electronic device. For example, event recognizer 325-1 has a plurality of gesture definitions (e.g., 3037-1 and 3037-2, FIG. 3D). In some embodiments, event recognizer 325-1 selects one of the plurality of gesture definitions in event recognizer 325-1 based on one or more values in device/global internal state 134 (FIG. 1C). The at least one event recognizer then processes the respective sub-event prior to processing a next sub-event in the sequence of sub-events in accordance with the selected event definition. In some embodiments, each of two or more event recognizers for actively involved views in the view hierarchy has a plurality of event definitions, one of which is selected in accordance with the internal state of the electronic device. In such embodiments, at least one of the two or more event recognizers processes the respective sub-event prior to processing the next sub-event in the sequence of sub-events in accordance with the selected event definition.

For example, FIGS. 7J-7K illustrate a next-application gesture that initiates displaying an application view of a next application. In some embodiments, the application launcher includes a next-application gesture recognizer, which includes a gesture definition that matches a three-finger left-swipe gesture. For purposes of this example, assume that the next-application gesture recognizer also includes a gesture definition that corresponds to a four-finger left-swipe gesture. When one or more values in device/global internal state 134 are set to default value(s), the next-application gesture recognizer uses the three-finger left-swipe gesture definition and does not use the four-finger left-swipe gesture definition. When the one or more values in device/global internal state 134 are modified (e.g., by using accessibility module 127, FIG. 1C), the next-application gesture recognizer uses the four-finger left-swipe gesture definition and does not use the three-finger left-swipe gesture definition. Thus, in this example, when the one or more values in device/global internal state 134 are modified, a four-finger left-swipe gesture initiates displaying an application view of a next application.

Similarly, FIGS. 7R-7S illustrate that a home screen gesture initiates displaying web browser application view 712-6 at a reduced scale and displaying at least a portion of home screen 708 in response to detecting a five-finger pinch gesture. Based on device/global internal state 134 and gesture definitions in a home screen gesture recognizer, a four-finger pinch gesture, a three-finger pinch gesture, or any other suitable gesture may be used to initiate displaying web-browser application view 712-6 at a reduced scale and displaying at least a portion of home screen 708.

In some embodiments, the plurality of event definitions includes (1020) a first event definition corresponding to a first swipe gesture with a first number of fingers and a second event definition corresponding to a second swipe gesture with a second number of fingers distinct from the first number of fingers. For example, the plurality of event definitions for a respective gesture recognizer may include a three-finger swipe gesture and a four-finger swipe gesture.

In some embodiments, the plurality of event definitions includes a first event definition corresponding a first gesture of a first kind with a first number of fingers and a second event definition corresponding to a second gesture of the first kind with a second number of fingers distinct from the first number of fingers (e.g., a one-finger tap gesture and a two-finger tap gesture, a two-finger pinch gesture and a three-finger pinch gesture, etc.).

In some embodiments, the plurality of event definitions includes a first event definition corresponding to a first gesture and a second event definition corresponding to a second gesture distinct from the first gesture (e.g., a swipe gesture and a pinch gesture, a swipe gesture and a tap gesture, etc.).

In some embodiments, a respective definition of the plurality of event definitions is selected (1022) for a respective event recognizer in accordance with the internal state of the electronic device and a determination (by the electronic device) that the respective event definition does not correspond to an event definition of any event recognizer for the actively involved views other than the respective event recognizer.

For example, a respective gesture recognizer may have two event definitions: a first event definition corresponding to a three-finger left swipe gesture that is typically used for a normal operating mode and a second event definition corresponding to a four-finger left swipe gesture that is typically used for an accessibility operating mode. When the internal state of the electronic device is set in a way such that the electronic device operates in the accessibility mode, the electronic device determines whether the four-finger left swipe gesture for the second event definition is used by any other event recognizer for the actively involved views. If the four-finger left swipe gesture is not used by any other event recognizer for the actively involved views, the four-finger left swipe gesture is selected for the respective gesture recognizer in the accessibility operating mode. On the other hand, if the four-finger left swipe gesture is used by any other event recognizer for the actively involved views, the three-finger left swipe gesture is used for the respective gesture recognizer even in the accessibility operating mode. This prevents two or more gesture recognizers from undesirably responding to a same gesture.

In some embodiments, a respective definition of the plurality of event definitions is selected for a respective event recognizer in accordance with the internal state of the electronic device and a determination (by the electronic device) that the respective event definition does not correspond to an event definition of any event recognizer (including event recognizers for the actively involved views and any other views) other than the respective event recognizer.

In some embodiments, two or more event recognizers for actively involved views in the view hierarchy each have (1024) a respective plurality of event definitions, and a respective event definition of the respective plurality of event definitions is selected for a respective event recognizer in accordance with the internal state of the electronic device and a determination (by the electronic device) that the respective event definition does not correspond to any event definition selected for any event recognizer with two or more event definitions other than the respective event recognizer.

For example, actively involved views may have a first gesture recognizer and a second gesture recognizer. In this example, the first gesture recognizer has: a first event definition corresponding to a three-finger left swipe gesture that is typically used for a normal operating mode and a second event definition corresponding to a four-finger left swipe gesture that is typically used for an accessibility operating mode. The second gesture recognizer has: a third event definition corresponding to a two-finger left swipe gesture that is typically used for the normal operating mode and a fourth event definition corresponding to the four-finger left swipe gesture that is typically used for the accessibility operating mode. When the internal state of the electronic device is set in a way such that the electronic device operates in the accessibility mode, the electronic device determines whether a four-finger left swipe gesture that satisfies the second event definition is selected for any other event recognizer with two or more event definitions (e.g., the second event gesture recognizer). If the four-finger left swipe gesture is not selected for any other event recognizer with two or more event definitions, the four-finger left swipe gesture is selected for the first gesture recognizer in the accessibility operating mode. As a result, the four-finger left swipe gesture is not selected for the second gesture recognizer, because the four-finger left swipe gesture is already selected for the first gesture recognizer. Instead, the two-finger left swipe gesture is selected for the second gesture recognizer, because the two-finger left swipe gesture is not selected for any other gesture recognizer with two or more event definitions including the first gesture recognizer. In another example, the actively involved views have the first gesture recognizer and a third gesture recognizer without the second gesture recognizer. The third gesture recognizer has the third event definition (corresponding to the two-finger left swipe gesture) that is typically used for the normal operating mode and a fifth event definition corresponding to a three-finger left swipe gesture that is typically used for the accessibility operating mode. In the accessibility operating mode, the three-finger left swipe gesture can be selected for the third gesture recognizer, because the three-finger left swipe gesture is not selected for any other gesture recognizer with two or more event definitions.

Although the examples above have been described with respect to multi-finger left swipe gestures, the methods described above apply to swipe gestures in any direction (e.g., a swipe-right gesture, swipe-up gesture, swipe-down gesture, and/or any diagonal swipe gesture) or gestures of any other kinds (e.g., tap gestures, pinch gestures, depinch gestures, etc.).

In some embodiments, processing the respective sub-event in accordance with the selected event definition includes (1026) displaying one or more views of a first software application distinct from the software that includes the view hierarchy (e.g., concurrently displaying at least a portion of user interface 712-6 including one or more views of the software and a portion of home screen 708, FIG. 7S).

In some embodiments, the at least one event recognizer processes (1028) the respective sub-event by replacing the display of the one or more views of the view hierarchy with display of one or more views of a first software application (e.g., home screen 708, FIG. 7A) distinct from the software that includes the view hierarchy.

In some embodiments, the at least one event recognizer processes (1030) the respective sub-event by: displaying in a first predefined area of a display in the electronic device a group of open application icons that correspond to at least some of a plurality of concurrently open applications; and concurrently displaying at least a subset of the one or more views of the view hierarchy (e.g., open application icons 5004 and at least a portion of user interface 712-6, FIG. 7H). For example, the electronic device concurrently displays the group of open application icons and at least a subset of the one or more views of the view hierarchy in response to a three-finger swipe-up gesture in the normal operating mode and a four-finger swipe-up gesture in the accessibility operating mode.

Figure 11:
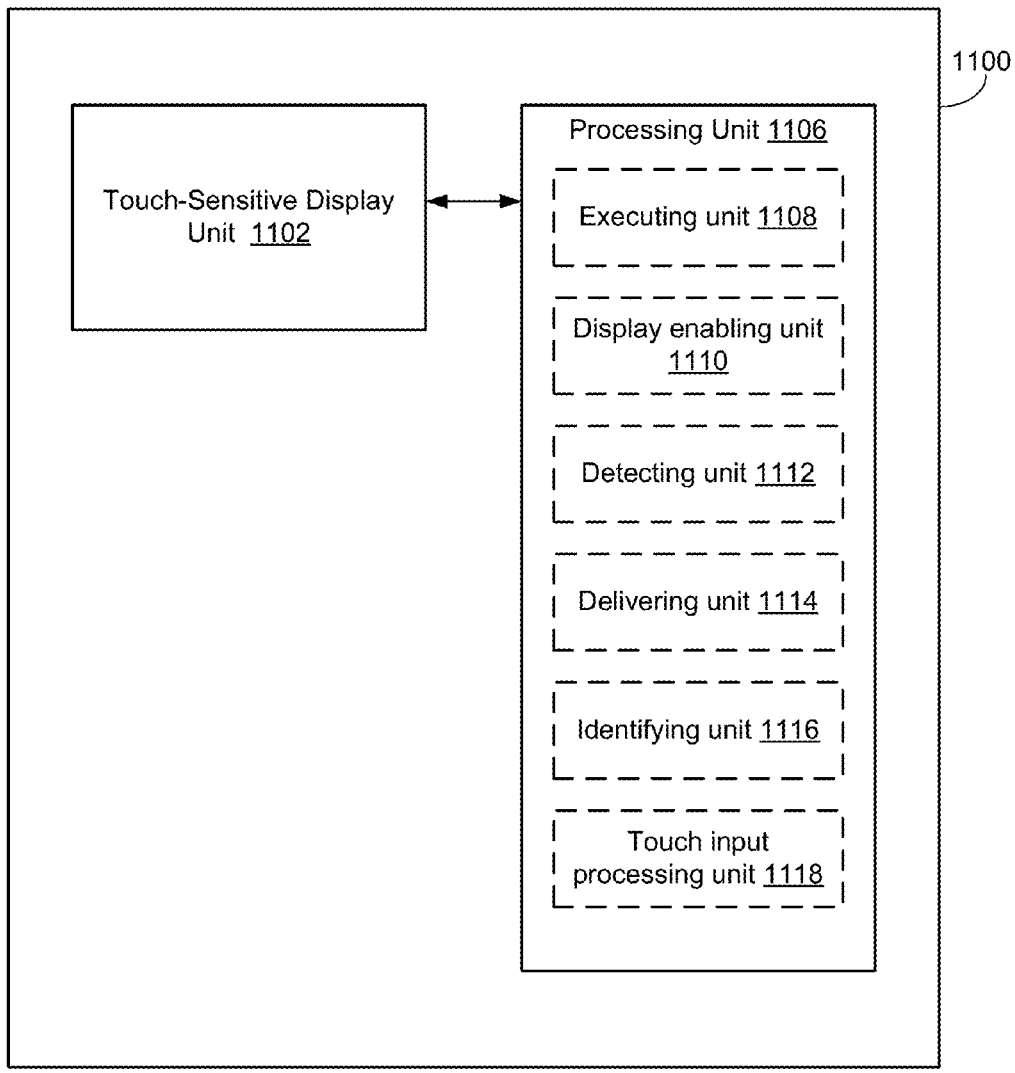
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a touch-sensitive display unit 1102 configured to receive touch inputs; and a processing unit 1106 coupled to the touch-sensitive display unit 1102. In some embodiments, the processing unit 1106 includes an executing unit 1108, a display enabling unit 1110, a detecting unit 1112, a delivering unit 1114, an identifying unit 1116, and a touch input processing unit 1118.

The processing unit 1106 is configured to: execute at least a first software application and a second software application (e.g., with the executing unit 1108). The first software application includes a first set of one or more gesture recognizers, and the second software application includes one or more views and a second set of one or more gesture recognizers. Respective gesture recognizers have corresponding gesture handlers. The processing unit 1106 is configured to enable display of at least a subset of the one or more views of the second software application (e.g., with the display enabling unit 1110, on the touch-sensitive display unit 1102). The processing unit 1106 is configured to, while displaying at least the subset of the one or more views of the second software application: detect a sequence of touch inputs on the touch-sensitive display unit 1102 (e.g., with the detecting unit 1112). The sequence of touch inputs includes a first portion of one or more touch inputs and a second portion of one or more touch inputs subsequent to the first portion. The processing unit 1106 is configured to, during a first phase of detecting the sequence of touch inputs: deliver the first portion of one or more touch inputs to the first software application and the second software application (e.g., with the delivering unit 1114); identify from gesture recognizers in the first set one or more matching gesture recognizers that recognize the first portion of one or more touch inputs (e.g., with the identifying unit 1116); and process the first portion of one or more touch inputs with one or more gesture handlers corresponding to the one or more matching gesture recognizers (e.g., with the touch input processing unit 1118).

In some embodiments, the processing unit 1106 is configured to detect the sequence of touch inputs (e.g., with the detecting unit 1112) while touch inputs in the first portion of one or more touch inputs at least partially overlap at least one of the displayed views of the second software application.

In some embodiments, the processing unit 1106 is configured to enable display of at least a subset of the one or more views of the second software application without displaying any view of the first software application (e.g., with the display enabling unit 1110, on the touch-sensitive display unit 1102).

In some embodiments, the processing unit 1106 is configured to enable display of at least a subset of the one or more views of the second software application without displaying a view of any other application (e.g., with the display enabling unit 1110, on the touch-sensitive display unit 1102).

In some embodiments, the processing unit 1106 is configured to, during a second phase of detecting the sequence of touch inputs, subsequent to the first phase: deliver the second portion of one or more touch inputs to the first software application without delivering the second portion of one or more touch inputs to the second software application (e.g., with the delivering unit 1114); identify from the one or more matching gesture recognizers a second matching gesture recognizer that recognizes the sequence of touch inputs (e.g., with the identifying unit 1116); and process the sequence of touch inputs with a gesture handler corresponding to the respective matching gesture recognizer (e.g., with the touch input processing unit 1118).

In some embodiments, the processing unit 1106 is configured to process the sequence of touch inputs with the gesture handler corresponding to the respective matching gesture recognizer by enabling display of one or more views of the first software application (e.g., with the display enabling unit 1110, on the touch-sensitive display unit 1102).

In some embodiments, the processing unit 1106 is configured to process the sequence of touch inputs with the gesture handler corresponding to the respective matching gesture recognizer by replacing the display of the one or more views of the second software application with display of one or more views of the first software application (e.g., with the display enabling unit 1110, on the touch-sensitive display unit 1102).

In some embodiments, the processing unit 1106 is configured to: concurrently execute the first software application, the second software application, and a third software application (e.g., with the executing unit 1108); and process the sequence of touch inputs with the gesture handler corresponding to the respective matching gesture recognizer by replacing the one or more displayed views of the second software application with one or more views of the third software application (e.g., with the display enabling unit 1110, on the touch-sensitive display unit 1102).

In some embodiments, the processing unit 1106 is configured to: enable display of, in a first predefined area of the touch-sensitive display unit 1102, a group of open application icons that correspond to at least some of a plurality of concurrently open applications (e.g., with the display enabling unit 1110); and enable concurrent display of at least a subset of the one or more views of the second software application (e.g., with the display enabling unit 1110).

In some embodiments, the first software application is an application launcher.

In some embodiments, the first software application is an operating system application.

Figure 12:
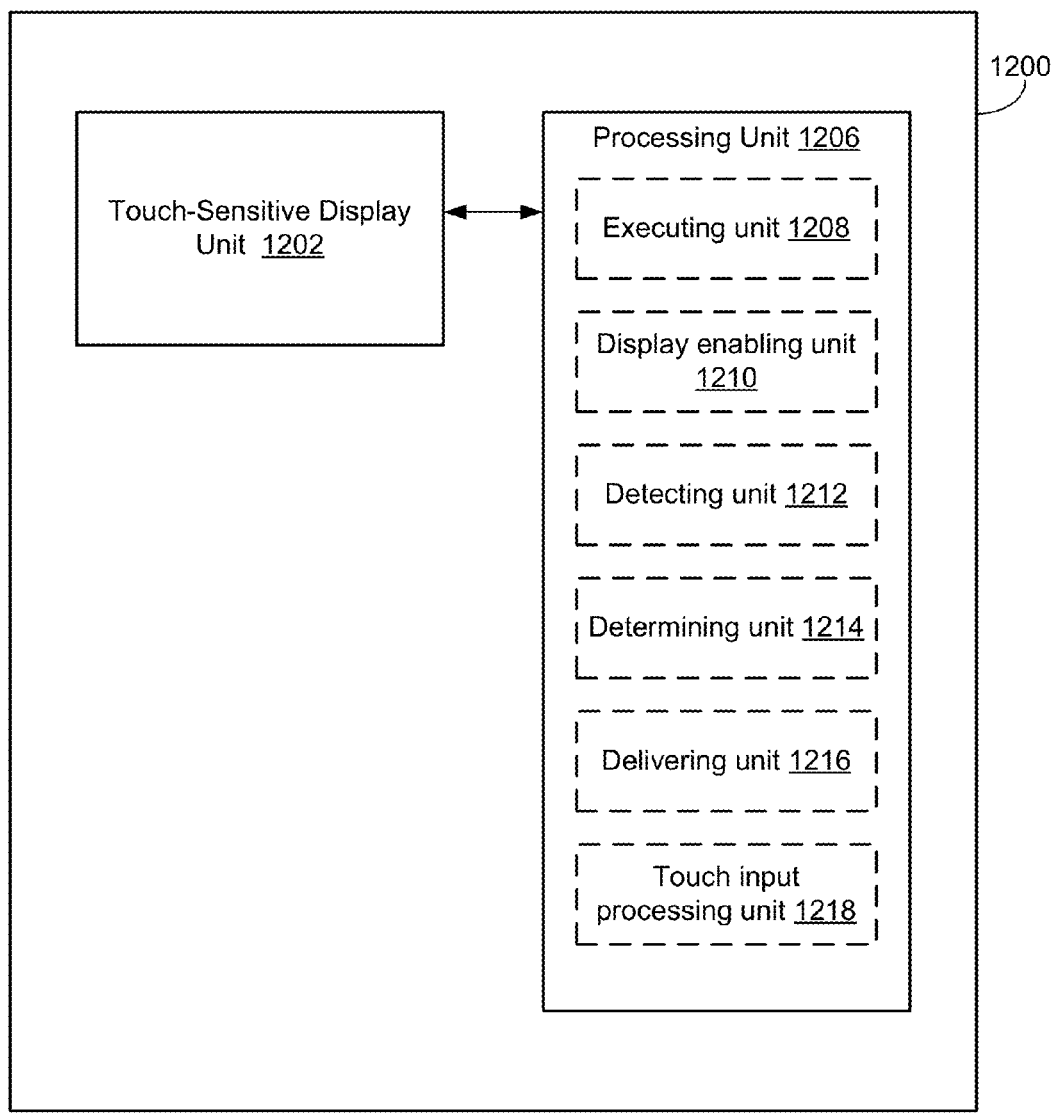
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, an electronic device 1200 includes a touch-sensitive display unit 1202 configured to receive touch inputs; and a processing unit 1206 coupled to the touch-sensitive display unit 1202. In some embodiments, the processing unit 1206 includes an executing unit 1208, a display enabling unit 1210, a detecting unit 1212, a determining unit 1214, a delivering unit 1216, and a touch input processing unit 1218.

The processing unit 1206 is configured to execute at least a first software application and a second software application (e.g., with the executing unit 1208). The first software application includes a first set of one or more gesture recognizers, and the second software application includes one or more views and a second set of one or more gesture recognizers. Respective gesture recognizers have corresponding gesture handlers. The processing unit 1206 is configured to enable display of a first set of one or more views (e.g., with the display enabling unit 1210). The first set of one or more views include at least a subset of the one or more views of the second software application. The processing unit 1206 is configured to, while displaying the first set of the one or more views, detect a sequence of touch inputs on the touch-sensitive display unit (e.g., with the detecting unit 1212). The sequence of touch inputs includes a first portion of one or more touch inputs and a second portion of one or more touch inputs subsequent to the first portion. The processing unit 1206 is configured to determine whether at least one gesture recognizer in the first set of one or more gesture recognizers recognizes the first portion of one or more touch inputs (e.g., with the determining unit 1214). The processing unit 1206 is configured to, in accordance with a determination that at least one gesture recognizer in the first set of one or more gesture recognizers recognizes the first portion of one or more touch inputs: deliver the sequence of touch inputs to the first software application without delivering the sequence of touch inputs to the second software application (e.g., with the delivering unit 1216); determine whether at least one gesture recognizer in the first set of one or more gesture recognizers recognizes the sequence of touch inputs (e.g., with the determining unit 1214). The processing unit 1206 is configured to, in accordance with a determination that at least one gesture recognizer in the first set of one or more gesture recognizers recognizes the sequence of touch inputs, process the sequence of touch inputs with the at least one gesture recognizer in the first set of one or more gesture recognizers that recognizes the sequence of touch inputs (e.g., with the touch input processing unit 1218). The processing unit 1206 is configured to, in accordance with a determination that no gesture recognizer in the first set of one or more gesture recognizers recognizes the first portion of one or more touch inputs: deliver the sequence of touch inputs to the second software application (e.g., with the delivering unit 1216); and determine whether at least one gesture recognizer in the second set of one or more gesture recognizers recognizes the sequence of touch inputs (e.g., with the determining unit 1214). The processing unit 1206 is configured to, in accordance with a determination that at least one gesture recognizer in the second set of one or more gesture recognizers recognizes the sequence of touch inputs, process the sequence of touch inputs with the at least one gesture recognizer in the second set of one or more gesture recognizers that recognizes the sequence of touch inputs (e.g., with the touch input processing unit 1218).

In some embodiments, the sequence of touch inputs at least partially overlaps at least one of the one or more displayed views of the second software application.

In some embodiments, the processing unit 1206 is configured to enable display of the first set of one or more views without displaying any view of the first software application (e.g., with the display enabling unit 1210, on the touch-sensitive display unit 1202).

In some embodiments, the processing unit 1206 is configured to enable display of the first set of one or more views without displaying a view of any other software application (e.g., with the display enabling unit 1210, on the touch-sensitive display unit 1202).

In some embodiments, prior to the determination that at least one gesture recognizer in the first set of one or more gesture recognizers recognizes the first portion of one or more touch inputs, the processing unit 1206 is configured to concurrently deliver the first portion of one or more touch inputs to the first software application and the second software application (e.g., with the delivering unit 1216).

In some embodiments, the first software application is an application launcher.

In some embodiments, the first software application is an operating system application.

In some embodiments, the processing unit 1206 is configured to process the sequence of touch inputs with the at least one gesture recognizer in the first set of one or more gesture recognizers by enabling displaying one or more views of the first software application (e.g., with the display enabling unit 1208, on the touch-sensitive display unit 1202).

In some embodiments, the processing unit 1206 is configured to process the sequence of touch inputs with the at least one gesture recognizer in the first set of one or more gesture recognizers by replacing the display of the first set of one or more views with display of one or more views of the first software application (e.g., with the display enabling unit 1208, on the touch-sensitive display unit 1202).

In some embodiments, the processing unit 1206 is configured to concurrently execute the first software application, the second software application, and a third software application (e.g., with the executing unit 1208). The processing unit 1206 is configured to process the sequence of touch inputs with the at least one gesture recognizer in the first set of one or more gesture recognizers by replacing the first set of one or more views with one or more views of the third software application (e.g., with the display enabling unit 1210, on the touch-sensitive display unit 1202).

In some embodiments, the processing unit 1206 is configured to: enable display of in a first predefined area of the touch-sensitive display unit 1202 a group of open application icons that correspond to at least some of a plurality of concurrently open applications (e.g., with the display enabling unit 1210); and concurrently display at least a subset of the first set of one or more views (e.g., with the display enabling unit 1210).

Figure 13:
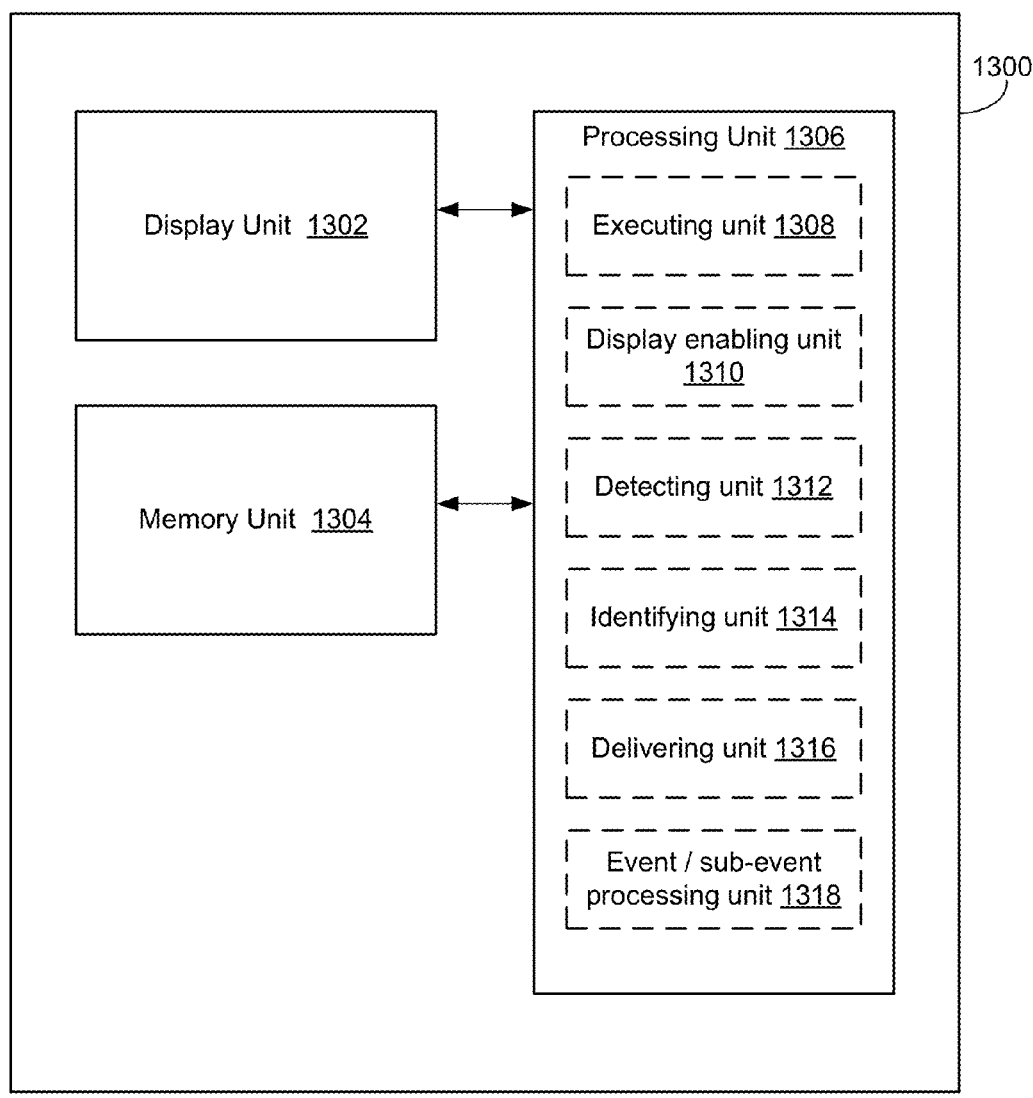
FIG. 13 is a functional block diagram of an electronic device in accordance with some embodiments.

In accordance with some embodiments, FIG. 13 shows a functional block diagram of an electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, an electronic device 1300 includes a display unit 1302 configured to display one or more views; a memory unit 1304 configured to store an internal state; and a processing unit 1306 coupled to the display unit 1302 and the memory unit 1304. In some embodiments, the processing unit 1306 includes an executing unit 1308, a display enabling unit 1310, a detecting unit 1312, an identifying unit 1314, a delivering unit 1316, and an event/sub-event processing unit 1318. In some embodiments, the processing unit 1306 includes the memory unit 1304.

The processing unit 1306 is configured to: execute software that includes a view hierarchy with a plurality of views (e.g., with the executing unit 1308); enable display of one or more views of the view hierarchy (e.g., with the display enabling unit 1310, on the display unit 1302); and execute one or more software elements (e.g., with the executing unit 1308). Each software element is associated with a particular view, and each particular view includes one or more event recognizers. Each event recognizer has: one or more event definitions based on one or more sub-events, and an event handler. The event handler specifies an action for a target, and is configured to send the action to the target in response to the event recognizer detecting an event corresponding to a particular event definition of the one or more event definitions. The processing unit 1306 is configured to: detect a sequence of one or more sub-events (e.g., with the detecting unit 1312); and identify one of the views of the view hierarchy as a hit view (e.g., with the identifying unit 1314). The hit view establishes which views in the view hierarchy are actively involved views. The processing unit 1306 is configured to deliver a respective sub-event to event recognizers for each actively involved view within the view hierarchy (e.g., with the delivering unit 1316). At least one event recognizer for actively involved views in the view hierarchy has a plurality of event definitions, one of which is selected in accordance with the internal state of the electronic device, and the at least one event recognizer processes the respective sub-event (e.g., with the event/sub-event processing unit 1318) prior to processing a next sub-event in the sequence of sub-events in accordance with the selected event definition.

In some embodiments, the plurality of event definitions includes a first event definition corresponding to a first swipe gesture with a first number of fingers and a second event definition corresponding to a second swipe gesture with a second number of fingers distinct from the first number of fingers.

In some embodiments, the internal state includes one or more settings for an accessibility operating mode.

In some embodiments, a respective definition of the plurality of event definitions is selected for a respective event recognizer in accordance with the internal state of the electronic device and a determination that the respective event definition does not correspond to an event definition of any event recognizer for the actively involved views other than the respective event recognizer.

In some embodiments, two or more event recognizers for actively involved views in the view hierarchy each have a respective plurality of event definitions, and a respective event definition of the respective plurality of event definitions is selected for a respective event recognizer in accordance with the internal state of the electronic device and a determination that the respective event definition does not correspond to any event definition selected for any event recognizer with two or more event definitions other than the respective event recognizer.

In some embodiments, the processing unit 1306 is configured to process the respective sub-event in accordance with the selected event definition by enabling display of one or more views of a first software application distinct from the software that includes the view hierarchy (e.g., with the display enabling unit 1310, on the display unit 1302).

In some embodiments, the processing unit 1306 is configured to process the respective sub-event by replacing the display of the one or more views of the view hierarchy with display of one or more views of a first software application distinct from the software that includes the view hierarchy (e.g., with the display enabling unit 1310, on the display unit 1302).

In some embodiments, the processing unit 1306 is configured to process the respective sub-event by: enabling display of, in a first predefined area of the display unit 1302, a group of open application icons that correspond to at least some of a plurality of concurrently open applications (e.g., with the display enabling unit 1310); and enabling concurrently display of at least a subset of the one or more views of the view hierarchy (e.g., with the display enabling unit 1310).

In some embodiments, the software is an application launcher.

In some embodiments, the software is an operating system application.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at an electronic device with a touch-sensitive display, the electronic device configured to execute at least a first software application and a second software application, the first software application including a first set of one or more gesture recognizers, the second software application including a second set of one or more gesture recognizers:
        displaying one or more views of the second software application; and
        while displaying the one or more views:
            detecting a sequence of touch inputs on the touch-sensitive display;
            determining whether at least one gesture recognizer in the first set of one or more gesture recognizers of the first software application recognizes a portion of the sequence of touch inputs;
            in accordance with a determination that no gesture recognizer in the first set of one or more gesture recognizers recognizes the portion of the sequence of touch inputs:
                delivering the sequence of touch inputs to the second software application;
                determining whether at least one gesture recognizer in the second set of one or more gesture recognizers of the second software application recognizes the sequence of touch inputs; and,
                in accordance with a determination that at least one gesture recognizer in the second set of one or more gesture recognizers recognizes the sequence of touch inputs, processing the sequence of touch inputs with the at least one gesture recognizer, in the second set of one or more gesture recognizers of the second software application, that recognizes the sequence of touch inputs.

2. The method of claim 1, wherein the sequence of touch inputs at least partially overlaps at least one of the one or more displayed views of the second software application.

3. The method of claim 1, wherein displaying the one or more views of the second software application includes displaying the one or more views of the second software application without displaying any view of the first software application.

4. The method of claim 1, wherein displaying the one or more views of the second software application includes displaying the one or more views of the second software application without displaying a view of any other software application.

5. The method of claim 1, further comprising, prior to a determination that at least one gesture recognizer in the first set of one or more gesture recognizers of the first software application recognizes the portion of the sequence of touch inputs, concurrently delivering the portion of the sequence of touch inputs to the first software application and the second software application.

6. The method of claim 1, wherein the first software application is an application launcher.

7. The method of claim 1, wherein the first software application is an operating system application.

8. The method of claim 1, further comprising:
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes displaying one or more views of the first software application.

9. The method of claim 1, further comprising:
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes replacing the display of the one or more views of the second software application with display of one or more views of the first software application.

10. The method of claim 1, wherein the electronic device concurrently executes the first software application, the second software application, and a third software application, the method further comprising:
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes replacing the one or more views of the second software application with one or more views of the third software application.

11. The method of claim 1, further comprising:
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes:

displaying in a first predefined area of the touch-sensitive display a group of open application icons that correspond to at least some of a plurality of concurrently open applications; and
concurrently displaying at least a subset of the one or more views of the second software application.

12. An electronic device, comprising:
a touch-sensitive display;
one or more processors; and
memory storing one or more programs for execution by the one or more processors, the one or more programs including: at least a first software application and a second software application, the first software application including a first set of one or more gesture recognizers, the second software application including a second set of one or more gesture recognizers;
wherein the one or more programs include instructions for:
displaying one or more views of the second software application; and
while displaying the one or more views:
detecting a sequence of touch inputs on the touch-sensitive display;
determining whether at least one gesture recognizer in the first set of one or more gesture recognizers of the first software application recognizes a portion of the sequence of touch inputs;
in accordance with a determination that no gesture recognizer in the first set of one or more gesture recognizers recognizes the portion of the sequence of touch inputs:
delivering the sequence of touch inputs to the second software application;
determining whether at least one gesture recognizer in the second set of one or more gesture recognizers of the second software application recognizes the sequence of touch inputs; and
in accordance with a determination that at least one gesture recognizer in the second set of one or more gesture recognizers recognizes the sequence of touch inputs, processing the sequence of touch inputs with the at least one gesture recognizer, in the second set of one or more gesture recognizers of the second software application, that recognizes the sequence of touch inputs.

13. The electronic device of claim 12, wherein the sequence of touch inputs at least partially overlaps at least one of the one or more displayed views of the second software application.

14. The electronic device of claim 12, wherein the instructions for displaying the one or more views of the second software application include instructions for displaying the one or more views of the second software application without displaying any view of the first software application.

15. The electronic device of claim 12, wherein the one or more programs include instructions for, in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, and the instructions for processing the sequence of touch inputs with the at least one gesture recognizer in the first set of one or more gesture recognizers include instructions for replacing the display of the one or more views of the second software application with display of one or more views of the first software application.

16. The electronic device of claim 12, wherein the one or more programs include instructions for, in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, and the instructions for processing the sequence of touch inputs with the at least one gesture recognizer in the first set of one or more gesture recognizers of the first software application include instructions for:

displaying in a first predefined area of the touch-sensitive display a group of open application icons that correspond to at least some of a plurality of concurrently open applications; and concurrently displaying at least a subset of the one or more views of the second software application.

17. The electronic device of claim 12, wherein the instructions for displaying the one or more views of the second software application include instructions for displaying the one or more views of the second software application without displaying a view of any other software application.

18. The electronic device of claim 12, wherein the one or more programs include instructions for, prior to a determination that at least one gesture recognizer in the first set of one or more gesture recognizers of the first software application recognizes the portion of the sequence of touch inputs, concurrently delivering the portion of the sequence of touch inputs to the first software application and the second software application.

19. The electronic device of claim 12, wherein the first software application is an application launcher.

20. The electronic device of claim 12, wherein the first software application is an operating system application.

21. The electronic device of claim 12, wherein the one or more programs include instructions for, in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes displaying one or more views of the first software application.

22. The electronic device of claim 12, wherein the one or more programs include the first software application, the second software application, a third software application, and instructions for:

in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes replacing the one or more views of the second software application with one or more views of the third software application.

23. A non-transitory computer readable storage medium storing one or more programs for execution by one or more processors in an electronic device with a touch-sensitive display, the one or more programs including: at least a first software application and a second software application, the first software application including a first set of one or more gesture recognizers, the second software application including a second set of one or more gesture recognizers, wherein the one or more programs include instructions for:

displaying one or more views of the second software application; and while displaying the one or more views:

detecting a sequence of touch inputs on the touch-sensitive display;

determining whether at least one gesture recognizer in the first set of one or more gesture recognizers of the first software application recognizes a portion of the sequence of touch inputs;

in accordance with a determination that no gesture recognizer in the first set of one or more gesture recognizers recognizes the portion of the sequence of touch inputs:

delivering the sequence of touch inputs to the second software application;

determining whether at least one gesture recognizer in the second set of one or more gesture recognizers of the second software application recognizes the sequence of touch inputs; and in accordance with a determination that at least one gesture recognizer in the second set of one or more gesture recognizers recognizes the sequence of touch inputs, processing the sequence of touch inputs with the at least one gesture recognizer, in the second set of one or more gesture recognizers of the second software application, that recognizes the sequence of touch inputs.

24. The computer readable storage medium of claim 23, wherein the sequence of touch inputs at least partially overlaps at least one of the one or more displayed views of the second software application.

25. The computer readable storage medium of claim 23, wherein the instructions for displaying the one or more views of the second software application include instructions for displaying the one or more views of the second software application without displaying any view of the first software application.

26. The computer readable storage medium of claim 23, wherein the one or more programs include instructions for, in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, and the instructions for processing the sequence of touch inputs with the at least one gesture recognizer in the first set of one or more gesture recognizers of the first software application include instructions for replacing the display of the one or more views of the second software application with display of one or more views of the first software application.

27. The computer readable storage medium of claim 23, wherein the instructions for displaying the one or more views of the second software application include instructions for displaying the one or more views of the second software application without displaying a view of any other software application.

28. The computer readable storage medium of claim 23, wherein the one or more programs include instructions for, prior to a determination that at least one gesture recognizer in the first set of one or more gesture recognizers of the first software application recognizes the portion of the sequence of touch inputs, concurrently delivering the portion of the sequence of touch inputs to the first software application and the second software application.

29. The computer readable storage medium of claim 23, wherein the first software application is an application launcher.

30. The computer readable storage medium of claim 23, wherein the first software application is an operating system application.

31. The computer readable storage medium of claim 23, wherein the one or more programs include instructions for,
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes displaying one or more views of the first software application.

32. The computer readable storage medium of claim 23, wherein the one or more programs include the first software application, the second software application, a third software application, and instructions for:
in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, wherein processing the sequence of touch inputs with the at least one gesture recognizer in the first set of one or more gesture recognizers of the first software application includes replacing the one or more views of the second software application with one or more views of the third software application.

33. The computer readable storage medium of claim 23, wherein the one or more programs include instructions for, in accordance with a determination that at least one gesture recognizer in the first set of one or more gesture recognizers of the first software application recognizes an entirety of the sequence of touch inputs, processing the sequence of touch inputs with the at least one gesture recognizer, in the first set of one or more gesture recognizers of the first software application, that recognizes the sequence of touch inputs, and the instructions for processing the sequence of touch inputs with the at least one gesture recognizer in the first set of one or more gesture recognizers of the first software application include instructions for:
displaying in a first predefined area of the touch-sensitive display a group of open application icons that correspond to at least some of a plurality of concurrently open applications; and
concurrently displaying at least a subset of the one or more views of the second software application.

\* \* \* \* \*